Dec. 11, 1962 L. D. SPRINGER 3,067,938

STERLING MULTIPLIER

Filed June 27, 1958 59 Sheets-Sheet 1

INVENTOR
LAMAR D. SPRINGER

BY Louis A Kline

[signature]

HIS ATTORNEYS

Dec. 11, 1962
L. D. SPRINGER
STERLING MULTIPLIER
3,067,938
Filed June 27, 1958
59 Sheets-Sheet 2

BASIC MULTIPLICATION

INVENTOR
LAMAR D. SPRINGER
BY Louis A Kline
J Havender
HIS ATTORNEYS

Dec. 11, 1962 L. D. SPRINGER 3,067,938

STERLING MULTIPLIER

Filed June 27, 1958 59 Sheets-Sheet 3

INVENTOR
LAMAR D. SPRINGER
BY Louis A Kline
J Havender
HIS ATTORNEYS

INVENTOR
LAMAR D. SPRINGER
BY Louis A Kline
J. Lavender
HIS ATTORNEYS

INVENTOR
LAMAR D. SPRINGER
BY Louis A Kline
J Cavender
HIS ATTORNEYS

Dec. 11, 1962

L. D. SPRINGER

STERLING MULTIPLIER 3,067,938

Filed June 27, 1958

59 Sheets-Sheet 6

INVENTOR
LAMAR D. SPRINGER

BY Louis A Kline
Bavender

HIS ATTORNEYS

INVENTOR
LAMAR D. SPRINGER
BY Louis A. Kline
Hcavender
HIS ATTORNEYS

Dec. 11, 1962 L. D. SPRINGER 3,067,938

STERLING MULTIPLIER

Filed June 27, 1958 59 Sheets-Sheet 8

INVENTOR
LAMAR D. SPRINGER

BY Louis A Kline
Flavender

HIS ATTORNEYS

FRACTIONAL SHILLINGS CONVERSION TO PENCE
0.44 SHILLINGS STORED, M9 AND M10 CONDUCTING

INVENTOR
LAMAR D. SPRINGER
BY Louis A. Kline
J. Lavender
HIS ATTORNEYS

Dec. 11, 1962 L. D. SPRINGER 3,067,938

STERLING MULTIPLIER

Filed June 27, 1958 59 Sheets-Sheet 10

INVENTOR
LAMAR D. SPRINGER
BY Louis A Kline
Hlavender
HIS ATTORNEYS

Dec. 11, 1962 L. D. SPRINGER 3,067,938

STERLING MULTIPLIER

Filed June 27, 1958 59 Sheets-Sheet 11

INVENTOR
LAMAR D. SPRINGER
BY Louis A Kline
Hovender
HIS ATTORNEYS

DIVISION BY 12, 28.0 PENCE STORED, M16 CONDUCTING

INVENTOR
LAMAR D. SPRINGER
BY Louis A Kline
J Cavender
HIS ATTORNEYS

Dec. 11, 1962 L. D. SPRINGER 3,067,938

STERLING MULTIPLIER

Filed June 27, 1958 59 Sheets-Sheet 13

INVENTOR
LAMAR D. SPRINGER

BY Louis A Kline
[signature]

HIS ATTORNEY

Dec. 11, 1962 L. D. SPRINGER 3,067,938

STERLING MULTIPLIER

Filed June 27, 1958 59 Sheets-Sheet 14

INVENTOR
LAMAR D. SPRINGER

BY Louis A. Kline
J. Cavender
HIS ATTORNEY

Dec. 11, 1962 L. D. SPRINGER 3,067,938

STERLING MULTIPLIER

Filed June 27, 1958 59 Sheets-Sheet 15

INVENTOR
LAMAR D. SPRINGER

BY Louis A Kline
Lavender
HIS ATTORNEYS

Dec. 11, 1962 L. D. SPRINGER 3,067,938

STERLING MULTIPLIER

Filed June 27, 1958 59 Sheets-Sheet 16

INVENTOR
LAMAR D. SPRINGER
BY Louis A. Kline
Cavender
HIS ATTORNEYS

Dec. 11, 1962 L. D. SPRINGER 3,067,938

STERLING MULTIPLIER

Filed June 27, 1958 59 Sheets-Sheet 17

INVENTOR
LAMAR D. SPRINGER
BY Louis A Kline
J Lavender
HIS ATTORNEYS

INVENTOR
LAMAR D. SPRINGER
BY Louis A Kline
[signature]
HIS ATTORNEYS

Dec. 11, 1962

L. D. SPRINGER 3,067,938

STERLING MULTIPLIER

Filed June 27, 1958

59 Sheets-Sheet 19

INVENTOR
LAMAR D. SPRINGER

BY Louis A Kline
[signature]

HIS ATTORNEYS

INVENTOR
LAMAR D. SPRINGER
BY Louis A Kline
J. Havender
HIS ATTORNEYS

INVENTOR
LAMAR D. SPRINGER
BY Louis A Kline
J Havender
HIS ATTORNEYS

INVENTOR
LAMAR D. SPRINGER
BY Louis A Kline
J Hauender
HIS ATTORNEYS

Dec. 11, 1962 L. D. SPRINGER 3,067,938

STERLING MULTIPLIER

Filed June 27, 1958 59 Sheets-Sheet 23

INVENTOR
LAMAR D. SPRINGER

BY Louis A. Kline
Cavender

HIS ATTORNEYS

Dec. 11, 1962 L. D. SPRINGER 3,067,938

STERLING MULTIPLIER

Filed June 27, 1958 59 Sheets-Sheet 24

INVENTOR
LAMAR D. SPRINGER

BY Louis A. Kline
Hovender

HIS ATTORNEYS

INVENTOR
LAMAR D. SPRINGER
BY Louis A Kline
J. Cavender
HIS ATTORNEYS

INVENTOR
LAMAR D. SPRINGER
BY Louis A Kline
J B Cavender
HIS ATTORNEYS

INVENTOR
LAMAR D. SPRINGER

BY Louis A Kline
J Cavender

HIS ATTORNEYS

Dec. 11, 1962 L. D. SPRINGER 3,067,938

STERLING MULTIPLIER

Filed June 27, 1958 59 Sheets-Sheet 28

INVENTOR
LAMAR D. SPRINGER

BY Louis A. Kline
[signature]

HIS ATTORNEYS

INVENTOR
LAMAR D. SPRINGER

BY Louis A Kline
J Havender

HIS ATTORNEYS

Dec. 11, 1962 L. D. SPRINGER 3,067,938

STERLING MULTIPLIER

Filed June 27, 1958 59 Sheets-Sheet 30

INVENTOR
LAMAR D. SPRINGER
BY Louis A Kline
J Cavender
HIS ATTORNEYS

INVENTOR
LAMAR D. SPRINGER

BY Louis A Kline
J Cavender

HIS ATTORNEYS

Dec. 11, 1962 L. D. SPRINGER 3,067,938

STERLING MULTIPLIER

Filed June 27, 1958 59 Sheets-Sheet 32

INVENTOR
LAMAR D. SPRINGER

BY Louis A Kline
J Cavender
HIS ATTORNEYS

INVENTOR
LAMAR D. SPRINGER
BY Louis A Kline
J Cavender
HIS ATTORNEYS

Dec. 11, 1962 L. D. SPRINGER 3,067,938

STERLING MULTIPLIER

Filed June 27, 1958 59 Sheets-Sheet 34

INVENTOR
LAMAR D. SPRINGER
BY Louis A. Kline
J. Hauender
HIS ATTORNEYS

Dec. 11, 1962 L. D. SPRINGER 3,067,938

STERLING MULTIPLIER

Filed June 27, 1958 59 Sheets-Sheet 35

INVENTOR
LAMAR D. SPRINGER
BY Louis A Kline
J. Cavender
HIS ATTORNEYS

Dec. 11, 1962

L. D. SPRINGER 3,067,938

STERLING MULTIPLIER

Filed June 27, 1958

59 Sheets-Sheet 36

INVENTOR
LAMAR D. SPRINGER

BY Louis A Kline
J. Cavender

HIS ATTORNEYS

Dec. 11, 1962 L. D. SPRINGER 3,067,938

STERLING MULTIPLIER

Filed June 27, 1958 59 Sheets-Sheet 37

INVENTOR
LAMAR D. SPRINGER

BY Louis A Kline
J Cavender
HIS ATTORNEYS

Dec. 11, 1962 L. D. SPRINGER 3,067,938

STERLING MULTIPLIER

Filed June 27, 1958 59 Sheets-Sheet 38

INVENTOR
LAMAR D. SPRINGER

BY Louis A Kline
J Cavender

HIS ATTORNEYS

INVENTOR
LAMAR D. SPRINGER

BY Louis A Kline
J. Cavender
HIS ATTORNEYS

Dec. 11, 1962 L. D. SPRINGER 3,067,938

STERLING MULTIPLIER

Filed June 27, 1958 59 Sheets-Sheet 40

INVENTOR
LAMAR D. SPRINGER

BY Louis A Kline
J Cavender
HIS ATTORNEYS

INVENTOR
LAMAR D. SPRINGER
BY Louis A Kline
J Cavender
HIS ATTORNEYS

INVENTOR
LAMAR D. SPRINGER

BY Louis A. Kline
J. Cavender

HIS ATTORNEY

INVENTOR
LAMAR D. SPRINGER
BY Louis A Kline
J Havender
HIS ATTORNEYS

INVENTOR
LAMAR D. SPRINGER
BY Louis A Kline
J Cavender
HIS ATTORNEYS

Dec. 11, 1962 L. D. SPRINGER 3,067,938

STERLING MULTIPLIER

Filed June 27, 1958 59 Sheets-Sheet 45

PENCE READOUT MATRIX

INVENTOR
LAMAR D. SPRINGER

BY Louis A Kline
[signature]

HIS ATTORNEYS

INVENTOR
LAMAR D. SPRINGER
BY Louis A Kline
J Cavender
HIS ATTORNEYS

INVENTOR
LAMAR D. SPRINGER
BY Louis A Kline
[signature]
HIS ATTORNEYS

INVENTOR
LAMAR D. SPRINGER
BY Louis A Kline
J Havender
HIS ATTORNEYS

INVENTOR
LAMAR D. SPRINGER

BY Louis A Kline
J Havender

HIS ATTORNEYS

INVENTOR
LAMAR D. SPRINGER
BY Louis A Kline
J Havender
HIS ATTORNEYS

Dec. 11, 1962 L. D. SPRINGER 3,067,938

STERLING MULTIPLIER

Filed June 27, 1958 59 Sheets-Sheet 51

SHILLINGS READOUT MATRIX

INVENTOR
LAMAR D. SPRINGER
BY Louis A Kline
Cavender
HIS ATTORNEYS

INVENTOR
LAMAR D. SPRINGER
BY Louis A Kline
J Havender
HIS ATTORNEYS

Dec. 11, 1962 L. D. SPRINGER 3,067,938

STERLING MULTIPLIER

Filed June 27, 1958 59 Sheets-Sheet 53

INVENTOR
LAMAR D. SPRINGER

BY Louis A Kline
J Havender

HIS ATTORNEYS

INVENTOR
LAMAR D. SPRINGER
BY Louis A Kline
J Havender
HIS ATTORNEYS

INVENTOR
LAMAR D. SPRINGER
BY Louis A. Kline
J. Cavender
HIS ATTORNEYS

Dec. 11, 1962 L. D. SPRINGER 3,067,938

STERLING MULTIPLIER

Filed June 27, 1958 59 Sheets-Sheet 56

INVENTOR
LAMAR D. SPRINGER
BY Louis A Kline
J. Cavender
HIS ATTORNEYS

INVENTOR
LAMAR D. SPRINGER
BY
Louis A Kline
J. Cavender
HIS ATTORNEYS

FIG. 51

DIVISIBLE IF:

| $\bar{A}$ | $\bar{B}$ | $\bar{C}$ | |
|---|---|---|---|
| 0 | X | X | 100 |
| X | 0 | X | |
| X | 1 | X | 20 |
| X | 0 | 0 | |
| X | 0 | 1 | 2 |

$F=\bar{A}_0$ OR $\bar{B}_0$ AND $\bar{B}_1$ OR $\bar{B}_0$ AND $\bar{C}_0$ AND $\bar{C}_1$ $=\bar{A}_0+\bar{B}_0\bar{B}_1+\bar{B}_0\bar{C}_0\bar{C}_1$ $\bar{F}=A_0(B_0+B_1)(B_0+C_0+C_1)$ $=A_0B_0+A_0B_0C_0+A_0B_0C_1+A_0B_1C_0+A_0B_1C_1$ $=A_0B_0(1+C_0+C_1)+A_0B_1C_0+A_0B_1C_1$ $=A_0B_0+A_0B_1C_0+A_0B_1C_1$ $=A_0(B_0+B_1C_0+B_1C_1)$

FIG. 52

NOT DIVISIBLE IF:

| A | B | C | |
|---|---|---|---|
| 0 | 0 | X | 9 |
| 0 | 1 | 0 | 10 |
| 0 | 1 | 1 | 11 |

$\bar{F}=A_0$ AND $B_0$ OR $A_0$ AND $B_1$ AND $C_0$ OR $A_0$ AND $B_1$ AND $C_1$ $=A_0B_0+A_0B_1(C_0+C_1)$ $=A_0(B_0+B_1C_0+B_1C_1)$

FIG. 53

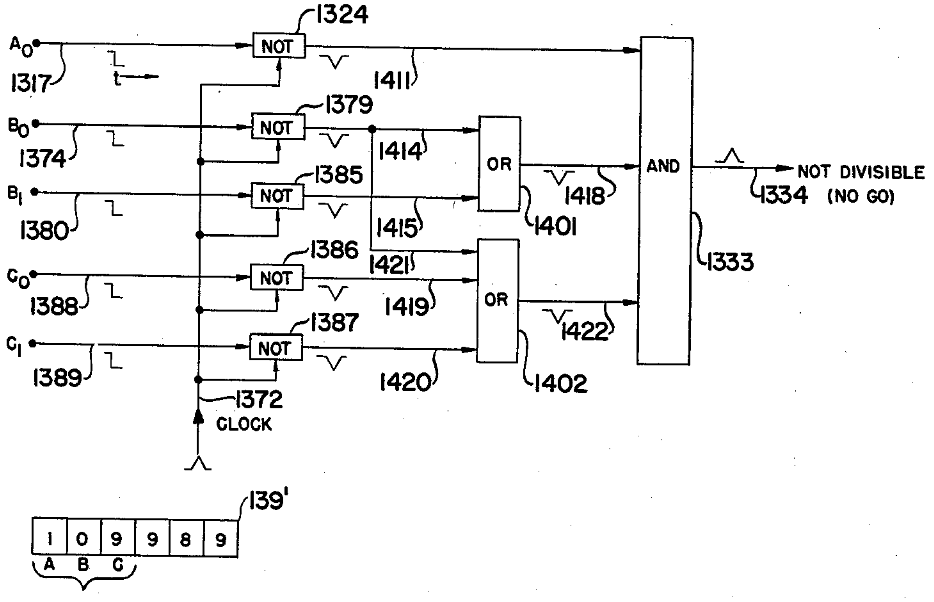

ABC IS NOT DIVISIBLE IF:
(1) A=0
AND (2) B=0 OR 1
AND (3) B=0 OR C=0 OR 1

INVENTOR
LAMAR D. SPRINGER
BY Louis A Kline
J. Cavender
HIS ATTORNEYS

FRACTIONAL SHILLINGS CONVERTED TO PENCE

INVENTOR
LAMAR D. SPRINGER
BY Louis A Kline
J Havender
HIS ATTORNEYS 3,067,938

STERLING MULTIPLIER

Lamar D. Springer, West Carrollton, Ohio, assignor to The National Cash Register Company, Dayton, Ohio, a corporation of Maryland Filed June 27, 1958, Ser. No. 744,977
29 Claims. (Cl. 235—156)

The present invention relates to a device capable of high-speed multiplication through the use of electronic principles. The machine principles not only permit the handling of problems wherein the multiplier and the multiplicand are numbers selected from the same base system, such as the decimal notation, but also enable the handling of problems where these factors are from different base systems, as, for example, multiplying a decimal number by a quantity of shillings, or a decimal number by a quantity of pence, or a decimal number by a quantity of feet, or a decimal number by a quantity of ounces, etc. However, it is not intended that the machine applications be limited to the handling of number systems having radices of 20, 12, 3, 16, etc., as given above, but, as will be obvious, the principles of operation enable the handling of numbers expressed in other systems of notation.

Not only is the machine capable of multiplying numbers from different base systems, as noted above, but it is also capable of multiplying a decimal number by a number constituted from a combination of non-uniform base systems, such as sterling currency, involving pounds, shillings, and pence. Similarly, within the scope of the teachings of the invention is the multiplication of a decimal number by other combination numbers from non-uniform radix systems, such as a measure expressed as yards, feet, and inches.

As a further feature, the machine includes provision for the automatic handling of the decimal point in multiplications involving fractional decimal numbers.

Regardless of whether the number system is monetary or one of measurement, the principles herein utilized are applicable. However, to simplify the task of the presentation of detailed explanations of all ramifications which might be encountered, the invention will be described as embodied in apparatus suitable for the multiplication of decimal quantities by sterling quantities, thereby illustrating the handling of various base number systems in the same problem.

The invention has many objectives, the accomplishment of which necessitated the solution of certain problems next to be discussed. The fact that an amount expressed in the sterling system makes use of three number systems (that is, systems having different radices) is, of course, one of the main sources of difficulty to be surmounted. For example, pounds are expressed in the decimal system, shillings in the vicenary system, and pence in the duodecimal system. It has been customary, in the performance of multiplication in mixed number systems, to first multiply by the units digit of the multiplier factor (through successive addition), with the intermediate products going into special accumulators, which enable transfers to be made in accordance with the decimal orders. Thus far in the operation, there is no real problem in multiplication by a single decimal digit. However, when the next higher denominational order of the multiplier factor is employed, provision ordinarily must exist to accommodate a large number of successive additions.

Frequently, this is handled by effectively multiplying the multiplicand by a factor of ten and then performing the intermediate multiplication with the second digit from the right in the multiplier factor. This type of operation requires special conversion apparatus for the multiplicand denominations. Furthermore, subsequent intermediate multiplication by the third digit from the right in the multiplier factor first requires that the multiplicand be increased one hundred times or at least ten times from its previous value in order again to avoid undue successive additions.

The above-described system of multiplication involving mixed numbers utilizes excessive equipment complexly interconnected in the performance of the necessary operations. For example, the special conversion apparatus must be provided for the multiplicand, wherein multiplication by 10, 100, 1,000, etc., may be effected as required by the multiplication by successive digits of the multiplier factor. It will be apparent that the multiplicand as it originally existed is soon lost, since it is increased tenfold immediately after multiplication by the units digit of the multiplier factor. Of course, in order to avoid this situation, separate accumulators for retaining the multiplicand have been employed, but, needless to say, the apparatus adds to the expenditure and complicates the timing and programming for the system. Also, storing means of some kind are required for the multiplier factor in order that intermediate multiplications by each digit of the multiplier factor may be had. The digit-by-digit intermediate multiplications require separate accumulators for receiving the various intermediate products. These product accumulators are necessarily interconnected in such a manner that transfers will be enabled in accordance with the mixed number system employed. For example, in the sterling system, the pence accumulator will transfer at "12," causing the addition of unity into the shillings accumulator, and then automatically recycles itself. The shillings accumulator must be capable of the same functions at 20 to transfer into the pounds accumulator banks.

Another system enabling sterling multiplication might be termed the "initial conversion" system. Here the pence and shillings parts of the sterling number are converted into decimal parts of pounds, and then decimal multiplication is carried out, upon the completion of which the answer expressed in decimal parts of pounds is reconverted to the nearest integral shillings and pence. Certain inherent disadvantages of this system may give rise to slight inaccuracies in the answers, in that the fractional decimal is frequently an indefinite value regardless of how many decimal places the digits are carried out. Other than the inaccuracies, the complexity and the conversion-effecting equipment required by this system have detracted from its practical usefulness.

The third prior art system which might be briefly discussed is known as multiplication by "duplation," perhaps more commonly known as "Russian" multiplication. United States Patent No. 2,346,616, issued to Frank Reginald Saxby on April 11, 1944, discloses a multiplying machine operative in accordance with the principles of duplation. Although this method, when viewed in a cursory manner, might suggest a simple manner of multiplication, it remains that, over the years, duplation has not been adopted as being practical, and the machines enabling such principles have not generally been accepted.

The reasons for the lack of acceptance might be attributable to the large amount of equipment necessary to successively double the multiplicand factor and to successively halve the multiplier factor. Also, in this system, the multiplier and the multiplicand are immediately lost in the natural sequence of operations unless separate accumulators or appropriate provisions are made for retaining these factors. Additionally, the system requires a greater number of cycles or more elapsed time to handle large numbers (which must be halved or doubled), even though it may turn out that only a few of the interim-developed factors are required to constitute the final product.

In actual practice and in cost per equipment, the foregoing systems have proved unwieldy and somewhat expensive. The fact that machines embodying the principles of such systems are not in common use in England today, at least, indicates that the previous approaches have not been commercially feasible.

The present invention provides a different approach to the problem. Electronic principles are employed, thereby achieving the utmost in speed of operation, while equipmentwise the device is straightforward and has proven reliable.

In the present approach, the decimal value is considered as the multiplicand, and the sterling quantity is considered as the multiplier. Each denomination of the sterling multiplier is independently used as a multiplier factor for the decimal multiplicand, and the individual products are appropriately accumulated. A control chain programs or sequences the operations automatically.

The intermediate product resulting from the multiplication of the decimal number by the pence factor is stored in the pence accumulator during steps 1 and 2 of the program, and the machine is automatically sequenced to step 3. Similarly, the intermediate product of shillings is placed in the shillings accumulator during steps 3 and 4, and the intermediate product of pounds in the pounds accumulator during steps 5 through 8.

In considering whole number problems, the integral shillings are next extracted from the pence accumulator, leaving any pence remainder, and subsequently the integral pounds are extracted from the shillings accumulator to yield a final product expressible in sterling nomenclature. These functions are performed during steps 14 through 17 and 18 through 21, respectively, steps 9 through 13 being omitted in whole number problems.

In the event that the decimal number involved in the multiplication includes a fractional decimal part, three additional operations are necessary to the multiplication. These operations are normally performed following the intermediate multiplication by the pounds factor, wherein the intermediate product is stored in the pounds accumulator. The fractional part of the stored shillings in the shillings accumulator is multiplied by 12 during steps 9 and 10, and the product therefrom is added to the total already in the pence accumulator. Secondly (during steps 11 and 12), the fractional decimal part of the stored pounds in the pounds accumulator is multiplied by 240 and added to the total already in the pence accumulator. Thirdly, during step 13, the total accumulated pence is rounded off to the nearest penny. Extraction of the integral shillings and pounds is then performed in the usual manner to yield the final product in the sterling nomenclature.

With the foregoing outlined system in mind, among the objects of the present invention are the following: the provision of a versatile high-speed electronic multiplier apparatus capable of the multiplication of numbers selected from the same base system or from different base systems, including numbers constituted from a combination of non-uniform base systems; the provision of an improved high-speed electronic multiplier apparatus capable of operation in the sterling system; the provision of such apparatus capable of handling multiplication involving fractional decimals; and the provision of an electronic apparatus of the foregoing character which minimizes the problems attempted in the multiplication of mixed-number quantities by decimal quantities wherein the multiplier factor involves two or more denominational orders.

With these and incidental objects in view, the invention includes certain novel features of construction and combinations of components, a preferred form or embodiment of which is hereinafter described with reference to the drawings which accompany and form a part of this specification.

Figure 6:
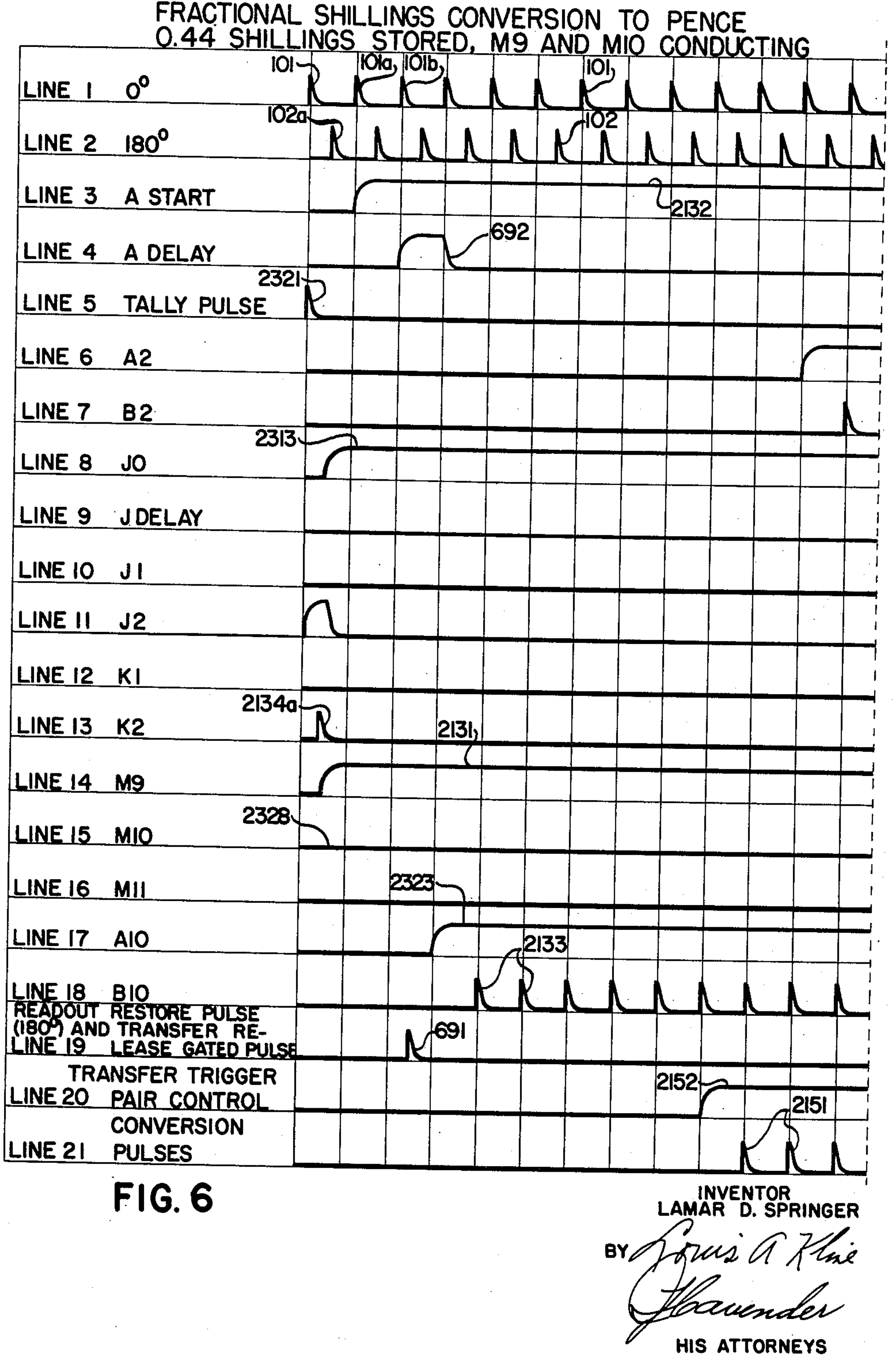
Figure 6A:
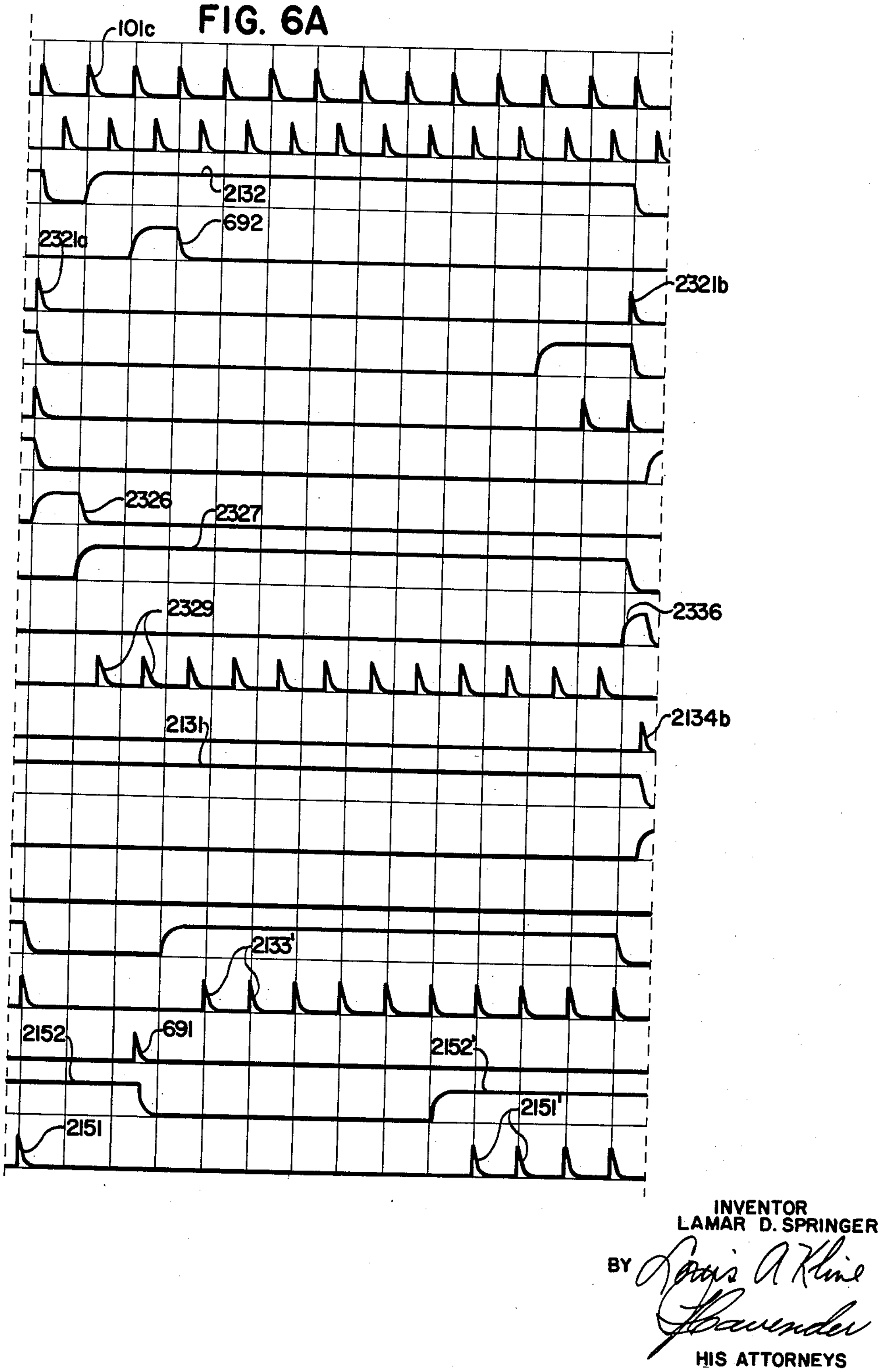
Figure 6B:
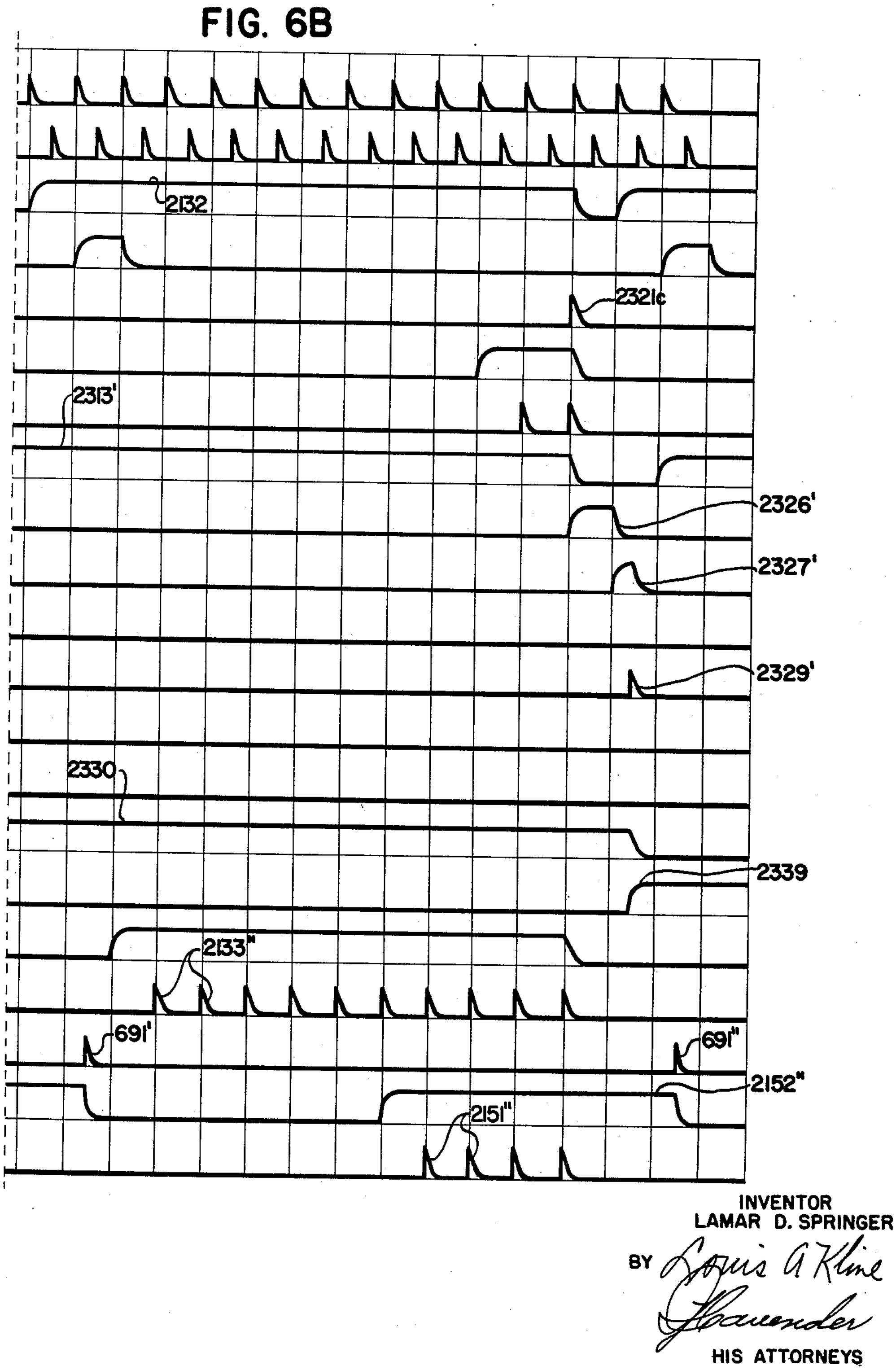

FIGS. 6, 6A, and 6B show a further timing chart, taken during conversion of fractional decimal shillings to pence to show the time and the intervals of operation of certain components and circuitry relative to the timing pulses.

Figure 7:
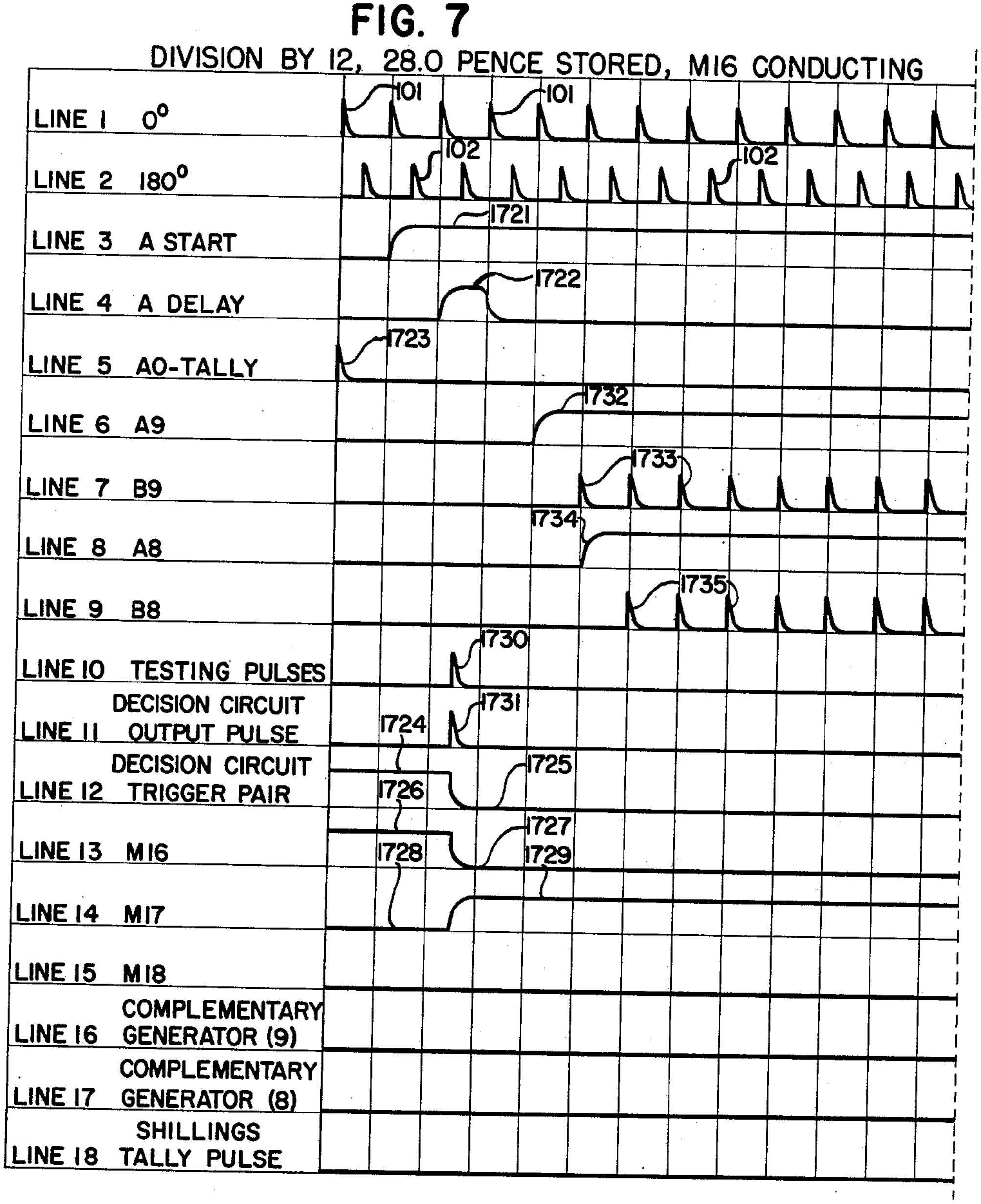
Figure 7A:
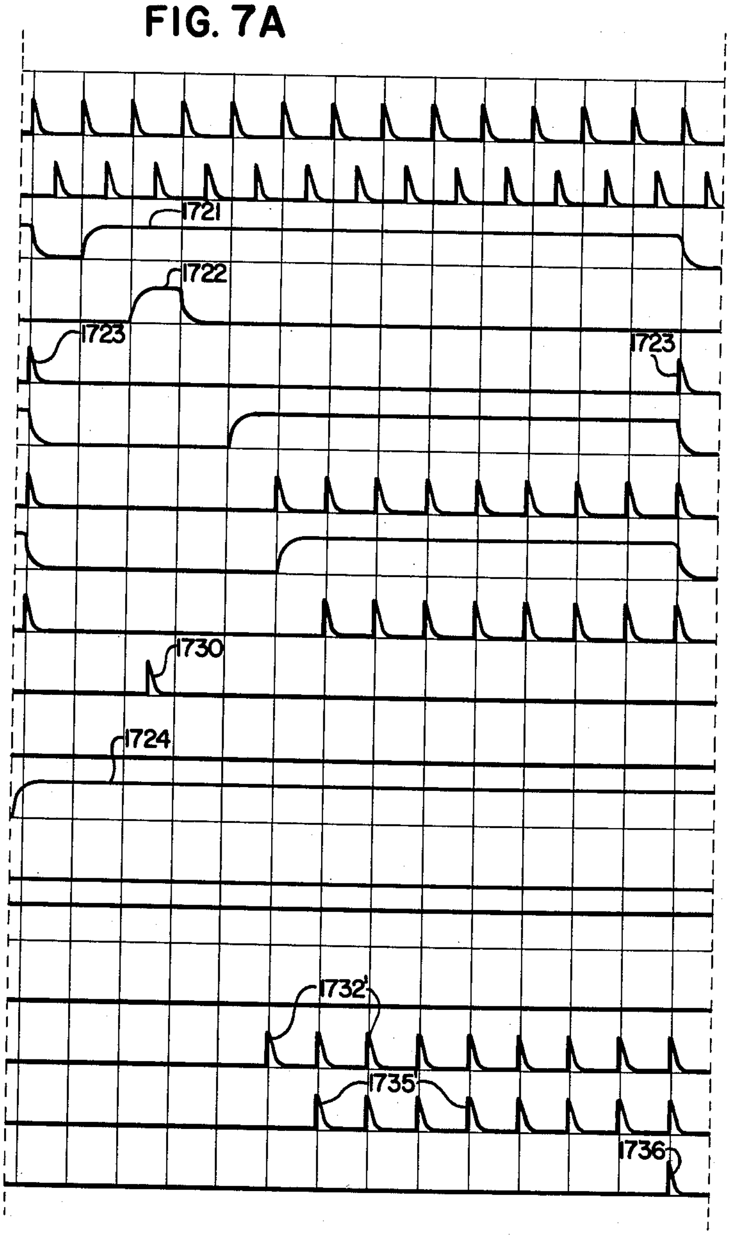
Figure 7B:
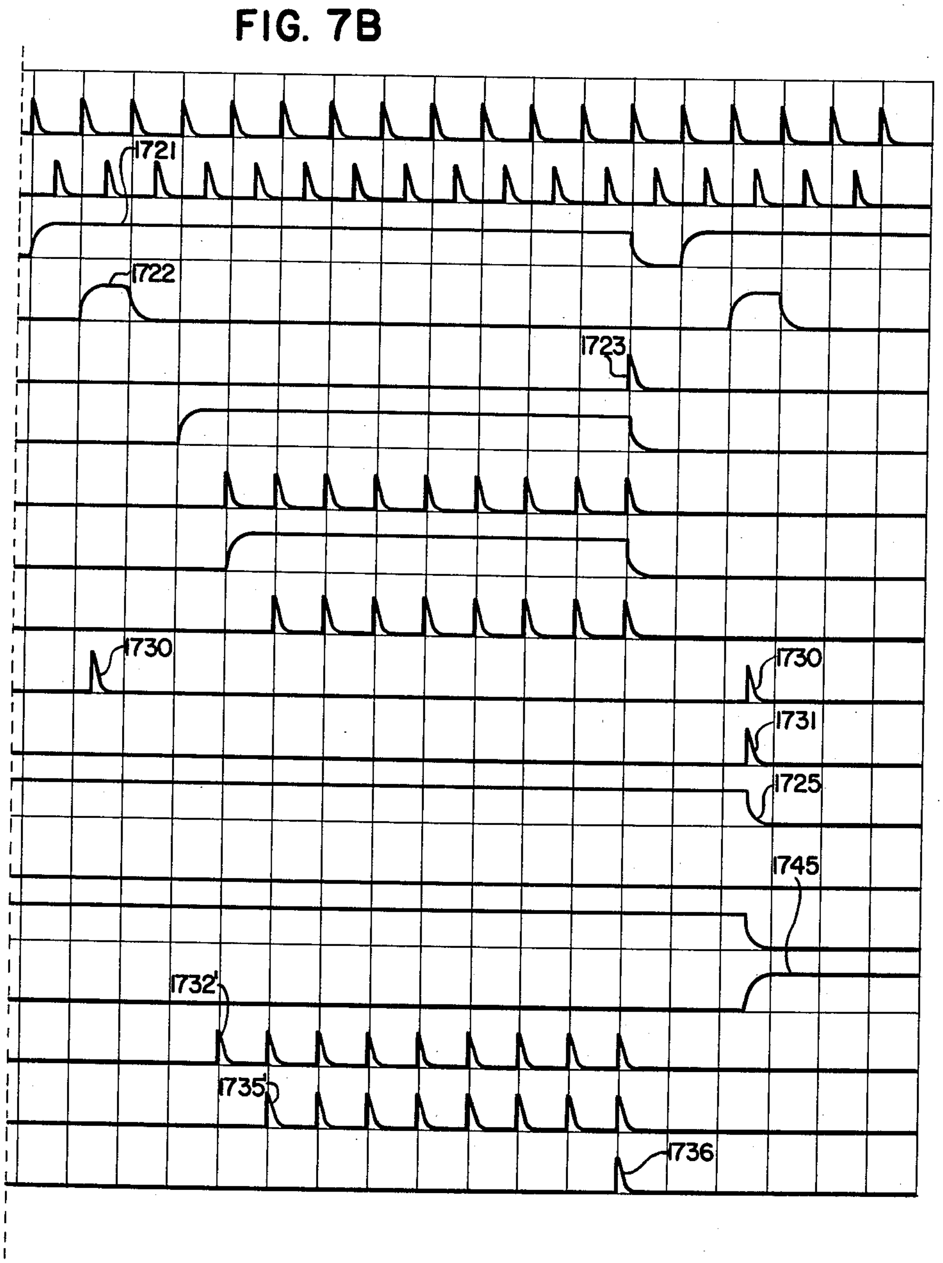

FIGS. 7, 7A, and 7B collectively show a timing chart taken during the extraction of integral shillings from the pence accumulator, to show the operational times of components for effecting this operation relative to the master pulse timing.

Figure 8:
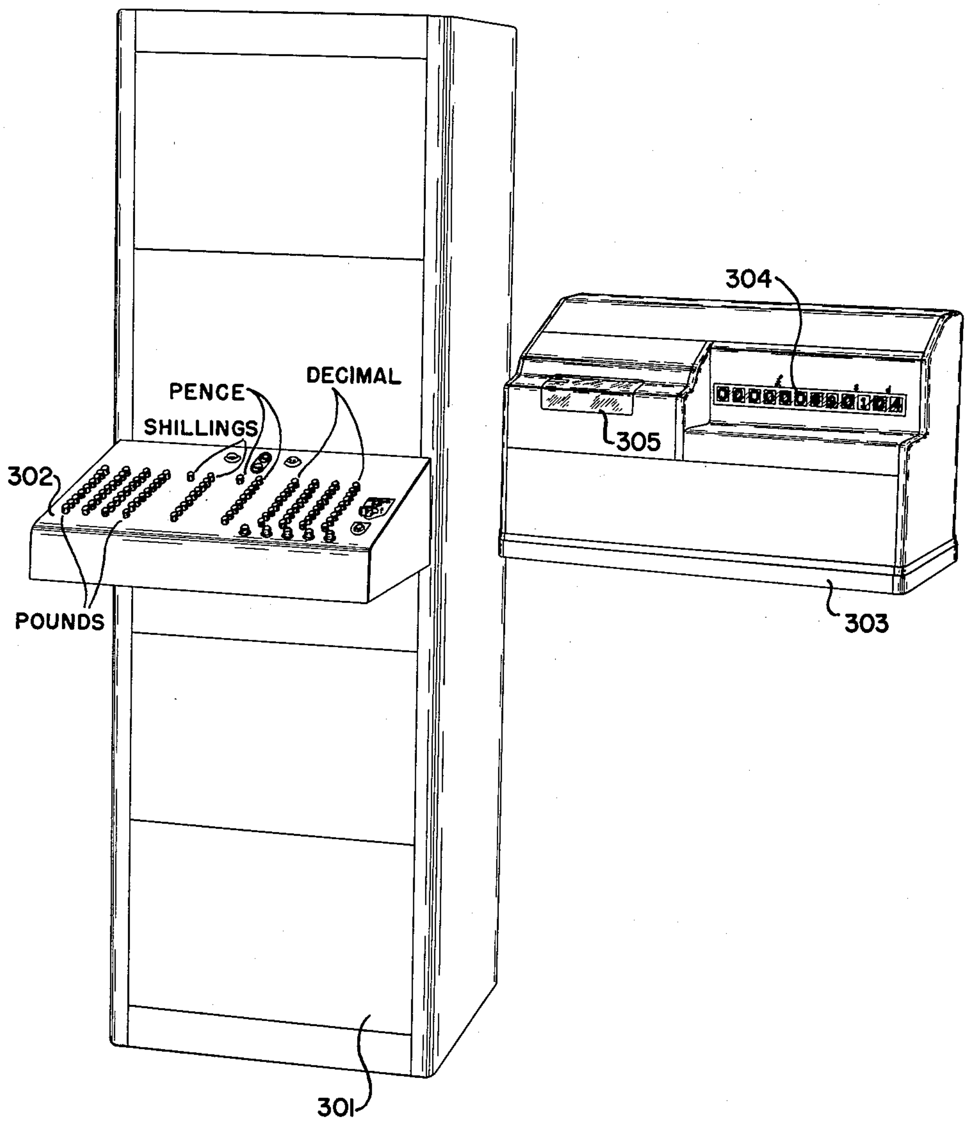

FIG. 8 is a view, in perspective, of the multiplying apparatus contained in a suitable housing with indicator means shown to the right-hand side of the figure.

Figure 9:
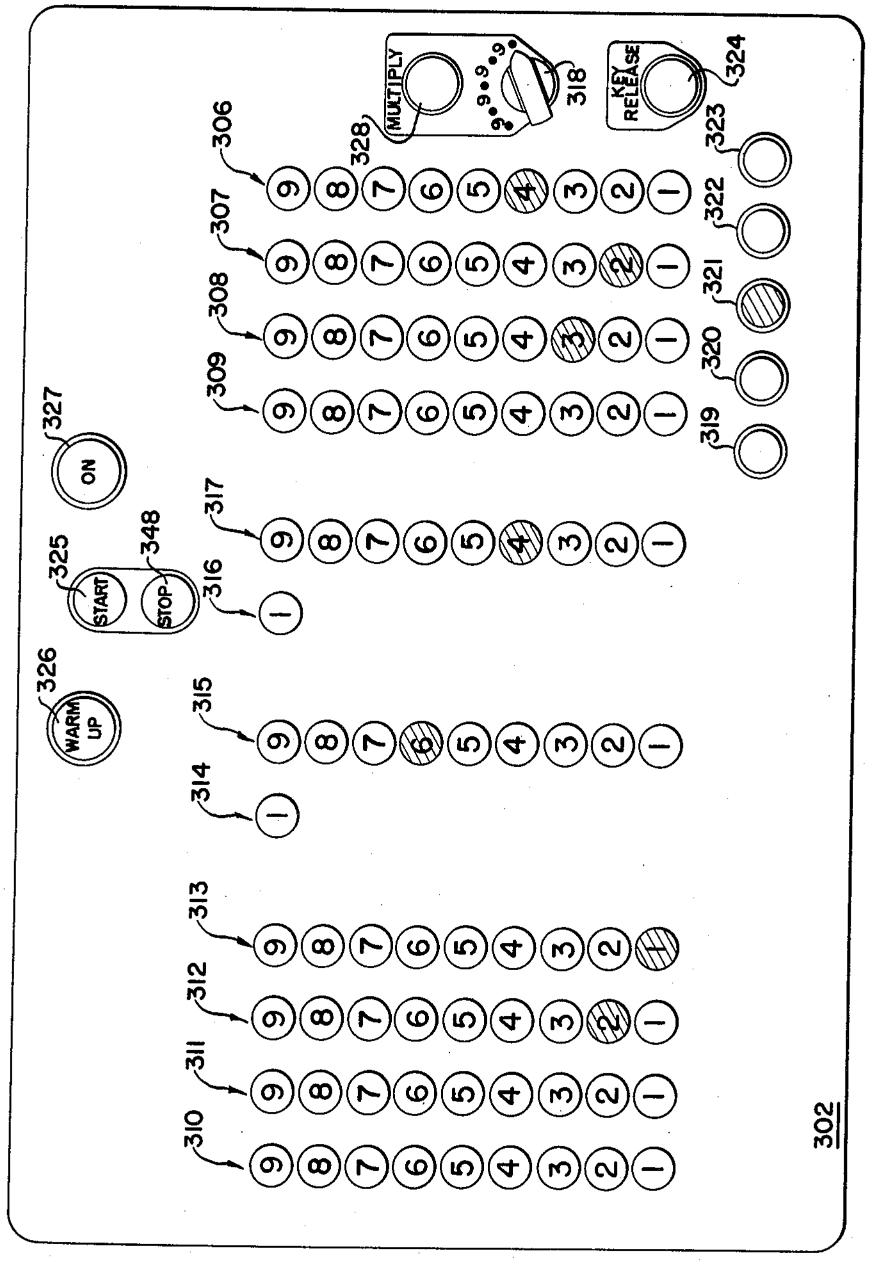

FIG. 9 is a detailed showing of the keyboard of FIG. 8.

FIGS. 10*a* to 10*j* inclusive show the manner in which the various sheets of the drawings to be described hereinafter are to be assembled to enable appropriate electrical interconnections.

Figure 11:
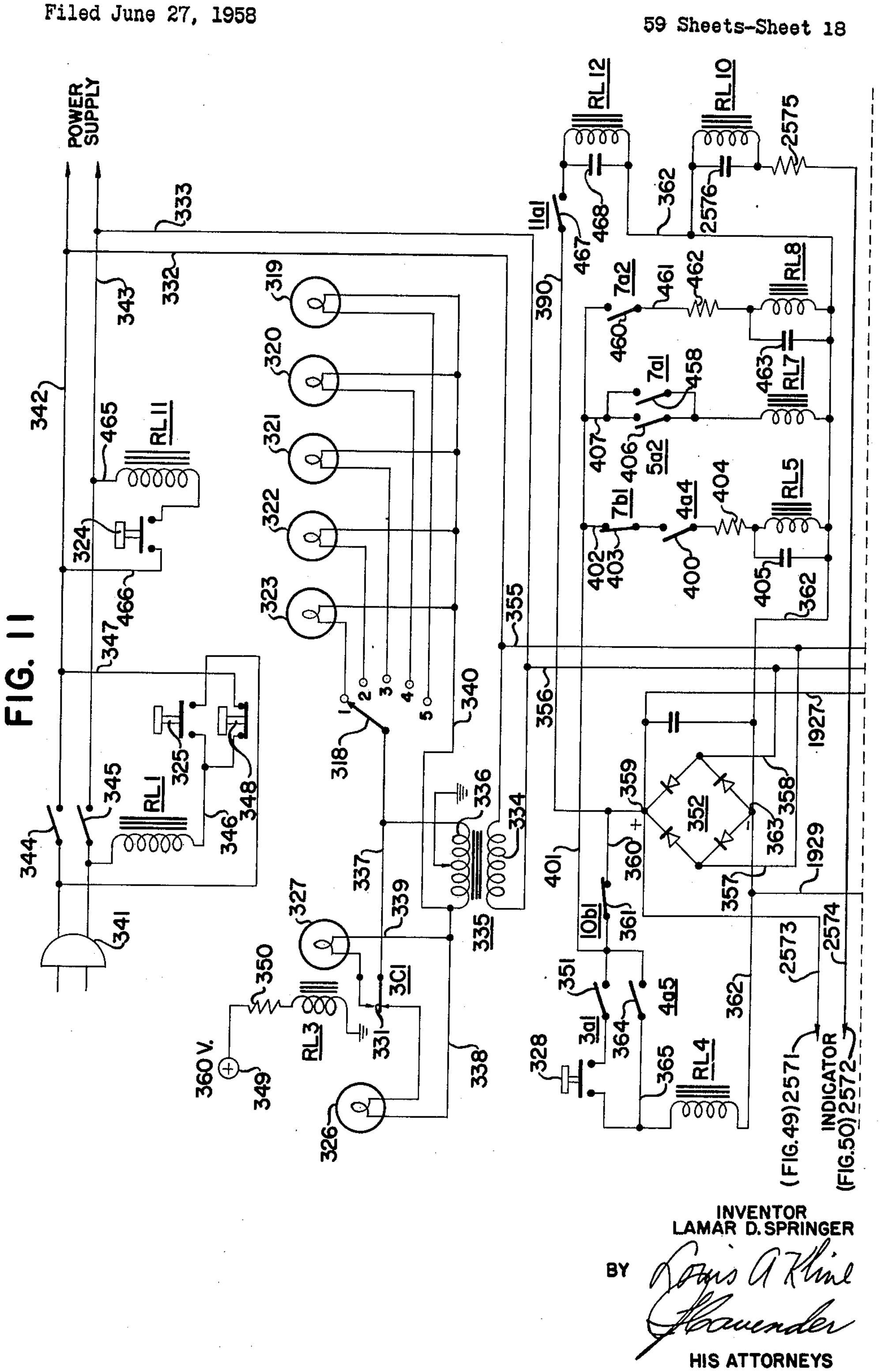
Figure 12:
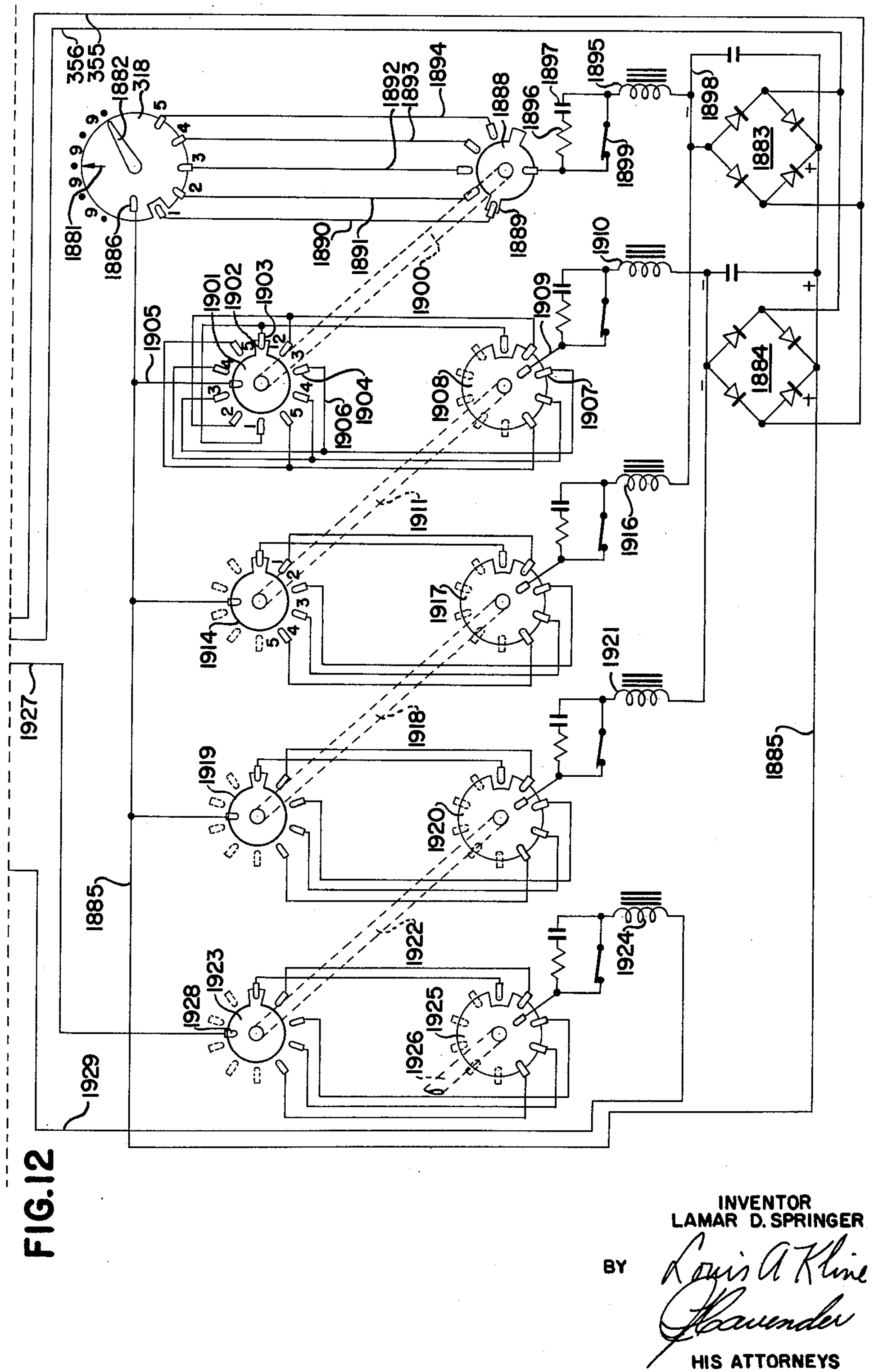

FIGS. 11 and 12 show certain relay controls arranged for sequential operation to enable the functioning of the apparatus and particularly, in FIG. 12, the control apparatus for effecting different decimal point settings.

Figure 10A:
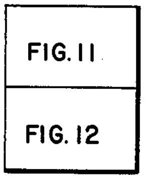
Figure 10B:
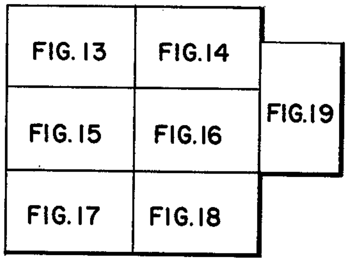

FIGS. 13 through 19 are assembled as shown in FIG. 10*b* in order to show clearly the source of timing impulses, the timing rings, and associated control gates operative therefrom.

Figure 10E:
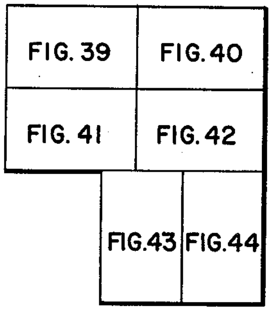
Figure 10D:
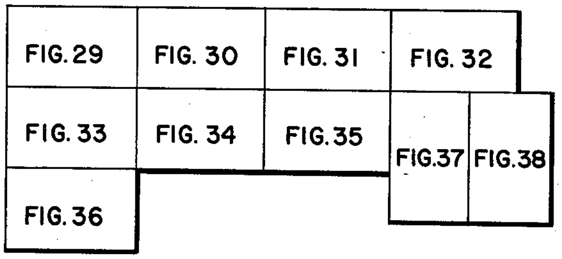
Figure 10F:
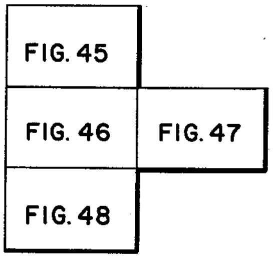
Figure 10C:
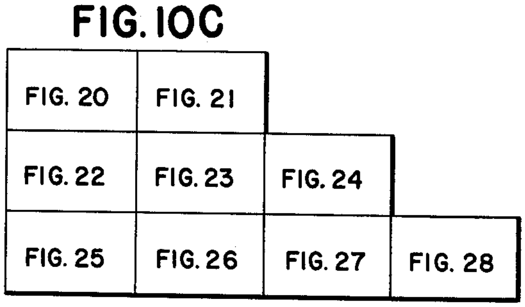
Figure 10I:
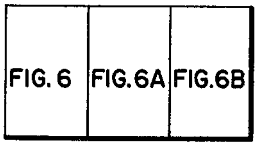
Figure 10J:
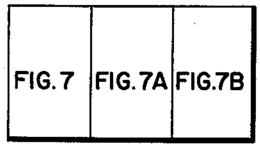

FIGS. 20 through 28 show the multiplicand and multiplier keyboards, certain isolation diodes and gating circuits for use in conjunction therewith, and the master sequencing or programming control for the multiplication operations, and are assembled according to FIG. 10*c*.

Figure 29:
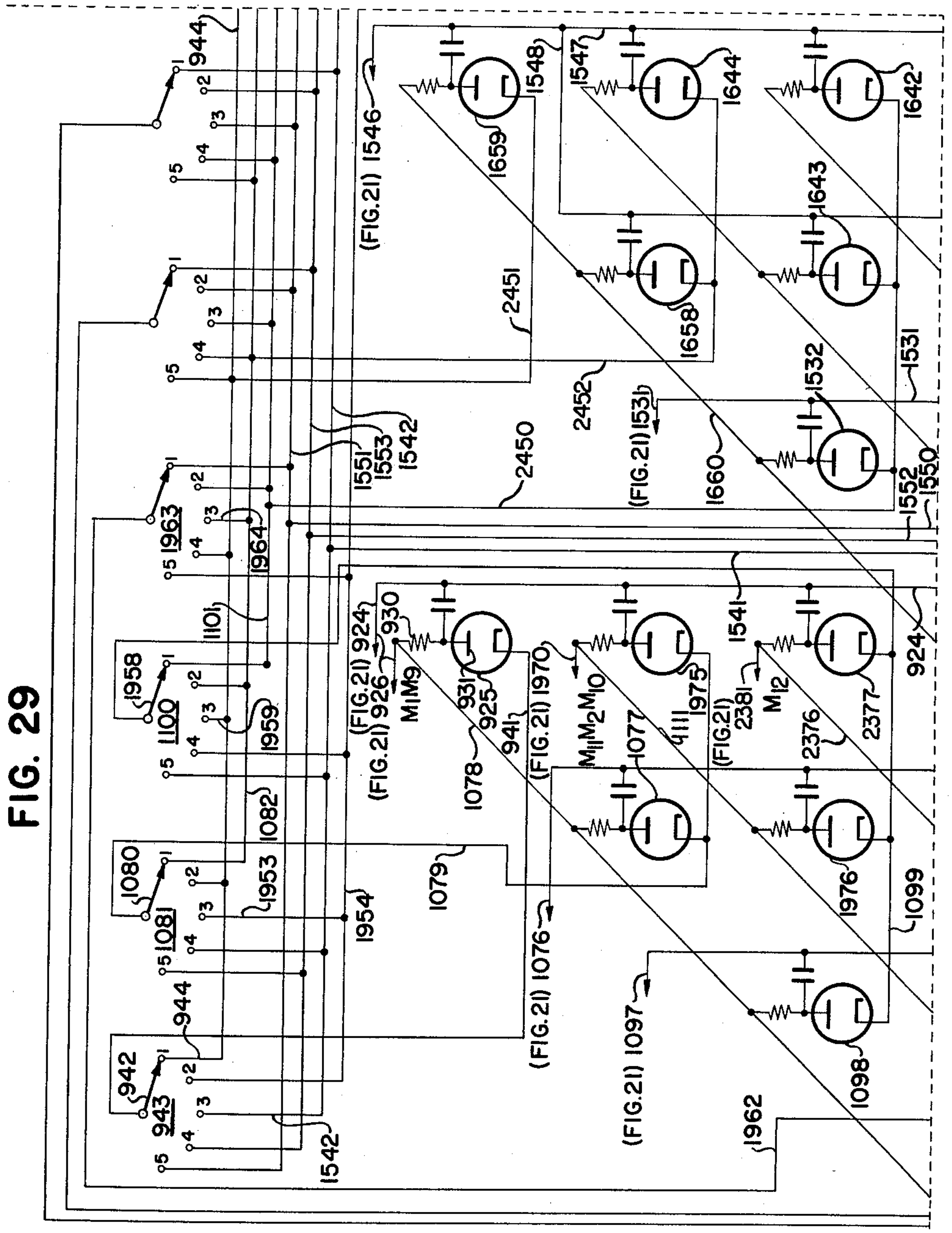
Figure 30:
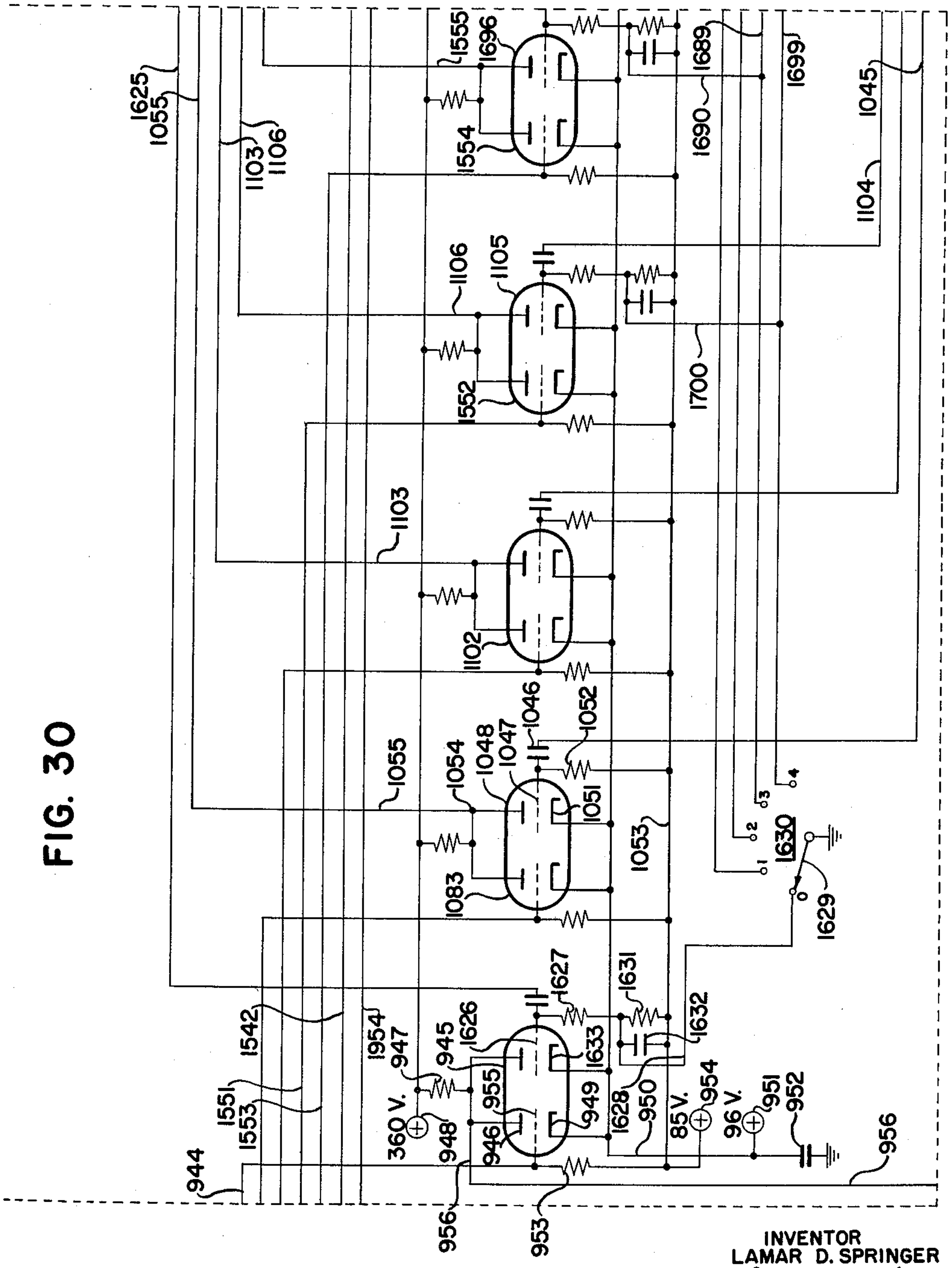
Figure 31:
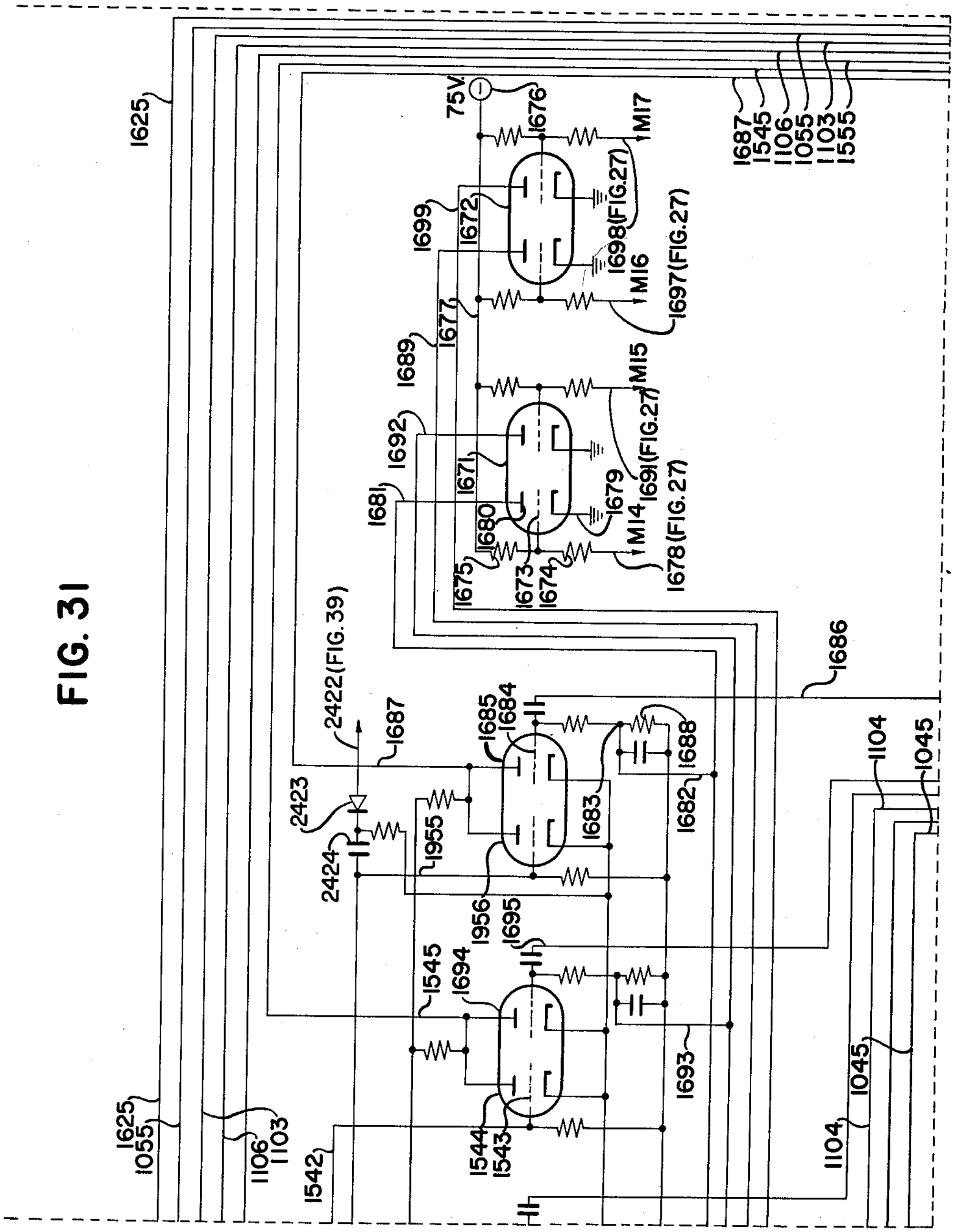
Figure 32:
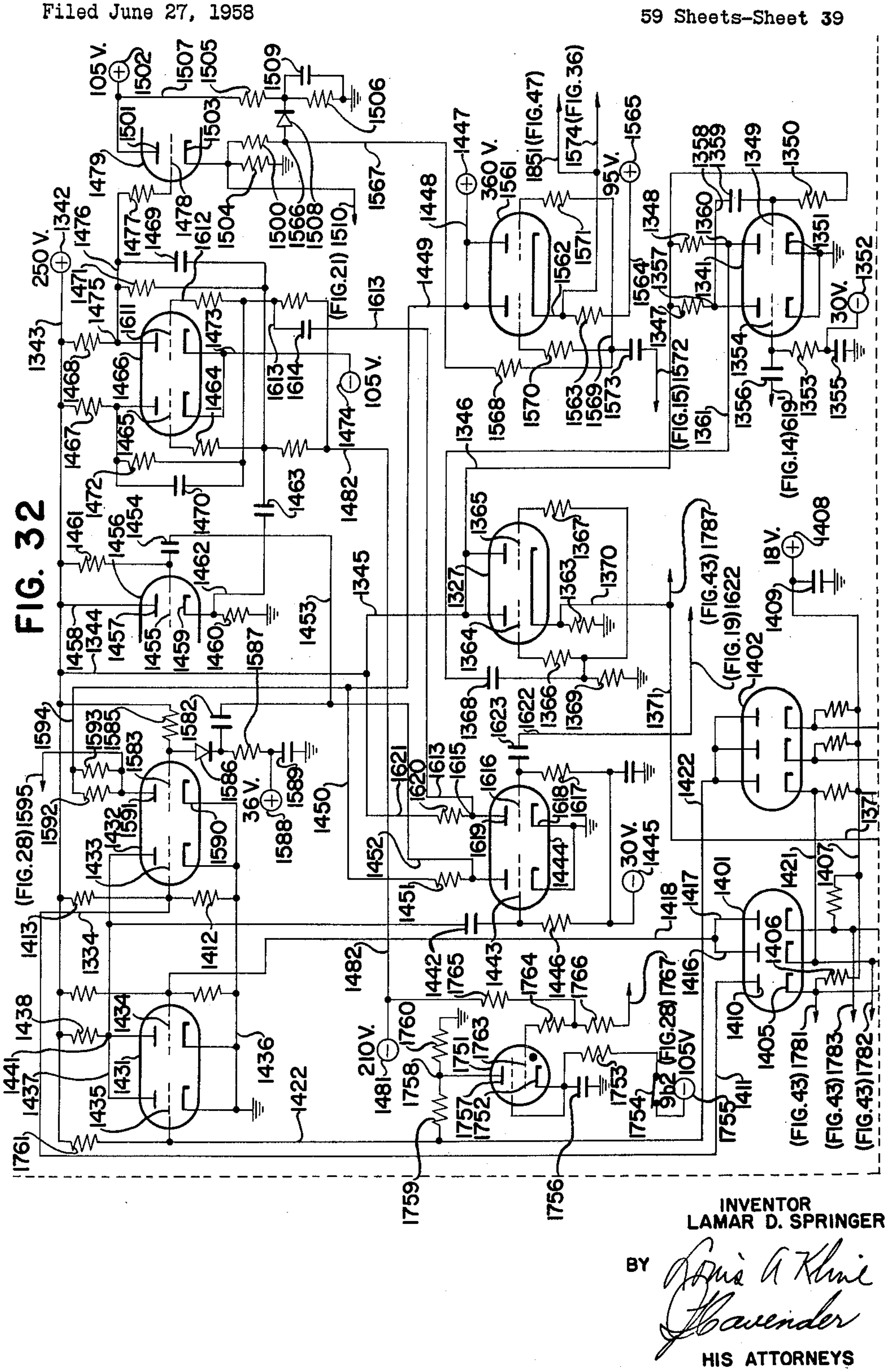
Figure 33:
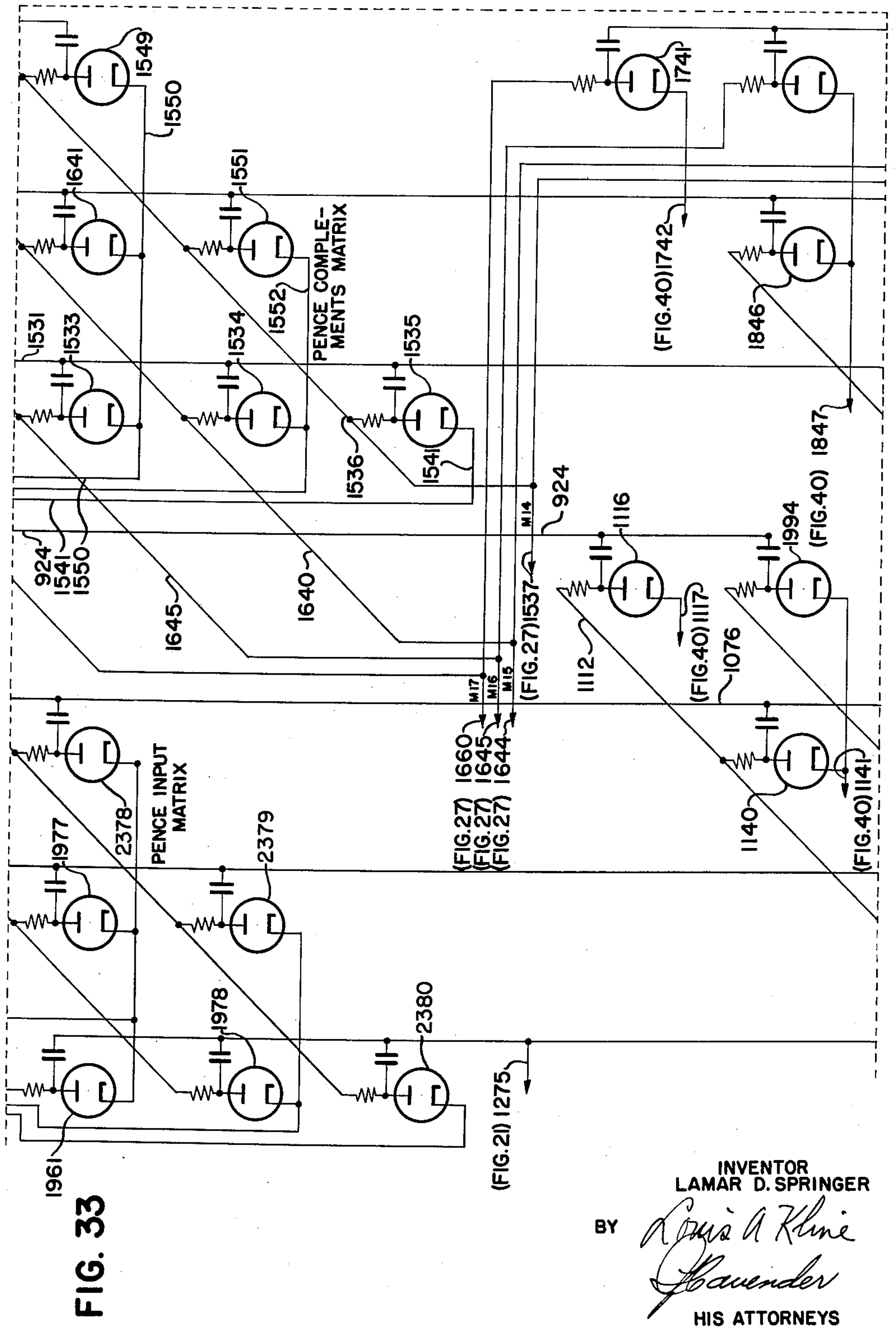
Figure 34:
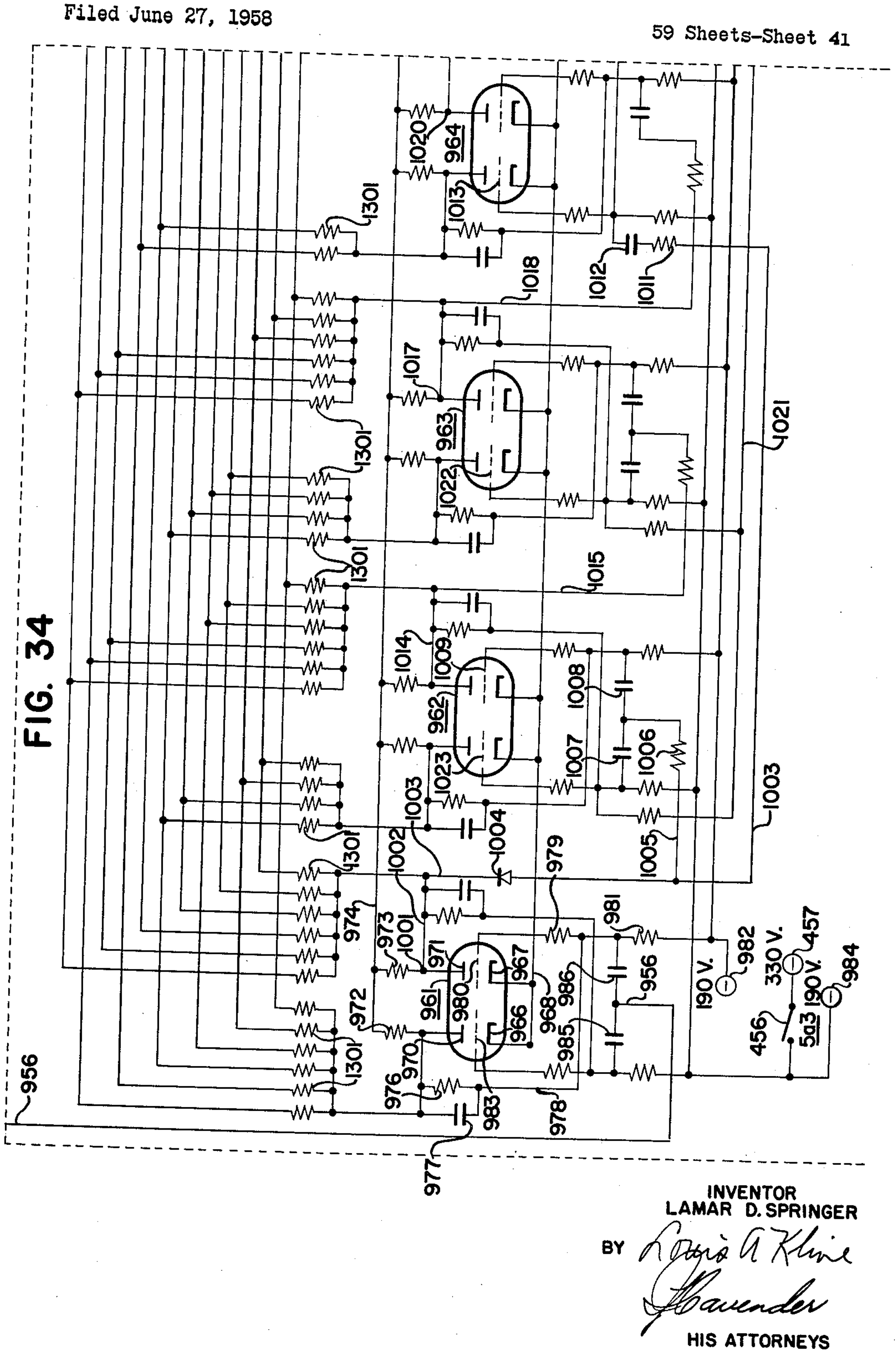
Figure 35:
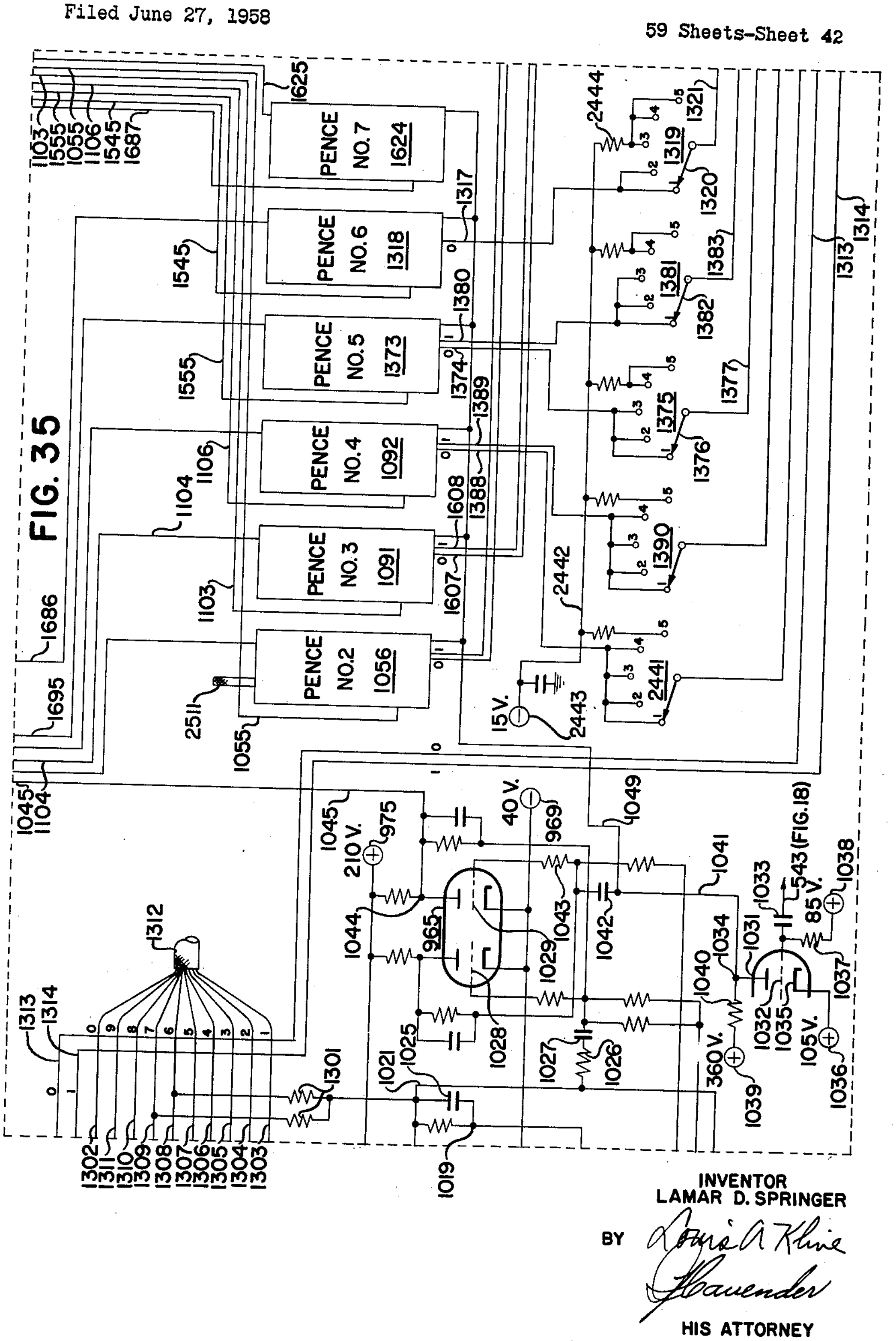
Figure 36:
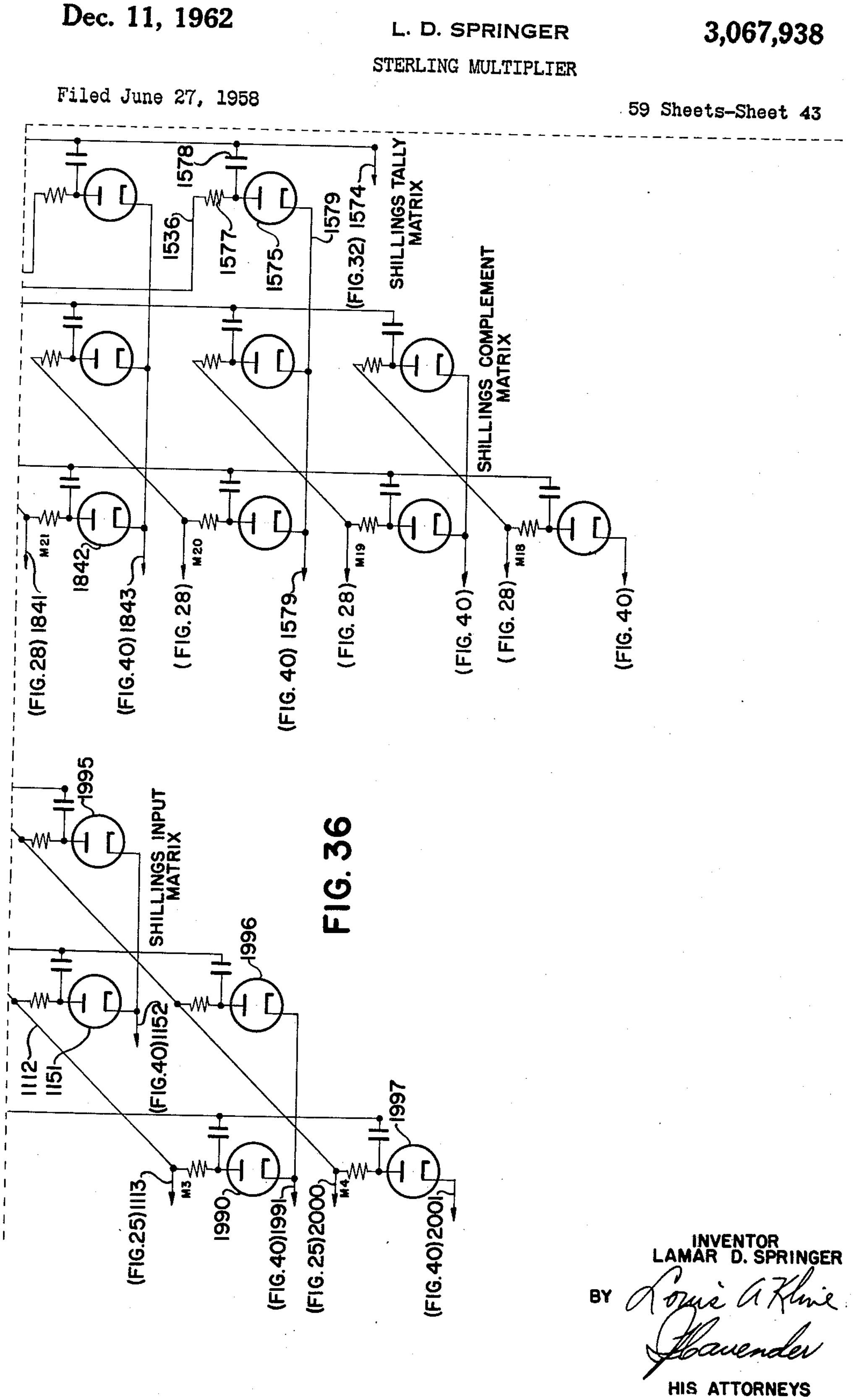
Figure 37:
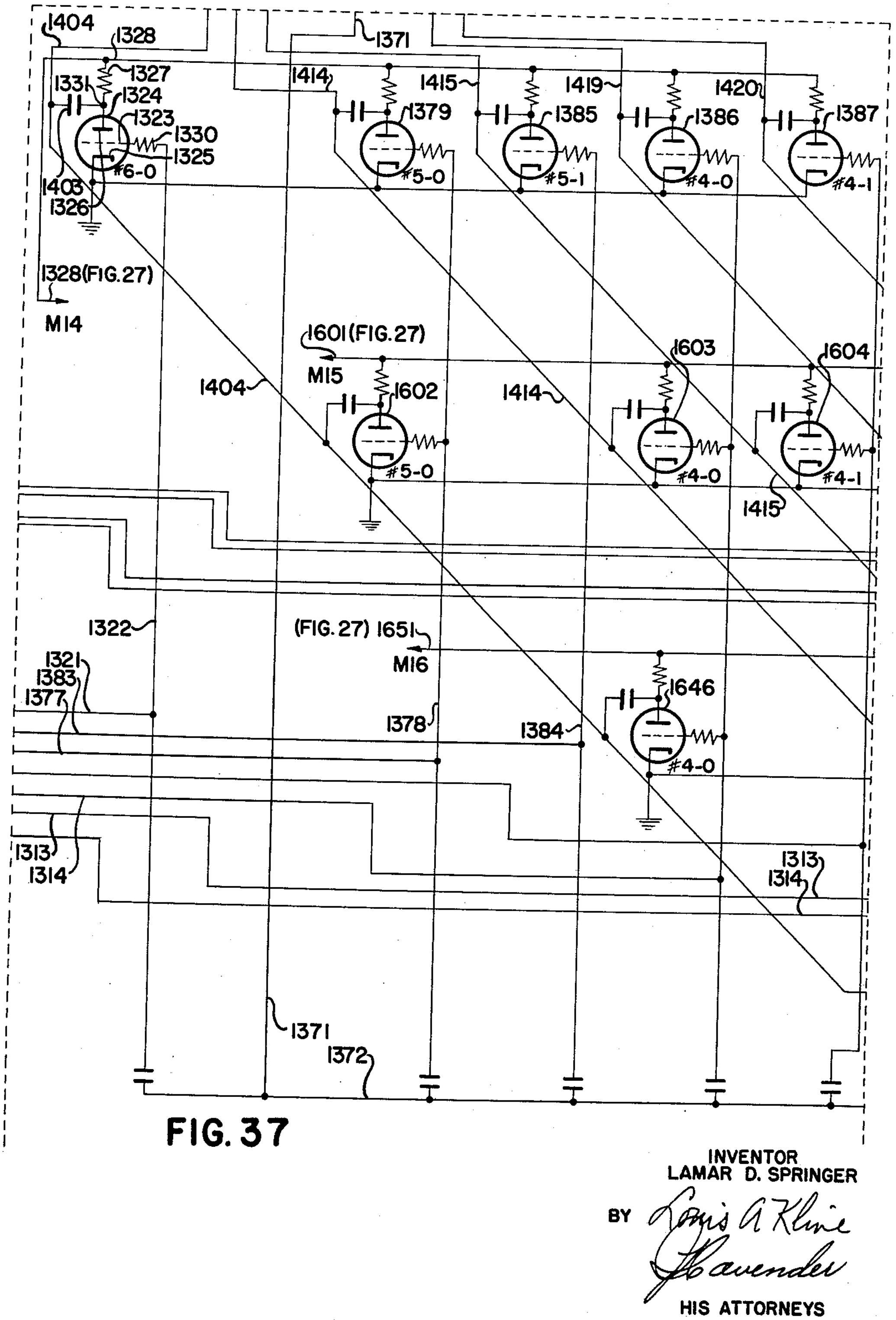
Figure 38:
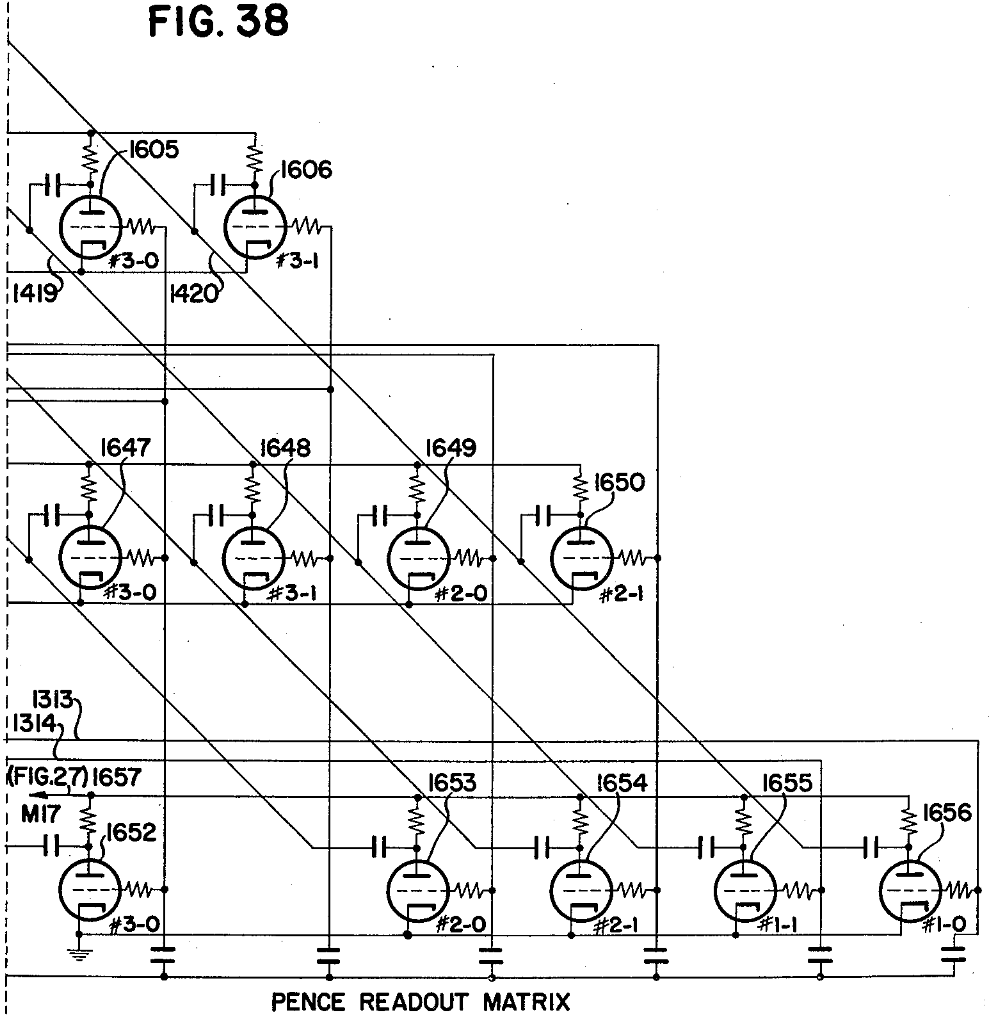

FIGS. 29 through 38 are arranged as shown in FIG. 10D and show, respectively, the pence and shillings input matrices and the pence and shillings complements matrices in FIGS. 29, 33, and 36; the pence accumulator banks in FIGS. 34 and 35; the pence accumulator input amplifiers in FIGS. 30 and 31; the decision circuit in FIG. 32; and the pence read-out matrix in FIGS. 37 and 38.

Figure 39:
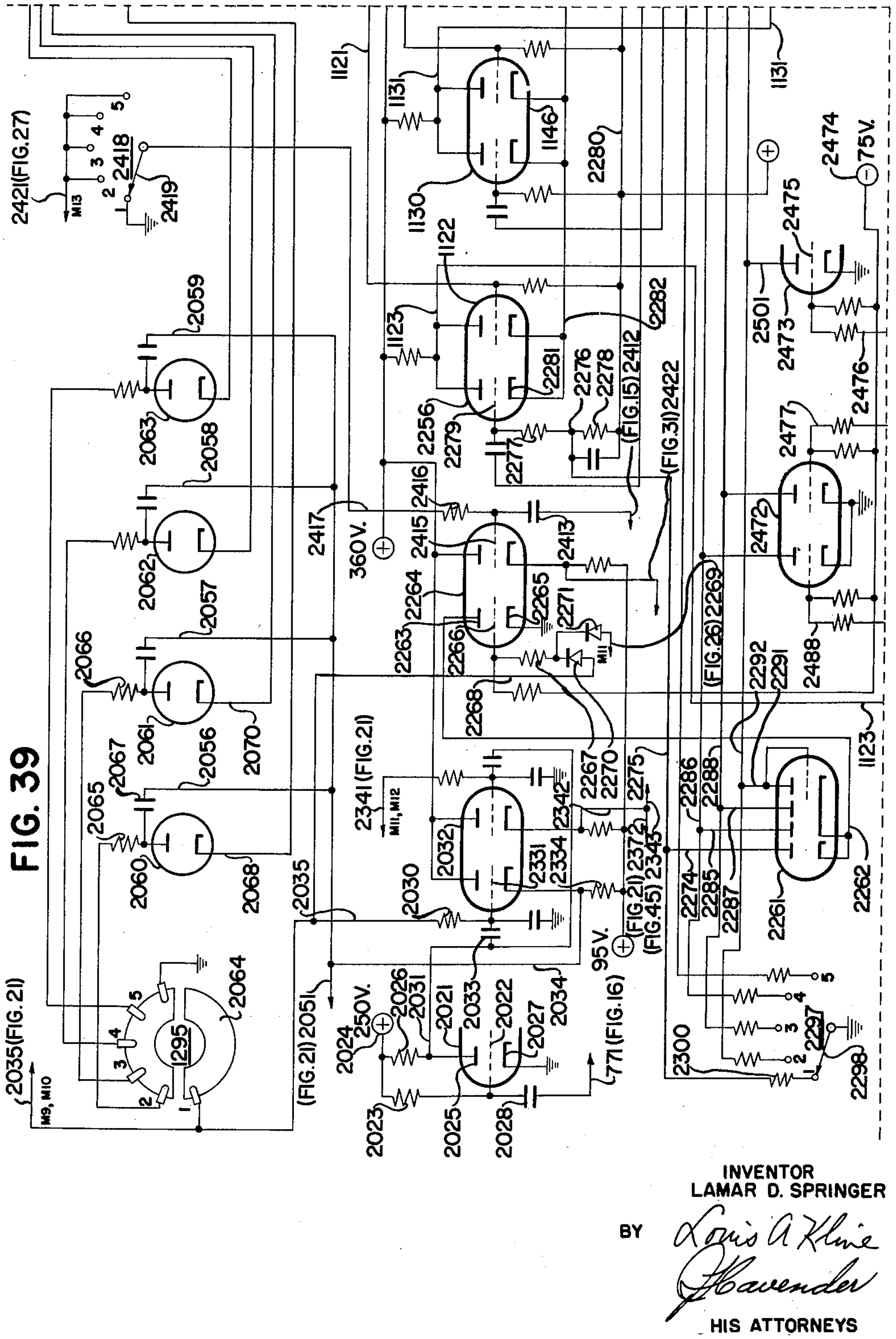
Figure 40:
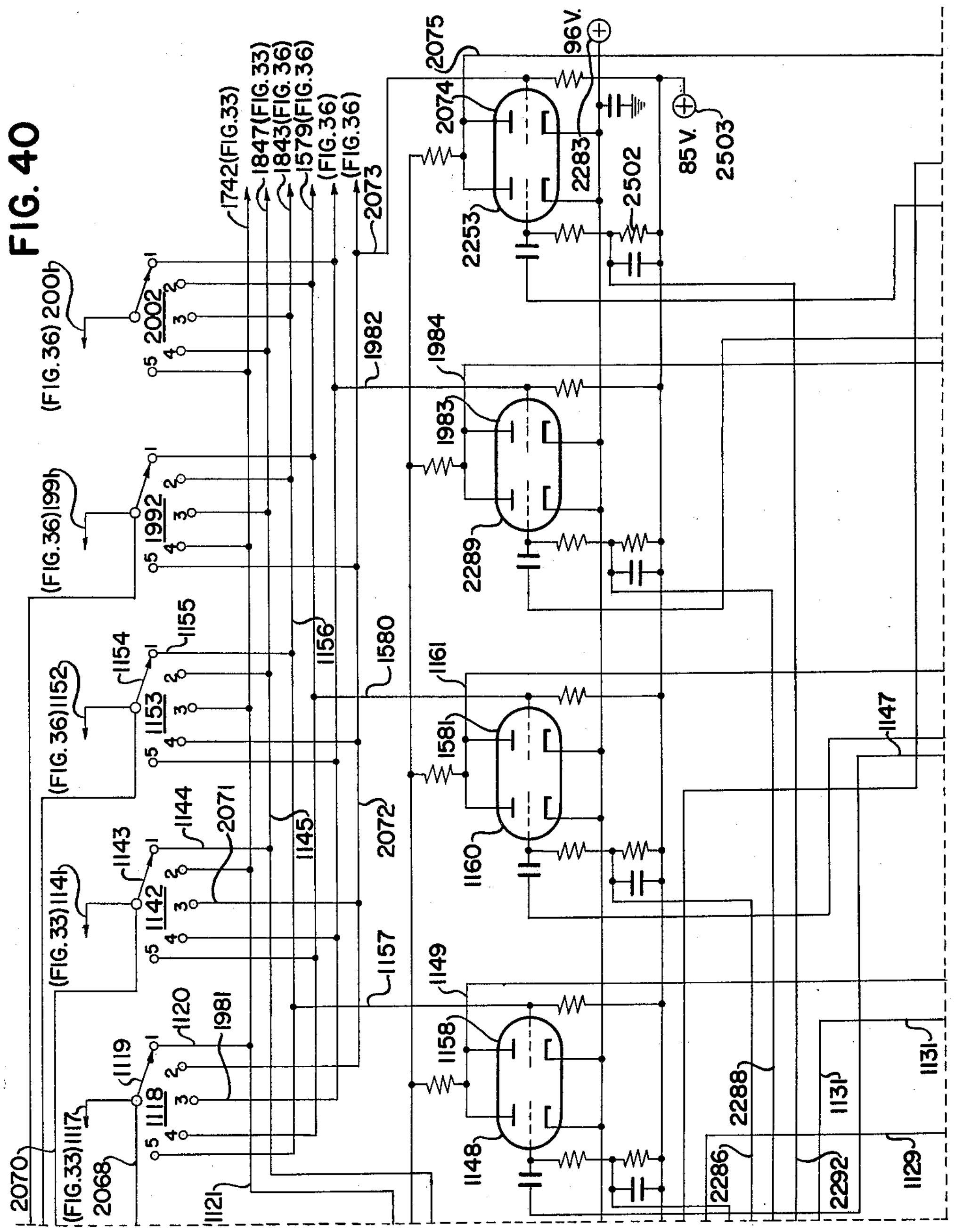
Figure 41:
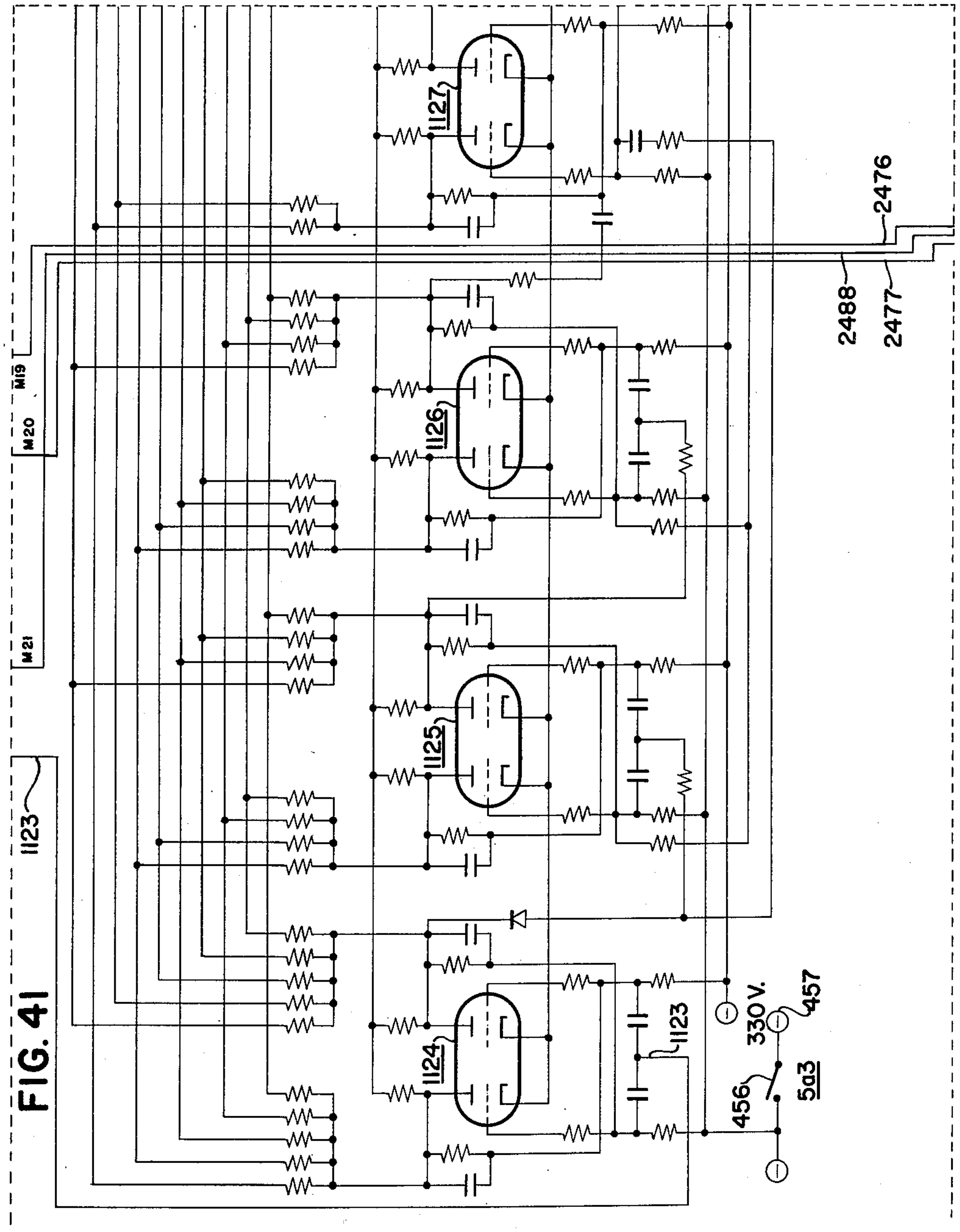
Figure 42:
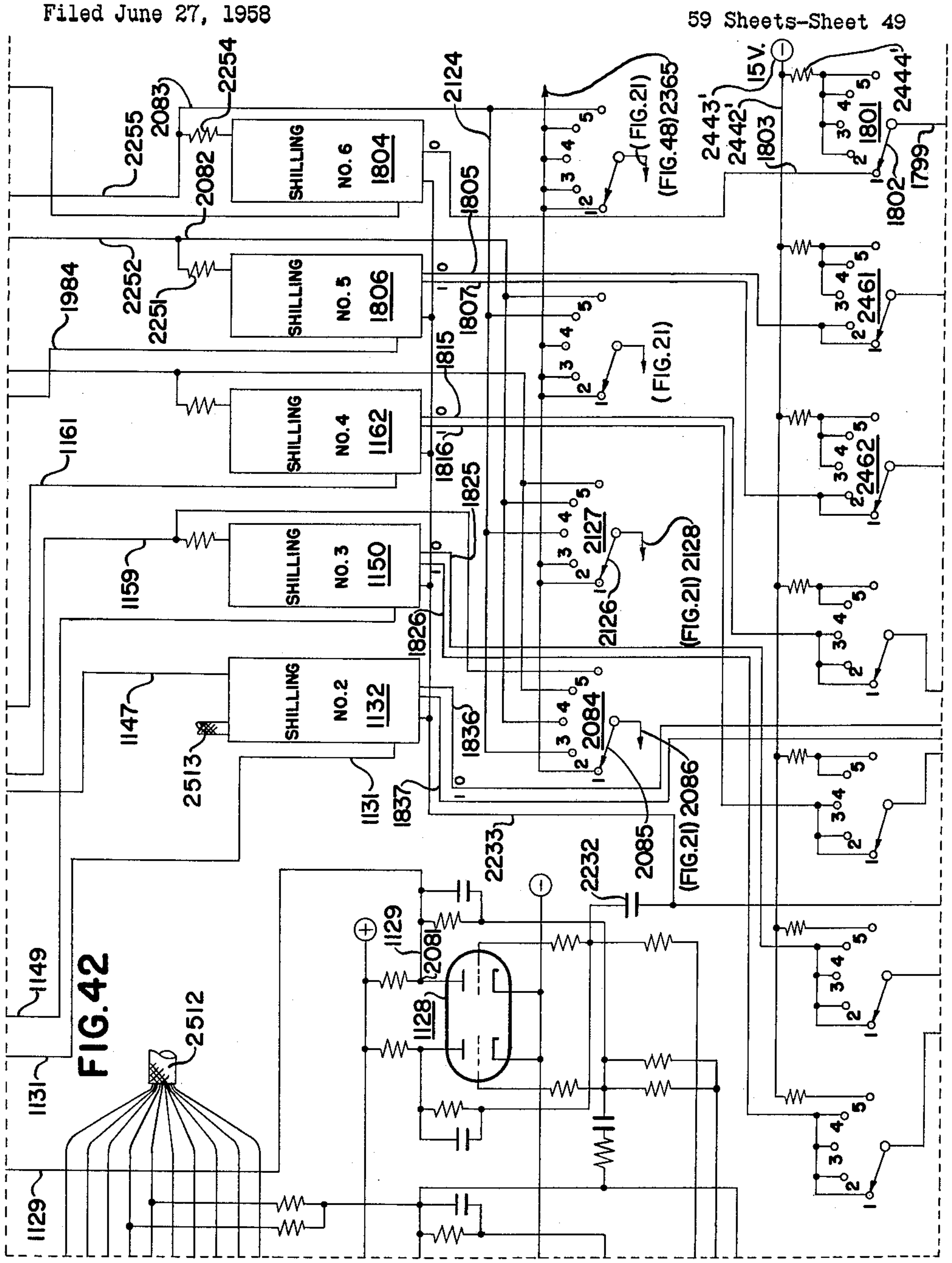
Figure 43:
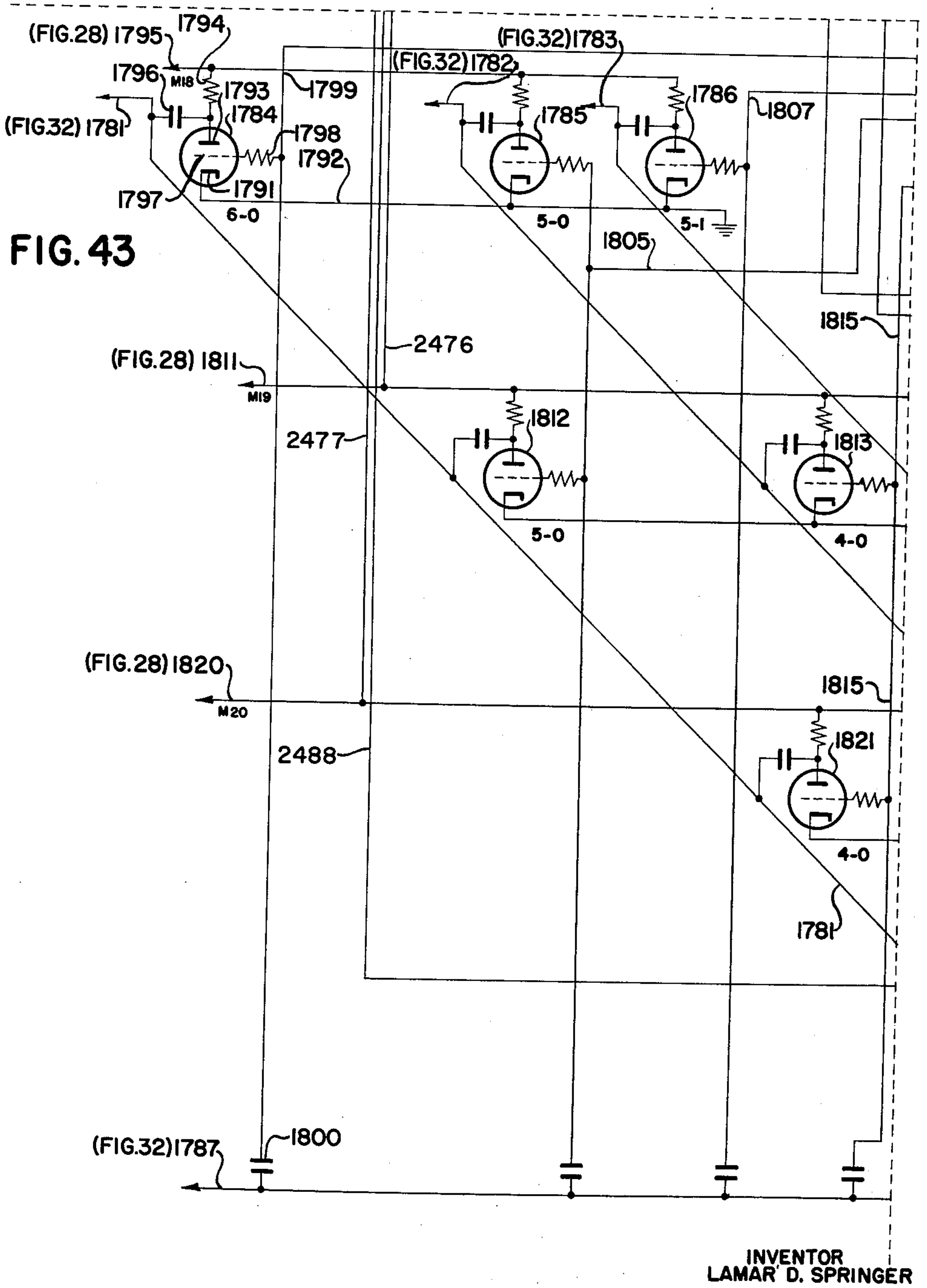
Figure 44:
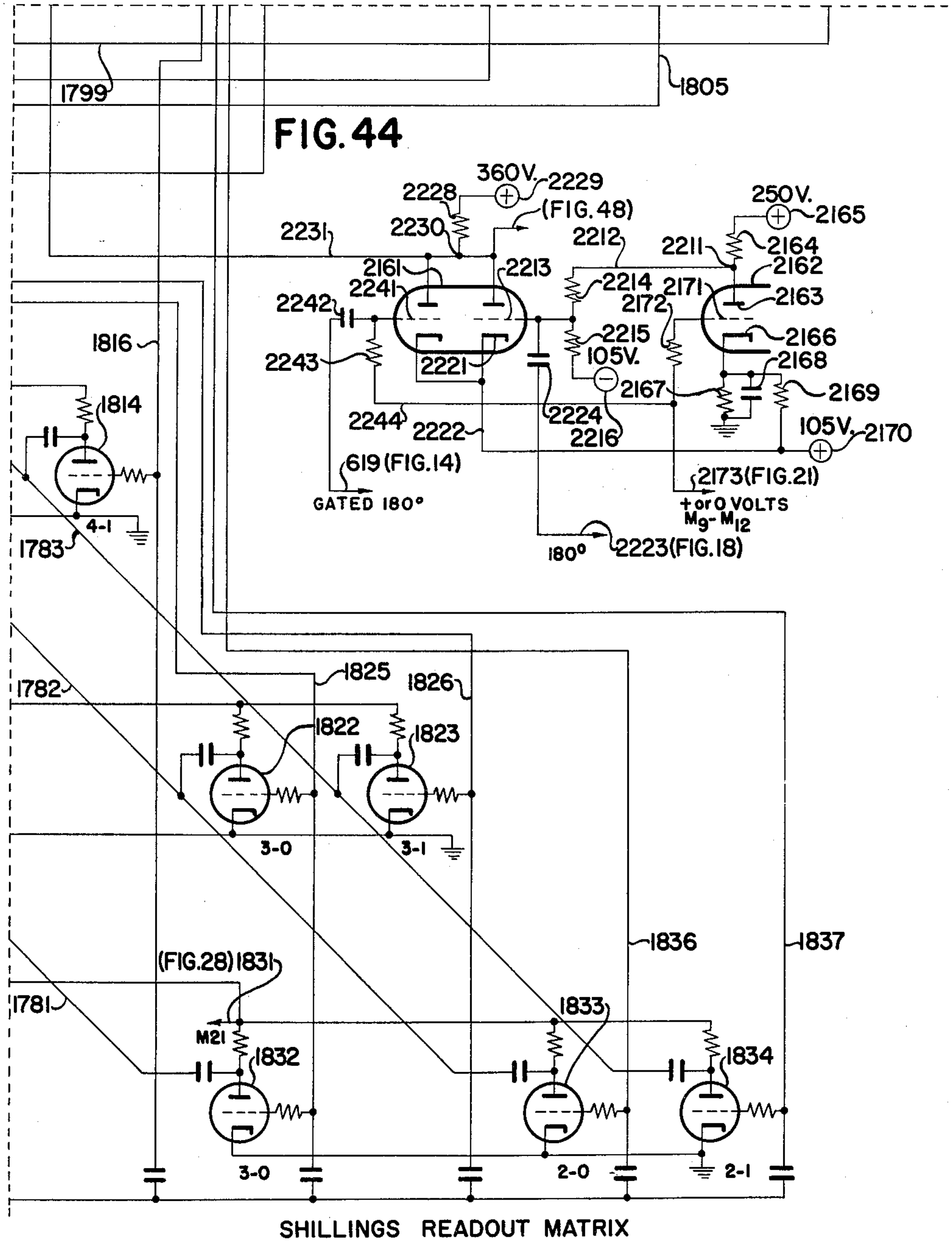

FIGS. 39 through 44 are arranged as shown in FIG. 10E and show, respectively, the shillings accumulator input amplifiers in FIGS. 39 and 40; the shillings accumulator in FIGS. 41 and 42; and the shillings read-out matrix in FIGS. 43 and 44.

FIGS. 45 through 48 are arranged as shown in FIG.

Figure 45:
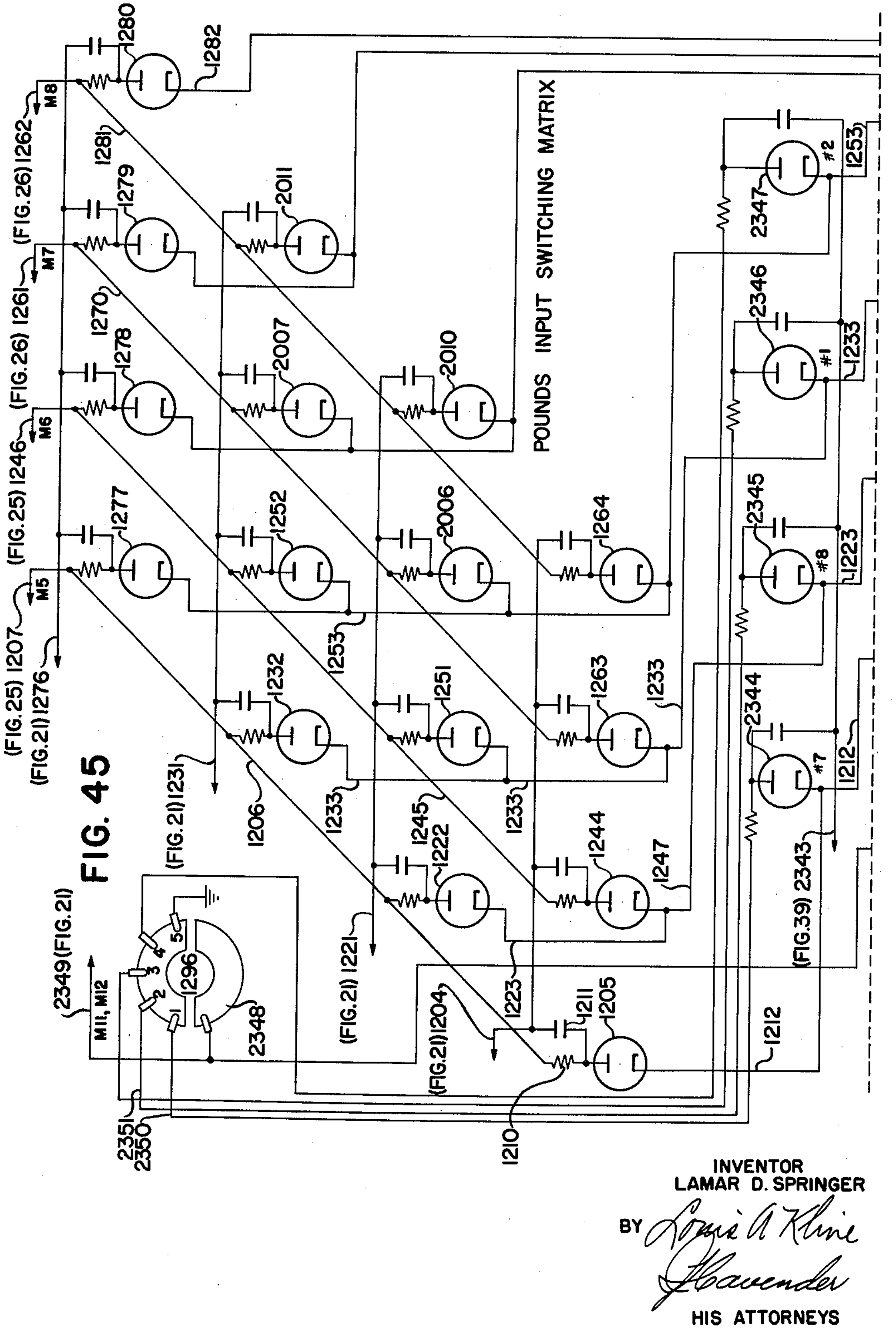
Figure 46:
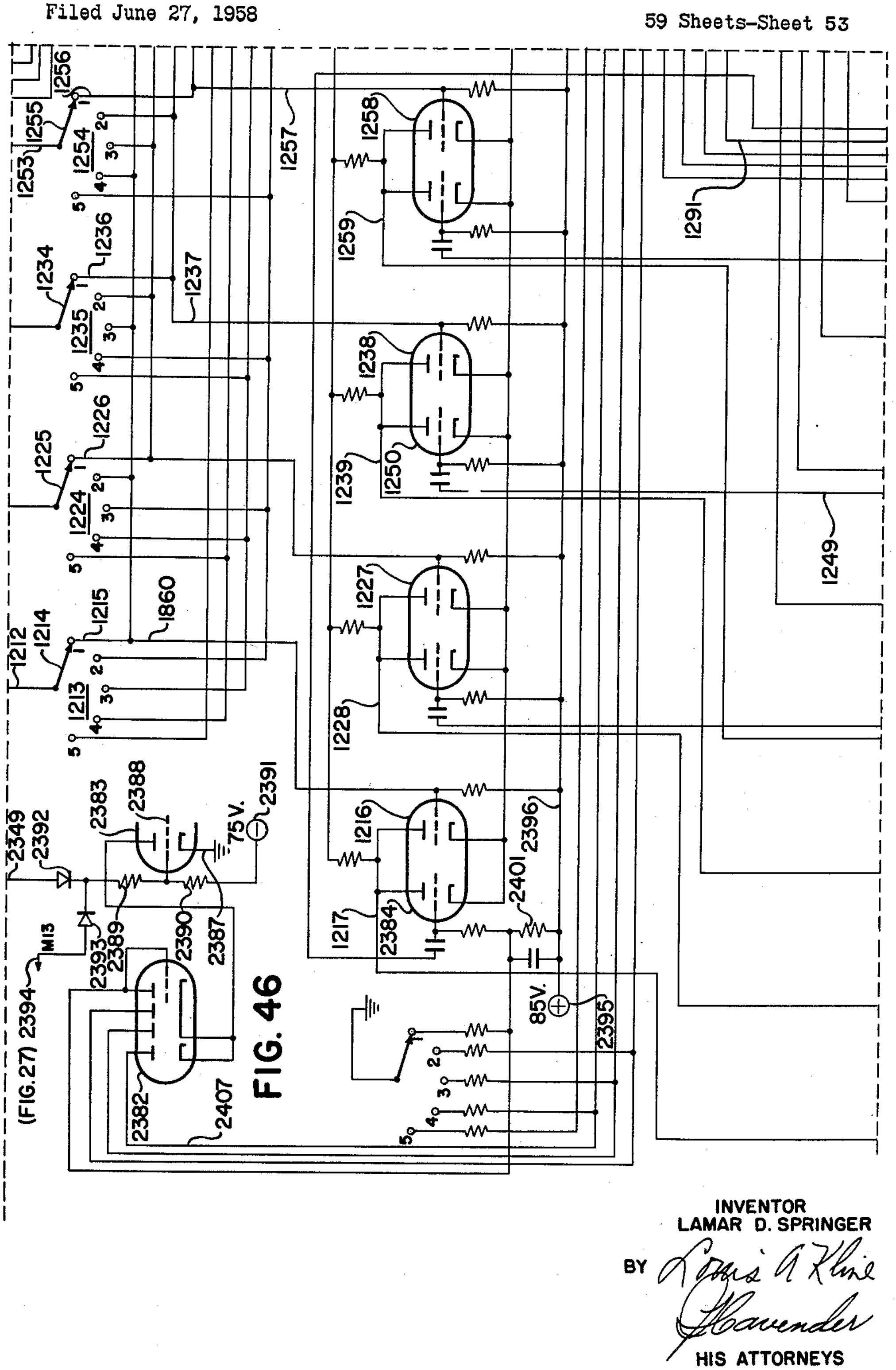
Figure 47:
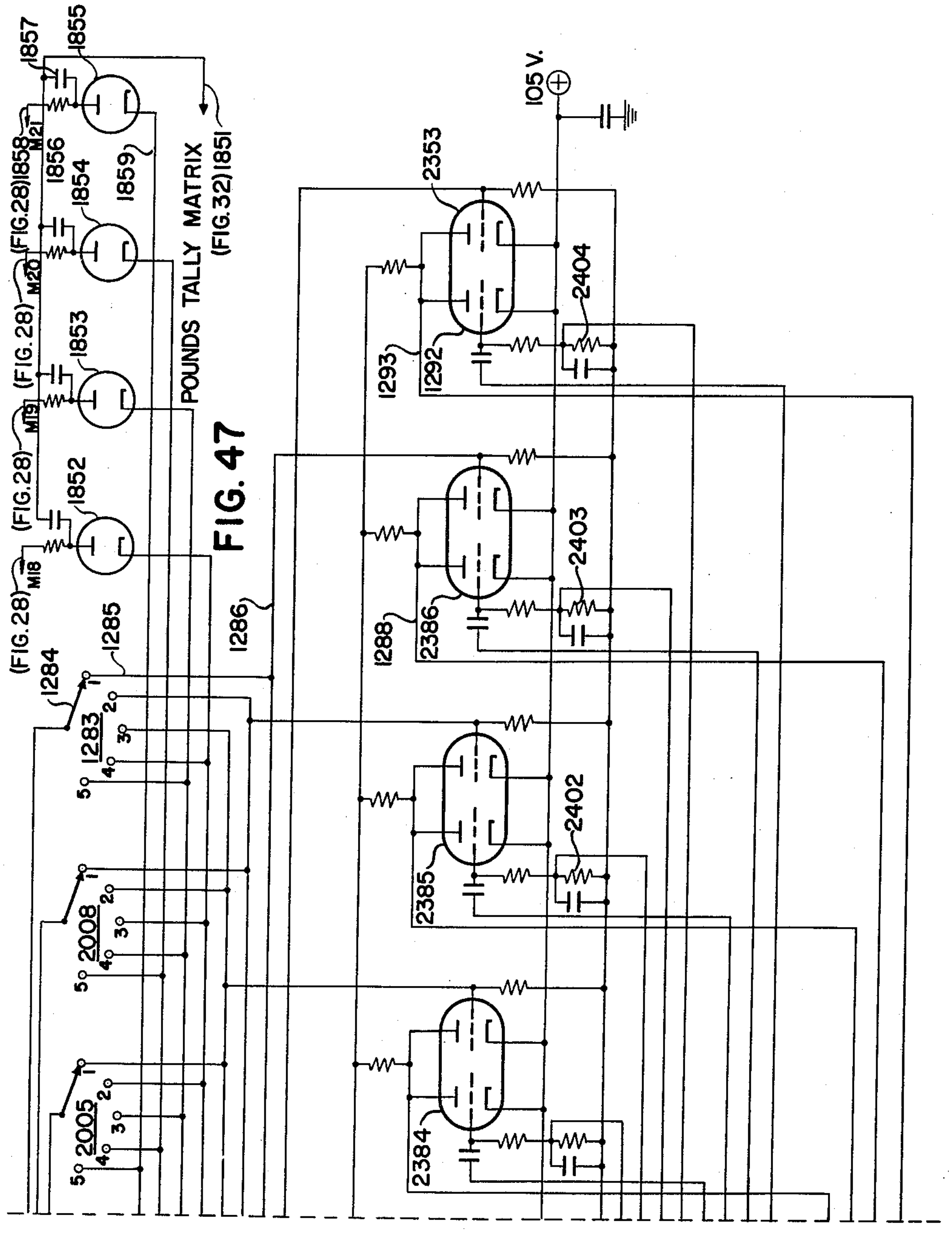
Figure 48:
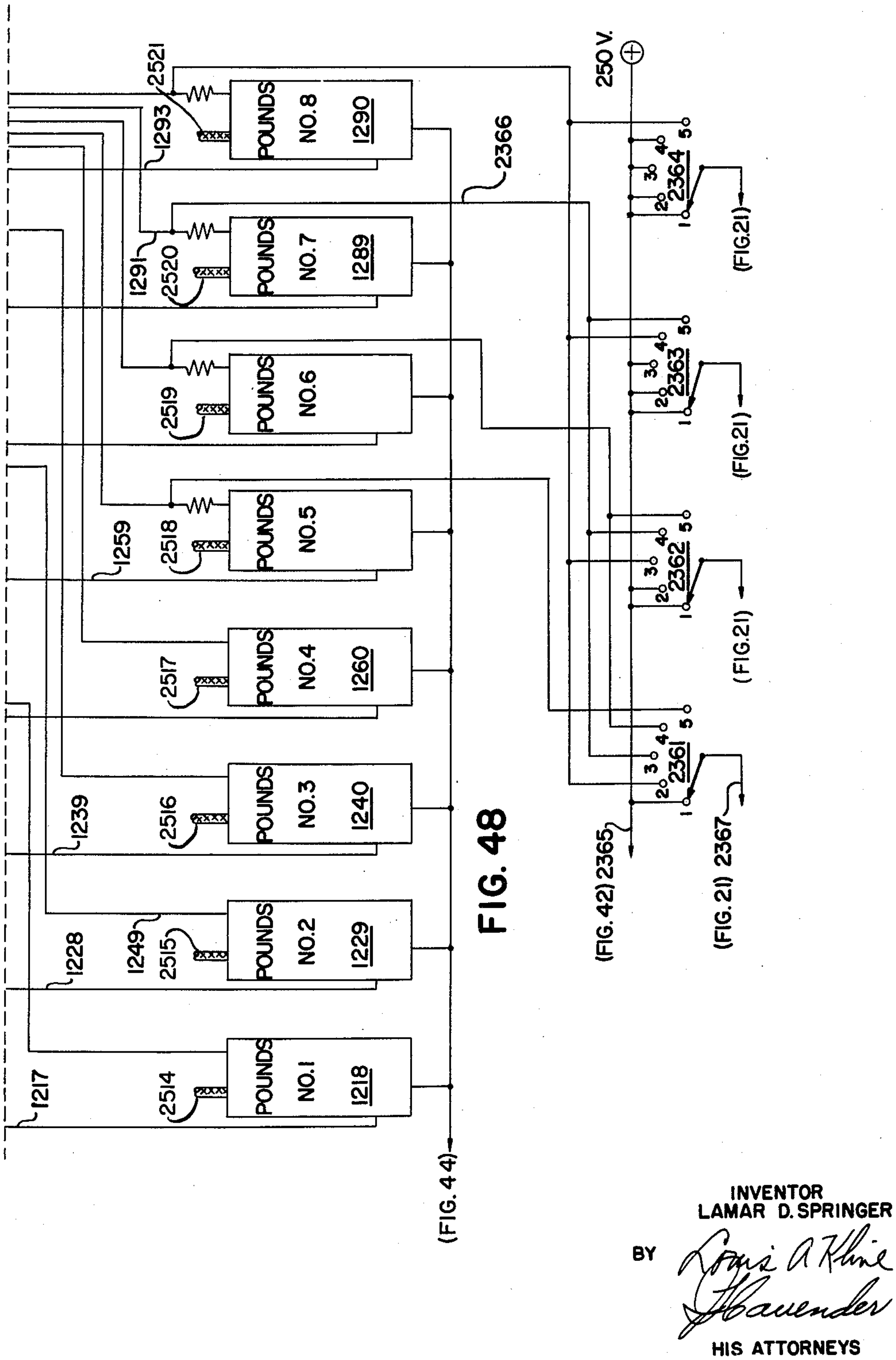

10F and show, respectively, the pounds input switching matrix in FIG. 45; the pounds accumulator input amplifiers in FIGS. 46 and 47; and the pounds accumulator order banks in FIG. 48.

Figure 10G:
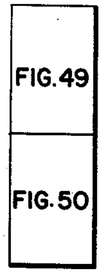
Figure 10H:
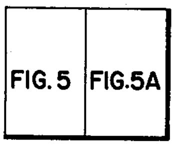
Figure 49:
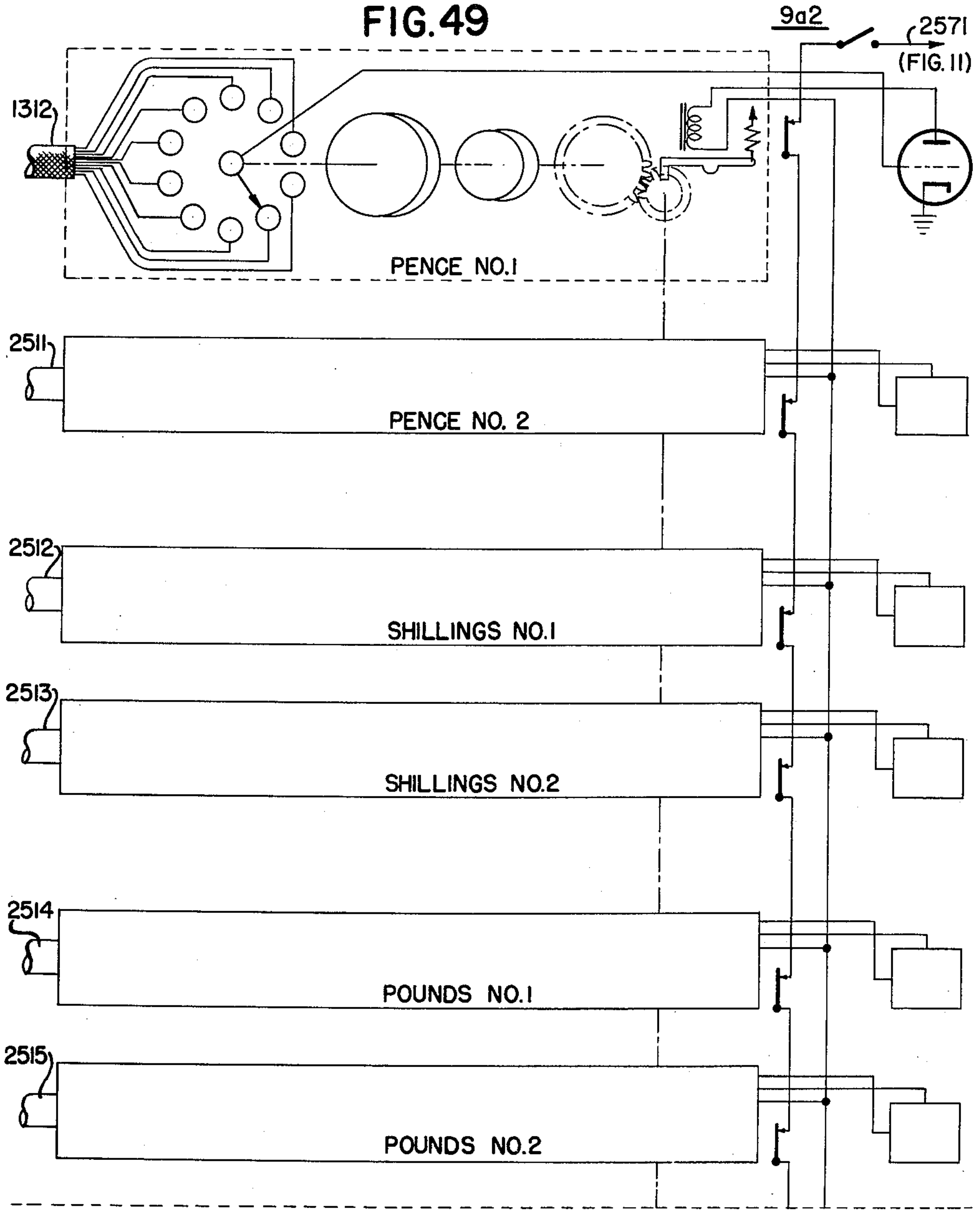
Figure 50:
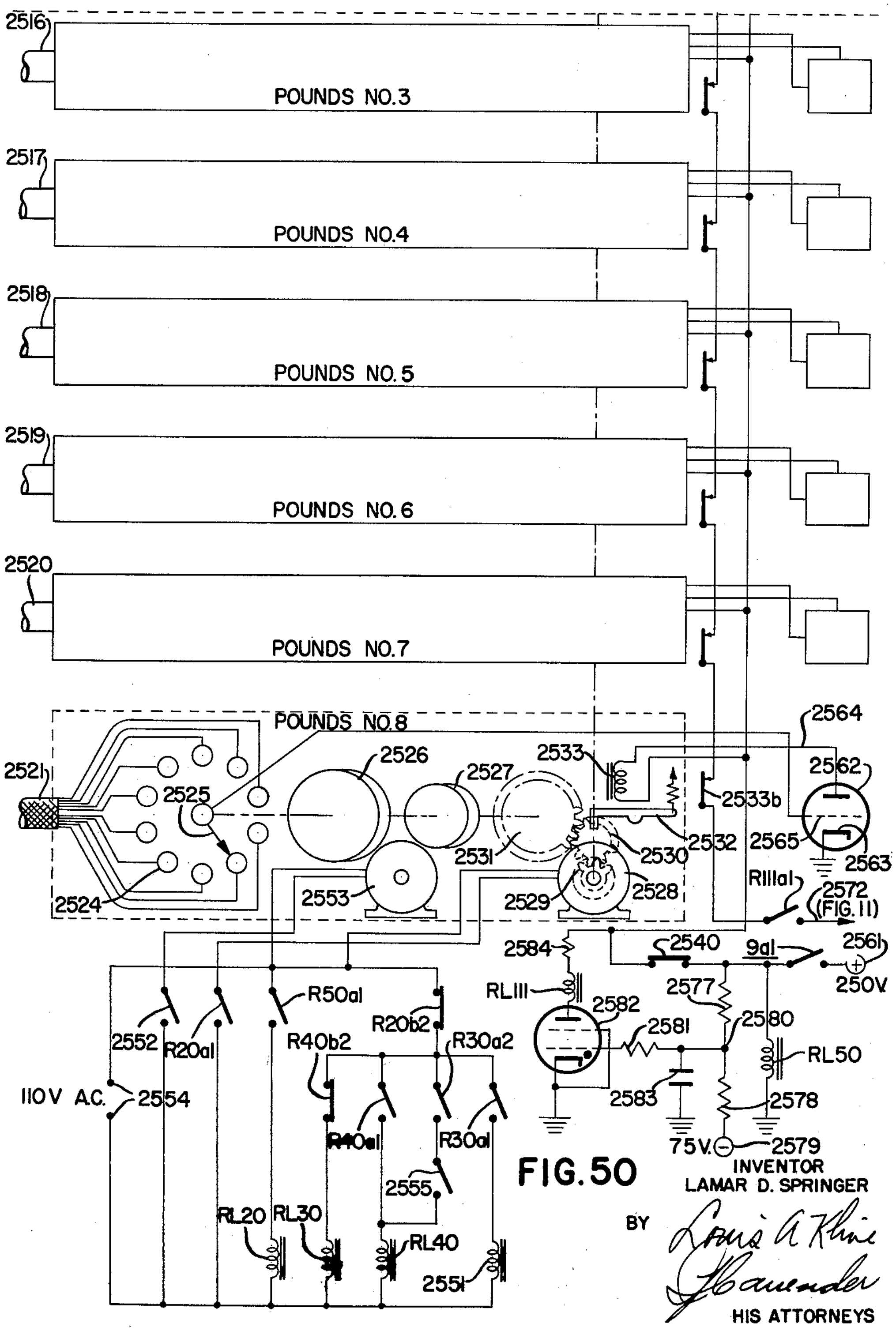

FIGS. 49 and 50 are arranged as shown in FIG. 10G and, taken collectively, show a suitable indicating mechanism included in the housing of FIG. 8.

FIGS. 51 and 52 are Truth Tables with attendant algebra for explaining the logic carried out by the decision circuit in controlling the extraction process.

FIG. 53 is a block-type showing of suitable logical elements for performing the logic set forth in FIG. 52.

Figures 54, 55:
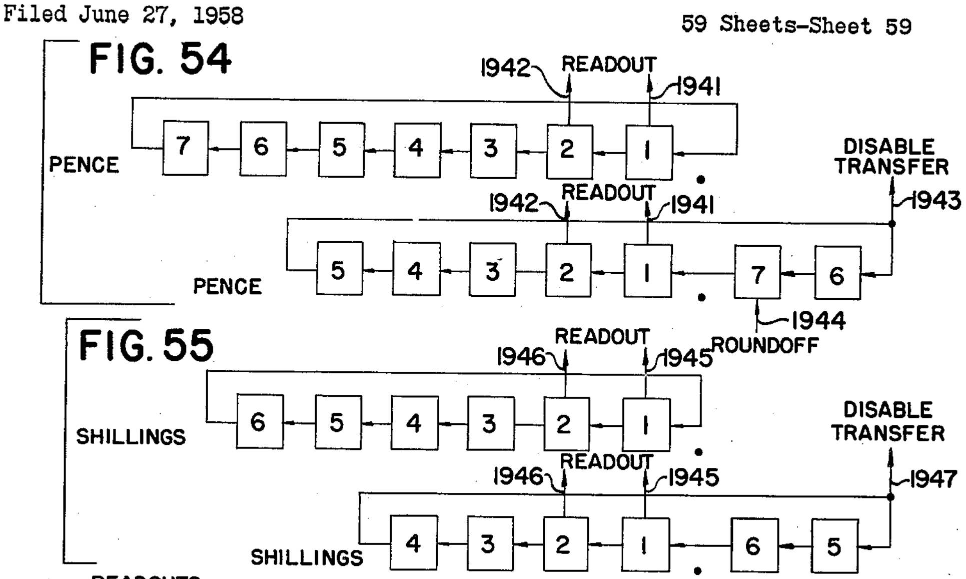
Figure 56:
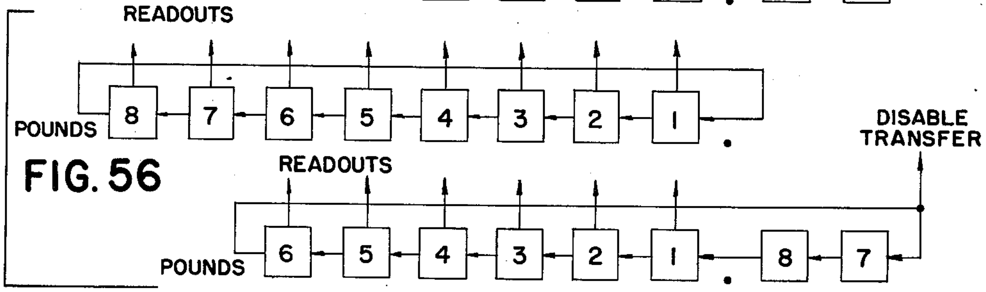

FIGS. 54, 55, and 56 show the pence, shillings, and pounds accumulators arranged for a decimal point problem.

Figure 57:
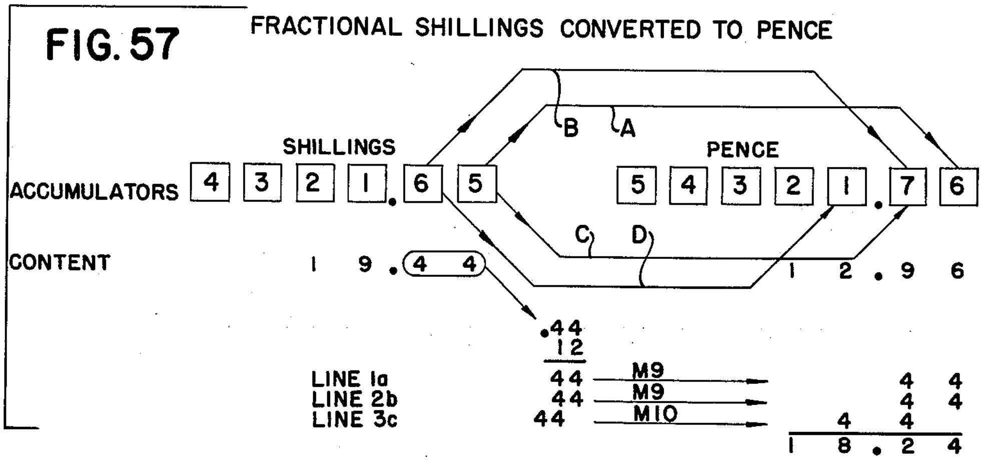

FIG. 57 is a chart useful in explaining a portion of the conversion process.

GENERAL DESCRIPTION

Accurate electronic digital multiplication is based on the ability of the machine to generate and count exact numbers of electrical impulses. The impulses may be generated or selected in the form of discrete groups and applied in controlled fashion wherever necessary to effect the programmed arithmetic operations. Groups of digit-representing pulses corresponding to the individual digits of the decimal multiplicand are formed. These groups of pulses are added into the appropriate accumulators a number of times corresponding to the various ones of the sterling multiplier digits.

Multiplication is first effected by the sterling digit or digits in the pence factor. The number of groups of pulses formed (corresponding to the decimal multiplicand digits) is first equal to the lowest order digit in the pence factor; namely, the units pence digit. After this intermediate product is stored in the appropriate order banks of the pence accumulator, further groups of pulses are formed a number of times corresponding to the tens pence digit, which groups of pulses are entered into proper denominations of the pence accumulator and added to the number standing therein. Subsequently, groups of pulses corresponding to the decimal multiplicand digits are formed a number of times equal to the digits of the shillings multiplier factor, the intermediate products resulting therefrom being entered into the appropriate order banks of the shillings accumulator. Finally, groups of pulses representative of the decimal digits are added into the pounds accumulator a number of times equal to the units digit of the pounds multiplier factor, then a number of times equal to the tens digit, etc.

BASIC MULTIPLICATION

Figure 1:
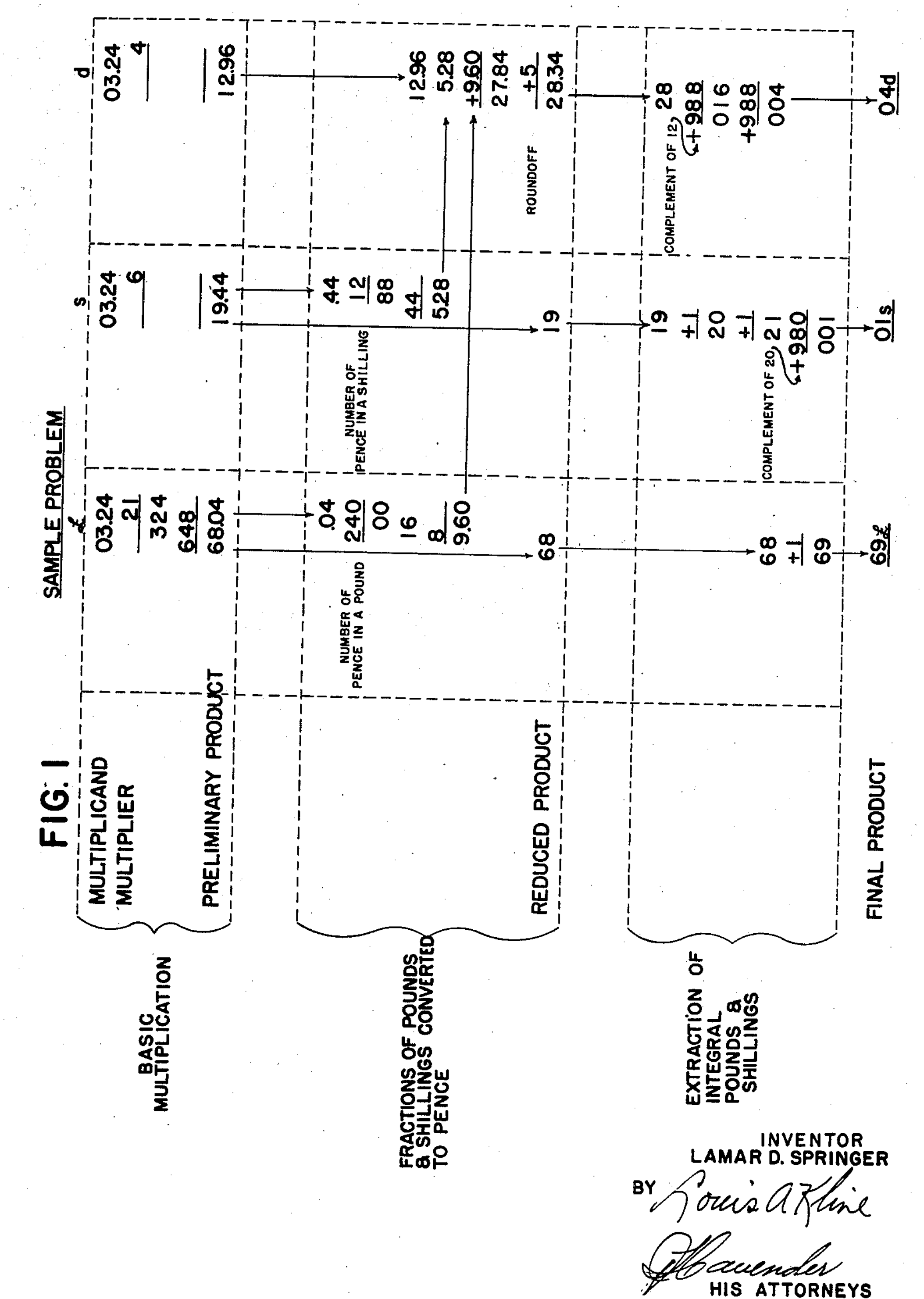
FIG. 1 shows a sample problem carried out in step-by-step fashion following the principles disclosed herein.

The foregoing is illustrated in the sample problem reproduced in FIG. 1 under the section entitled "Basic Multiplication," wherein the multiplicand is the decimal number 03.24 and the multiplier is the sterling number £21 6s. 4d. In accordance with the foregoing, the multiplicand, 03.24, is initially multiplied by the units pence denominational digit 4, and the resulting preliminary or intermediate product of 12.96 is developed in the appropriate orders of the pence accumulator. This is accomplished by entering the multiplicand into the pence accumulator four times. The groups of three, two, and four pulses are added into different orders of the accumulator. For example, the group of four pulses is added into the lowest order of the pence accumulator, the group of two pulses is added into the second lowest order, and the group of three pulses is added into the third lowest order bank, there being four such entries, as dictated by the pence multiplier digit 4.

Transfer paths exist from the lowest order bank to the second lowest order bank, etc., to provide for carries. In the above example, carries appear out of the lowest order bank and the third lowest order bank, since four fours are sixteen—that is, six with one to carry—and four threes are twelve—that is, two with one to carry.

Entry of the intermediate product of 12.96 into the pence accumulator completes the multiplication by the pence factor (step 1 of the program), because, in the example given, there is no tens pence digit. Accordingly, the control chain, operating through the keyboard, omits step 2 and automatically proceeds to step 3. However, in the event of a tens pence digit, multiplication by addition would be effected in the manner explained above, except that the groups of pulses would be applied to the next higher order pence accumulator banks than before (omitting the lowest order), thereby accounting for the denominational shift from the units to the tens order multiplier pence digit.

Also included under "Basic Multiplication" in the sample problem of FIG. 1 is the intermediate multiplication by the shillings factor. Here, during step 3, the decimal multiplicand, 03.24, is multiplied by the shillings multiplier digit 6 to produce a preliminary product of 19.44 in the shillings accumulator. The groups of three, two, and four pulses are added into the appropriate order banks of the shillings accumulator, and carries from lower to higher orders are effective to produce the preliminary product of 19.44. The sample problem does not contain any tens shillings factor, so step 4 is automatically skipped. However, when such a digit is present, it would also be used to form a product in the appropriate order banks of the shillings accumulator.

The next operation in the sequence, which is the last operation of the "Basic Multiplication" of FIG. 1, is that of multiplying the decimal multiplicand, 03.24, by the pounds multiplier factor. Steps 5 through 8 are allotted to this operation, because the exemplary machine capacity will permit four pound digits. In the instant problem, only steps 5 and 6 will be used, since the pounds multiplier used in the example, 21, contains only units and tens digits. The preliminary product, developed in the pounds accumulator during these steps, is 68.04, which number remains stored until conversion.

In the sample problem of FIG. 1, the operations to be discussed next are included in the bracket marked "Fractions of Pounds and Shillings Converted to Pence." First, the fractional portion of the shillings preliminary product—namely, 0.44—is multiplied by 12 (the number of pence in one shilling) to effect a conversion to pence. During conversion, the fractional decimal orders of the shillings accumulator become the source of pulse groups, and the fixed conversion factor 12 determines the number of times that the pulse groups are introduced to the pence accumulator. The order banks of the pence accumulator which receive the pulse groups are selected in accordance with the particular digit of the conversion factor being used to control the number of pulse groups, so that the interim product of 5.28 is set into the units and fractional decimal order banks of the pence accumulator. Steps 9 and 10 are allotted to the conversion of the fractional decimal shillings.

Similarly, the pounds fraction of 0.04 is multiplied by 240 (pence per pound), and the interim product of 9.60 is developed in the appropriate order banks of the pence accumulator. This operation is performed during steps 11 and 12. The reason that only two steps are required for conversion of the pounds fractional decimal is that the conversion factor of 240 contains only two multiplier digits, the zero being taken into consideration by the expedient of a denominational shift.

After conversion of the fractional decimal portions of the shillings and pounds to pence, the total stored in the pence accumulator is rounded off to the nearest penny. In the example given, 27.84 pence is rounded off to 28. This is achieved by pulsing the highest order fractional bank of the pence accumulator five times. The five pulses added to the stored digit 8 results in a carry which yields 28.34 pence. The fractional pence are not considered in the final answer.

The control chain is automatically stepped to step 13A, which is a time-delay-providing step. This step insures the completion of conversion by enabling time for carries on carries, etc., when the capacity is approached.

In the sample problem of FIG. 1, the final phase is concerned with the "Extraction of Integral Pounds and Shillings." First, all integral shillings are extracted from the total in the pence accumulator, leaving any pence remainder. Steps 14 through 17 are allotted to this operation. The pence total of 28 is divided by 12, and the resulting quotient—namely, 2—is added into the lowest order bank of the shillings accumulator. The remainder of 4 pence is the pence part of the final product. It might be pointed out that the division is accomplished by complementary addition, wherein the complement of 12, or 988, is added to the pence total of 28 twice in order to reduce the pence total to the ultimate pence portion of the answer.

Finally, the shillings total of 21 is divided by 20, the number of shillings per pound, and the quotient of 1 is added into the pounds accumulator. The remainder from this division—namely, 1 shilling—is the shillings portion in the final product. Here again, division is accomplished by means of complementary addition, wherein the complement of 20, or 980, is added to produce the foregoing result. With the addition into the pounds accumulator of 1 pound, extracted from the shillings division, the total in the pounds accumulator becomes 69, which is the pounds portion of the final product. Steps 18 through 21 are allotted to the extraction of integral pounds. Step 22 provides the automatic stop controls for the machine.

The apparatus will be described broadly with reference to the block diagrams of FIGS. 2 through 4B, which show a suitable block type diagram for illustrating the principles involved when sterling multiplication is performed by the apparatus of the subject invention. The source of timing pulses is illustrated by the block 100 (FIG. 2), labeled Impulse Generator. The pulses from Impulse Generator 100 are generated uniformly and appear in the timing charts shown in FIGS. 5 through 7B. These timing impulses are indicated at 101 opposite the 0° notation. This notation is merely presented to differentiate the 0° pulses from the 180° pulses 102, which occur also in uniformly-timed spacing but at intervals midway between the 0° pulses, in the manner of the well-known half-after pulses.

The 0° pulses 101 are used to drive an A Ring 103 (FIG. 2), which ring is capable of providing an output control at selected 0° pulse times. This control affords timed selection or gating and may be effective for the duration of the cycling time of the ring. More specifically, the A Ring enables a control voltage to be obtained at the proper time and for a selectable time duration to afford the selection of an appropriate group containing the required number of 0° impulses. It is these groups of pulses which represent the digits of the multiplicand and which are added into the accumulators the desired number of times to effect a multiplication.

The former type of control, the formation of digit-representing pulse groups, is determined by the settings of the Multiplicand Keyboard 104 (FIG. 2) for the decimal multiplicand, and the latter control, the determination of the number of times that the groups are formed, is obtained from the settings of the sterling keyboard, which includes the Pounds Keyboard 105, the Shillings Keyboard 106, and the Pence Keyboard 107 via a J Ring 108.

The A Ring 103 is continuously cycling, and the decimal keyboard setting merely picks off the number of pulses to constitute each group, whereas the J Ring is stepped one step each time the A Ring cycles. The sterling keyboard 105–107 then determines, by the digit set therein, how many times the J Ring 108 is stepped before it is reset. The J Ring 108 is stepped only up to the tube corresponding to the sterling multiplier digit being used.

This is illustrated in the example of FIG. 1, where the decimal multiplicand, 03.24, is multiplied by the units pence multiplier digit 4. The A Ring 103 (FIG. 2) cycles four times, corresponding to the pence digit, whereas the J Ring 108 steps up to the #4 tube, thereby forming four groups of four pulses each.

Figure 5:
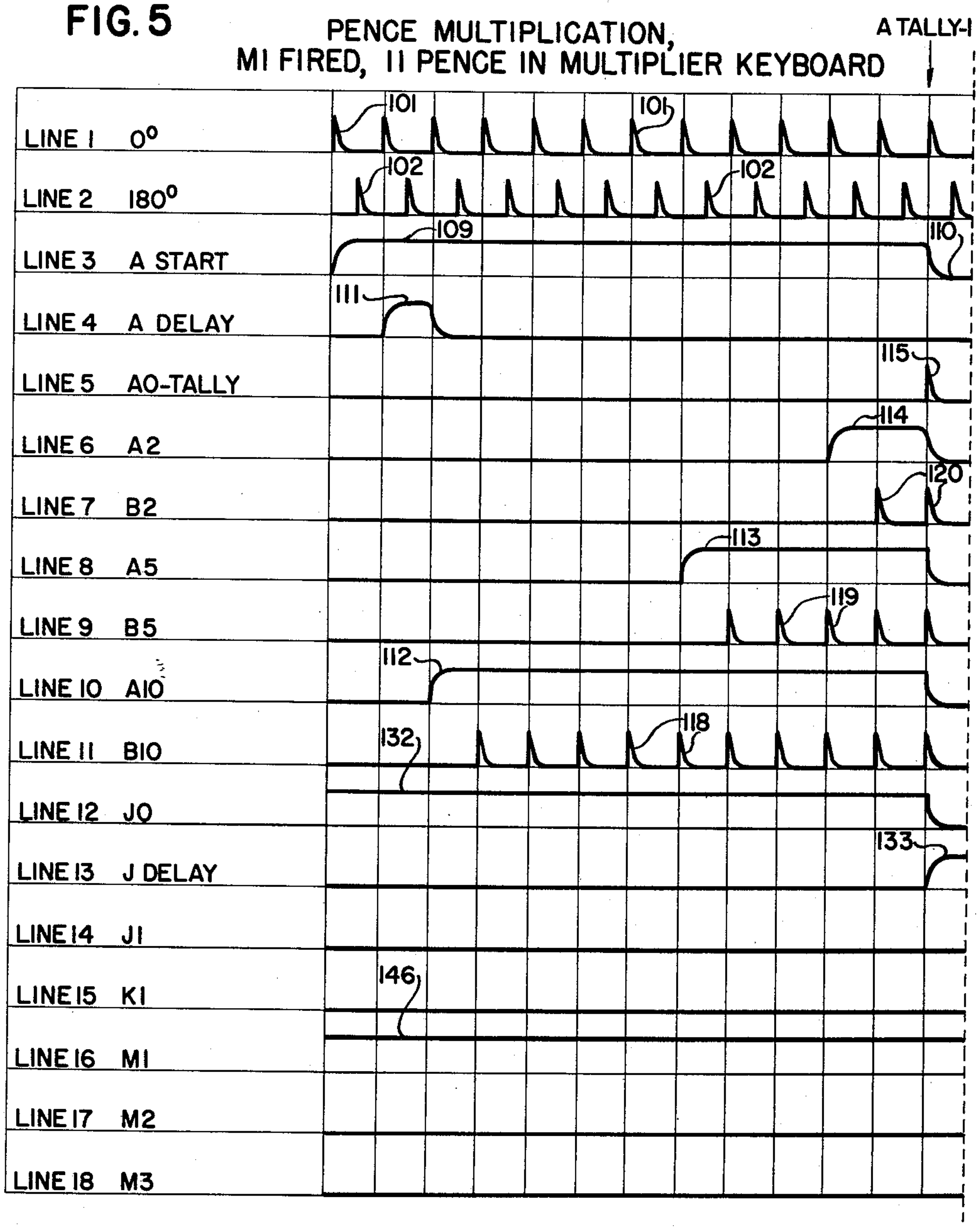
FIGS. 5 and 5A show timing pulses and operational intervals of various components relative to the timing pulses during the development of the pence intermediate product realized from the multiplication of the decimal multiplicand by the pence factor multiplier.
Figure 13:
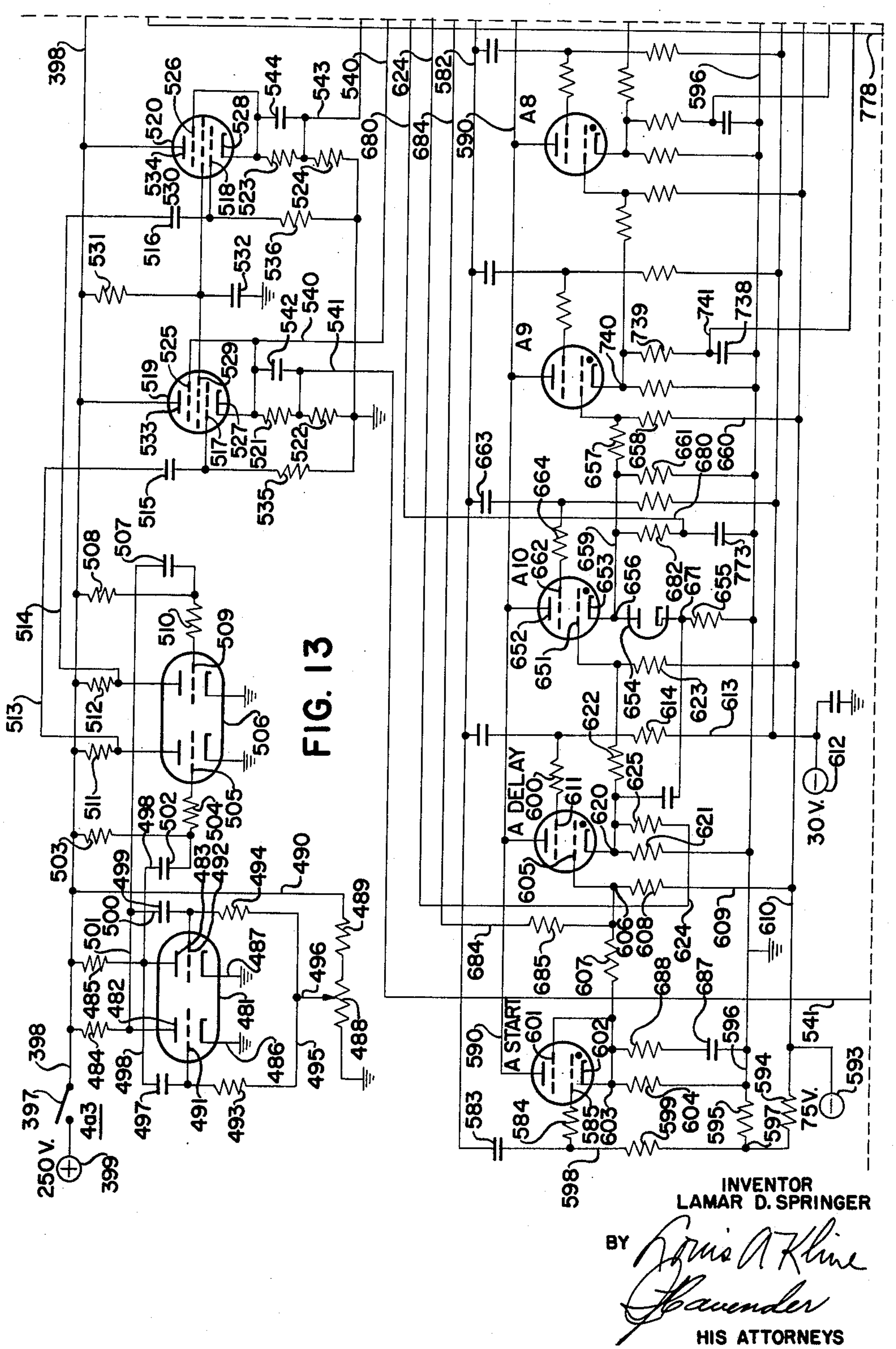
Figure 14:
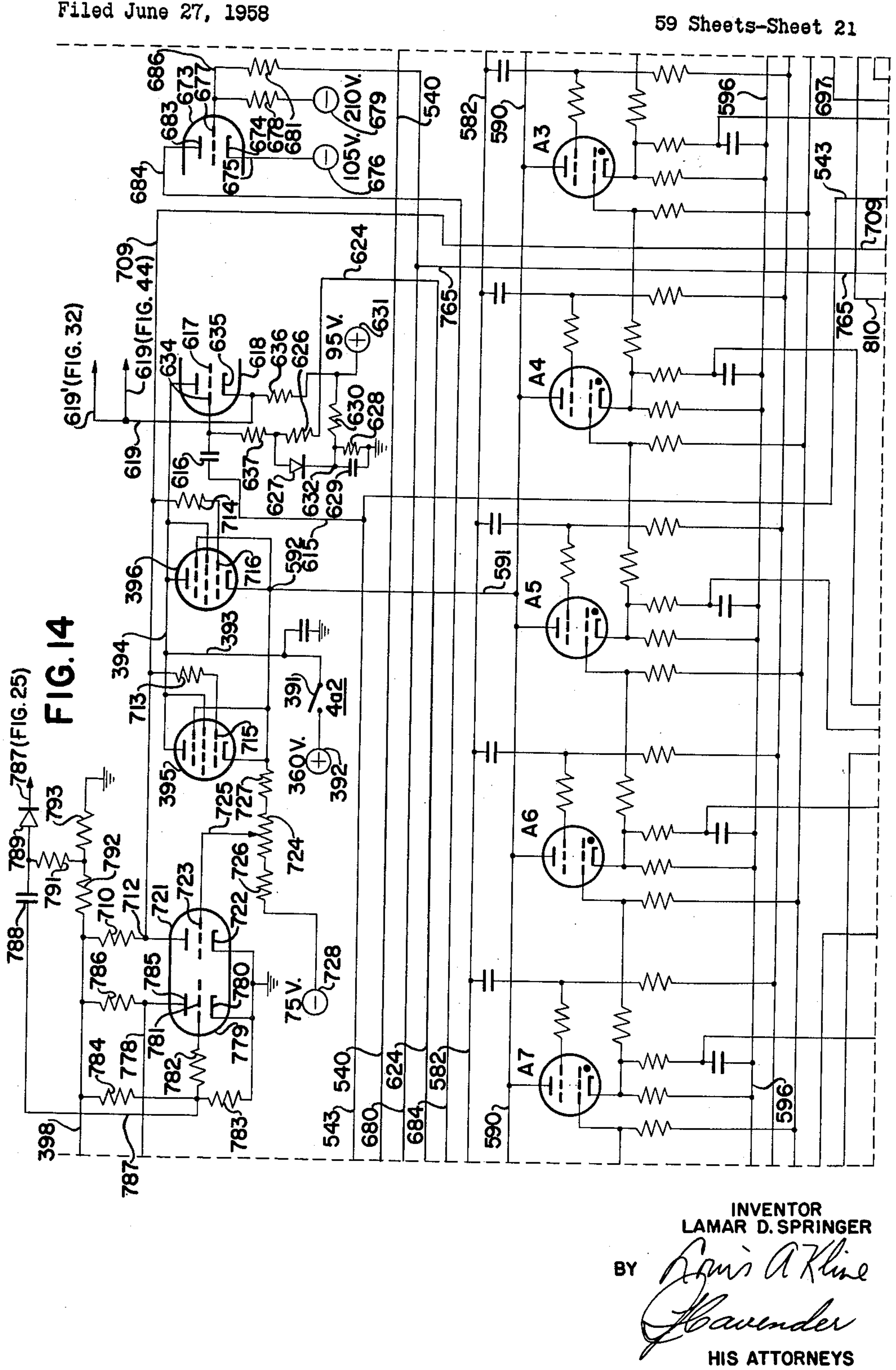
Figure 19:
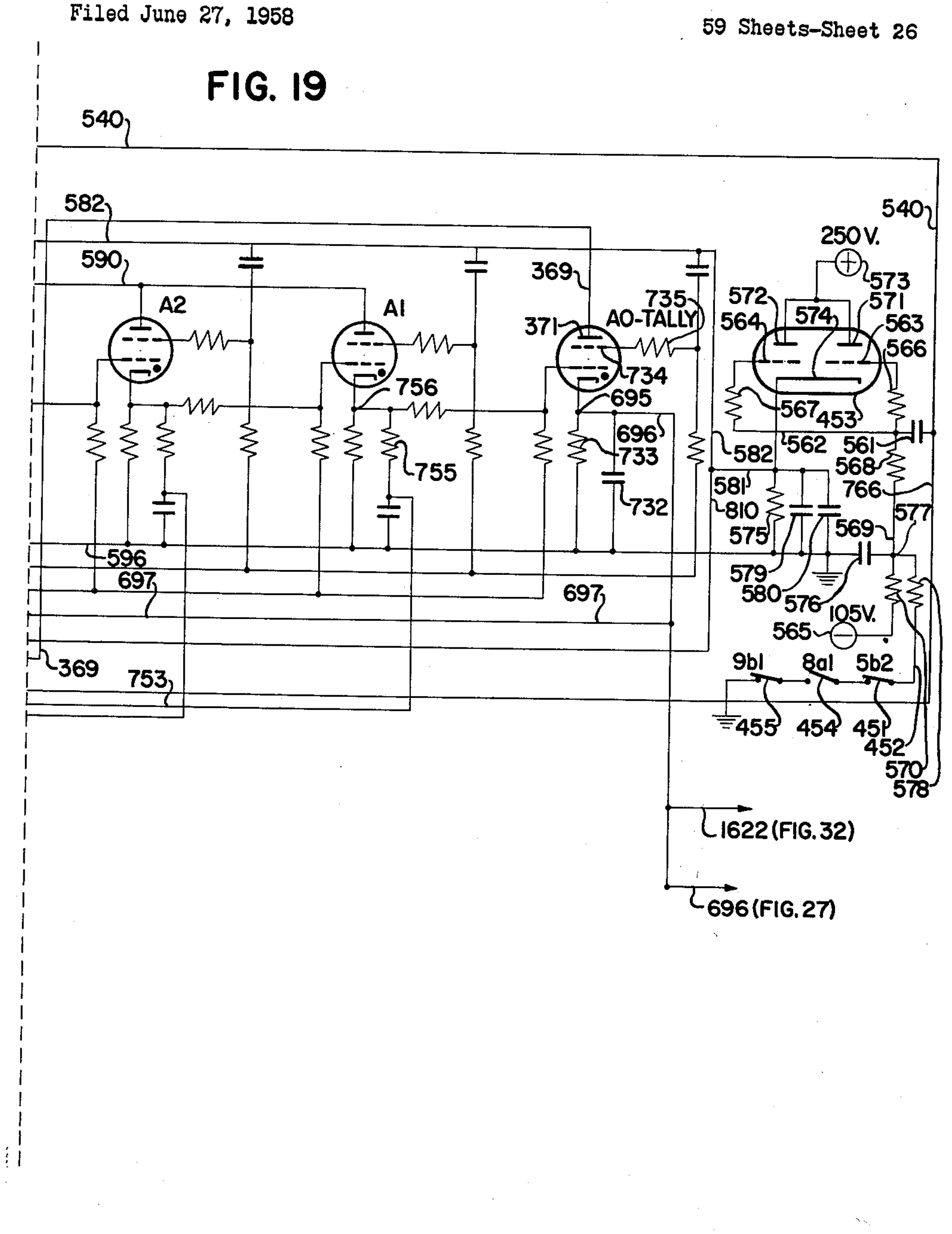

In FIG. 5 are illustrated the 0° pulses 101, used to drive the A Ring, which in turn provides gating controls for controlling the formation of digit-representing groups of pulses. This ring is in the nature of a conventional counting ring, with certain exceptions. The ring comprises thirteen thyratrons, arranged to fire in sequential order. These tubes are shown in FIGS. 13, 14, and 19, labeled A Start, A Delay, A10 to A1, and A0–Tally, in sequence. Initially, the A Start tube is fired and remains conducting for the duration of each A Ring cycle. In FIG. 5, the conducting periods for certain of the A Ring tubes are depicted relative to the 0° pulses 101. The A Start tube is conducting over the time interval 109, corresponding to ten time intervals between 0° pulses. Expressed differently, conduction is initiated in the A Start tube upon the occurrence of the first 0° pulse, and this tube is extinguished simultaneously with the occurrence of the thirteenth 0° pulse. The non-conductive time interval is shown at 110, corresponding to one 0° pulse time interval, defined as the time between adjacent 0° pulses.

While the A Start tube is conducting, each of the remaining A Ring tubes is fired. The A Delay tube is fired on the second 0° pulse and extinguished on the third 0° pulse. Its conducting interval is indicated at 111 in FIG. 5. Hence it may be seen that the A Start tube and the A Delay tube actually provide some idle time in the A Ring cycle to insure the restoration to normal operating condition of various components prior to the succeeding A Ring cycle.

The A10 tube is fired on the third 0° pulse and conducts over the time interval 112 (FIG. 5). In succession, then, the A9– to A0–Tally tubes are fired on 0° pulses, the A9 tube on the fourth pulse, the A8 tube on the fifth pulse, etc., until the A0–Tally tube is fired on the thirteenth 0° pulse. Conduction in the A5 tube is shown at 113, in the A2 tube at 114, and in the A0–Tally tube at 115. The thirteenth 0° pulse signifies the end of the first A Ring cycle. This pulse is labeled A Tally–1 at the top of FIG. 5. In reality, it is the occurrence of the A Tally pulse 115 (corresponding to the 0° Tally–1 pulse) which extinguishes all of the A Ring tubes in preparation for the next A Ring cycle.

Figure 5A:
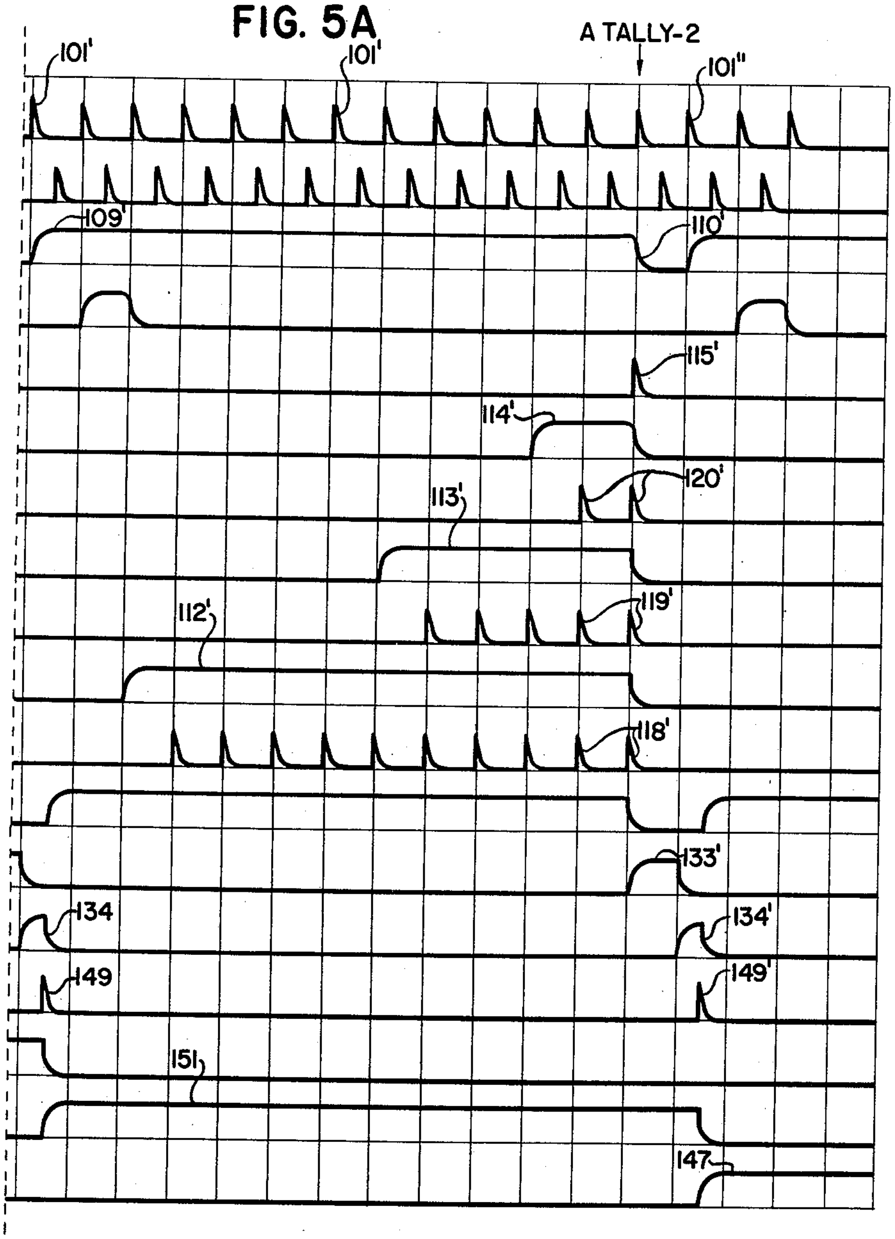

FIG. 5A is a continuation of the timing chart of FIG. 5 and shows the second A Ring cycle and a portion of the third. The numbers used to designate the various pulses and time intervals are the same as those used in FIG. 5 but include primes. The end of the second A Ring cycle is marked by the 0° pulse designated A Tally–2. A comparison of the elapsed time intervals for the first and second A Ring cycles reveals twelve 0° pulse time intervals for the first and thirteen for the second. Thereafter, each A Ring cycle occupies thirteen 0° pulse time intervals.

The reason for the shortened initial A Ring cycle is due to the fact that a single 0° pulse time interval is allotted between A Ring cycles, measured during the non-conducting interval of the A Start tube; i.e., between the Tally pulse and the succeeding 0° pulse. Prior to the initial A Ring cycle, time to permit extinguishment of the A Ring tubes is not required, because it is assumed that the machine has been off. Accordingly, the first 0° pulse initiates conduction in the A Start tube. The A Ring is also extinguished between problems, so the initial A Ring cycle is always shorter than the succeeding cycles.

For purposes of the explanation at the moment, it will suffice to know that the A Ring repeatedly forms a gating control for the selection of ten groups of pulses containing different numbers of pulses, from ten pulses per group down to one pulse per group. It remains, then, to select the appropriate groups as required in the mathematical operations.

Figure 2:
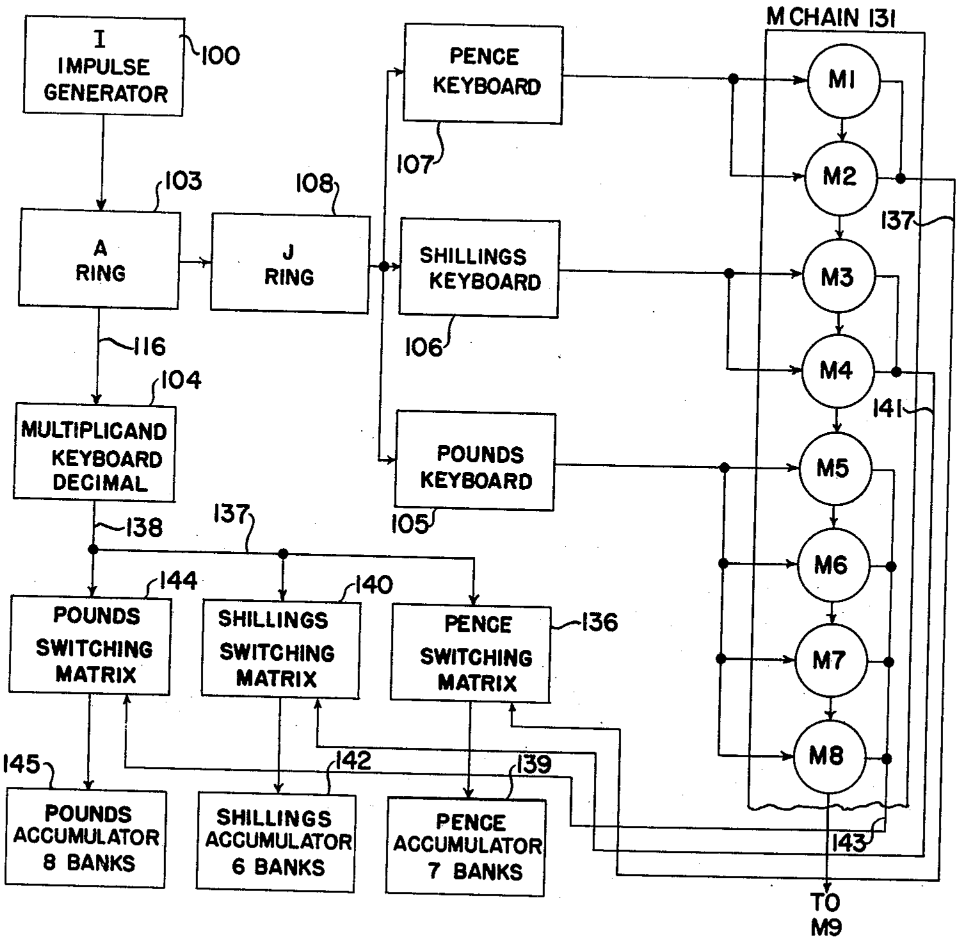
FIG. 2 shows, in block form, suitable apparatus interconnected to effect the basic multiplication as outlined in the sample problem of FIG. 1, wherein the intermediate pence, shillings, and pounds products are accumulated.
Figure 15:
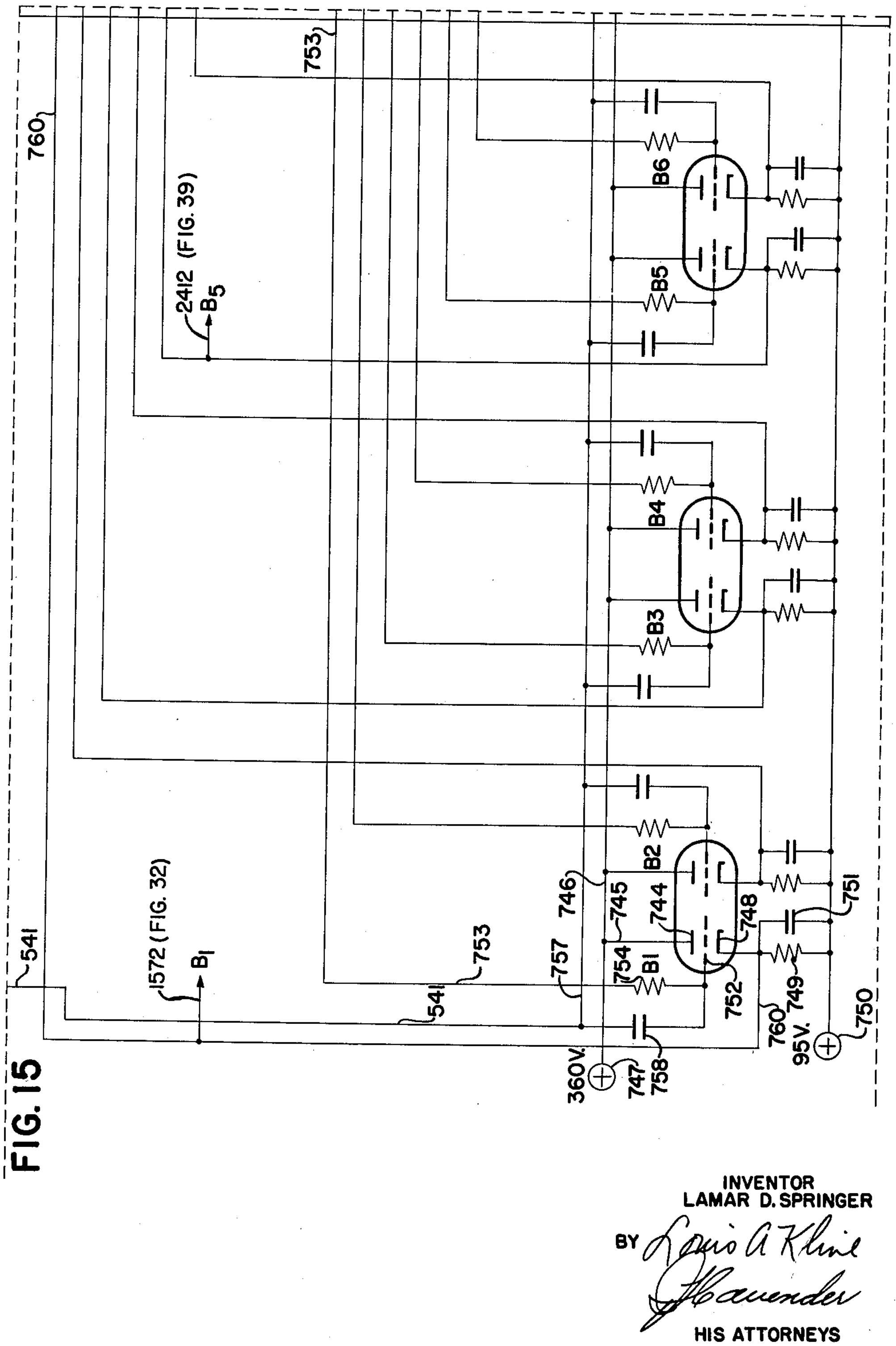
Figure 16:
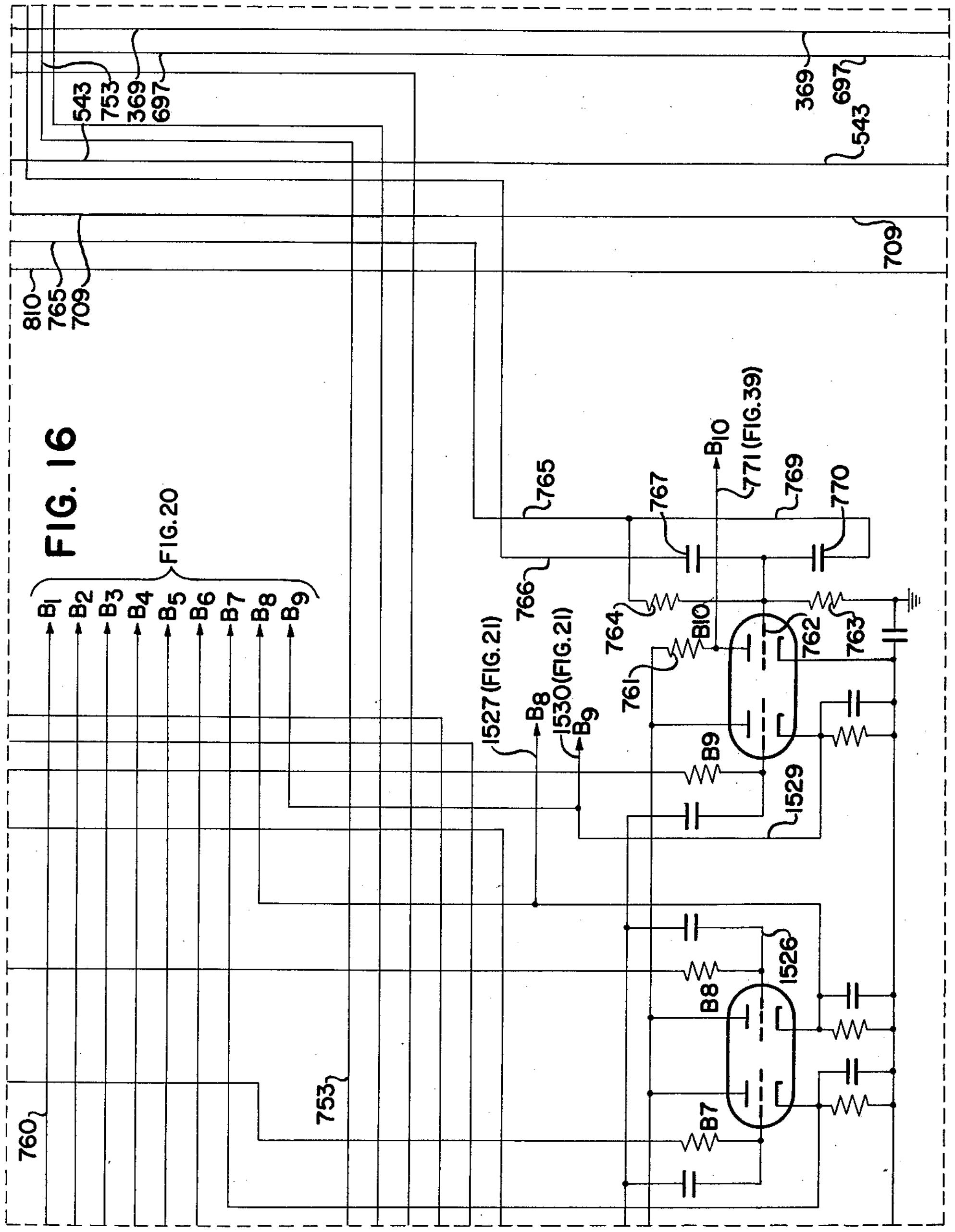

Returning to the block illustration of FIG. 2, ten separate lines, illustrated as the single lead 116, extend between the A Ring 103 and the decimal Multiplicand Keyboard 104, whereby the gating controls enabling the formation of pulse groups may be selected by a corresponding setting on the Multiplicand Keyboard 104. It should be pointed out that, in the actual connection, a B "Ring" 117 (FIG. 3) is included between the A Ring 103 and the keyboard 104 to form the pulse grouping output under control of the A Ring gating. This ring has been omitted from the showing of FIG. 2, but it will be described more fully hereinafter. However, the B Ring tubes are shown in FIGS. 15 and 16, the B1 through B9 tubes being cathode follower-connected and the B10 tube being connected as an amplifier. The B Ring merely selects groups of one through ten 0° pulses in accordance with the gating controls exercised by their related individual A Ring tubes. The timing charts of FIGS. 5 and 5A show certain groups of 0° pulses selected by the B Ring tubes in accordance with the conducting intervals of the A Ring tubes. The group of ten pulses 118, attributable to the B10 tube, occurs during conduction of the A10 tubes. Similarly, the B5 group of five pulses 119 is formed during conduction of the A5 tube, and the B2 group of two pulses 120 during conduction of the A2 tube. At the keyboard 104, there are available all groups of pulses from one through nine for selection by the corresponding keyboard setting. The group of ten pulses is utilized for another purpose, as will be explained, since the highest digit on the keyboard is 9.

The use of the multiplicand factor set into the Multiplicand Keyboard 104 has been touched upon. Now, the manner of using the multiplier factor which is set into the appropriate keyboards 105, 106, and 107 to determine the number of times the multiplicand is to be repetitively added into the appropriate accumulators and also to determine the order and denominational positions of such additions will be discussed. This is accomplished through the use of the J Ring 108 and the M Control Chain 131 (FIG. 2).

The J Ring and the M Chain cooperate with the multiplier keyboards to determine the number of times the A Ring will be required to cycle in completing the "Basic Multiplication" operation set forth in the sample problem of FIG. 1 to arrive at the preliminary products.

Figure 3:
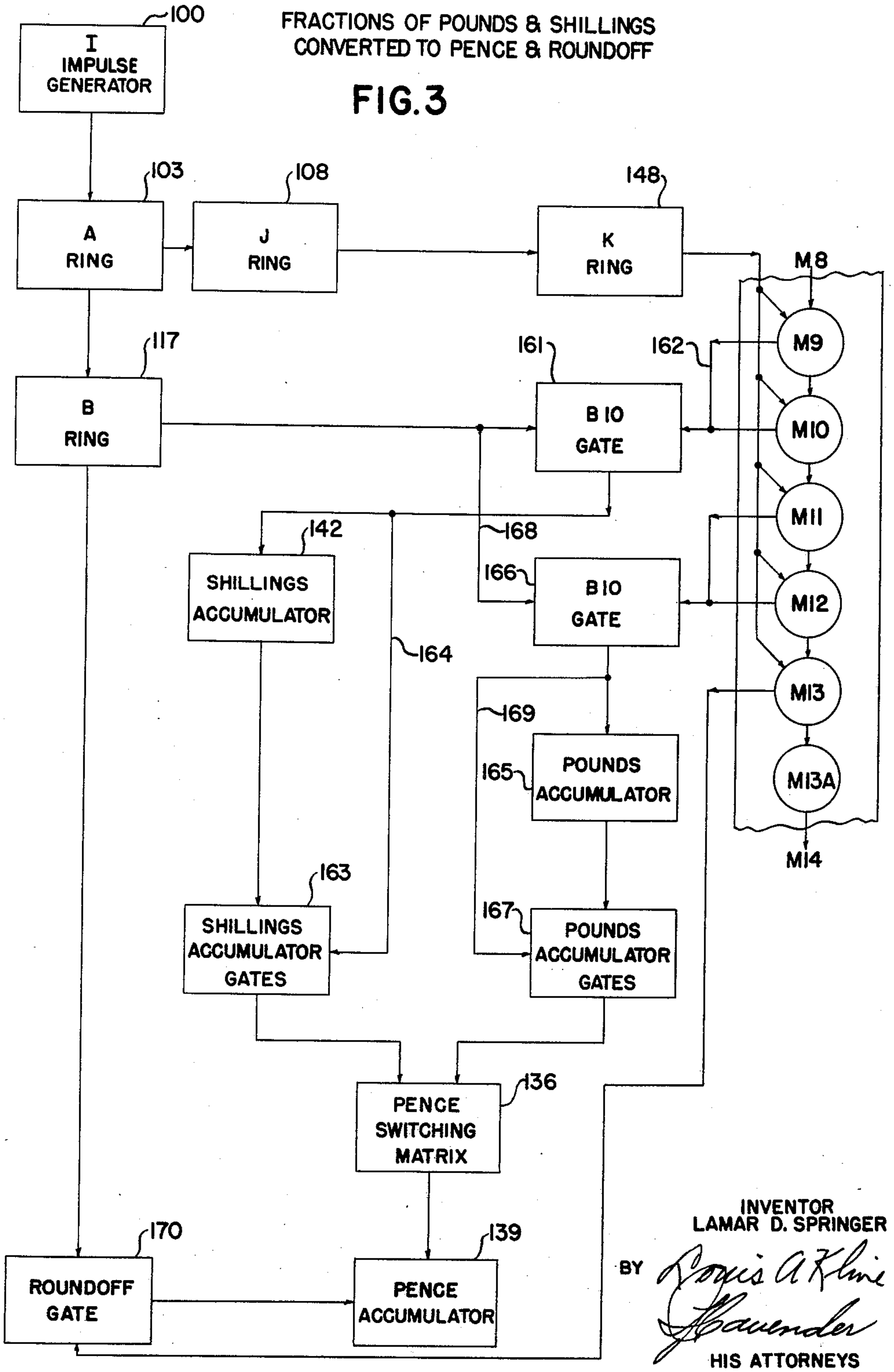
FIG. 3 shows, in block form, apparatus used to convert the decimal fractions of the pounds and shillings intermediate products to pence (as illustrated in FIG. 1) and also apparatus for rounding off the accumulated pence total to the nearest penny.
Figure 4:
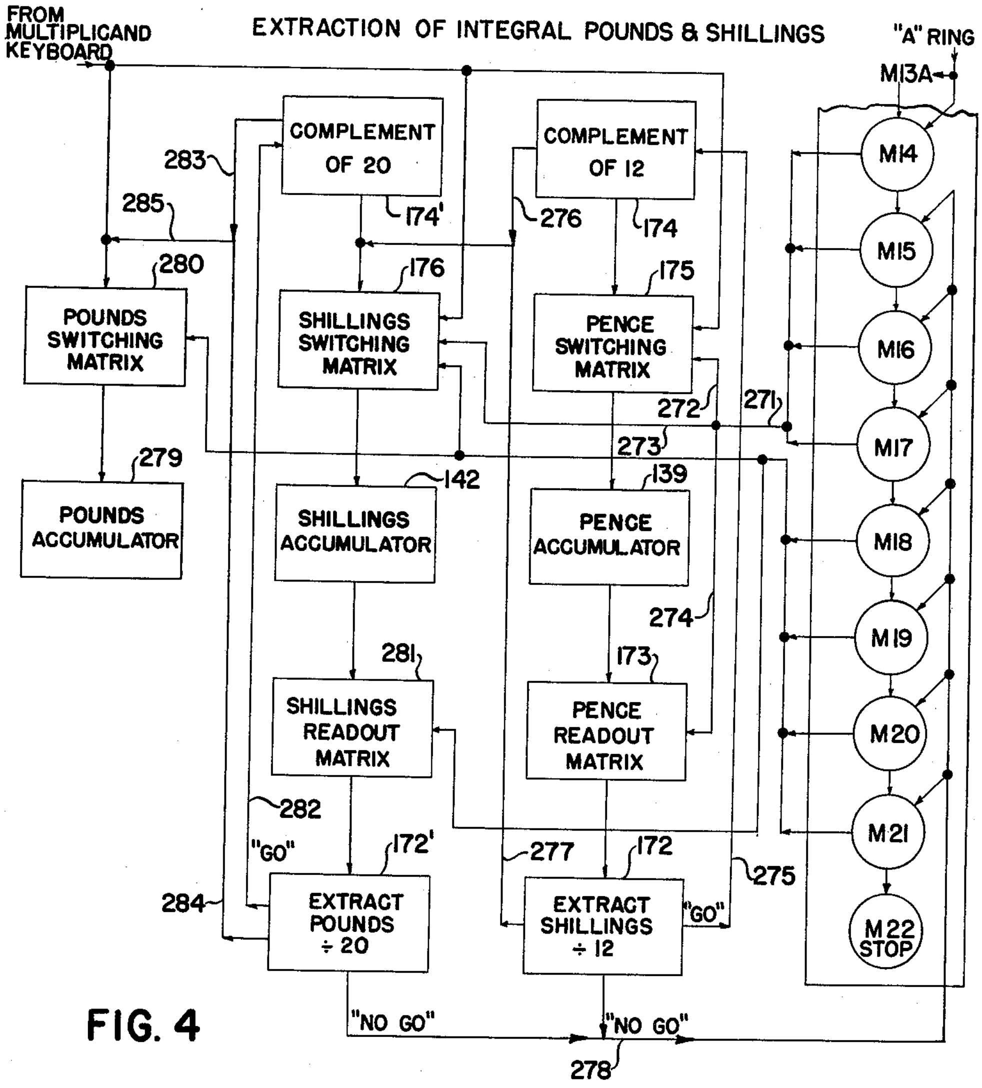
FIG. 4 is a further block diagram showing apparatus suitable for effecting the extraction of integral pounds and shillings from the shillings and pence accumulators, respectively, as illustrated in FIG. 1.

The M Chain includes tubes numbered 1 through 22, as schematically illustrated in the block diagrams of FIGS. 2, 3, and 4. The J Ring includes a J0 tube, a J Delay tube, and J1 through J9 tubes, all thyratrons, as shown in the circuit diagrams of FIGS. 17 and 18. The J Ring, while operating in many ways as a counting ring, is not a true ring but is a resettable sequential step-by-step counting ring. The J Ring steps one tube for each A Ring cycle. The ring is resettable after any number of steps by the M Chain through the expedient of plate extinguishment. Hence, the J Ring counts the A Ring cycles, and the M Chain controls the resetting of the J Ring after the ring has exerted its control for a particular step in the multiplication operation and prepares the J Ring for controlling the next multiplication operation.

Before multiplication is begun, the J ring is preset to J0 and the M chain to M1. After the first A ring cycle, a Tally pulse is sent to the J ring, stepping it to J1. This will be explained with reference to the timing charts of FIGS. 5 and 5A. The J0 output is represented at 132, where conduction occurs following presetting of the J0 tube to its "on" condition. The J0 tube conducts for one A ring cycle and is extinguished by the firing of the J Delay tube due to the Tally–1 pulse from the A ring. Conduction of the J Delay tube (shown at 133 in FIG. 5) extends only over a single 0° pulse time interval, at which time the J1 tube is automatically fired (by the next 0° pulse). The J1 tube conduction is represented at 134 in FIG. 5A.

Firing of the J1 tube counts the first A ring cycle. Each A ring cycle thereafter will be counted by stepping of the J ring. This action continues until the J ring reaches a position corresponding to the digit set into the Pence Keyboard 107 (FIG. 2). When the J ring has stepped to the tube corresponding to the digit set into the Pence Keyboard 107, the M Chain 131 is caused to step to its next tube, which controls the entries to be made according to the next denomination of the pence multiplier. Stepping of the M. chain resets the J ring to zero, so that the number of times that the multiplicand is to be added may now be controlled by the next higher denomination of the multiplier.

For example, tubes M1 and M2 control, respectively, multiplication by the units and the tens denominational orders of the pence factor (see FIG. 2). Similarly, tubes M3 and M4 control multiplication by the shillings multiplier factor units and tens denominational orders, respectively. In the same manner, tubes M5 through M8 control multiplication by the pounds multiplier digits as to the units through the thousands digits, respectively.

The tubes M1 and M2, when energized, control the Pence Switching Matrix 136 (FIG. 2) over control lines, such as 137, to cause the digit-representing pulse groups from the Multiplicand Keyboard 104 to be switched over the required output line, indicated generally at 138, and into the proper order banks of the Pence Accumulator 139. Similarly, tubes M3 and M4 control the Shillings Switching Matrix 140 over lead 141 for entries into the correct order banks of the Shillings Accumulator 142, and tubes M5 through M8 effect the same type of control over the Pounds Switching Matrix 143 via suitable leads, as indicated at 144, for entries into the appropriate order banks of the Pounds Accumulator 145.

Hence it may be observed that the M chain is the program control unit for the entire machine, the various mathematical operations being performed in timed sequence. The first eight tubes of the M chain, as has been explained, carry out the "Basic Multiplication," the respective preliminary products (FIG. 1) being formed by multiplication operations using the two pence digits, the two shillings digits, and the four pounds digits. However, it also might be mentioned that, if any of these digits is missing, the M chain will step over the corresponding M tube and exercise normal control thereafter. The skipping of one or more M chain tubes is enabled by circuits through the multiplier keyboards 105, 106, or 107, which establish firing circuits and priming circuits (from the preceding tube) for the tubes of the M chain. Priming from lower number to higher number M tubes is indicated by the short arrows between these tubes in FIG. 2. In the absence of a setting in one denomination, the keyboard automatically establishes priming and firing circuits for the M tube of the next higher denomination.

The components depicted in the block illustration of FIG. 2 have been generally described. These components are sufficient to carry out the "Basic Multiplication" as outlined in the sample problem of FIG. 1 and hereinbefore briefly discussed. It is now the purpose to carry through, in greater detail, the multiplication operations necessary to produce the pence, shillings, and pounds preliminary products.

Assume that the J ring 108 is preset with the J0 tube conducting, the M Chain 131 is preset with M1 conducting and the A Ring 103 is starting to cycle; that is, the A Start tube is conducting. Reference to FIG. 5 will show the M1 tube conducting at 146, the A Start tube conducting at 109, and the J0 tube conducting at 132. The first step in the multiplication is one of multiplying the decimal multiplicand, 03.24, by the pence factor of 4, the latter factor being set into the Pence Keyboard 107 and the former factor into the Multiplicand Keyboard 104 (FIG. 2).

The A ring will be caused to cycle four times because of the "4" digit in the pence units denomination of the keyboard 107. Each time, groups of four, two, and three pulses (corresponding to the decimal multiplicand, 03.24) are available at the Multiplicand Keyboard 104. The M1 tube controls the Pence Switching Matrix 136 to pass these groups into the proper order banks of the Pence Accumulator 139. Simultaneously, each cycle of the A ring is counted in the J ring until the J4 tube becomes conducting.

After the fourth cycle of the A Ring 103, the output of the J Ring 108 will feed a firing pulse through the Shillings Keyboard 106 to fire the M3 tube, since the tens digit of the pence factor is zero and M2 is therefore skipped. When M3 fires, it signifies that any multiplication by the pence units and tens digits is complete, and, accordingly, the J Ring 108 is reset to zero. At this point, as is apparent from the sample problem of FIG. 1, the pence accumulator contains a preliminary product of 12.96 pence. This preliminary product is stored for future use.

Ordinarily, both steps 1 and 2 would have been required to develop the pence preliminary product. However, the single pence digit in the sample problem enabled step 2 to be omitted. Subsequently, in the ensuing description, a problem involving a pence factor of 11 will be assumed, so step 2 can be described fully.

Figure 17:
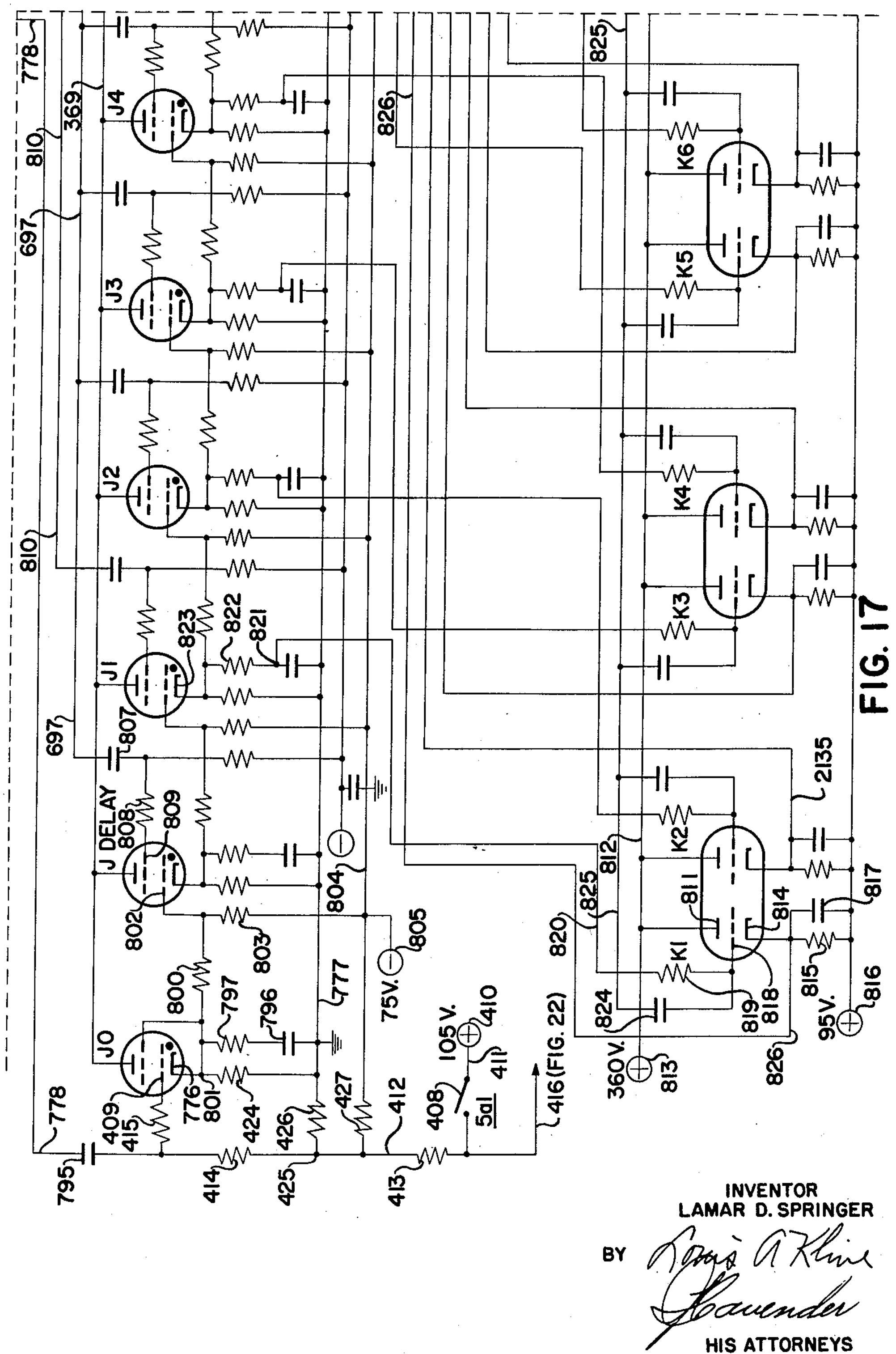
Figure 18:
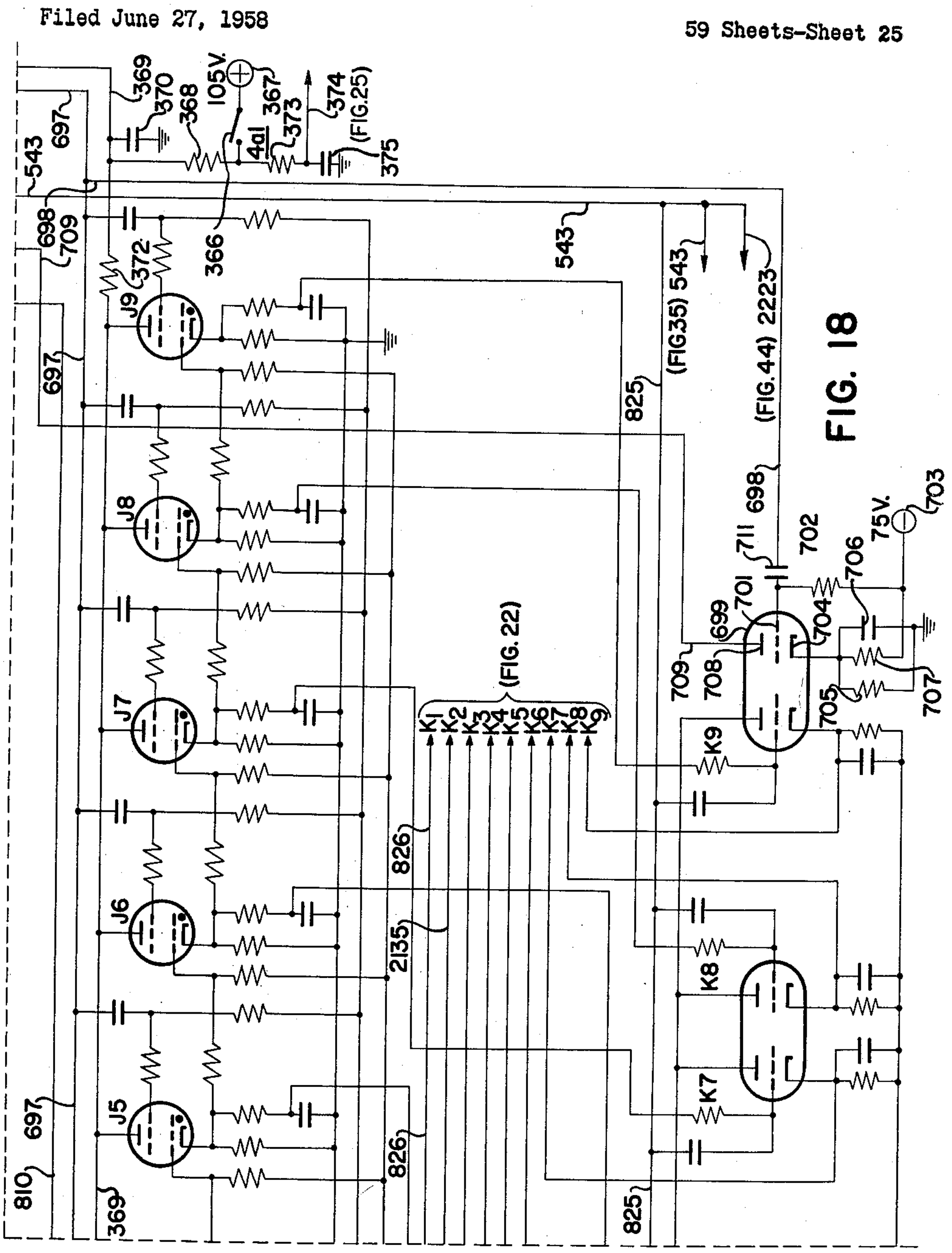

In reality, the K Ring 148 (FIG. 3) is interposed between the J Ring 108 and the sterling keyboard. The K ring merely passes 180° pulses in accordance with the control exerted by the J ring control tubes. For example, in FIG. 5A, the K1 pulse 149 is a 180° pulse 102 selected during conduction of the J1 tube. The K ring tubes, K1 through K9, are cathode-follower connected, as shown in FIGS. 17 and 18, and operate as slaves to the J ring.

The apparatus is now set for step 3, the multiplication of the decimal number 03.24 by the shillings factor of 06. Accordingly, the Shillings Keyboard 106 (FIG. 2) has entered therein a setting of 06, which permits the A ring to cycle six times and the J ring to step to a J6 setting. This action develops the preliminary product of 19.44 shillings in the Shillings Accumulator 142 (FIG. 2). Each time the A ring cycles, the groups of four, three, and two pulses, representing the multiplicand 03.24, are available at the Multiplicand Keyboard 104 for entry into the Shillings Accumulator 142 via the Shillings Switching Matrix 140 under control of the M3 tube over line 141. Conduction is shown in the M3 tube at 147 in FIG. 5A. It must be explained that the timing chart of FIGS. 5 and 5A was drawn for a problem involving a pence factor of 11. Hence, in such a problem, each of the tubes M1 and M2 need conduct for only one A ring cycle, which also explains the M2 conduction interval shown at 151 and not utilized in the sample problem under consideration. In the instant example (of FIG. 1), the A ring was required to cycle four times for the pence factor and six times for the shillings factor. The M1 and M3 tubes are required to conduct for corresponding intervals. A timing chart showing ten or more A ring cycles would be unduly lengthy and really unnecessary, since the principles of operation are clearly explainable from the showing made.

The preliminary product of 19.44 shillings is developed and entered by the time the J ring attains a J6 setting. Conduction in the J6 tube causes a firing pulse to be sent through the Pounds Keyboard 105 to the M5 tube, the M4 tube being skipped due to a zero in the tens denominational order of the Shillings Keyboard 106. When conduction is established in the M5 tube, the J ring is reset to J0, which signifies the completion of step 2. The preliminary product of 19.44 shillings, resulting from the shillings multiplication, is stored in the Shillings Accumulator 142 for future use.

The next step in the multiplication begins when control tube M5 is fired in preparation for multiplication by the pounds multiplier factor. The keyboard setting of the Pounds Keyboard 105 is 21, the pounds multiplier being used in the problem. The lowest denomination—namely, the units order—of the pounds multiplier factor is 1, so that the A ring cycles once and the J ring steps only to its J1 setting to enter the quantity 324 into the Pounds Accumulator 145 (FIG. 2). The J1 tube of the J ring, operating through the K ring, then fires the tube M6 to set up controls for multiplication by the tens digit (namely, 2) of the pounds multiplier factor.

As may be seen from FIG. 1, the result of this step of the multiplication, 648 (324 twice), is entered into the Pounds Accumulator 145 (FIG. 2), in the appropriate order banks. This action required a cycling of the A ring twice and stepping of the J ring to the J2 position, which action fired the M9 tube in preparation for the next step in the multiplication process. It should be pointed out that the firing of the M7 and M8 tubes is avoided, and these tubes are actually skipped due to the lack of a setting in the hundreds and thousands orders of the Pounds Keyboard 105. The Pounds Accumulator 145 now contains 68.04 pounds, which figure is stored for further use.

FRACTIONS OF POUNDS AND SHILLINGS CONVERTED TO PENCE

The block diagram of FIG. 3 will be used to explain conversion. Step 4 of the multiplication relates to reducing the decimal fraction of the shillings preliminary product to pence and adding the converted quantity into the pence accumulator. This is accomplished by multiplying the shillings decimal fractional part (0.44) by 12 to effect the conversion. The fractional part of the number in the Shillings Accumulator 142 (FIG. 3) is extracted by "pulsing out" the accumulator in order to obtain the multiplicand for the conversion. It will be recalled that the A ring is capable of initiating a group of pulses, ten in number, which heretofore has not been utilized, since the keyboard includes no numbers above 9. Briefly, the reason for the ten-pulse group is to enable pulsing out of the accumulator banks during the conversion step without destroying the accumulator content.

Since step 4 of the multiplication process began when M9 was fired, the M9 tube opened a gate, shown as the block 161, labeled B10 Gate, by way of a connection 162, thereby permitting ten pulses to pass from the B Ring 117 to the Shillings Accumulator 142 (FIG. 3). The M9 tube accomplishes this purpose through a diode control circuit (not shown in FIG. 3), completely independently of any keyboard. A group of ten pulses is, of course, applied to each of the shillings accumulator banks which contain the fractional part of the number to be converted.

The banks are pulsed in parallel, and, regardless of the amount stored in the banks, as each accumulator bank reaches its zero position, its corresponding Shillings Accumulator Gate 163 is opened, so that the remaining number of the pulses of the group of ten on path 164 is gated through the Shillings Accumulator Gates 163 (FIG. 3). The reason that the Shillings Accumulator Gates 163 are opened when the related orders of the Shillings Accumulator 142 reach zero is to allow a selected number of the pulses passing along path 164 equal to the contents of the order being pulsed out to go through the Pence Switching Matrix 136 and into the Pence Accumulator 139. Hence the pulses passed through the Switching Matrix 136 and into the Pence Accumulator 139 correspond to the number originally stored in these banks of the Shillings Accumulator 142. In the case of the instant example, these are the digits of the fractional part (0.44) of the shillings accumulator content.

It should be understood that the B10 Gate 161 provides the group of ten pulses to the order banks of the Shillings Accumulator 142 in parallel, so that up to four order banks can be "read or pulsed out" simultaneously.

In this manner, the multiplication by twelve to effect the conversion is accomplished by cycling the A Ring 103 twice (under control of the M9 tube), which in turn causes the groups of ten pulses from the B Ring 117 to pass through the B10 Gate 161 to the appropriate order banks of the Shillings Accumulator 142. This effects a multiplication of the shillings fractional part (0.44) by the lowest order digit (2) of the conversion factor 12 and consequently causes an appropriate but incomplete entry into the Pence Accumulator 139. During this conversion, when the M9 tube is controlling, cycling of the A Ring 103, twice, causes the J Ring 108 to step to J2, which enables the K Ring 148 to transfer control from the M9 tube to the M10 tube by establishing conduction in the latter tube. It should be understood that a fixed connection (between the K2 tube and the M10 tube) in the machine causes a shift of conduction in control tubes as soon as the A ring has cycled twice. This is possible because the conversion factor is always 12.

When tube M10 is fired and assumes control, multiplication in the continued conversion operation is effected by the highest denominational order in the conversion factor; namely, 1. The Pence Switching Matrix 136 (FIG. 3) is appropriately set up to connect to one or more higher order banks of the Pence Accumulator 139, so that the output from the order banks of the Shillings Accumulator 142 being pulsed out is appropriately applied via the Shillings Accumulator Gates 163 into the Pence Accumulator 139. As a result of this addition, the pence accumulator receives a total of 5.28 pence due to the shillings conversion.

When tubes M11 and M12 operate, they control the conversion of the pounds fraction into pence, which is entered into the pence accumulator. The only difference between the conversion of the pounds fraction and that of the shillings fraction is in the conversion factor—namely, 240—for pounds conversion. The fractional part of the pounds product (.04 in the example of FIG. 1) is "pulsed out" of the appropriate pounds accumulator banks of the Pounds Accumulator 165 (FIG. 3). This operation is initiated under control of M chain tube M11, which, when conducting, opens the B10 Gate 166 at the appropriate time to allow pulsing out of certain orders of the Pounds Accumulator 165, the Pounds Accumulator Gates 167 serving to pass pulses in accordance with counts in the accumulator 165 on to the Pence Switching Matrix 136 and hence to the Pence Accumulator 139.

The source of the groups of ten pulses for reading out the amount in the fractional pounds order banks is the B Ring 117 via the direct path 168. The by-pass path 169 enables the number of pulses in accordance with the pounds order content to be passed on to the Pence Accumulator 139 via the Pounds Accumulator Gates 167 when the latter are opened as the pounds orders pass through zero.

While M11 is controlling, the conversion multiplication factor is 40. After this part of the conversion multiplication is completed, control is shifted from the M11 tube to the M12 tube, here again by a fixed connection from the K Ring 148, to permit multiplication by the conversion factor of 200 during the time that control tube M12 is operative. As may be seen in the example of FIG. 1, 9.60 pence are added into the Pence Accumulator 139 as a result of the pounds fractional conversion.

Multiplication under control of tube M12 is completed when conduction is shifted from the M12 tube to the M13 tube under the control of the K Ring 148. A fixed connection from the K2 tube to the M13 tube is used to fire in the M13 tube. This is possible because the conversion factor in the higher order for the pounds fractional conversion is always 200, and consequently, when the J Ring 108 steps to two, the K Ring 148 causes the conduction shift.

ROUND-OFF

Tube M13 in the chain is concerned with round-off, which converts any fractional pence total at this time to the nearest integral pence number. Round-off is effected by adding one half-penny to the first bank to the right of the decimal point in the Pence Accumulator 139. The first A ring cycle, after M13 has assumed control, generates five pulses in the output of the B Ring 117 (at the B5 tube), which group is gated under the control tube M13 through the Round-Off Gate 170 (FIG. 3) to the proper bank of the Pence Accumulator 139.

The subsequent A ring tally pulse, produced at the end of this first A ring cycle, fires control tube M13A by way of a fixed connection from the A ring tally tube to the control tube M13A to terminate the round-off operation.

The next A ring tally pulse fires control tube M14 (FIG. 4) to begin a further step in the multiplication. Hence, it will be noted that one A ring cycle time elapses while control tube 13A is operative. This time interval is provided to effect all necessary transfers and to avoid the usual type errors associated with a transfer on a transfer on a transfer.

EXTRACTION OF INTEGRAL POUNDS AND SHILLINGS

Tube M14 provides the controls used in the extraction of shillings from the total in the pence accumulator, which is necessary when the stored quantity of pence is in excess of 12. In the example of FIG. 1, the pence accumulator at the time tube M14 becomes effective contains 28 pence, which number in reality represents 2 shillings and 4 pence.

As will be seen, the approach to the extraction problem in each instance is novel, in that logical circuit design principles have been applied to avoid overdraft situations. In this approach, before each division is made, the fact that the division can be made has been previously anticipated, so that only integral divisions are made, thereby permitting the remainder to remain in the accumulators where the dividend was stored. The anticipation approach avoids the usual "fugitive 1" type correction, necessary to many prior-art systems of mathematical manipulations.

LOGICAL PRINCIPLES

Figure 4A:
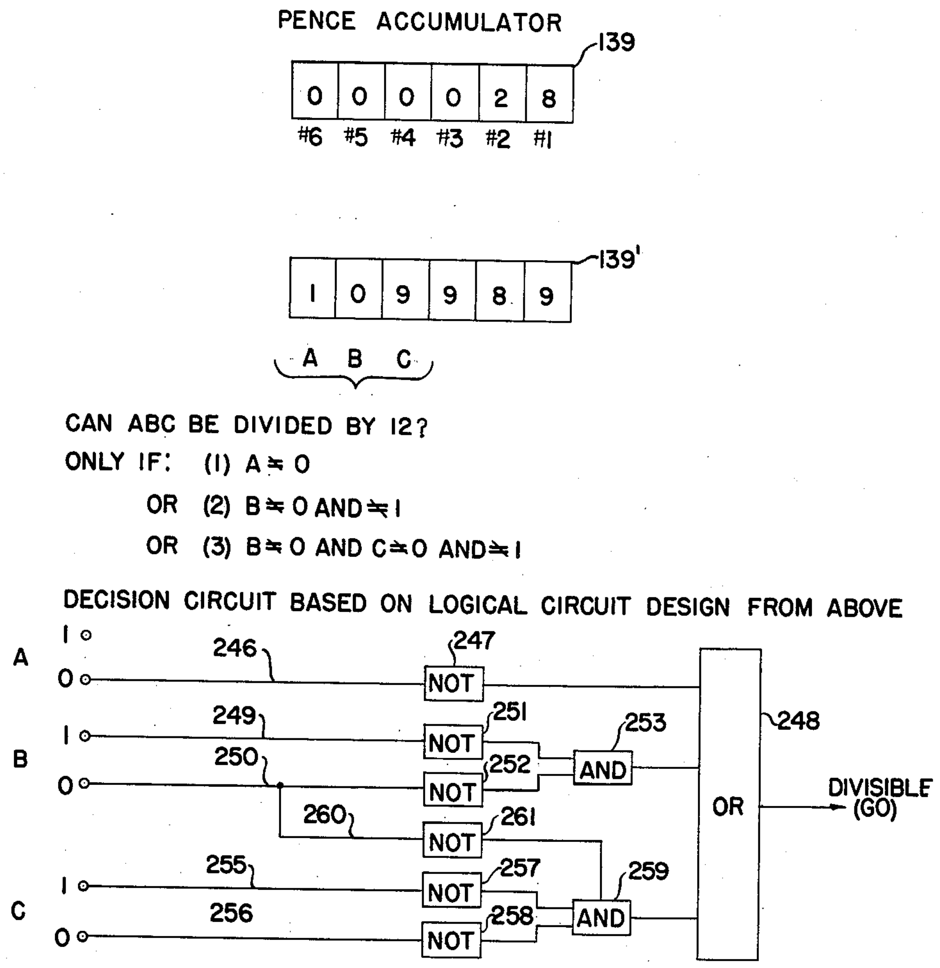
FIG. 4A shows, in detail, a block representation of a decision circuit used in the extraction process.

In FIG. 4A is shown a block illustration of a suitable decision circuit for anticipating whether division of a stored number by a selected divisor is possible. In the example of FIG. 1, extraction of integral shillings from the quantity stored in the pence accumulator is first attempted. The divisor is 12, the number of pence in one shilling, and the dividend is the quantity of 28 pence. However, the pence accumulator is capable of accumulating up to seven denominational digits, so the ensuing discussion will not be limited to division of the relatively small number occasioned by the example of FIG. 1.

In FIG. 4A, there are illustrated, in the multiple block 139, six order banks of the pence accumulator. The highest order bank (#6) is to the left, and the lowest order bank (#1) is to the right of the block illustration. Examination is first made of the content of the three highest order banks (#6, #5, and #4) of the accumulator to see whether the quantity stored therein is divisible by 12. If division is possible, a "GO" signal results from the decision circuit generally illustrated in block form at 172 in FIG. 4B. This causes the number 12 to be subtracted from the content of the first three banks observed, by the process of complementary addition. The remainder is then examined to determine whether further division is possible. If so, successive subtractions, by complementary addition, are made until it is determined that the remainder is less than 12. Now a "NO GO" signal steps the program control M chain to its next position, thereby terminating the examination of the highest order bank and permitting examination of banks #5, #4, and #3. The same process is repeated until all banks of the pence accumulator have been examined and the stored pence quantity has been reduced to its equivalent in shillings, plus any remainder of less than 12 pence. Of course, the shillings accumulator receives the quotient of this division.

The sample problem of FIG. 1 will first be utilized to illustrate the reduction of the pence quantity to integral shillings and a pence remainder. The control chain tubes M14 through M17 conduct the division by 12. After round-off, the pence product stored in the pence accumulator is 28, as may be seen from FIG. 1. The M chain tube 14 has been fired to initiate the division process.

Figure 4B:
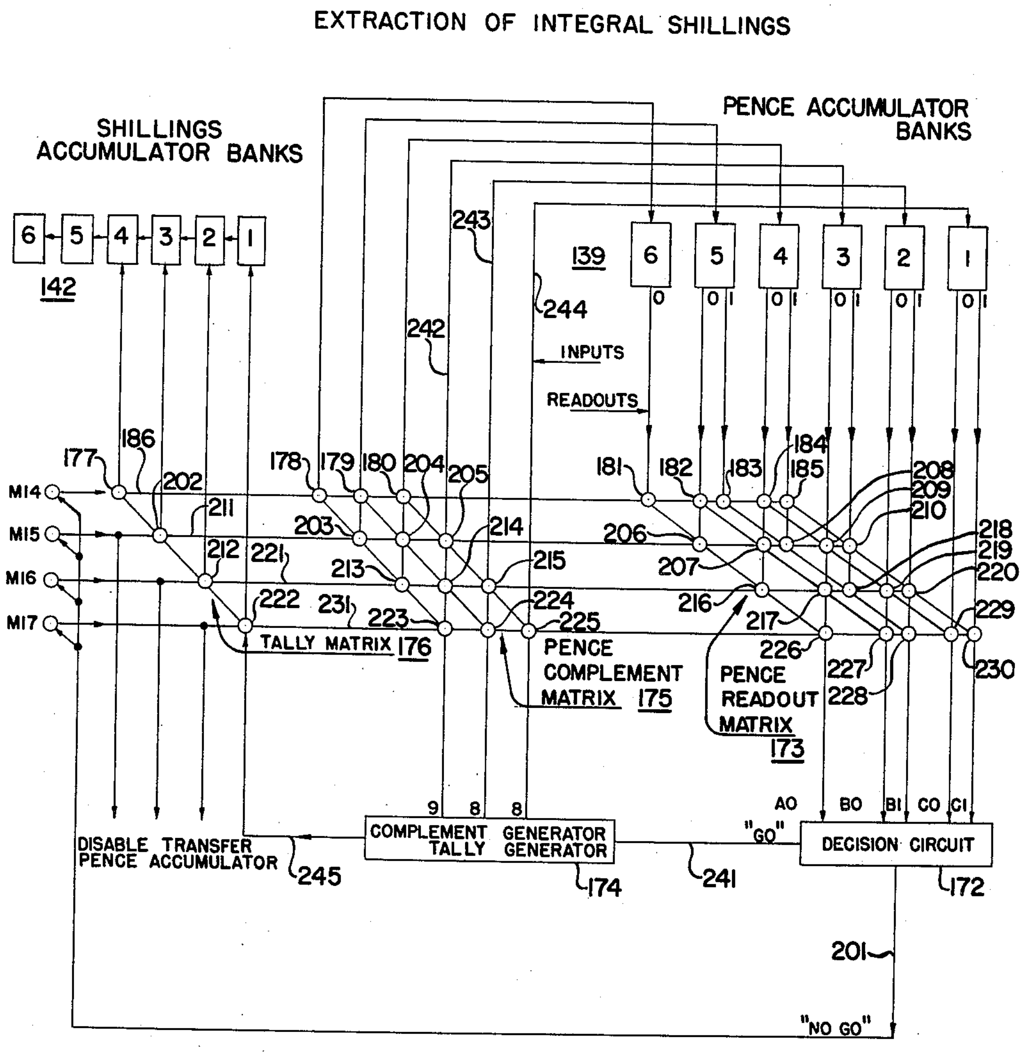
FIG. 4B shows, in greater detail, that portion of the components of FIG. 4 for enabling the extraction of integral shillings from the pence accumulator.

Referring now to the schematic illustration of FIG. 4B, which represents in block form the circuitry necessary to the extraction of integral shillings, the Shillings Accumulator 142 is shown including six order banks, and the Pence Accumulator 139 has the same number of banks. The Pence Accumulator 139 is selectively connected to the Decision Circuit 172 by way of a Pence Readout Matrix 173. The Decision Circuit 172 controls a Complement and Tally Generator 174, which applies a complementary number, by way of a Pence Complement Matrix 175, to the order banks of the pence accumulator when division is required. A Tally Matrix 176 controls the input to the Shillings Accumulator 142 each time division of the pence quantity is effected.

Each of the matrices is composed of a plurality of gates in the form of diodes or triodes which are rendered receptive to signals upon the application of anode potential. These gates are represented by the small circles shown above the matrix labels in FIG. 4B. The M chain tubes M14 through M17 selectively energize the gates by the application of anode potential thereto to establish appropriate switching paths for the extraction process. When the control tube M14 is fired, all gates 177 through 185, along conductor 186, are opened to establish a plurality of connections. During the initial step in the extraction operation, connections are established between banks #6, #5, and #4 of the Pence Accumulator 139 and the Decision Circuit 172. Bank #6 has only a zero ("0") read out lead because the presence of any count in this bank would always render the quantity stored in banks #6, #5, and #4 divisible by 12. However, banks #5 and #4 have to be examined as to both the "0" and the "1" readouts in order to ascertain whether division is possible, because they could be storing merely a count of 10 or 11.

The "0" connection from bank #6 of the Pence Accumulator 139 is established to the Decision Circuit 172 over a gate 181, which is opened by way of conductor 186 when M14 is fired. Also, connections are established for the "0" and "1" leads from pence accumulator bank #5 to the Decision Circuit 172 by the now-open gates 182 and 183. Similarly, like connections for the "0" and "1" readouts from pence accumulator bank #4 are established to the decision circuit by way of gates 184 and 185. The gates 181 through 185 are included in the Pence Readout Matrix 173, as illustrated in FIG. 4B.

Since, in the sample problem of FIG. 1, the pence accumulator contains only 28 pence, obviously the order banks #6, #5, and #4 will contain zeros, so there is nothing to support a subtraction of 12. This condition is accordingly indicated by a "NO GO" signal from the Decision Circuit 172, which signal is set along lead 201 to the program control M chain to step the chain from the M14 tube to the M15 tube.

When M15 becomes conducting, the gates 202 through 210, located along conductor 211, are open, so that the amount contained in the pence accumulator banks #5, #4, and #3 will now be examined by the Decision Circuit 172 via the Pence Readout Matrix 173. The zero content in pence banks #5, #4, and #3 results in a "NO GO" decision, which causes the M chain to be stepped to M16.

The gates 212 through 220, located along conductor 221, are now open, so that the contents of pence accumulator banks #4, #3, and #2 are available at the Decision Circuit 172. However, these banks contain the quantity 002; therefore, a "NO GO" signal is produced by the decision circuit because the quantity is not divisable by 12. The "NO GO" signal steps the M chain to M17.

When M17 is conducting, the gates 222 through 230, along conductor 231, are open, so that the pence readout matrix gate 226 connects the "0" readout from the order bank #3 to the decision circuit. Gates 227 and 228 connect the "0" and "1" readouts from bank #2 to the decision circuit and gates 229 and 230 connect the "0" and "1" readouts from bank #1 to the decision circuit.

The accumulator content is 028 in banks #3, #2, and #1, which quantity permits two subtractions. When it has been determined that a subtraction can be made, a "GO" signal is sent from the Decision Circuit 172 over conductor 241 to cause the Complement Generator 174 to apply the complementary number 988 to banks #3, #2, and #1. The digit "9" of the complementary number is applied through gate 223 of the Pence Complement Matrix 175 and along lead 242 to bank #3 of the pence accumulator. The digits "8" are applied through gates 224 and 225 and thence via leads 243 and 244 to banks #2 and #1, respectively. The first successful subtraction then causes a tally from the Complement and Talley Generator 174 to be sent over lead 245 and through the now-open gate 222 of the Tally Matrix 176 into the lowest order bank (#1) of the Shillings Accumulator 142. This process is again completed for the second subtraction to cause a second tally to be entered into the #1 bank of the shillings accumulator, thereby effecting the addition of two shillings to the shillings count, as set forth in the sample problem of FIG. 1.

After the foregoing two subtractions, a "NO GO" signal is developed by the decision circuit because the remainder in the pence accumulator is 04, which is less than one shilling. This "NO GO" signal steps the control chain to the M18 tube for the beginning of the pounds extraction. This extraction is carried out in generally the same manner as was explained in connection with the shillings extraction. No schematic diagram is included, but the pounds extraction operation will be detailed in connection with the circuit description. However, the sample problem of FIG. 1 shows that only one pound was extracted from the shillings accumulator and added into the pounds accumulator.

The general application of the logical arrangement to the cooperative units of the machine has been explained. It is now the purpose to explain how the decision circuit determines whether a subtraction can be made. The block type circuit of FIG. 4A illustrates the arrangement of the decision-making elements and carries notations of conditions to be met to permit division.

The decision circuit of FIG. 4A is arranged to test any three consecutive banks of the pence accumulator, illustrated by the block 139 at the top of FIG. 4A. Hence three input channels, labeled, respectively, A, B, and C, are shown.

In channel A, a signal lead 246 is connected through a "Not" circuit 247 to an "Or" circuit 248 to test for a "0" in this channel. Channel A really tests for "not 0," which condition permits division.

Channel B is provided with two input conductors, 249 and 250, for the "1" and "0" readouts, respectively. A "Not" circuit 251 is included in the lead 249, and a "Not" circuit 252 is connected in lead 250. A common "And" circuit 253 is connected between the "Not" circuits just described and the "Or" circuit 248. Hence, channel B tests for "not 0 and not 1" in order to know whether division is proper.

Channel C is arranged similarly to channel B, having leads 255 and 256, which include the "Not" circuits 257 and 258, connected in common through an "And" circuit 259, which also supplies the "Or" circuit 248. A further connection 260 extends from the "0" readout of channel B through a "Not" circuit 261 to the common "And" circuit 259 of channel C.

It will be assumed now that the Decision Circuit 172 of FIG. 4A is selectively connected to the six order banks of the Pence Accumulator, as represented by the multiple block 139' illustrated near the center of FIG. 4A. Since the real number stored in the pence accumulator is only 000 028, only two subtractions are permitted. Therefore, in order to depict the logical operation better, the content of the accumulator will be assumed to be 109,989, a number having a digit in each of the six order banks. The assumed number 109,989 is the product of 9999 by 11 pence and represents the maximum pence obtainable within the exemplary capacity of the machine described herein. Under the first three digits (109) of the stored quantity are noted the letters A B C enclosed by a single bracket. This is to signify that channel A of the decision circuit is connected to read out the digit 1, channel B receiving 0 count and channel C observing the digit 9. Hence the decision network is first examining the number 109.

The three-channel tester of FIG. 4A will signify a "GO" signal, indicating that the quantity under examination is divisible by 12 if at least one of the following conditions is met.

| | Bank A | Bank B | Bank C |
|---|---|---|---|
| (1) | Not 0 | | |
| or | | | |
| (2) | | Not 0 and not 1 | |
| or | | | |
| 3) | | Not 0 and | Not 0 and not 1. |

Considering first condition (1), and thinking of the three highest orders in the pence accumulator, it will be noted that the subtraction or division can be made if the digit in bank A is not 0. This, of course, would indicate that the accumulator contained at least 100 in the three banks under consideration. Looking at condition (2), which states that bank B must not be 0 and not 1 in order to permit the division, it will be observed that the accumulator must contain 20 or more to fulfill this condition. Next, considering condition (3), it is noted that bank B must not be 0 and bank C not 0 and not 1. This means that at least a count of 12 must be present in these two banks of the pence accumulator in order to extract one shilling by dividing by 12.

If the assumed capacity of the machine is limited to a multiplication wherein the decimal multiplicand is 9999 and the sterling multiplier is £9999 19s. 11d, the maximum number of pence which could ever be stored in the pence accumulator would be 109,989, which quantity is shown stored in the pence accumulator 139' of FIG. 4A. Examination by the three-channel tester is made necessary because division may be possible even though the two highest order banks of the pence accumulator do not contain a quantity divisible by 12.

Now the decision circuit will be assumed to be connected to banks #6, #5, and #4 of the pence accumulator 139'. Considering condition (1), the contents of banks #6, #5, and #4 can only be divided by 12 if the content of bank #6 is not 0 as determined by the Not circuit 247.

Condition (1) is met, so the complementary number 988 is applied to banks #6, #5, and #4. The contents of these banks is reduced from 109 to 097. Now condition (1) is not satisfied, but condition (2) is, in that the content of bank B (bank #5) is 9, which is not 0 and not 1, as determined by the Not circuits 251 and 252 and the And circuit 253. Accordingly, a "GO" signal from the "Or" circuit 248 causes the Complement and Tally Generator 174 (FIG. 4B) to apply the complementary number 988 to banks #6, #5, and #4 a second time. The stored quantity 097 is reduced to 085. Condition (2) remains controlling for six more divisions (subtractions) until the stored quantity has been reduced to 013. Now neither condition (1) or (2) is satisfied, but condition (3) is, because the content of bank B is not 0 (as determined by the Not circuit 261 of FIG. 4A) and the content of bank C is not 0 and not 1 as examined by the Not circuits 258 and 257 and the And circuit 259. Hence the ninth subtraction is made, leaving 001 in banks #6, #5, and #4.

During the foregoing examination, M chain tube M14 (FIG. 4B) is operative, so that the tally path for the nine tally signals is from the Complement and Tally Generator 174 over gate 177 of the Tally Matrix 176 to order bank #4 of the shillings accumulator. This is proper because there are 9,165 shillings in 109,989 pence, with a remainder of 9 pence.

When it has been determined that the content of pence banks #6, #5, and #4 is no longer divisible by 12, the "NO GO" signal steps the control chain to M15, and the Pence Readout Matrix 173 connects pence banks #5, #4, and #3 to the Decision Circuit 172 for examination. The content of these three banks is 019, so condition (3) controls the single subtraction, with the single tally signal passing through gate 202 to bank #3 of the shillings accumulator. The succeeding "NO GO" signal advances the control chain to M16, and the Pence Matrix gates 216 through 220 set up readouts for the pence banks #4, #3, and #2.

The foregoing process is continued until 9,165 shillings have been extracted from the pence accumulator, which then contains the remainder of 9 pence. It is thought that this exemplary extraction constitutes a much more thorough example than that presented in the sample problem of FIG. 1, wherein the pence total of 28 yields only 2 shillings, with a 4-pence remainder.

A general outline of the circuitry for the extraction of shillings has been presented in connection with the special purpose apparatus of FIG. 4B. Since the manner of extracting integral pounds is so similar to the extraction of shillings, no special figure is allotted to this operation, but reference will be had to the overall block diagram of FIG. 4. A cursory review of the shillings extraction, in broad concept only, will precede the brief description of the pounds extraction.

As may be seen, the M chain tubes M14 through M17 control the shillings extraction, whereas the tubes M18 through M21 enable pounds extraction. Each of tubes M14 through M17 is connected to three matrices over a common lead 271; to the Pence Switching Matrix 175 via lead 272; to the Shillings Switching Matrix 176 (Tally Matrix of FIG. 4B) over lead 273; and to the Pence Readout Matrix 173 by way of lead 274. Hence each of the M tubes is capable of selecting different readouts and corresponding complementary number input paths to the pence accumulator and tally paths to the shillings accumulator. In the shillings extraction, the tubes M14 through M17, over leads 271 and 274, selectively set up readouts in the Pence Readout Matrix 173 for the banks of the Pence Accumulator 139. By analyzing these readouts, the Decision Circuit 172 (labeled "Extract Shillings÷12" in FIG. 4) sends a "GO" signal over lead 275 to the Complement Generator 174 when further division is in order. The complementary number 988 is applied through the Pence Switching Matrix 175 to the Pence Accumulator 139 to alter the stored quantity. The Decision Circuit 172 then analyzes the new stored quantity over the Pence Readout Matrix 173 to develop a further "GO" or a "NO GO" signal.

Each time a "GO" signal is developed, the Complement Generator 174, over lead 276, cooperates with the Decision Circuit 172, over lead 277, to enter a tally in the proper order bank of the Shillings Accumulator 142 as determined by the Shillings Switching Matrix 176 under control of the M tubes M14 to M17 via common lead 273.

In the event of a "NO GO" signal from Decision Circuit 172, an output lead 278 is used to advance conduction among the M15 through M17 control tubes, so that the content of further banks of the pence accumulator may be examined.

EXTRACTION OF POUNDS

A "NO GO" signal from the decision circuit while tube M17 is conducting causes the tube M18 to fire to initiate the process of division of the quantity in the shillings accumulator by 20 and the addition of the resulting quotient to the pounds accumulator. This is accomplished in basically the same manner as the previous division by 12 except that it is simpler, for the conditions to be met are fewer and the matrices are correspondingly simpler.

Since the divisor for the shillings extraction is now 20, the complementary number 980 is applied to the Pounds Accumulator 279 via the Pounds Switching Matrix 280 (FIG. 4) for each subtraction. The same Complement Generator 174′ supplies this number by simply changing the units order of the original complementary number 988 to zero. The decision as to whether 20 can be subtracted is now subject to only two requirements; that is, the subtraction can be made if:

| | Bank A | Bank B | Bank C |
|---|---|---|---|
| (1)---------- or | Not zero---- | -------------------- | Not controlling. |
| (2)---------- | ------------- | Not zero and not 1-- | |

This, of course, is the same logic and is carried out by the same decision circuit as heretofore used except that condition (3) is omitted because there is no significant digit in the units order of the divisor and it is only necessary to compare banks A and B with the digit 2.

From the example of FIG. 1, it will be noted that the Shillings Accumulator 142 (FIG. 4) contains 21 shillings, from which one pound is extracted, leaving a remainder of 1 shilling. The amount stored in the six order banks of the shillings accumulator is 000021, which is divisible by 20 only after three shifts of the decision circuit from the inspection of the higher order banks to the lower order banks. Accordingly, as in the case of extraction of shillings from the stored pence, the control tubes M18, M19, and M20 are operated in sequence but without effecting any subtraction. The first subtraction which is made is the one which is required by the division of 21 by 20, which operation is under the control of tube M21.

When M21 becomes conducting, the Shillings Readout Matrix 281 (FIG. 4) opens paths from the three lowest order banks of the shillings accumulator to the Decision Circuit 172′ (labeled "Extract Pounds÷20"), which is duplicated in FIG. 4 for the sake of illustration. The content of these banks (021) is such that channel A of the decision circuit sees 0 and channel B sees 2. The decision circuit renders a "GO" signal if the logic of either of the conditions is satisfied. Condition (1) is satisfied if the number tested by the A channel of the decision circuit is not 0. This condition is obviously not satisfied. However, condition (2) states that the contents sampled by channel B of the decision circuit should not be 0 and not 1. Since the number in the second-lowest order bank of the shillings accumulator is two, condition (2) is satisfied, and division is made. When the decision circuit sends a "GO" signal, the signal passes over conductor 282 to the Complement Generator 174′ to cause the complementary number 980 to be applied through the Shillings Switching Matrix 176 and into the Shillings Accumulator 142. The Complement Generator 174′ and the Decision Circuit 172′ cooperate over leads 283 and 284 and common lead 285 to enter a tally into the Pounds Accumulator 279 by way of the Pounds Switching Matrix 280.

After the subtraction of one pound from the shillings accumulator, its second-lowest order bank contains a 0, and condition (2) is no longer satisfied. This leaves a remainder of 1 shilling and a new pounds total of 69 pounds, yielding the answer to the sample problem of 69 pounds, 1 shilling, and 4 pence.

Since the subtraction could not be made a second time, the decision circuit sends a "NO GO" signal along conductor 278 to step the M ring from tube M21 to M22, which is the stop tube. Tube M22 terminates the multiplying operation and initiates an operation of the printing and indicating means. The machine thus ceases operation and indicates the appropriate answer. Readout and printing of the answer is the last step of the multiplication.

DETAILED DESCRIPTION

A suitable housing for the calculating portion of the apparatus in accordance with the instant invention is shown in the form of the cabinet 301 of FIG. 8.

A keyboard 302 extends outwardly from the cabinet 301 at a suitable height for an operator. Adjacent to the cabinet and at about the same height as the keyboard, there is shown a suitable printing and indicating mechanism 303. United States Patent No. 2,682,995, entitled "Printer and Indicator Unit," which was filed on September 29, 1951, and issued on July 6, 1954, to Edward J. Carey and Desmond R. Hearsum, discloses a device suitable for use as the printing and indicating mechanism 303. A multiple cable (not shown) extends from the housing 301 to the unit 303 to establish electrical operating circuits. A window 304 is provided for reading data from the indicator portion of the apparatus 303. Suitable indicia in the form of the symbols for pounds, shillings, and pence is noted above the window 304. A transparent window 305 enables the attendant to observe the record material upon which the data shown in the indicator window 304 is printed.

In the reading out of the contents of the sterling accumulators, the only requirement of the indicating mechanism is the ability to distinguish among different potential levels, thereby indicating different digits. Consequently, any printing and indicating mechanism selected for use with the present invention is only deemed a component by combination.

The keyboard 302 of FIG. 8 is illustrated with twelve rows of keys, generally allotted four rows to decimal notations, two rows each to pence and shillings, and four rows to pounds numbers.

The keyboard is detailed in FIG. 9. The multiplicand or decimal keys are shown in the four rows 306, 307, 308, and 309 to the right-hand side of the keyboard 302. The pounds portion of the multiplier is set up in the pounds keys, shown as the four rows 310, 311, 312, and 313 to the left-hand side of the keyboard. The shillings portion of the multiplier is set up in rows 314 and 315, and the pence portion in rows 316 and 317. The decimal point can be set into the multiplicand to the right or left of any of the four rows of decimal keys 306 through 309 by a rotary switch 318. A bank of lamps, respectively numbered 319 through 323, signifies the decimal point setting of the rotary switch.

The sample multiplication of FIG. 1 is set into the keyboard 302, as indicated by the shading of the depressed keys. The multiplicand appears as the amount 3.24, set into rows 308, 307, and 306 with the rotary switch 318 rotated counter-clockwise two positions from that illustrated in FIG. 9, the decimal point setting being indicated by the shaded lamp 321. The multiplier pounds factor of 21 is set into rows 312 and 313, the shillings factor of 6 is set into row 315, and the pence factor of 4 appears on row 317. A key release button 324 is provided for releasing depressed keys.

The first step in readying the machine for operation is to push the start button 325, shown on the keyboard 302. After the start button is depressed, the machine goes through a 1½-minute warm-up routine, during which time the warm-up light 326 is illuminated and at the termination of which time interval the "on" lamp 327 is illuminated to signify readiness of the machine for a multiplication operation. The sample problem is then set into the machine, as shown on the keyboard of FIG. 9. Depression of the "multiply key" 328 then initiates the automatic operation which produces the answer to the problem which has been set into the keyboard.

Next, the actual circuit diagrams will be discussed. Due to the extensive and continuous nature of the circuit constituting the invention, it was necessary to use several sheets to contain the circuit. In FIGS. 10*a* through 10*j* there are blocks depicting the arrangement of sheets of the various figures of the drawing to be described. The blocks include two or more sheets of circuitry; the demarcation between blocks is taken between functional circuit units as far as possible.

It will be noted that FIGS. 11 and 12 comprise the group of FIG. 10*a*. Operation during warm-up is under the control of relays operable in sequence, as will now be described through the use of FIGS. 11 and 12.

The main power connection for the machine is shown as the plug 341, adapted for connection to a 110-volt A.C. supply main. A pair of leads 342 and 343 extends from the plug 341 to a suitable power supply (not shown, but merely indicated by notation in FIG. 11). A pair of relay armature contact arms 344 and 345 open and close the conductors 342 and 343 under the control of a relay coil RL1. The armature contact arms 344 and 345 are closed when the start button 325 (FIGS. 9 and 11) is depressed, because of the A.C. circuit through relay coil RL1, identified as a continuous loop conductor 346. The start button 325 is spring-loaded to the open position, so that, once relay coil RL1 is energized, the start button 325 opens, and a holding circuit is established through now-closed armature contact arm 344, conductor 347, normally-closed stop button 348 (FIGS. 9 and 11), and relay coil RL1.

Energization of the power supply (which is not illustrated because it is thought to be conventional in nature) establishes appropriate potentials to power the filaments of the tubes employed throughout the circuit, B+ anode supply potentials, and fixed bias voltages. All voltage or potential values given herein are measured with respect to ground unless otherwise specified. When the power supply is energized, a potential of +360 volts is established at terminal 349, which serves to energize relay coil RL3 (located in the upper left-hand portion of FIG. 11) by way of a 20,000-ohm resistor 350. Relay coil RL3 has two separate sets of contacts. One set of multiple contacts is shown at 3*c*1 directly beneath the coil RL3, the common armature therefor being designated at 331. In the notation "3*c*1," the numeral (3) indicates that the contacts are controlled by relay coil RL3, the letter (*c*) means that contact is established to one circuit when the coil is deenergized and to another circuit when the coil is energized, and the last digit (1) denotes the first set of *c* type contacts for this relay.

Prior to energization of relay coil RL3, the common armature 331 is closed in its lower position. This completes a circuit to the warm-up light 326 (FIGS. 9 and 11). The circuit is energized from the A.C. leads 342 and 343 by way of a pair of leads 332 and 333, which connect to the primary winding 334 of a transformer 335. The secondary winding 336 completes the circuit over leads 337 and 338 via contacts 3*c*1 for the lamp 326. Consequently, when the start button 325 is depressed to supply power to the A.C. leads 342 and 343, the warm-up lamp 326 is illuminated.

For the 1½-minute warm-up interval, which is under the control of the power supply (not shown) in conventional manner, the lamp 326 remains on. However, when the power supply applies +360 volts to the terminal 349 to energize the relay coil RL3, the common armature 331 of contacts 3*c*1 is closed to its upper position, thereby extinguishing the warm-up lamp 326 and at the same time illuminating the "on" lamp 327 (FIGS. 9 and 11). The circuit for the "on" lamp 327 is from the transformer secondary winding 336 over leads 337 and 339 and contacts 3*c*1.

One of the decimal point indicator lamps 319 through 323 is immediately illuminated when the transformer 335 is powered by way of the common lead 340 and the lead 337 and the decimal switch 318 (FIGS. 9 and 11). With the switch 318 in the "1" position, as shown, the decimal lamp 323 will be lighted to indicate that the decimal mulitplicand is a whole number. In the sample problem of FIG. 1, the lamp 321 is lit because the decimal switch 318 is on position "3," signifying that the decimal multiplicand is 03.24.

When relay coil RL3 is energized at terminal 349, it also closes its contact 3*a*1 (represented at 351 in FIG. 11, considerably below RL3) to activate a circuit for the multiply key 328 (FIGS. 9 and 11). The relay contact designation 3*a*1 indicates by the first digit (3) that the contacts are operated under control of relay coil RL3, by the letter (*a*) that the contacts are normally open and close upon energization of the relay coil, and by the last numeral (1) that these contacts are the first set of (*a*) type contacts under control of coil RL3.

The power circuit tapped by the multiply key 328 is a fullwave bridge rectifier circuit 352. The input circuit for the bridge 352 is from the A.C. supply leads 342 and 343, which extend over a pair of leads 332 and 333, along a further pair of leads 355 and 356 to the input leads 357 and 358. From the positive terminal 359 of the bridge 352, a path is established over lead 360, normally-closed relay contacts 10*b*1 (identified with the contact arm 361), and via now-closed relay contacts 3*a*1 and multiply key 328 to relay coil RL4, the return path being via lead 362 to the negative terminal 363 of the bridge 352.

Energization of relay coil RL4 causes its contacts 4*a*5 (associated with armature 364) to be closed, thereby establishing a holding circuit for the coil RL4 over leads 365 and 360 to the positive terminal 359 of the bridge 352. The holding circuit is necessary to maintain the coil RL4 in an operative condition because the multiply key 328 is of the spring-loaded variety. Relay coil RL4 will remain energized so long as the contacts 10*b*1 in lead 360 remain closed; i.e., until relay coil RL10 (shown to the lower right-hand side of FIG. 11) is operated Relay coil RL10 is energized only after the answer sought has been set in the indicator and printer, so relay coil RL4 remains operative throughout the entire multiplication.

Relay coil RL4 closes five normally-open contacts (of the "*a*" type) associated with this relay. With the exception of the holding contacts 4*a*5, these contacts establish presetting throughout various portions of the machine. Reference will be had to the circuitry included in the blocks making up FIG. 10*b*, the figure numbers of the individual blocks running from FIG. 13 through FIG. 19. In particular, near the upper right-hand corner of FIG. 18, there are located the contacts 4*a*1, which include an armature 366. Energization of relay coil RL4 closes contacts 4*a*1 to connect the +105-volt terminal 367 over a 100-ohm resistor 368 to a common B+ supply lead 369, by-passed to ground by a 0.1-microfarad condenser 370, which, along with the resistor 368, constitutes a decoupling network. The lead 369 is connected directly to the anode 371 of the A0–Tally tube (FIG. 19), which is a part of the A ring. The lead 369 also serves as the B+ supply for the J0 through J9 tubes (FIGS. 17 and 18) of the J ring by way of a 4,700-ohm plate load resistor 372. The decoupling network rounds out the wavefront of the B+ applied to the J ring, so that the tubes are not fired through interelectrode capacity coupling.

Also, the contacts 4*a*1 of FIG. 18 establish a path from the +105-volt terminal 367 over a 100-ohm resistor 373 to lead 374, which is by-passed to ground by a 0.1-microfarad condenser 375. Lead 374 includes a 1,500-ohm plate load resistor 376 (FIG. 25) to constitute the B+ supply for the M tubes M1 through M22 of the M chain (FIGS. 25 through 28). The resistor 373 and the condenser 375 also constitute a decoupling network to prevent the B+ supply from firing the gas tubes of the M chain.

The second set of the RL4 relay contacts—namely, *4a2*—is shown in FIG. 14. The armature 391, associated with the contacts *4a2*, is adapted to establish a connection to the +360-volt terminal 392 when relay coil RL4 is energized for presetting purposes. This connection extends over lead 393 to common lead 394 to establish B+ supply for a pair of triode-connected pentodes 395 and 396 of the 6CL6 variety, which in turn regulate the voltage applied to the anodes of the A ring tubes of FIGS. 13 and 14.

In FIG. 13 is found the third set of the RL4 relay contacts; namely, contacts *4a3*. The armature 397 of contacts *4a3* is closed to establish an anode voltage connection over lead 398 to the +250-volt terminal 399 for the impulse generator tubes, grouped along the tops of FIGS. 13 and 14 and to be described more fully hereinafter.

Returning now to FIG. 11, closure of relay contacts *4a4*, designated at 400, provides an energizing circuit for relay coil RL5. The energizing source of this circuit is the bridge 352, which has its positive terminal 359 connected over lead 360, armature 361 of contacts *10b1*, lead 401, and the shunt path 402, including armature 403 of closed contacts *7b1*, armature 400 of closed contacts *4a4*, and 3,900-ohm resistor 404 to one end of the relay coil RL5. The other end of the relay coil is connected over lead 362 to the negative terminal 363 of the bridge 352. The coil itself is shunted by a 20-microfarad condenser 405.

Relay coil RL5 is connected in a "slow drop out" fashion due to the 3,900-ohm series resistor 404 and the 20-microfarad shunt-connected capacitor 405. Even though operation of relay coil RL5 serves to close the armature 406 of its contacts *5a2* (FIG. 11) to energize relay coil RL7 from the bridge 352 by way of leads 360, 401, and 407 and return lead 362, the relay coil RL5 will remain energized for a short time interval including a period after relay coil RL7 has been energized.

During this time interval, several functions under the control of the contacts of relay coil RL5 are effected. For example, energization of its contacts *5a1* (FIG. 17), which are closed by the armature 408, fires the J0 tube on its control grid 409 from the +105-volt terminal 410 over leads 411 and 412, including a 100,000-ohm resistor 413, a 1-megohm resistor 414, and a 47,000-ohm grid resistor 415, the cathode resistor 424 being 22,000 ohms. The J0 tube is preferably a gas tube of the GL5663 variety.

Figure 22:
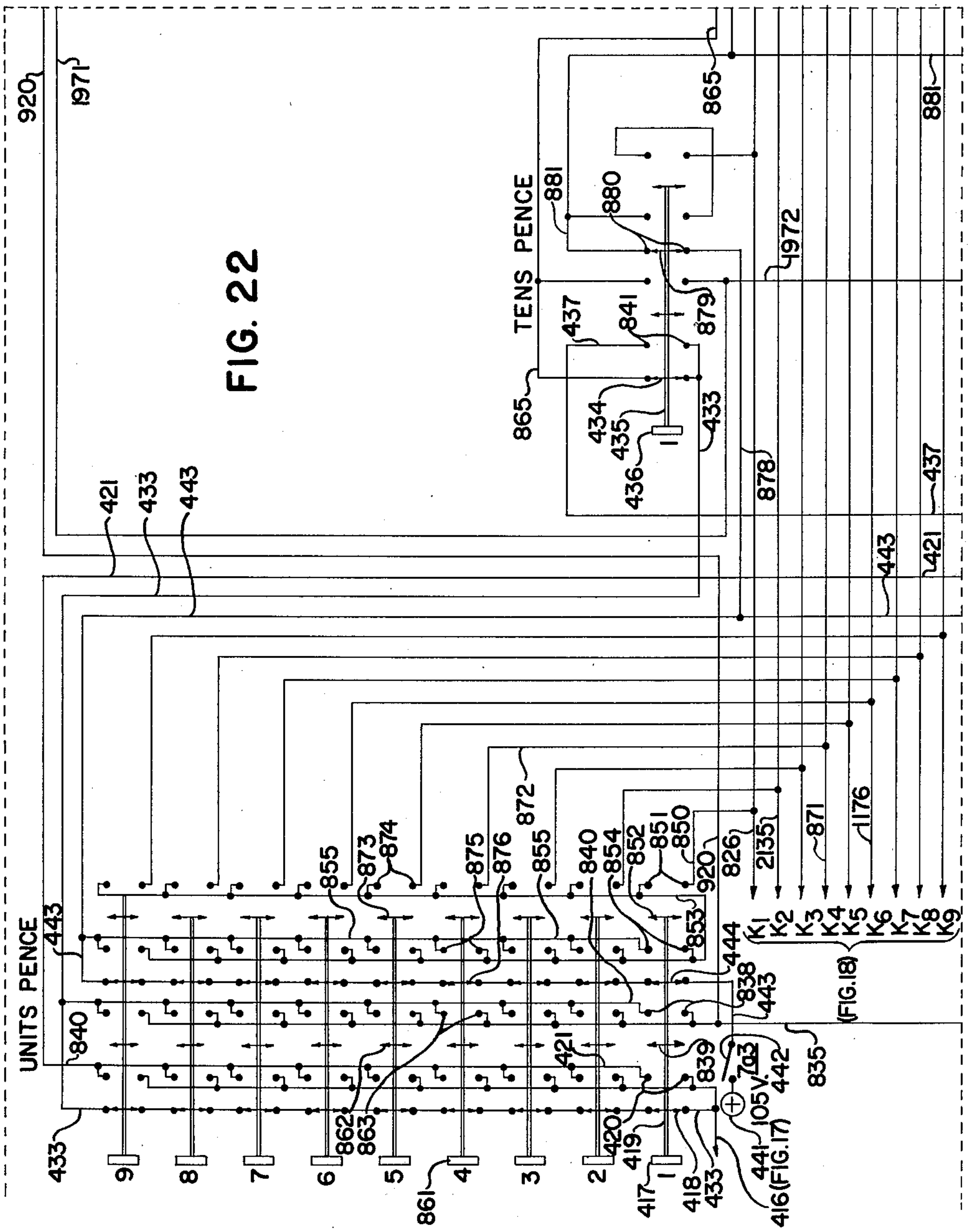
Figure 25:
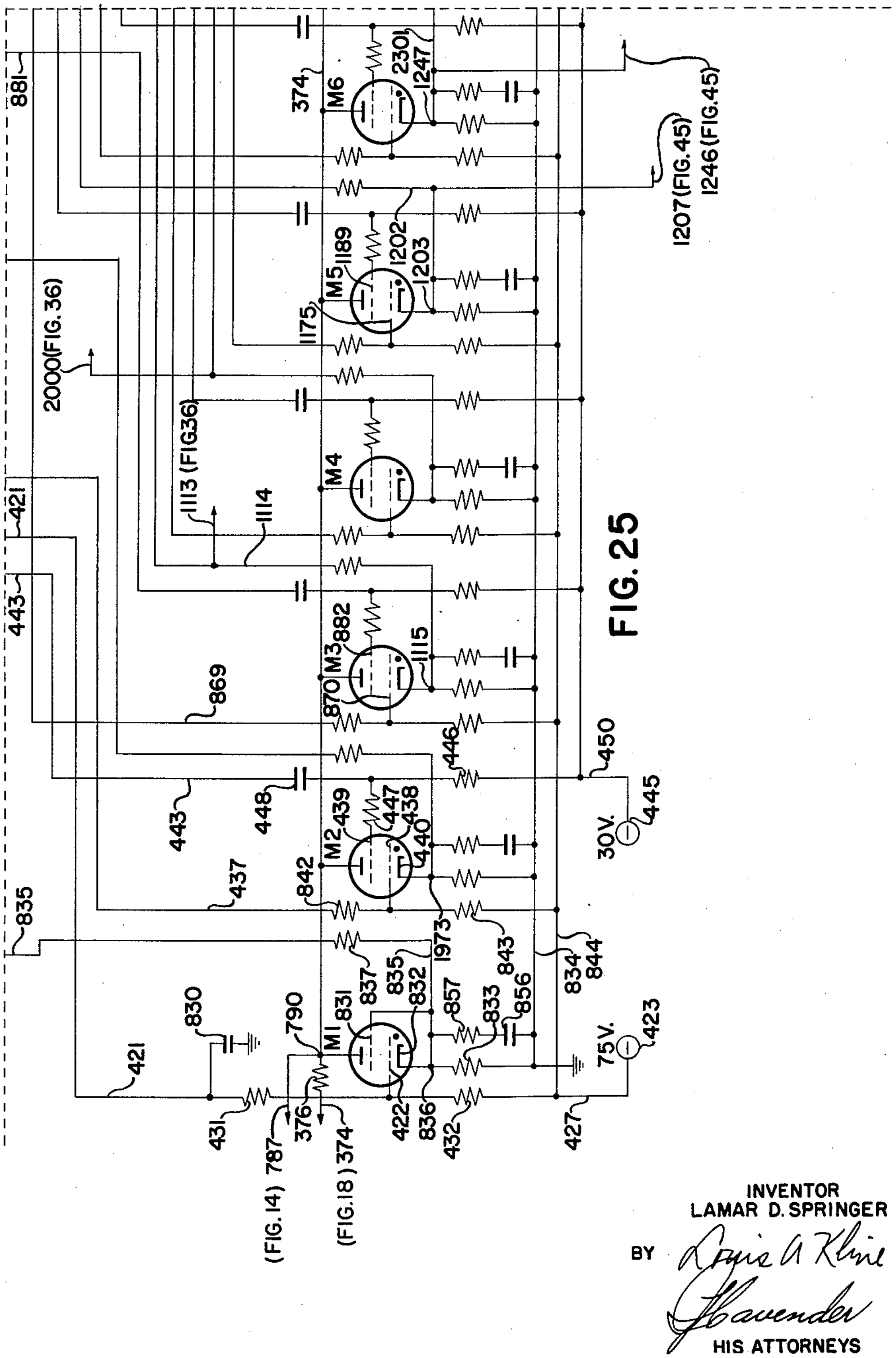

A further connection 416 (FIG. 17) extends from the +105-volt terminal 410, when the relay contacts *5a1* are closed, to a selected one of the M tubes of the M chain by way of the sterling keyboard (see FIG. 22). The lead 416 is connected to the Units Pence keyboard, which will extend the connection to the M1 if any key therein is depressed. For example, if the "1" key 417 is depressed, the left-hand switch arm 418, on the "1" key stem 419, will be moved to the right to close contacts 420, thereby connecting lead 416 to lead 421. Hence the +105-volt terminal 410 of FIG. 17 will be connected through the Units Pence keyboard to the control electrode 422 of the M1 tube (FIG. 25). The M tubes are gas tubes of the GL5663 type.

The normal biasing arrangement for the M1 tube is established by the −75-volt terminal 423, which is connected to lead 421. However, when +105 volts is applied to lead 421 (from lead 416), a pair of 1.3-megohm resistors 431 and 432 establish the potential level of the control electrode 422 of the M1 tube at +15 volts to fire this tube. Therefore, if a units pence digit is present in the sterling multiplier factor, the M1 tube will be preset on.

In the event that the Sterling multiplier factor contains no units pence digit, a circuit is established through the Units Pence and Tens Pence keyboards to prime the M2 tube. The lead 416 from the +105-volt terminal 410 (FIG. 17) is connected to the vertical lead 433 (FIG. 22), which is extended through the Units Pence keyboard by the left-hand switch arms of the key stems, such as switch arm 418 of the stem 419 for the "1" key 417. The lead 433 extends to the Tens Pence keyboard, where the switch arm 434 on the stem 435 of the "1" key 436 completes a path to lead 437, assuming that the pence multiplier factor is 10. The lead 437 is connected to prime the M2 tube by applying the +105 volts to the control grid 438 circuit. The control grid biasing circuit has the same parameters as the corresponding circuit of the M1 tube, so approximately +15 volts appears at the control grid of the M2 tube. However, the screen grid 439 is not tied to the cathode 440, so the M2 tube is primed but not fired.

Figure 23:
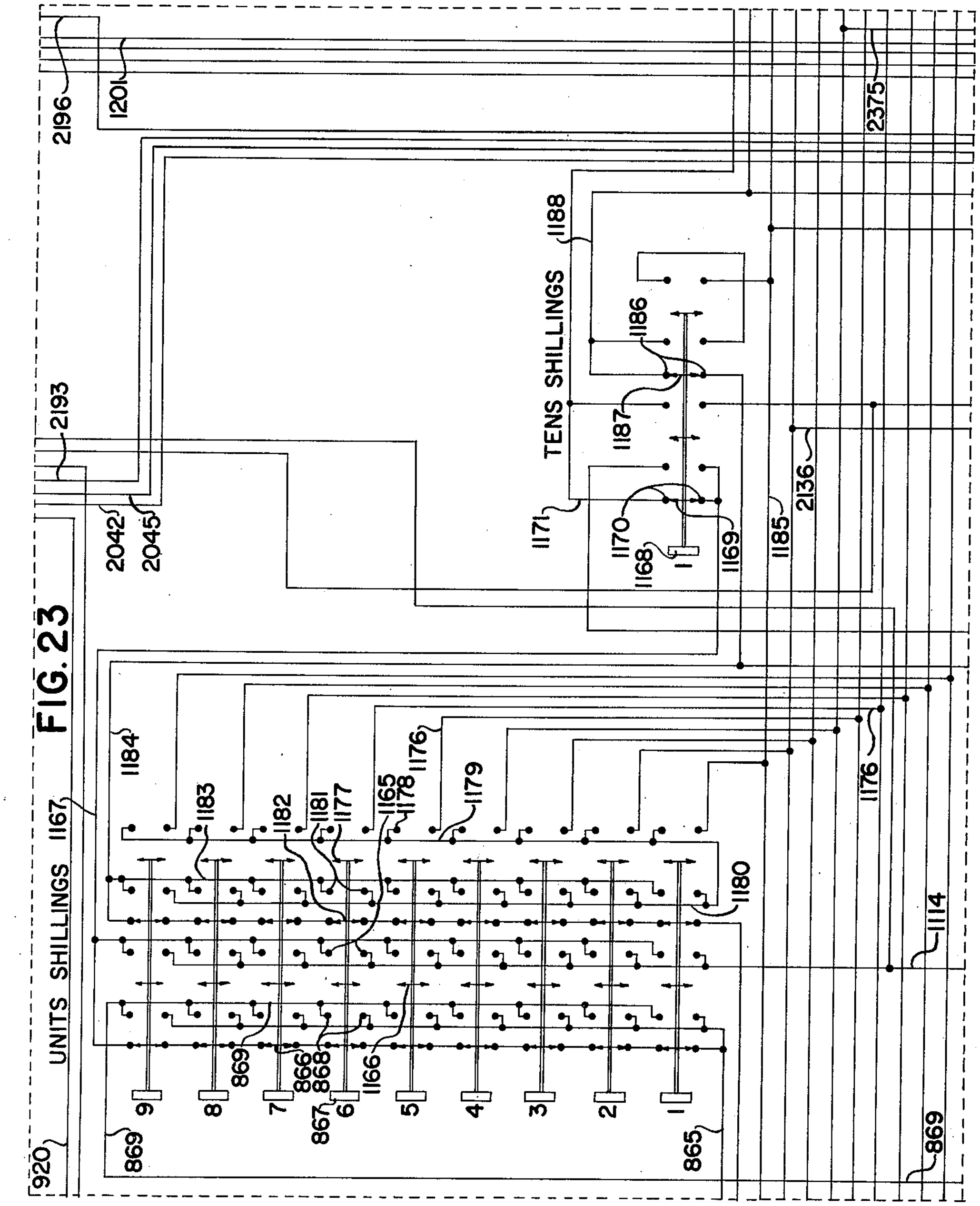
Figure 24:
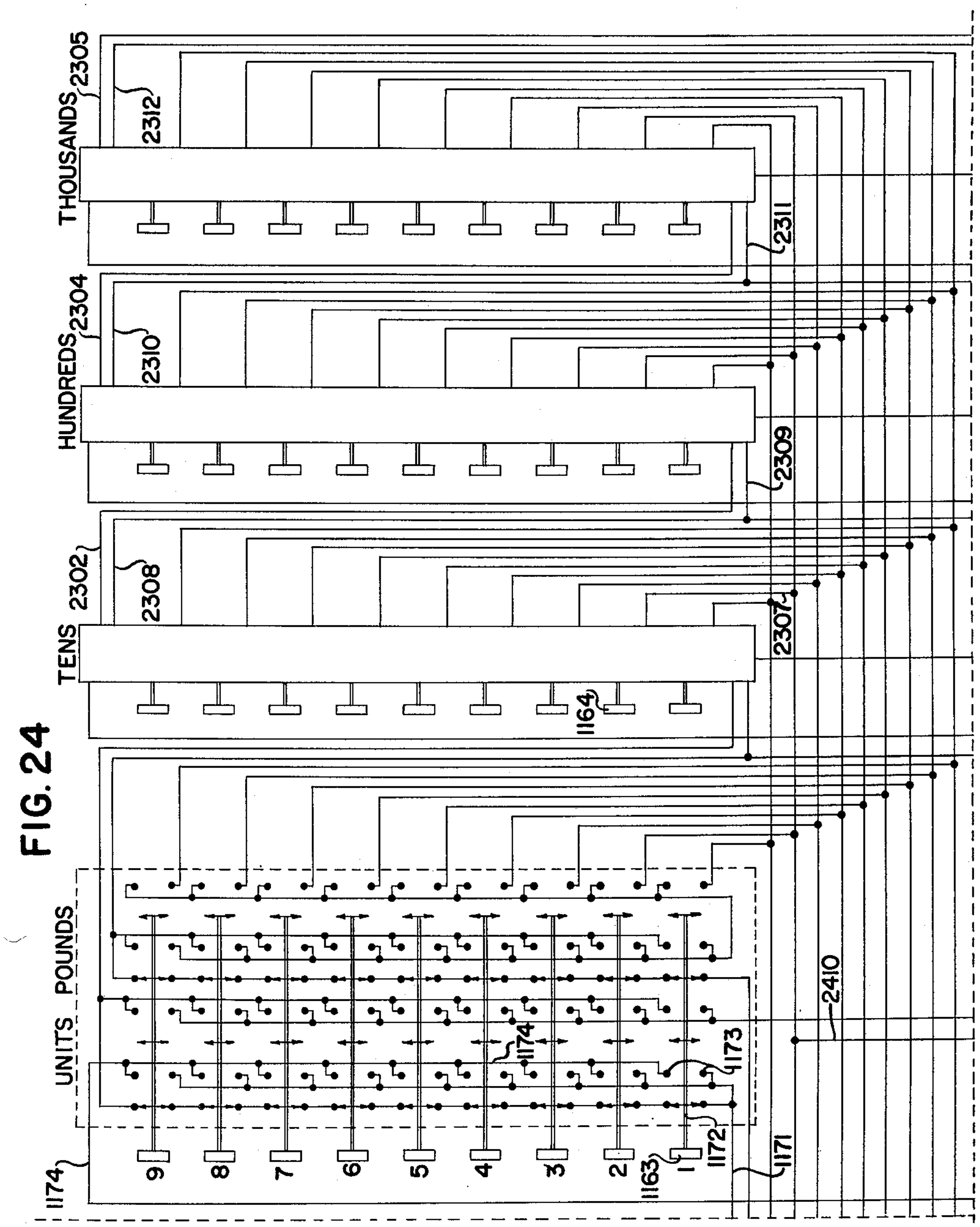

Presetting does include the firing of the selected M tube which will initially control the multiplication. It has been shown that the M1 tube will be fired during presetting if there is a units pence factor in the multiplier. It has also been shown that in the absence of such a digit the next M tube—namely, M2—will be primed, by the same means that fired the M1 tube, if there is a tens pence factor in the sterling multiplier. In the same manner, it is possible to prime any of the M3 through M8 tubes during presetting in accordance with the lowest order digit in the sterling multiplier. If, for example, the lowest order digit set into the shillings keyboard of FIG. 23 is the units shillings factor, the M3 tube is primed; or, if it is the tens shillings factor, then the M4 tube is primed. By the same token, this same source is used to prime the M5, M6, M7 (FIG. 26), or M8 tube if the lowest order in the multiplier, as set into the Pounds keyboard of FIG. 24, is the units pound, tens pound, hundreds pound, or thousands pound digit, respectively.

In the event the M1 tube is not used, further means in the form of another +105-volt terminal 441. (FIG. 22), associated with relay contacts *7a3*, is provided to fire the selected one of the M2 through M8 tubes during presetting and subsequently to the application of priming potential to the selected tube. Closure of the contacts *7a3* by armature 442 connects the +105-volt terminal 441 to lead 443, which is extended through the Units Pence keyboard by virtue of the switch arms of the "1" through "9" keys corresponding to switch arm 444 of the "1" key 417. The lead 443 is the pulsing or firing line connected to the screen grid 439 of the M2 tube (FIG. 25). Normally, the screen grid 439 is biased from the −30-volt terminal 445 over lead 450, which includes the 1-megohm resistor 446, and by way of the 47,000-ohm grid resistor 447. The firing pulse, initiated at the +105-volt terminal 441 (FIG. 22), when the relay contacts *7a3* are closed, is applied over lead 443 and by way of a 100-micro-microfarad capacitor 448 and the grid resistor 447 to the screen grid 439 of the M2 tube.

In this manner, the M2 tube is both primed and fired during presetting. In the same manner, any of the M3 through M8 tubes, selected by the keyboard settings, would be primed and fired during presetting.

In summary, the foregoing occurs during the "slow drop out" time interval of relay coil RL5 (FIG. 11). The +105-volt terminal 410 of FIG. 17 is rendered effective by operation of coil RL5 through the *5a1* contacts to fire the M1 tube, or, in the alternative, to prime a selected one of the M2 through M8 tubes according to the lowest order setting in the sterling keyboard. The further source, the +105-volt terminal 441 of FIG. 22 is rendered effective by operation of the coil RL7 (FIG. 11) through its contacts *7a3* to fire the selected one of the M2 through M8 tubes in accordance with the lowest order sterling keyboard setting. Since the selected M2 through M8 tube must be primed until it is fired, the two +105-volt sources must be effective concurrently; hence the reason for the "slow-drop out" connection of relay coil RL5.

The next contact on relay coil RL5 (FIG. 11) is shown in FIG. 19 as contact 5*b*2, designated at 451, which is, of course, a normally-closed contact. This contact is connected in the ground lead 452 for the A ring cathode follower tube 453 (FIG. 19), which tube prevents the A ring from running until the ground lead is continuous. It will be noted at this point that a contact 8*a*1, identified at the armature 454, is open, which contact will be closed in the sequential operation of the relays, as will be discussed. Also, a contact 9*b*1, represented with the armature 455, remains normally closed in the ground line 452 during operation of the machine.

When relay coil RL5 was energized, its further normally-open contacts 5*a*3 (designated at 456 in FIG. 34) are closed to establish a connection to the −330-volt terminal 457. The application of this negative voltage to the control grids of the tubes of the associated accumulators serves to reset (during presetting) all pence accumulator order banks to zero. It might be noted that the same resetting −330-volt source 457 and relay contacts 5*a*3 are shown in FIG. 41 for resetting the shillings accumulators. In reality there is only a single source 457 and a single set of contacts 5*a*3, because a common resetting line is used. This common line extends to each order bank of the pence, shillings, and pounds accumulators to provide for the simultaneous resetting of every order bank in the machine.

As will be recalled, when relay contacts 5*a*2, noted at 406 in FIG. 11, were closed, relay coil RL7 was energized and is locked in the activated state by its holding contacts 7*a*1, designated by the armature 458 in FIG. 11.

It is the relay contacts 7*a*3, which appear in FIG. 22 associated with the armature 442, that were closed to apply an abrupt potential change from the +105-volt terminal 441 through the keyboard having the lowest order multiplier digit set therein to fire the corresponding M ring tube from M2 to M8 in the event the M1 tube was not used. Also, when relay coil RL7 is energized, its contacts 7*b*1, identified with the armature 403 in FIG. 11, are opened to deenergize relay coil RL5.

Figure 26:
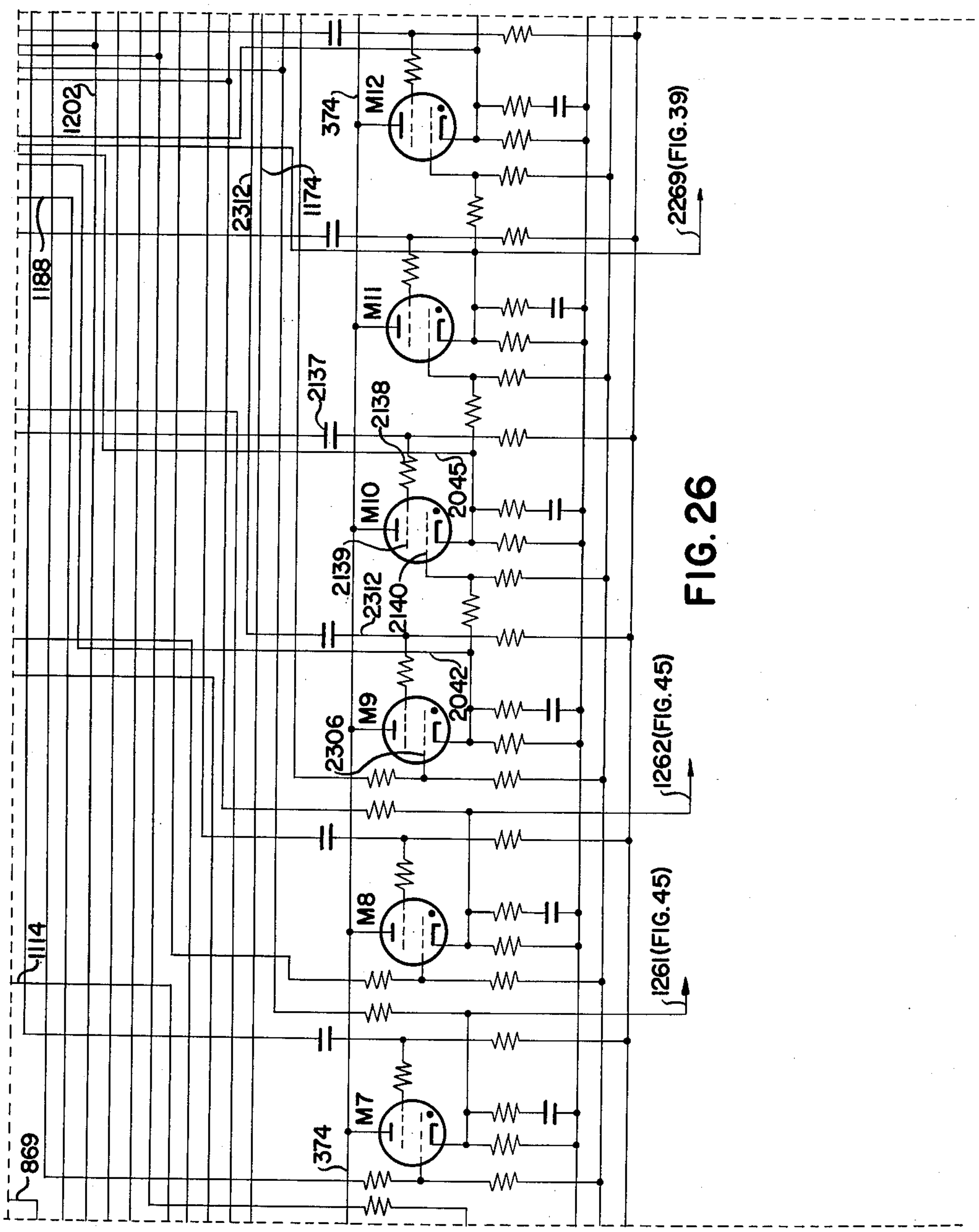

After the built-in time delay, the relay coil RL5 removes the accumulator reset voltage by opening its contacts 5*a*3, shown associated with the armatures 456 of FIGS. 26 and 41. The coil RL5 also removes the presetting voltage from the J0 tube (FIG. 17) over its now-open contacts 5*a*1, noted with the armature 408. The J0 tube, being of the gaseous type, remains conducting. Simultaneously, the same armature removes the +105-volt potential from terminal 410, which was formerly applied over conductor 416 to the sterling keyboard (FIGS. 22, 23 and 24) for firing the M1 tube if something other than 0 were in the Units Pence bank, or to prime higher order M tubes if 0 was in the Units Pence bank. The selected M tube remains on, for it is also of the gaseous variety.

Relay coil RL7 enables the next step in sequencing the presetting relays. Its contacts 7*a*2 (shown at 460 in FIG. 11) are closed to energize relay coil RL8 over lead 461, connected to the bridge leads 401—360 and 362. The relay coil RL8 is connected in the "slow pull-in" fashion due to the series resistor 462, of 3,900 ohms, and the shunt capacitor 463, of 20 microfarads. The "slow pull-in" type of connection insures that certain of the presetting voltages, as above mentioned, will have been removed prior to the time that relay contact 8*a*1 (FIG. 19) is closed to start the A ring cycling through the medium of the A ring cathode follower tube 453.

Although the apparatus is now set up for operation, one other relay and an associated solenoid will now be discussed, for it is conceivable that the operator has committed an error in entering either the multiplicand or multiplier factor into the keyboard 302 of FIG. 9 and it is just now discovered. The Key Release button 324 (FIGS. 9 and 11) may be used to enable a correction of the key settings or a new problem to be set into the keyboard, so long as the "start" button 325 has previously been depressed and before the multiply key 328 has not been operated. If power has been applied to the A.C. mains 342 and 343, the relay coil RL11 (FIG. 11) will be energized over leads 465 and 466. Energization of the relay coil RL11 closes its contacts 11*a*1, identified by the armature 467, to power solenoid coil RL12 (FIG. 11) over common bridge leads 390 and 362. A 2-microfarad condenser 468 is connected in shunt with the solenoid RL12, because this heavy-duty solenoid is used to release all keys in the keyboard 302 (FIG. 9) in conventional manner, as, for example, for withdrawing a detent latching shaft.

IMPULSE GENERATOR

Since the impulse generator section of the circuit supplies the fundamental timing in the form of the driving pulses for the A ring, as well as other pulses utilized throughout the system, the generator will be described first. The driver for the impulse generator shown in FIG. 13 is a free-running multi-vibrator type circuit comprising the duo-triode tube 481 of the 12AT7 variety.

The circuit is conventional in nature, merely being required to initiate a continuous train of positive and negative going pulses. Each of the anodes 482 and 483 is connected through its corresponding 47,000-ohm plate load resistor 484 and 485 to the +250-volt B+ supply line 398. Each of the cathodes 486 and 487 is grounded. The D.C. biasing potential for the triode sections is obtained from a 25,000-ohm potentiometer 488, connected in series with a 68,000-ohm resistor 489, both in lead 490, which extends between ground and the B+ supply line 398. Each of the control grids 491 and 492 is connected through its own 330,000-ohm grid resistor 493 and 494 to a common grid supply lead 495, which is connected to the adjustable tap 496 of the potentiometer 488. Adjustment of the tap 496 provides the proper D.C. biasing level for each triode section. The "flip-flop" action takes place at about 4,000 cycles per second. The triggering paths include, respectively, the 600-micro-microfarad capacitor 497, connected by lead 498 from the control grid 491 (of the left-hand tube section) to the anode 483 (of the right-hand tube section), and the same size capacitor 499, connected from control grid 492 by leads 500 and 501 to the anode 482. The leads 498 and 501 from the anodes 483 and 482 are the output connections for the multivibrator stage.

As will be recalled, during the presetting sequential operation of the relay coils, coil RL4 closed its contacts 4*a*3, including armature 397, to apply +250 volts from terminal 399 to the anode circuits of the triodes of multivibrator tube 481. This immediately caused the multivibrator to produce output pulses from each tube section, respectively, 180° out of phase.

Those pulses produced by the potential drop at the anode 483 and appearing on output lead 498 are used to produce pulses which will be referred to as the zero degree (0°) pulses, and those produced in the interim times by the potential drop at the anode 482 are used to produce pulses on output lead 501, referred to as half-after, or 180°, pulses.

The square pulses on lead 498 are differentiated in the RC network comprising a 25-micro-microfarad capacitor 502 and a 220,000-ohm resistor 503 to shape the 0° pulses. From the differentiating network, the differentiated pulses are applied over a 47,000-ohm grid-current-limiting resistor 504 to the left-hand control grid of a duo-triode tube 506, having each triode section connected as a zero or positively-biased amplifier. The purpose of the zero-biased amplifier is to increase the amplitude of the pulses and the steepness of the wave fronts of these pulses. Similarly, the 180° pulses from lead 501 are also applied through a differentiating network comprising a 25-micro-microfarad capacitor 507 and a 220,000-ohm resistor 508 to the control grid 509 of the left-hand section of the zero-biased amplifier tube sections in envelope 506, by way of the 47,000-ohm grid-current-limiting resistor 510. The 0° and 180° output pulses from tube 506 are taken from the 10,000-ohm load resistors 511 and 512 and applied over conductors 513 and 514 and by way of the .01-microfarad coupling condensers 515 and 516 to the control electrodes 517 and 518 of a pair of pentode (type 6CL6) cathode-follower-connected tubes 519 and 520, each of which serves in a power amplification capacity.

The load for power amplifier 519 includes the cathode resistors 521 and 522, the former of 1,000 ohms and the latter of 3,000 ohms. Similarly, the load for the tube 520 includes resistors 523 and 524, corresponding in size to resistors 521 and 522. The suppressor grids 525 and 526 are tied to the cathodes 527 and 528, respectively. The screen grids 529 and 530 are connected in common through a 22,000-ohm resistor 531 to the +250-volt B+ supply line 398 and are by-passed to ground by a 4-microfarad condenser 532. The anodes 533 and 534 are, of course, connected directly to the +250-volt B+ supply line 398. A pair of 100,000-ohm resistors 535 and 536 provide the initial biasing arrangement for the control grids 517 and 518, respectively.

Since the cathodes and control electrodes of the tubes 519 and 520 are at the same potential, the tubes are normally barely conducting. However, in the multivibrator tube 481, when a potential drop occurs at the anode 483 due to the right-hand tube section going from an off condition to an on condition, a negative pulse is formed at the control electrode 505 of the left-hand section of amplifier tube 506. This negative pulse is inverted and amplified to appear as a large positive pulse at control electrode 517 of power amplifier 519. A corresponding positive pulse is developed across the cathode resistors 521 and 522 due to the heavy conduction in tube 519. Each time the right-hand tube section of multivibrator tube 481 is turned on, a positive pulse appears at the output of tube 519 to form a continuous train of 0° pulses.

The full-amplitude 0° pulses (140 volt) are taken off the cathode 527 by conductor 540 for application to the cathode-follower-connected driver tube 453 (FIG. 19), which supplies driving pulses to the A ring of FIGS. 13, 14, and 19. Lesser-amplitude 0° pulses (115 volt) are taken from cathode resistor 522 of tube 519 (FIG. 13) by conductor 541 for application to the B ring of FIGS. 15 and 16, a 500-micro-microfarad condenser 542 in the cathode circuit of tube 519 (FIG. 13) serving to steepen these pulses for the hard tubes of the B ring.

The right-hand power amplifier pentode tube 520 (FIG. 13) operates in a manner similar to the left-hand tube 519 to produce a continuous train of 180° pulses at times intermediate the occurrences of the 0° pulses. This timing is caused by the operation of the power tube 520 simultaneously with the left-hand multivibrator tube section of tube 481 (FIG. 13) going from an "off" condition to an "on" condition.

The lesser-amplitude 180° pulses are applied from the cathode circuit of tube 520 over conductor 543 to drive the K ring of FIGS. 17 and 18. A 500-micro-microfarad condenser 544 in the cathode circuit of tube 520 (FIG. 13) is used to steepen the pulses applied to the hard tubes of the K ring.

The 0° pulses appearing at the output conductors 540 and 541 of the cathode-follower-connected power amplifier tube 519 of FIG. 13 are illustrated throughout the timing charts of FIGS. 5 through 7B as the impulses 101. The 180° pulses from tube 520 are shown in the same timing charts as the impulses 102. The timing charts clearly show the relative times of occurrences of the 0° pulses and the 180° pulses. It is also to be noted that these pulses are supplied continuously throughout the operation of the multiplier apparatus.

THE A RING

The 0° pulses from the tube 519 of FIG. 13 are used to drive the tubes of the A ring (FIGS. 13, 14, and 19). The conductor 540 applies the 0° pulses through a 0.001-microfarad coupling condenser 561 (FIG. 19) to the common grid connection 562 for the A ring cathode-follower-connected tube 453, which tube served to prevent the A ring from cycling until the proper time in the presetting operation just explained.

During presetting, the control electrodes 563 and 564 of the cathode-follower-connected driver tube 453 are connected to the −105-volt terminal 565. This path includes the 1,000-ohm parasitic suppressor resistors 566 and 567 in common lead 562, the 470,000-ohm biasing resistor 568 in lead 569, and a 100,000-ohm voltage divider resistor 570. In spite of the fact that the anodes 571 and 572 of the 6J6 tube 453 are at +250 volts (due to terminal 573) and the cathode 574 is grounded through the 33,000-ohm load resistor 575, the tube is not receptive to the 0° pulses from the impulse generator because of the highly negative grid bias.

It might be noted that the impulse generator of FIG. 13 has been running ever since the relay coil RL4 operated armature 397 (early in the presetting sequence) to close its contacts *4a3* in the impulse generator B+ supply line 398. The highly negative bias from terminal 565 (FIG. 19) is necessary to prevent these 0° pulses from passing through the cathode-follower-connected driver tube 453 to the A ring tubes but provides free running time for the impulse generator, during which the multivibrator operation is stabilized.

As will be recalled, at the end of the presetting interval, relay contacts *8a1*, shown with the armature 454 in FIG. 19, closed to permit the A ring to cycle. This closure of contacts *8a1* connected junction point 577 of lead 452 over a 1,000-ohm resistor 578 to ground. The potential of junction point 577 is established between ground and −105 volts as applied at terminal 565 by the 100,000-ohm resistor 570 and the 1,000-ohm resistor 578 at approximately −1 volt. The bias now effective at the control electrodes 563 and 564 permits the driver tube 453 to pass the 0° pulses on to the A ring tubes.

It should be mentioned that the potential at junction point 577 is somewhat stabilized by the 0.01-microfarad capacitor 576, which by-passes transients to ground. Hence the cathode-follower-connected driver tube 453 remains in condition to pass pulses once relay contacts **8*a*1** are closed.

The 0° pulses appear across the output load resistor 575, the tube being capacitively loaded by the shunt-connected 500-micro-microfarad capacitor 579 and the 50-micro-microfarad capacitor 580, so that the pulses are slightly widened. The 0° pulses from the cathode resistor 575 are passed over conductor 581 to the screen grid pulsing line 582, which supplies pulses simultaneously to all of the screen grids of the A ring tubes except the A Start tube (FIG. 13). The A Start tube receives the 0° pulses from lead 582 over a 10-micro-microfarad coupling capacitor 583 and a 47,000-ohm gas tube protective resistor 584 on its control grid 585.

All of the tubes of the A ring are of the gaseous GL5663 variety and, with the exception of the A Delay and the A10 tubes, are similarly connected. However, the A Start tube is triode connected, whereas the other A ring tubes are tetrode-connected and consequently require priming before conduction can be established therein.

The A Start tube will be fired by the first 0° pulse which is passed onto the common pulsing lead 582 from the driver tube 453 of FIG. 19. The anode potential for the A Start tube is derived from the common B+ supply line 590 for the A ring, which line, in turn, is connected over lead 591 (FIG. 14) to the cathode junction point 592 of the pentode 396. The pentode 396, in combination with other tubes, which will be described at the conclusion of the A ring description, is connected in a voltage-regulating circuit, in such a way that the potential of junction point 592 is maintained at +105 volts relative to ground. It might be observed at this time that there is no common plate load resistor for the tubes of the A ring, for it is desired that these tubes remain conducting once fired for the duration of each A ring cycle, with the exception of the A Delay and the A0–Tally tubes.

The potential for the control grid 585 of the A Start tube (FIG. 13) is approximately —9 volts when the tube is non-conducting. This level is established by the —75-volt terminal 593, effective through a 200,000-ohm resistor 594 and a 27,000-ohm resistor 595 to the common ground lead 596. The junction point 597 between these two resistors assumes the —9-volt level by divider action. The grid lead 598 includes a 1-megohm biasing resistor 599 and the 47,000-ohm protective resistor 584.

The first 0° pulse to pass the driver tube 453 (FIG. 19) and emerge on the common firing line 582 fires the A Start tube (FIG. 13), as the 0° pulse magnitune is still approximately 140 volts, which is sufficient to overcome the —9-volt bias. Since the A Start tube is triode-connected, having its screen grid 601 tied to its cathode 602, it does not require priming. However, the remaining A ring tubes are tetrode-connected for priming on the control electrodes and firing on the screen electrodes.

When the A Start tube becomes conducting, it primes the A Delay tube. The potential of the cathode 602 of the A Start tubes rises at point 603 from ground to approximately +90 volts due to the drop across the 22,000-ohm cathode resistor 604. This elevates the potential of the control grid 605 of the A Delay tube from approximately —38 volts, as established at junction point 606 by the voltage divider action of two 1.3-megohm resistors 607 and 608, connected to ground by way of the 22,000-ohm cathode resistor 604 and to the —75-volt terminal over conductors 609 and 610, to approximately +9 volts, sufficient for priming purposes. The potential at junction point 606 was elevated to approximately +9 volts when conduction was established in the A Start tube because the cathode 602 assumed a potential of roughly +92 volts and the 1.3-megohm divider resistors 607 and 608 split the voltage between +92 volts and the —75 volts of terminal 593. With the control grid 605 thus positively biased, conduction is established in the A Delay tube upon the application of the first 0° pulse to the screen grid 611 over a 47,000-ohm grid resistor 600 from common pulsing line 582 after priming; i.e., after the A Start tube has been fired. Heretofore the screen grid 611 had been biased negatively from the —30-volt terminal 612 over lead 613, including the 1-megohm resistor 614.

The anode supply potential for the A ring tubes, as described, is obtained from the voltage regulator tubes 395 and 396 (FIG. 14) and is maintained at approximately +105 volts. Many counting rings employ a common anode resistor, which effects blow-out in one tube as the succeeding tube is fired. However, in the instant case, the A ring tubes remain conducting (with the exception of the A Delay tube under discussion) because of the constant anode supply potential. This enables controls for the formation of pulse groups of all digit-representing numbers employed herein.

The A Delay tube is included in the A ring to provide a time interval in which the normal transfer controls may be restored without effecting a transfer entry when the transfer controls have been used to control fractional readout. These controls are used only during the fractional conversion operation when the stored pounds fraction and shillings fraction are converted to pence, but the A ring provides a time interval for this purpose during each cycle anyway. The order banks of the shillings and pounds accumulators containing the decimal fractions are "pulsed out" by groups of ten pulses which run these counters through zero and back to their original settings. As the counters pass through zero, what normally would have been a transfer is now used as a control to gate out the remainder of the group of ten pulses, which is equal to the content of the bank. After this control is exercied, the normal transfer controls must be restored. It is during the A Delay time interval that a "readout restore pulse" is provided for restoring the normal transfer controls of these fractional order banks. The A Delay tube conducts for one time interval between adjacent 0° pulses because it is fired by the 0° pulse occurring after the A Start tube is conducting, and it is extinguished when the A10 tube assumes the conducting condition on the next 0° pulse.

During this time interval, a single 180° readout-restore pulse is gated to the accumulators to restore the transfer means. This 180° pulse is derived from the output lead 543 of the pentode 520 (FIG. 13) and is applied over input lead 615 (FIG. 14) and a 100-micro-microfarad pulsing capacitor 616 to the control electrode 617 of a gated triode section of a 12AU7 tube 618.

Of course, 180° pulses are present at the control electrode 617 of tube 618 at all times during operation of the impulse generator, but they cannot normally pass to the cathode output lead 619 because of the bias derived from the A Delay tube while it is non-conducting. However, it should be understood that normal transfers are released by the 180° pulses immediately following the 0° pulses which set the transfers.

Also, the gated triode 618 under control of the A Delay tube is used to supply single 180° pulses to the logical circuitry in testing whether division or extraction is possible. This function is effective only when the M14 through M21 tubes set up the extraction operation. A detailed explanation of the foregoing is presented under the heading Extraction of Integral Shillings From Pence, supra.

The cathode junction point 620 (FIG. 13) above the 22,000-ohm cathode resistor 621 of the A Delay tube is approximately at ground potential, established by the 1.3-megohm resistors 622 and 623 and the —75-volt terminal 593 in the manner of the A Start tube, as previously explained. The junction point 620 is connected over a lead 624, including a 2,200-ohm resistor 625, to a resistive voltage divider network (FIG. 14) in the grid-cathode circuit of the gated triode 618. The voltage divider includes a 22,000-ohm resistor 626, connected through a diode 627, of the IN65 type, to a grounded 50,000-ohm resistor 628, shunted by a 0.01-microfarad capacitor 629, and from the ungrounded end of the resistor 628 through a 12,000-ohm resistor 630 to the +95-volt terminal 631. The junction point 632 between the diode 627 and the resistor 628 is set at approximately +77 volts by the resistors 628 and 630 in dividing the +95 volts of terminal 631. However, the diode 627 is non-conducting until the A Delay tube is fired, so it is the cathode potential of approximately zero volts of the A Delay tube which normally prevents operation of the gated triode 618, over lead 624, resistor 626, and a 47,000-ohm grid resistor 633 to control electrode 634 thereof. The potential of the cathode 635 of triode 618 is established at +95 volts from source 631 over a 3,000-ohm cathode resistor 636 at this time, so the triode 618 remains gated off so long as the A Delay tube is not conducting.

When the A Delay tube becomes conducting, its cathode junction point 620 is elevated in potential to approximately +92 volts, which, over lead 624, establishes a sufficiently positive bias for tube 618 of FIG. 14 to enable it to pass the next 180° pulse from input line 615 to output lead 619. The diode 627 in the biasing arrangement of tube 618 has its cathode maintained at +77 volts, so the application of +92 volts to its anode lead 624 causes conduction. This operation insures that the positive cathode pulse from the A Delay tube (FIG. 13) does not appear as an output pulse of tube 618 (FIG. 14) but rather serves as a temporary D.C. bias for effecting the passage of the 180° readout-restore pulse.

The first 0° pulse occurring after the 180° readout transfer restore pulse fires the A10 tube (FIG. 13), which in turn, through means to be explained, causes the A Delay tube to be extinguished, thereby gating off the transfer release triode 618 (FIG. 14). While the A Delay tube is conducting, the control electrode 651 of the A10 tube is maintained at approximately +9 volts due to the +92-volt potential at cathode junction point 620 of the A Delay tube being divided by the 1.3-megohm resistors 622 and 623, taking into account the −75-volt potential of terminal 593. The anode 652 of the A10 tube is at the +105 volts of the common B+ line 590. The cathode 653 is connected through a 22,000-ohm load resistor 661 to ground. It is also connected through extinguishing means for the A Delay tube in the form of a diode 654 of the 6AL5 type and the 22,000-ohm resistor 655 to ground. The cathode junction point 656 is about ground potential while the A10 tube is inoperative due to the 1.3-megohm resistors 657 and 658, connected between the junction point 656 in lead 659 and over lead 660 to the −75-volt common line 610. The 22,000-ohm cathode load resistor 661 serves as a ground return while diode 654 is open, but its magnitude is not sufficient to affect this potential distribution materially.

The above-mentioned parameters insure the firing of the A10 tube upon the application of the 0° pulse following the 0° pulse which initiated conduction in the A Delay tube. This firing pulse is applied to the screen grid 662 from the common pulsing line 582 by way of the 35-micro-microfarad capacitor 663 and the 47,000-ohm screen grid resistor 664.

When the A10 tube is fired, the potential of the junction point 671 between its cathode-connected diode 654 and the resistor 655 approaches +90 volts. This junction point is connected over a 0.002-microfarad capacitor 672 to the cathode junction point 620 of the A Delay tube, which has charged the capacitor to about +92 volts, the cathode potential of the A Delay tube when it is conducting. Consequently, the cathode of the A Delay tube is momentarily at about +182 volts, which is sufficiently above the +105-volt anode potential to extinguish the A Delay tube.

Prior to and during the extinction of the A Delay tube, the diode 654 in the cathode circuit of the A10 tube serves as an isolation device. It is so connected as to permit the capacitor 672 to charge (while the A Delay tube is conducting) with the connection to the cathode of the A10 tube open, but, upon the instant the A10 tube conducts, the diode permits gas tube current flow through the resistor 655 to boost the extinguishing voltage effective at the cathode of the A Delay tube. The diode 654 also serves to prevent the negative going pulse from the A Delay tube, as the tube is extinguished, from influencing the A10 tube.

Although the A Delay tube has been extinguished, it must be precluded from re-firing during the remainder of the A ring cycle, because the A Start tube remains conducting to supply, if permitted, a positive bias to the control electrode 605 of the A Delay tube. Also, 0° pulses are present at the screen grid 611 of the A Delay tube from the common supply line 582. The A Delay tube is prevented from re-firing by a triode section 673 (upper right of FIG. 14), of the 12AU7 type, which reduces the control grid potential of the A Delay tube. The triode 673 has its cathode 674 connected over lead 675 to the −105-volt terminal 676, while its control grid 677 is connected by way of a 1-megohm resistor 678 to the −210-volt terminal 679. The control electrode 677 is also connected over lead 680, including a 1.5-megohm resistor 681 and a 2,200-ohm resistor 682 (FIG. 13) to the cathode junction point 656 of the A10 tube. The anode 683 is connected over lead 684, including a 470,000-ohm resistor 685 (FIG. 13), to the control electrode 605 of the A Delay tube.

When the A Delay tube (FIG. 13) is conducting, the A10 tube is off, so the potential on lead 680 for control electrode of triode 673 (FIG. 14) is determined by the A10 cathode voltage dividing network, comprising resistors 658 (connected to −75 volts, FIG. 13), 657, and 661 (grounded) in relation to the resistors 682, 681 (FIG. 14), and 678, connected to −210 volts. Suitable calculations for the assigned resistance and voltage values establish the potential of control grid 677 of triode 673 at approximately −127 volts. The anode voltage for tube 673 is +9 volts as established over lead 684 to the control grid 605 of the A Delay tube (FIG. 13) at this time, and the cathode voltage of tube 673 (FIG. 14) is −105 volts. Consequently, the triode 673 is non-conducting and does not interfere with the A Delay tube operation. However, when the A Delay tube is extinguished as the A10 tube comes on, the control grid potential of triode 673 (FIG. 14) is elevated to about −90 volts (+15 volts with respect to the cathode 674), so the triode conducts to pull the control electrode 605 of the A Delay tube (FIG. 13) toward the −105-volt cathode supply of the triode 673 (FIG. 14). This condition persists throughout the A ring cycle to preclude restriking of the A Delay tube.

As will be recalled, after the A Delay tube was fired, the succeeding 0° pulse on common lead 590 caused the A10 tube to be fired, which in turn primed the A9 tube over circuit components having the same parameters as the priming circuit for the A Delay tube. The A9 tube (FIG. 13), upon coming on, primes the A8 tube for firing on the next 0° pulse. In this manner, all the remaining tubes of the A ring—namely, A7 . . . A1 and the A0–Tally tube (FIGS. 14 and 19)—are fired in sequence by 0° pulses. The specific circuits of the A9 . . . A1 tubes employ the same valued components as the A Delay tube circuitry. However, the blow-out circuit for these gas tubes is the same as that for the A Start tube, where the 0.002-microfarad capacitor 687 is connected from ground level 596 to the cathode junction point 603 over the 2,200-ohm current-limiting resistor 688, so that the capacitor holds the cathode potential high when the anode potential is reduced, to insure extinction.

Reference to the timing charts of FIGS. 5 and 5A will now be had to show the first and second A ring cycles and selected periods of operation of certain of the components involved. The A Start tube assumes the conducting condition, as represented at 109 on Line 3, coincidentally with the first 0° pulse 101. This condition persists for twelve 0° pulse time intervals until the occurrence of the A Tally–1 pulse, which is the thirteenth 0° pulse 101. The A Start tube is non-conducting over one 0° pulse time interval, as indicated at 110 in FIG. 5, with conduction being re-established by the first 0° pulse 101′ (FIG. 5A) following the A Talley–1 pulse. Throughout the operation of the machine, this pattern is followed by the A Start tube.

Conduction in the A Delay tube is illustrated at 111 in FIG. 5 opposite Line 4. The conduction period lasts for one 0° pulse time interval. It is during this interval that a single 180° readout-restore pulse is gated to the accumulators to restore the transfer means. Such a 180° pulse is shown in the timing charts on Line 19 of FIGS. 6 through 6B at 691 and is in reality the third 180° pulse 102 of Line 2. Line 4 of these same charts shows the A Delay tube conducting interval at 692. The A ring cycles depicted in FIGS. 6 through 6B are taken during the conversion of fractional shillings to integral pence, whereas the A ring cycles of FIGS. 5 and 5A are taken during the pence multiplication; but the gating of the 180° pulses is the same during all A ring cycles.

Returning to FIGS. 5 and 5A, it will be seen that the third 0° pulse 101 establishes the conducting interval 112 (Line 10) for the A10 tube. This is, of course, the cause of extinction for the A Delay tube.

The fourth 0° pulse 101 of Line 1 establishes conduction for the A9 tube (not shown), the fifth pulse fires the A8 tube, the sixth pulse fires the A7 tube, the seventh pulse fires the A6 tube, and the eighth pulse establishes conduction in the A5 tube, as shown at 113 on Line 8 of FIG. 5. The twelfth pulse fires the A1 tube (not shown), and the thirteenth pulse fires the A0–Tally tube, as appears at 115 on Line 5 of FIG. 5.

Firing of the A0–Tally tube causes the extinction of all of the A ring tubes to permit the next A ring cycle. FIG. 5A of the timing charts shows the second A ring cycle and a portion of the third to be the same as the first for the selected periods of operation of the components involved. The A ring cycles are repetitive throughout the machine operation, the A0–Tally tube serving to separate A ring cycles by causing the extinction of all A ring tubes at the proper time.

Blow-out, or extinction, for the A ring tubes is accomplished under the control of the A0–Tally tube (FIG. 19) on a selected 0° pulse, the thirteenth 0° pulse 101, shown as the A0–Tally pulse 115 on Line 5 of FIG. 5 for the first A ring cycle. When this tube becomes conducting due to the appropriate 0° impulse from common pulsing line 582, its cathode potential at point 695 is elevated. This positive rise is transmited over conductors 696, 697, and 698 (FIGS. 19, 16, and 18) to a triode amplifier tube section 699 (one half of a 12AU7), located in the lower right-hand corner of FIG. 18. The control electrode 701 has a D.C. biasing path over a 100,000-ohm resistor 702, connected to the −75-volt terminal 703. The cathode 704 is connected to a voltage divider comprising the grounded 47,000-ohm resistor 705 (by-passed by a 0.01-microfarad capacitor 706) and the 22,000-ohm resistor 707, connected to the −75-volt terminal 703. The potential of the cathode 704 is approximately −51 volts due to this divider. The control grid 701 is, accordingly, about 24 volts negative with respect to the cathode. The potential of the anode 708 is about +250 volts, as derived over anode lead 709, which extends through a 470,000-ohm resistor 710 (FIG. 14) to the +250-volt B+ supply line 398.

These parameters insure that the amplifier tube 699 (FIG. 18) is normally cut off. The capacitor 706 is provided to prevent cathode degeneration at the time of current onslaught, thereby steepening the wavefront of the output pulse delivered by triode 699. Hence, when the cathode potential rise from the A0–Tally tube (FIG. 19) is applied over leads 696, 697, and 698 and through a 0.001-microfarad D.C. blocking condenser 711 to the control electrode 701, the triode 699 is suddently turned on to draw substantial current through the large load resistor 710 (FIG. 14), thereby dropping the potential at junction point 712 (the lower end of resistor 710). The decreased potential is effective over lead 709 and 1,000-ohm resistors 713 and 714, connected to the control electrodes 715 and 716 of the A ring anode supply voltage regulator tubes 395 and 396.

The application of the negative going potential to the control electrodes of tubes 395 and 396 sharply decreases the cathode potential at common junction point 592 from its normal +105-volt B+ supply level, which effect, over lead 591 and common anode lead 590, serves to extinguish all of the conducting A ring tubes (with the exception of the A0–Tally tube, which is self-extinguishing).

Since the voltage of anode A+ supply for the A ring tubes should be constant to avoid premature blow-out for any tube of the ring, a voltage regulator amplifier type control is provided in the form of a triode amplifier tube section 721 (FIG. 14), which is one half of a 12AU7 tube. The cathode 722 is grounded, and the control electrode 723 is connected to a 25,000-ohm potentiometer 724 by way of adjustable tap 725. The potentiometer 724 is connected in series with a 47,000-ohm resistor 726 and an 82,000-ohm resistor 727, the combination being connected between the −75-volt terminal 728 and the +105-volt common cathode junction point 592. The plate potential of the tube 721 is used as the B+ supply for the regulator tubes 395 and 396, the operating potential for tube 721 being derived from the +250-volt line 398 over the 470,000-ohm resistor 710. If, for example, for one reason or another, the cathode potential of the tubes 395 and 396 at junction point 592 (which is the +105-volt supply for the A ring tubes) should decrease, the bias applied to control electrode 723 also decreases, thereby decreasing the current through tube section 721, which in turn increases the anode potential of this tube at point 712 to increase the control electrode bias at grids 715 and 716 for the regulator tubes 395 and 396. When the potential of the control electrodes of the regulator tubes 395 and 396 is increased in a positive manner, these tubes draw more current, thereby restoring the cathode potential to +105 volts, because the anode potential supply for the regulator tubes is fixed through the regulated voltage supply applied at line 398. Similarly, a voltage change in the opposite direction will be compensated through this arrangement of amplifier tube 721.

Extinction of the A ring tubes will be discussed further, now that the regulated B+ supply for these tubes has been set forth in detail. It has been mentioned that the A0–Tally tube of FIG. 19 suddently dropped the anode supply voltage for the A ring tubes. The A0–Tally tube is so connected as to extinguish itself in conventional thyratron fashion to effect the foregoing. Its anode 371 is connected over lead 369 and by way of 100-ohm resistor 368 (FIG. 18) and relay contacts **4*a*1 to the +105-volt terminal 367. A 500-micro-microfarad capacitor 732 shunts the 100,000-ohm cathode load resistor 733 to charge up to its peak oscillation value when the A0–Tally tube conducts. The RC time constant is sufficient to insure that the cathode potential remains very close to the anode potential as the firing pulse applied to shield grid 734, by way of the 47,000-ohm grid resistor 735**, decays, so that the A0–Tally tube extinguishes itself in conventional fashion.

Each of the A Start, A Delay, and A10 . . . A1 tubes is assisted in extinguishing by a capacitor in its cathode circuit. A typical example is the circuitry of the A9 tube (FIG. 13), which includes the 0.002-microfarad capacitor 738, connected from ground lead 596 through a 2,200-ohm current-limiting resistor 739 to the cathode junction point 740. The capacitor 738 serves to hold the cathode potential high when the voltage of the common anode B+ suply for the A ring tubes is diminished, thereby insuring extinction. The series resistors, such as resistor 739, are provided to prevent excessive current flow through the capacitors, such as capacitor 738, when conduction is initially established in the A ring tubes, such as the A9 tube.

It should be clear now that the A ring supplies gating controls for all 0° pulse time intervals from one to ten. The A1 tube conducts for a single 0° pulse time interval, the A5 tube for five pulse time intervals, the A10 tube for ten pulse time intervals, etc. It should also be noted that ten 0° pulses are formed during conduction of the A10 tube, five such pulses appearing during the interval of conduction of the A5 tube, etc., down to one pulse during conduction of the A1 tube.

The gating controls afforded by the A ring are taken from the cathode circuits of the individual A ring tubes. For example, in FIG. 13 the A9 tube has an output lead 741, connected to the cathode junction point 740 through the current-limiting resistor 739. This output line will have a positive voltage applied to it during the conducting interval for the A9 tube; i.e., a time interval in which nine 0° pulses are formed. It remains, then, to apply the gating controls for the selection of groups of 0° pulses corresponding to all of the digits from one through ten.

B RING

The B ring, comprising the B1 through B10 tubes of FIGS. 15 and 16, is controlled by the A ring to provide the digit-representing groups of pulses. The B ring tubes are cathode-follower-connected gates operating under the control of the corresponding A ring tubes. The B ring tubes are triode sections of the 12AU7 type tubes. They receive a continuous supply of 0° pulses on the control electrodes but pass these pulses to the output cathode circuits only when gated on by the A ring tubes. In this manner, the B1 tube will be gated on by the A1 tube for one 0° pulse time interval to pass a single 0° pulse (or really a pulse resulting from a 0° pulse), which represents the digit "one." Likewise, for example, the B5 tube is gated on under control of the gating potential supplied by the A5 tube to pass a group of five pulses, which represent the digit 5.

The B1 through B9 tubes are all connected similarly, so the ensuing description will set forth the component values in relation to the B1 tube, which are to be taken as the values associated with the B2 through B9 tubes. The anode 744 of the B1 tube (FIG. 15) is tied over conductor 745 to the common B+ supply lead 746, which extends to the +360-volt terminal 747. The cathode 748 of the B1 tube is connected through a 3,000-ohm cathode load resistor 749 to the +95-volt terminal 750. The load resistor is shunted by a 1,000-micro-microfarad condenser 751. The D.C. biasing path for the control electrode 752 is the lead 753, including a 100,000-ohm grid resistor 754, which extends to the cathode circuit of the A1 tube of FIG. 19. The 2,200-ohm resistor 755 completes the path for lead 753 to the cathode junction point 756 of the A1 tube.

It will be recalled that the cathode junction point 756 assumes approximately the +92-volt level when the A1 tube is conducting to apply a suitable gating potential to the B1 tube. When this bias is considered relative to the +95-volt cathode potential of the B1 tube, it will be seen that the B1 tube is biased almost up to cut-off. However, in the absence of conduction in the A1 tube, the potential level of junction point 756 is approximately at ground, which is sufficiently negative with respect to the cathode to block the B1 tube.

The source of pulses for the tubes of the B ring is the 0° power amplifier tube 519 of FIG. 13. The 0° pulses which are of the lesser-amplitude variety appear on output lead 541, which extends to the common pulsing lead 757 (FIG. 15) and also over the 250-micro-microfarad capacitor 758 to the control electrode 752 of the B1 tube. When the A1 tube is conducting, therefore, it will reduce the negative bias on the control electrode 752 of the corresponding B1 tube to a point just below cut-off, so that they will respond to the lesser-amplitude 0° pulses, but these 0° pulses will be ineffective to cause conduction in the B1 tube if the A1 tube is not conducting, and a heavy negative bias is therefore applied to the B1 tube.

Since positive 0° pulses are continuously available at the input pulsing lead 541, the B1 tube will gate a pulse to its output lead 760 whenever the A1 tube is rendered conducting. This type of operation is shown in the timing chart of FIG. 5 for the A2 and B2 tubes, as illustrated on Lines 6 and 7. Conduction in the A2 tube is shown at 114, and the pulses passed by the B2 tube are indicated at 120. It is noted that the B2 tube output pulses 120 correspond in time to the twelfth and thirteenth 0° pulses 101 of Line 1. The timing chart is also arranged to show the operation of the formation of a group of five pulses under control of the A5 and B5 tubes, as seen on Lines 8 and 9. It should be mentioned that the last pulse of each of the groups of two and five pulses corresponds in time to the A Tally–1 pulse. Hence, in the formation of groups of pulses, the larger number pulse groups are merely initiated earlier than the small digit representing pulse groups during the A ring cycles. By the same token, the single pulse supplied by the B1 tube (not illustrated in FIG. 5) would occur in coincidence with the A Tally pulse 115, shown on Line 5. The largest group of pulses formed is represented on Line 11 as the ten pulses 118, developed under control of the A10 and B10 tubes.

As the A ring tubes are successively fired, all digit-representing pulse groups from one to nine are devloped at the corresponding B ring tubes during the interval beginning with the firing of the A10 tube and terminating when the A0–Tally tube (FIG. 19) is fired to extinguish the R ring tubes and gate off all of the B ring cathode-follower-connected tubes. During each cycle of the A ring, nine pulses appear on the output line of the B9 tube, eight pulses appear on the output lead from the B8 tube, etc., down to the B1 tube output lead 760, which has one pulse. The output leads for the B1 through B9 tubes are collected and identified in FIG. 16. These leads are connected into the multiplicand keyboard to permit the keyboard settings to select the groups of pulses which will be used in any problem.

The B10 tube (FIG. 16) is not connected in cathode-follower manner but rather is connected as a Class C amplifier. It utilizes full-amplitude type 0° pulses to form groups of ten pulses, which will be utilized for "reading out" the order banks of the accumulators. The anode load resistor 761 has a value of 10,000 ohms. The control grid 762 is connected to a D.C. voltage divider including a grounded 470,000-ohm resistor 763 and a 100,000-ohm resistor 764, which is connected over leads 765 and 680 to the cathode circuit of the A10 tube (FIG. 13). The 0° pulse input lead 766 (FIG. 16) for the B10 tube, including the 50-micro-microfarad coupling condenser 767, is connected from the control electrode 762 to the pulsing lead 540 of FIG. 19, which extends back to the 0° power amplifier pulse tube 519 of FIG. 13, where the full-amplitude 0° pulses are applied. These pulses control the operation of the B10 gate (FIG. 16) and cause corresponding pulses to appear on output lead 771. It might be noted that the A10 lead 765 is also branched over a further lead 769 (FIG. 16) and by way of a 10-micro-microfarad condenser 770 to the control grid 762 of the B10 tube. The condenser 770, by way of leads 765 and 680, is grounded through the A10 condenser 773, of 0.002 microfarad (FIG. 13), to steepen the A10 control wavefront applied to the B10 tube.

When the accumulator order banks are to be read out without disturbance or alteration of their contents, groups of ten pulses are required for this purpose. During this operation, the groups of ten pulses developed under control of the A10 and B10 tubes are utilized. This will be described further in connection with the multiplication step relating to the conversion of fractional portions of pounds and shillings to pence.

J RING

Thus far it has been explained how the B ring, under the control of the A ring, develops groups of pulses representative of digits from one through ten. The multiplicand keyboard will be used to select the appropriate groups of these pulses to develop the decimal or multiplicand number which is being multiplied. The next problem is to add the selected groups of pulses into the appropriate accumulator order banks the correct number of times according to the multiplier factor. This is effected under the joint control of the J ring and the sterling keyboad setting, with the J ring automatically stepping up to the keyboard setting. The multiplier factor, which is the sterling quantity, dictates the number of times the multiplicand pulse groups are added into the accumulators.

The J ring is illustrated in FIGS. 17 and 18 and includes a J0 tube, a J Delay tube, and J1 through J9 tubes. The J ring is very similar to the A ring of FIGS.

13, 14, and 19 in component values, tube types, and manner of connection and firing of the individual tubes, with the exception that only a single J ring tube is permitted to conduct at a time. This is achieved through the conventional practice of employing a common anode resistor 372 (FIG. 18), of 4,700 ohms, connected in the common anode supply line 369 between the tubes of the J ring and the +105-volt (B+ supply) terminal 367 (FIG. 18). Also in this circuit there is included an isolation network in the form of a 0.1-microfarad capacitor 370, connected from the common anode line 369 to ground, and a 100-ohm resistor 368, connected between the anode load resistor 372 and the +105-volt terminal 367.

It will be recalled that, during presetting, the relay contacts **4*a*1 were closed to supply anode potential to the J ring tubes. The relay contacts 4*a*1, of course, remain closed during the entire operation of the machine. It should also be recalled that the J0 tube (FIG. 17) of the J ring was preset "on" by closure of the relay contacts 5*a*1, which connected the positive 105-volt biasing source from terminal 410 to the control electrode circuit for the J0 tube. The cathode 776 of the J0 tube is connected through the 22,000-ohm cathode resistor 424 to the common ground lead 777. The control electrode 409 of the J0 tube is normally supplied with a negative bias by being connected over the 47,000-ohm grid resistor 415 and the 1-megohm resistor 414 to point 425, which is connected to ground over a 47,000-ohm resistor 426, and is connected to the −75-volt terminal over a 270,000-ohm resistor 427. When contacts 5*a*1 close, the point 425 is also connected over 100,000-ohm resistor 413 to the +105-volt terminal 410 to overcome the normal negative bias on the tube and cause it to fire. This arrangement is such as to fire the J0 tube when the armature 408 of the relay contacts 5*a*1 is closed. During presetting, these contacts are later opened and remain open throughout the machine operation. However, the J0 tube remains conducting because it is a gas tube of the GL5663 variety. Subsequently, after the J0 tube has been extinguished, it can only be fired over its input pulsing line 778, which receives a pulse whenever conduction is shifted in the M chain of control tubes. The pulse lead 778 of FIGS. 17 extends to the anode circuit of a normally conducting triode section 779** of a 12AU7 tube, shown in FIG. 14.

The triode 779 has a grounded cathode 780 and a control electrode 781 connected through a 100-ohm grid resistor 782 and a 100,000-ohm biasing resistor 783 back to the cathode. The biasing resistor 783 is included in a voltage divider arrangement having a 2.2-megohm resistor 784 connected to the +250-volt common anode supply line 398. The anode 785 is connected through a 47,000-ohm resistor 786 to supply line 398. This voltage divider arrangement insures that the triode 779 is normally conducting. A pulsing path, including input lead 787 and a 100-micro-microfarad capacitor 788, extends through a diode 789, of the 1N65 type, to the junction point 790 (FIG. 25) between the common load resistor 376 for the M chain tubes. Consequently, whenever conduction is shifted in the M chain tubes, a negative pulse appears at junction point 790 due to a new M tube coming on. This negative pulse is transferred over lead 787, and by way of the biased diode 789 (FIG. 14), to the control electrode 781 of the normally-conducting triode 779.

The purpose of the diode 789 is to remove the "hash" from this negative signal. The biasing arrangement includes a 100,000-ohm resistor 791, connected from the anode side of the diode to the junction point of a pair of voltage dividing resistors 792 and 793, of 51,000 ohms and 22,000 ohms, respectively. The two resistors 792 and 793 are connected from the +250-volt line 398 to ground, so that suitable voltage division is provided for the diode 789. In this manner, a threshhold value is established, so that the "hash" and the lesser-amplitude portion of the negative pulses from the M chain are blocked to remove the "hash." Negative going pulses having an amplitude of more than 18 volts are passed onto the control electrode circuit for the triode 779. This signal is sufficient to cut off the triode 779, causing a positive pulse to appear on its anode output lead 778, which is the input pulsing line for the J0 tube of FIG. 17. The 10-micro-microfarad capacitor 795 in lead 778 passes the pulse to the control electrode 409 by way of the grid resistor 415 to fire the J0 tube.

When the J0 tube is fired, it primes the J Delay tube, which will be fired by the next A0–Tally pulse. The biasing circuit for the J Delay tube is a voltage divider arrangement including a 1.3-megohm resistor 800, connected from the cathode junction point 801 of the J0 tube to the control electrode 802 of the J Delay tube, and a 1.5-megohm resistor 803, connected from the control electrode 802 of the J Delay tube to the −75-volt common lead 804, as supplied by the terminal 805. Since the cathode resistor 424 of the J0 tube has a value of only 22,000 ohms, it does not materially affect the potential distribution in the priming circuit for the J Delay tube. This biasing circuit, including the component values, is very similar to the biasing circuit used by the A ring tubes, in that the potential of the J Delay tube control electrode 802 is about −38 volts in the absence of conduction in the J0 tube and about +9 volts when the J0 tube is priming the J Delay tube. This situation prevails throughout the tube circuitry for the remaining tubes of the J ring.

The J Delay tube is fired from common pulsing line 697 over a 10-micro-microfarad capacitor 807 and a 47,000-ohm grid resistor 808, connected to the shield grid 809. The pulsing line 697 extends back to the output lead 696 (FIG. 19), connected to the cathode junction point 695 of the A0 Tally tube. Consequently, the first tally pulse following conduction in the J0 tube will fire the J Delay tube. The J0 tube is assisted in extinguishing by a 0.005-microfarad capacitor 796, connected from ground through a 2,200-ohm resistor 797 to the cathode 776 of the J0 tube. The capacitor holds the cathode potential high as the J Delay tube comes on, dropping the anode potential, thereby insuring the extinction of the J0 tube.

Firing of the J Delay tube primes the J1 tube in the same manner as the J0 tube primed the J Delay tube. However, the J1 tube input pulsing lead 810 is connected to the output lead 581 (FIG. 19) for the A ring cathode-follower tube 453. The A ring cathode-follower tube continuously supplies 0° pulses, so that the J1 tube (FIG. 17) will be fired on the first 0° pulse following conduction in the J Delay tube. The remaining J ring tubes—namely, J2 through J9—have their shield grids connected to the common pulsing lead 697 for firing only by tally pulses from the A ring.

The reason for this pattern is the fact that a very short time interval—namely, one 0° pulse time—is provided by the J Delay tube in order to permit the cathode potential of the J0 tube to be settled whenever the J0 tube is required to be refired shortly after it has been extinguished. This condition occurs only when the multiplier factor is unity and the multiplicand is to be entered into the accumulators only once. Later on, reference to the timing charts will be had to clarify this condition further.

The purpose of the J ring is to cause the decimal multiplicand to be entered into the accumulators the appropriate number of times as dictated by the sterling multiplier factor. However, this function is not achieved by the J ring alone because all that the J ring does is count off the number of times the multiplicand pulse groups are to be formed for entry into the accumulators. For example, if, as in the sample problem of FIG. 1, the pence multiplier factor is 4, the J ring will step to the J4 tube before it exercises any control. During this period, the M1 tube will have opened paths to the appropriate order banks of the accumulators. As the J ring steps to its "four" setting, the multiplicand 03.24 is developed four times in the form of pulse groups. Similarly, if the multiplier factor were 11 pence, the J ring would step to its J1 setting to enter the preliminary product of 1×03.24, at which time the J ring would initiate a control to step the M chain, so that the next time the multiplicand pulse groups, representative of the number 03.24, were developed they would be entered into different order banks of the accumulators under control of the M tube.

K RING

The foregoing is accomplished under control of the J ring, which operates the K ring and the M ring, all as dictated by the setting in the sterling keyboard. The K ring includes the K1 through K9 tubes, each connected in cathode-follower fashion and operated by the corresponding J ring tube in the manner of the A-ring-to-B-ring relation. However, the purpose of the K ring is to select 180° pulses, at times determined by the J ring, for switching of the M chain.

Each of the K ring tubes is a triode section of a 12AU7 type tube. The circuitry associated with the K1 tube (FIG. 17) will be described as being representative of each of the K tube circuits. The anode 811 is connected to the common B+ supply line 812, which is attached to the +360-volt terminal 813. The cathode 814 is connected through a 10,000-ohm resistor 815 to the +95-volt terminal 816. A 1,000-micro-microfarad capacitor 817 is connected across the load 815 for pulse shaping and high frequency transient filtering purposes. The control electrode 818 has a D.C. biasing path over the 100,000-ohm resistor 819 and by way of lead 820 to the junction point 821 in the cathode circuitry of the J1 tube. A 2,200-ohm resistor 822 extends the biasing circuit to the cathode 823 of the J1 tube.

Consequently, when the J1 tube is conducting, the K1 tube is primed (+85 volts on its control grid relative to 95 volts on its cathode) and is then receptive to 180° pulses applied to its control electrode 818 by way of a 250-micro-micro-farad capacitor 824 connected to input pulsing lead 825. The pulsing lead 825 is common to all of the K ring tubes, K1 through K9, and is connected to the lead 543 (FIG. 18), which extends to the output circuit of the 180° power amplifier pentode 520 of FIG. 13. Since the 180° pulse tube 520 is continuously supplying pulses to the K ring tubes, output pulses will appear on lead 826 of the K1 tube (FIG. 17) only when the J1 tube is conducting.

In this manner, each of the K ring tubes supplies 180° output pulses whenever gated on by the corresponding J ring tube. The output leads from the K ring tubes are collected and identified in FIG. 18.

The output pulses (of the 180° variety) from the K ring are selectively applied by the sterling keyboard of FIGS. 22 through 24 to tubes of the M chain of FIGS. 25 through 28 to advance conduction along this chain. The output leads for the K ring identified by the K1 through K9 letters, collected in FIG. 18, are continued as the leads K1 through K9, bracketed in FIG. 22. These output leads are then extended through the banks of the sterling keyboard, according to the setting therein, and thence to the M ring tubes to serve as firing lines therefor.

M CHAIN

*Pence Multiplier Factor of 11 Assumed for Timing Charts of FIGS. 5 and 5A*

It has already been explained that the M1 tube of FIG. 25 is preset to its "on," or conducting, condition if there is a key depressed in the Units Pence keyboard of FIG. 22. The timing charts of FIGS. 5 and 5A have been drawn for a problem involving a multiplier factor of 11 pence, as relatively few A ring cycles are required in this multiplication, and the charts are not excessively extensive. It will be assumed, for the purposes of the present discussion, that the pence multiplier factor of 11 is set into the sterling keyboard. Since the units denominational order digit in the pence multiplier factor is "on," the "1" key 417 of the Units Pence keyboard was depressed. This condition insured that the M1 tube was fired during presetting.

The anode supply for the M1 tube is established over the common 1,500-ohm anode resistor 376 by way of the lead 374, which extends back to the +105-volt terminal 367 of FIG. 18. When the contacts **4*a*1** of relay coil RL4 were closed during presetting, the B+ supply lead was connected to the +105-volt terminal.

Since the shield grid 831 of the M1 tube (FIG. 25) is connected back to the cathode 832, this tube must be fired on its control electrode 422 (contrary to the firing circuits of the rest of the M chain tubes).

The normal D.C. biasing circuit for the M1 tube includes the 1.3-megohm resistor 432, connected over lead 427 to the −75-volt terminal 423, and the 1.3-megohm resistor 431, connected back over lead 421 (by-passed to ground by a 0.01-microfarad capacitor 830) and through the Units Pence keyboard of FIG. 22 by way of the contacts 420, now closed by the switch arm 418 of the "1" key stem 419, and then along leads 433 and 416 back to the +105-volt terminal 410 of FIG. 17.

It may thus be seen that when the relay contacts **5*a*1 (FIG. 17) are closed to connect the +105 volts of terminal 410 to the biasing circuit for the control electrode 422 of the M1 tube (FIG. 25), the voltage divider action of the 1.3-megohm resistors 431 and 432 (FIG. 25) suddenly elevates the potential level of the control electrode 422 of the M1** tube from −75 volts to about +15 volts to fire this tube.

In the manner of the A ring or the J ring, the tubes of the M chain prime the next tube to be fired; e.g., the cathode 832 of the M1 tube (FIG. 25) is connected through a 12,000-ohm cathode resistor 833 to the common ground lead 834, so that the cathode junction point 836 assumes a potential of about +90 volts, suitable for priming purposes. The priming lead 835, for the next tube to be fired in the M chain, is connected from the cathode junction point 836 of the M1 tube and extended over a 1,000-ohm resistor 837 to the Units Pence keyboard of FIG. 22. Due to the fact that the "1" key 417 is depressed, the contacts 838 are now closed by the switch arm 839 to continue the path along lead 840 and then via lead 433 to the Tens Pence keyboard.

In the problem which was assumed for purposes of firing both the M1 and the M2 tubes, the pence keyboard was set to 11 pence. Hence the "1" key 436 of the Tens Pence keyboard is depressed. This enables the priming path from lead 433 to be extended over contacts 841 by switch arm 434 and on to lead 437, which is connected to the control electrode 438 of the M2 tube of FIG. 25.

A similar voltage divider arrangement is included in this priming circuit, in that a 1.3-megohm resistor 842 is connected between the control electrode 438 of the M2 tube and the cathode junciton point 836 of the M1 tube, and a further 1.3-megohm resistor 843 is connected from the control electrode 438 to the −75-volt common lead 844. In the absence of conduction in the M1 tube, the potential at control electrode 438 of the M2 tube is about one half of the −75 volts of line 844. However, when the M1 tube is conducting, the potential of the control electrode 438 of the M2 tube is raised to about +9 volts by voltage divider action. It now remains to fire the M2 tube on its shield grid 439.

However, it should be mentioned that, before the M2 tube is fired, the M1 tube is capable of priming any other M tube in lieu of the M2 tube. This is, of course, under the control of the sterling keyboard, and a problem involving a pence factor of 11 has been selected to insure that the M2 tube would be primed by the M1 tube and successively fired.

It will merely be pointed out at this time that, if the pence multiplier factor was 01 rather than 11, for example, the M2 tube would be skipped, and the next M tube to be fired would be determined by the next order of the sterling multiplier in which a digit occurred. Again, for example, if the sterling multiplier contained a digit in the lowest order of the shillings multiplier factor, it would be the M3 tube which would be primed and subsequently fired. However, if the shillings multiplier factor were 10, for example, both the M2 and the M3 tubes would be skipped, and the M4 tube would be primed and subsequently fired.

It is now the purpose to explain how the M2 tube is fired when there is a setting in the Units Pence and Tens Pence keyboards. This will require the cooperation of the J ring and the K ring of FIGS. 17 and 18 to exercise such a control through the Units Pence and the Tens Pence keyboards of FIG. 22. Since the tens order of the pence multiplier factor 11 is 1, it will be the J1 and K1 tubes which enable the M2 tube to be fired. The J ring of FIG. 17 will be stepped up to its J1 setting; i.e., conduction will be established in the J1 tube, so that the output lead 820 will supply a suitable biasing potential to the control electrode 818 of the K1 tube. Once the K1 tube is gated on, the first 180° pulse on pulsing line 825 from the 180° pulse source power amplifier pentode tube 520 of FIG. 13 will pass through the K1 tube and appear on output lead 826. The output lead 826 is continued from FIG. 18 to FIG. 22, where a path is extended over lead 850 and through contacts 851, now closed by the switch arm 852, and thence back down lead 853 and through contacts 854, now closed by switch arm 444, to lead 855, which connects to lead 443 as it leaves the Units Pence keyboard and extends to the shield grid 439 (FIG. 25) of the M2 tube by way of coupling condenser 448 and shield grid resistor 447. Consequently, this first pulse to pass through the K1 tube of FIG. 17, under control of the J1 tube, causes the M2 tube (FIG. 25) to be fired, which in turn extinguishes the M1 tube.

Extinguishing of the M1 tube is effected in conventional fashion by the common anode resistor 376 in the manner of the J ring, heretofore explained. The cathode circuit of the M1 tube is equipped with the usual component to insure that this tube becomes non-conducting when the M2 tube assumes the conducting condition. This component is the 0.01-microfarad condenser 856, connected between the common ground lead 834 and through the 1,000-ohm resistor 857 to the cathode junction point 836. The condenser holds the cathode potential near its then +90-volt level sufficiently long to enable the M1 tube to be extinguished.

It has previously been mentioned how the negative pulse, developed at the common anode resistor 376 (FIG. 25), for the M chain is transmitted over lead 787 and through the clipper diode 789 of FIG. 14 to the normally-conducting triode 779, which in turn passes a positive pulse on its output lead 778 to the control electrode 409 of the J0 tube of FIG. 17. This operation resets the J ring, so that it may now proceed to count the required number of A ring cycles to develop the multiplicand pulse groups, a number of times corresponding to the next setting in the sterling multiplier keyboard.

The foregoing operations, including those of the J ring, the K ring, and the M chain, as dictated by the sterling keyboard, will now be represented in the timing charts of FIGS. 5 and 5A. The sterling multiplier keyboard contains the assumed multiplier factor of 11 pence. The 0° pulse generator and the 180° pulse generator are operating to produce the 0° pulses 101 of Line 1 and the 180° pulses 102 of Line 2. The A Start tube of Line 3 has been preset on, as indicated at 109; also, the J0 tube of Line 12 has been preset on, as indicated at 132; and the M1 tube is conducting, having been fired during presetting, as illustrated on Line 16 at 146. The J0 tube remains conducting until the occurrence of the first Tally Pulse, shown on Line 5 as the pulse 115, and indicated at the top of the timing chart by the A Tally–1 time. It will be recalled that the A tally pulse was used to fire the J Delay tube and the J2 through J9 tubes, but that the first 0° pulse followig a tally pulse fired the J1 tube when it was primed from the J Delay tube.

While the J0 tube is conducting, as shown at 132 on Line 12, the J Delay tube of Line 13 is primed but not fired. However, upon the occurrence of the tally pulse 115 (Line 5), the J Delay tube, as shown on Line 13, is fired, and the J0 tube, as shown on Line 12, is extinguished. The J Delay tube conducts for one 0° pulse time interval, as shown at 133 on Line 13. During this interval, the J1 tube of Line 14 is primed by the J Delay tube. The first 0° pulse 101' to occur after the A Tally–1 time fires the J1 tube, as shown on Line 14 at 134, which in turn extinguishes the J Delay tube. During conduction of the J1 tube, the K1 tube is gated on, so that the first 180° pulse to reach the K1 tube at this time is passed to the output circuit of the K1 tube. This pulse is indicated at 149 on Line 15. It is this pulse which fired the M2 tube, as shown on Line 17 at 151. Firing of the M2 tube caused the M1 tube of Line 16 to be extinguished. Then a negative pulse (not shown) from the M chain, occasioned by the M2 tube coming on, was applied back to the J0 tube to re-initiated conduction therein, as illustrated on Line 12.

The purpose of the J Delay tube should now be apparent, in that it has provided a time interval, extending the period between the time that the J0 tube was extinguished and the time that it was re-fired. This enabled the cathode potential of the J0 tube to become sufficiently settled to insure its proper firing, when required. It might be pointed out that the J Delay time interval is not required at all times preceding the switching of conduction in the M chain. As a matter of fact, the J Delay interval occurs only when the J1 tube (through the K1 tube) controls the shifting of conduction in the M chain. Explained another way, the J Delay interval is only present immediately preceding the switching of M chain tubes when the multiplier factor is 1. If the multiplier factor be 2 or more, the J0 tube will be off sufficiently long to enable its cathode to recover, because the J1 or higher order J ring tubes will have conducted for an A ring cycle time less one 0° pulse time interval or for a full A ring cycle time.

At this time, the multiplication of the decimal multiplicand 03.24 by the units order digit 1 of the pence multiplier factor of 11 has been concluded. The groups of 3, 2, and 4 pulses have been selected from the B ring outputs by the multiplicand keyboard and applied into the appropriate orders of the pence accumulator under control of the M1 tube, one time as dictated by the sterling keyboard and carried out by the J ring and the K ring. Control has now been shifted to the M2 tube, so that the above process can be carried out again, but this time for the multiplication involving the tens order pence multiplier factor of 1. It is the M2 tube which sets the controls to insure that the multiplicand pulse groups are applied to the appropriate accumulator orders, the different banks selected being shifted one order from those selected by the M1 tube for the multiplication resulting from the Units Pence multiplier factor. The J ring and the K ring operate in precisely the same manner as before because the sterling keyboard contains a "1" setting in the tens pence keyboard, the same as the "1" setting in the Units Pence keyboard. Consequently, the J Delay tube will be fired by the second A0 Tally pulse 115' as indicated at 133' on Line 13 of FIG. 5A, and the J0 tube of Line 12 will be extinguished. The J1 tube is then fired, as shown at 134' on Line 14, by the first 0° pulse 101'' following the A0 Tally pulse 115' to allow the K1 tube to pass the 180° pulse 149' of Line 15 to the M3 tube of the M chain, since there is a digit in the units order of the shillings multiplier. The M3 tube is thus fired, as indicated at 147 on Line 18, and the M2 tube is extinguished thereby. At this time, the circuit is ready to effect the multiplication of the lowest order shillings multipler factor.

Returning to the sample problem of FIG. 1, it will be noted that the shillings factor is 06, indicating that the M3 tube will be used to open a path to the appropriate orders of the accumulator but that the M4 tube will be skipped. Also, in the sample problem of FIG. 1, the pence factor is 04, which number, when set into the sterling keyboard, occasions conduction in the M1 tube but omission of control by the M2 tube.

It will now be shown how the M1 tube primes the M3 tube when the former is conducting, it being noted that the M2 tube is skipped because of the absence of a tens order pence factor. When the M1 tube of FIG. 25 is conducting, the potential of its cathode junction point 836 is about +90 volts. This potential will be used to prime the next M ring tube selected for control purposes in the situation under consideration. This is the M3 tube. The priming circuit will, accordingly, now be extended from the M1 tube to the M3 tube. The lead 835 from the cathode 832 of the M1 tube is extended through the Units Pence keyboard of FIG. 22, it being borne in mind that the "4" key 861 is depressed. Accordingly, the priming path is extended from lead 835 by the switch arm 862 of the "4" key 861, which switch arm closes contacts 863 to connect the priming lead 835 to lead 840. Lead 840 is connected to lead 433, the connection between the Units Pence and the Tens Pence keyboards of FIG. 22.

The Tens Pence keyboard setting is 0, so that the "1" key 436 is in the position shown, with the switch arm 434 extending the lead 433 to the further priming lead 865, a connection between the Tens Pence keyboard and the Units Shillings keyboard of FIG. 23. The priming lead 865 is connected through the Units Shillings keyboard by the switch arm 866 of the "6" key 867. The priming lead 865 is connected through the Units Shillings keyboard by the switch arm 866 of the "6" key 867. The switch arm 866 closes the contacts 868 to extend the priming circuit from lead 865 to lead 869, which connects to a voltage divider arrangement in the circuit to the control electrode 870 of the M3 tube (FIG. 25).

While the M1 tube is conducting, the M3 tube is primed thereby and will be fired by a K4 pulse due to the pence factor of 4. The K4 pulse (from the K ring) appears on lead 871 of FIG. 22, where it follows a lead 872, which extends to the Units Pence keyboard of FIG. 22. The "4" key 861 is depressed, so the switch arm 873 closes contacts 874 to connect the lead 872 to the lead 853, which lead is further extended through the "4" key contacts 875 by the switch arm 876. From the now-closed contacts 875, the firing path is extended over lead 855 to lead 443, which has a branch 878 extending to the Tens Pence keyboard of FIG. 22.

Again, since the "1" key 436 of the Tens Pence keyboard is unset, its switch arm 879 closes its contacts 880 to connect the lead 878 to a further lead 881, which is connected to the shield grid 882 of the M3 tube (FIG. 25). In this manner, the K4 pulse fires the M3 tube while it is primed from the M1 tube.

The M3 tube primes the M5 tube in order to accommodate the lowest order of the pounds multiplier factor, the M4 tube being skipped due to the absence of any tens order digit in the shillings multiplier factor. It should now be apparent that the priming and firing of the M ring tubes M1 through M8 is under control of the sterling multiplier factor, as set into the sterling keyboard of FIGS. 22 through 24. Priming is accomplished through the next higher order keyboard setting having a digit set therein, whereas firing is effected from the keyboard setting which registers the multiplier factor which is controlling the multiplying process and over any omitted banks.

However, it has not been explained how one of the higher order M ring tubes is initially primed and fired, or preset, in the event that the lower order sterling multiplier digits are missing. For example, assume that there is no setting in the Units Pence and Tens Pence keyboards of FIG. 22 and that the lowest order setting is a "6" in the Units Shillings keyboard of FIG. 23.

In the instant situation, the M3 tube of FIG. 25 is preset to its operative condition in lieu of the M1 tube. The priming source for the M3 tube is the +105-volt terminal 410 in FIG. 17. During presetting, the relay contacts 5*a*1 are closed by the armature 408 to connect the +105-volt terminal over lead 416 and through the unset Units Pence keyboard of FIG. 22 to lead 433, which extends through the unset Tens Pence keyboard via switch arm 434. The priming path is then over lead 865, which extends through the Units Shillings keyboard to the "6" key 867, where the contacts 868 are closed by the switch arm 866 to continue the priming path over lead 869 to the control electrode 870 of the M3 tube (FIG. 25).

The M3 tube is fired during presetting subsequently to the application of the priming voltage thereto. The source of firing potential is the +105-volt terminal 441 (FIG. 22), which is connected to lead 443 when the relay contacts 7*a*3 are closed. The contacts 7*a*3 for the firing source are operated after the controls 5*a*1 for the priming source. The lead 443 extends through the Units Pence keyboard and over conductor 878 (FIG. 22) to pass through the Tens Pence keyboard via now-closed contacts 880 and thence via lead 881 on to the shield grid 882 of the M3 tube (FIG. 25).

It has now been shown how a preceding M chain tube primes a succeeding M chain tube for firing under control of the multiplier factor in the sterling keyboard. It has also been shown how priming and firing takes place when one or more M chain tubes are omitted in the sequence and also how it is actually possible to preset on a higher order M chain control tube.

The multipler factor has been represented in the problem by the M1 through M8 tubes. The M1 and M2 tubes have controlled entries into the accumulator when the pence factor of the sterling multiplier was being used. In the same manner, the M3 and M4 tubes set up paths to the appropriate order banks of the accumulator for multiplication by the shillings factor, while the M5 through M8 tubes were similarly used for the pounds multiplier factor.

MULTIPLICAND

The multiplicand of the sample problem of FIG. 1 is 03.24. If used, the decimal point is always in the multiplicand. The provisions for a shiftable decimal point involve rather complex switching circuits generally throughout the apparatus of the instant machine. For this reason, the operation of the machine, as to its detailed circuitry, will first be explained utilizing a problem which avoids any decimal fraction. This is stated at this time because it is the multiplicand which employs a decimal point and, although the formation of the pulse groups representative of the multiplicand digits is the same, the switching paths to the orders of the accumulator are considerably different.

Figure 20:
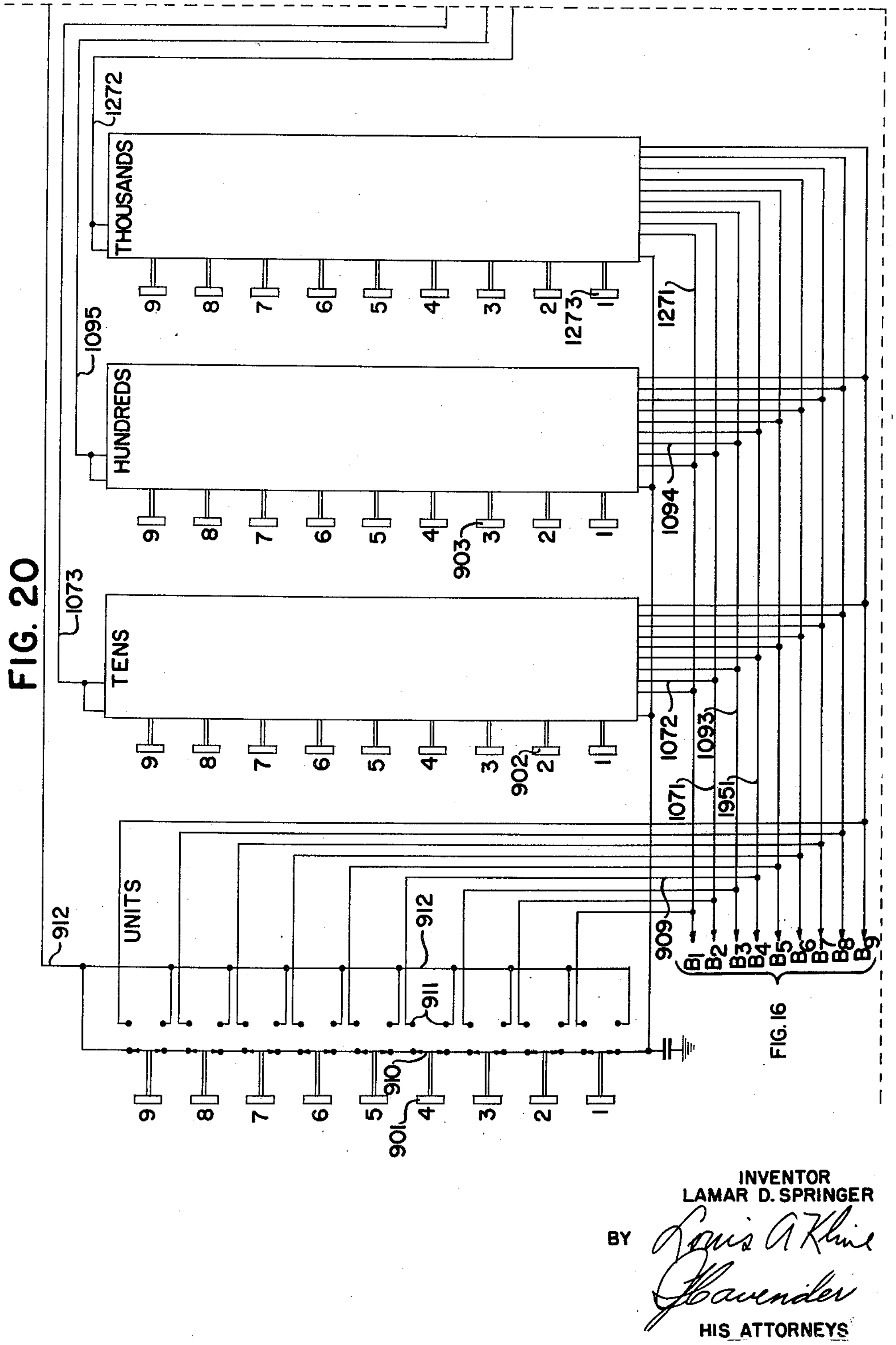

Accordingly, for the moment, the multiplicand will be the whole number 324 rather than the decimal fractional number 3.24, but the multiplier will remain unchanged; i.e., 21 pounds, 06 shillings, and 04 pence. In FIG. 20, the Units through Thousands order keyboards for the multiplicand are shown, the Units order being detailed and the remaining orders (since they are duplicates) being shown in block form. In the multiplicand number 324, the units digit 4 is set into the Units keyboard through depression of the "4" key 901. In the same manner, the "2" key 902 of the Tens order is depressed, and the "3" key 903 of the Hundreds order is set. The development of this multiplicand, and its entry into the appropriate order banks of the accumulator, will now be described.

In general, the groups of pulses corresponding to the multiplicand digits will be obtained from the B ring of FIGS. 15 and 16 in accordance with the setting of the multiplicand keyboards of FIG. 20. Multiplicand output gates in the form of cathode-follower-connected half-triode sections of the 12AU7 type tube, such as the tube 904 (FIG. 21), are provided between each of the multiplicand keyboard order banks and the pence accumulator of FIGS. 34 and 35. The gates, as indicated at 904 (FIG. 21), are opened under control of the M chain tubes which are responsible for setting up paths to the appropriate order banks of the accumulator. In this manner, any of the M1 through M8 tubes is permitted to control the output from any of the Units through Thousands order banks of the multiplicand keyboard of FIG. 20.

Figure 21:
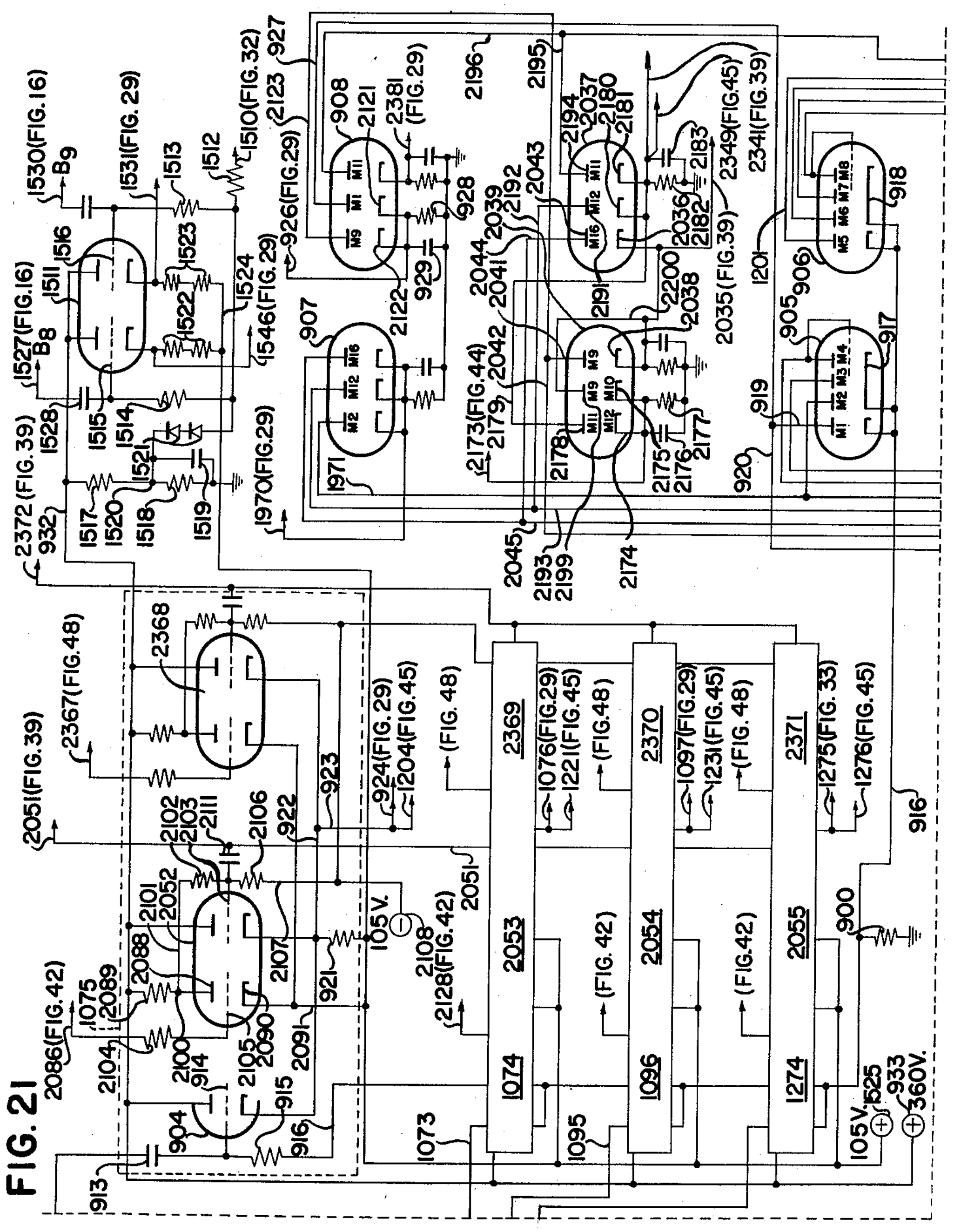

A plurality of diodes contained in the multiple envelopes 905 and 906 of FIG. 21 serve as isolation devices for the M chain tubes which are the source of gating potential via the diodes for the multiplicand output gates 904 in FIG. 21. The pulse groups which pass through the multiplicand keyboard output gates are applied to the Pence Input Switching Matrix shown to the upper left of FIG. 33 and in the center of FIG. 29. Suitable paths are provided through the Pence Input Switching Matrix of FIGS. 29 and 33 by the M chain tubes of FIGS. 25 and 26 by way of the isolation diodes contained in multiple envelopes 907 and 908 of FIG. 21. It might be mentioned that pence input amplifiers are shown in FIGS. 30 and 31 as being connected between the Pence Input Switching Matrix of FIGS. 29 and 33 and the pence accumulator of FIGS. 34 and 35.

The foregoing outlines generally the procedure to be followed. A detailed explanation will now be given wherein the whole number multiplicand 324 will be represented by pulse groups which are selected by the multiplicand keyboard of FIG. 20 and ultimately added into the proper order banks of the pence accumulator of FIGS. 34 and 35. The decimal quantity 324 requires three groups of pulses for suitable representation; namely, a group of three pulses, a group of two pulses, and a group of four pulses. Formation of the group of four pulses is begun two 0° pulse time intervals prior to the beginning of the formation of the group of two pulses, and the group of three pulses is begun one 0° pulse time prior to the beginning of the group of two pulses; however, the last pulse in each group is formed simultaneously. For this reason, the counts occur substantially simultaneously and are, accordingly, handled in parallel fashion. This will be illustrated in the preliminary multiplication of the decimal quantity 324 by the pence factor of 04.

It has previously been shown how the A ring cycles to form the pulse group controls which make available the pulse groups at the respective B ring tubes. It has also been shown how the J ring steps up to the particular multiplier digit then in control to enter the multiplicand once for each cycle of the A ring which caused the stepping of the J ring.

Considering now the formation of the group of four pulses, it will be appreciated that the B4 tube of FIG. 15 passes four 0° impulses onto the output B4 lead 1951, which is shown continued in FIG. 20. A path for the group of four pulses is provided by the lead 909, which extends into the Units order of the multiplicand keyboard, where the switch arm 910 of the "4" key 901 closes the contacts 911 to connect lead 909 to the output lead 912. This output lead is connected over a 250-micro-micro-farad condenser 913 (FIG. 21) to the control electrode 914 of the cathode-follower gate triode section 904.

A D.C. biasing path for this tube section is provided over the 240,000-ohm grid resistor 915 by way of lead 916, which is converted over a 100,000-ohm resistor 900 to ground and extends to the common cathodes 917 and 918 of the multiple envelope diodes 905 and 906. At the present time, the M1 tube is conducting in order to provide the controls for the multiplication by the units pence factor of 4, and, accordingly, the left-hand diode section of envelope 905 (FIG. 21) will be conductive because its anode lead 919 extends back over leads 920 and 835 to the cathode junction point 836 (FIG. 25) of the M1 tube. Consequently, a suitable D.C. bias will be supplied to the triode gate 904 (FIG. 21) to pass the group of four pulses to the cathode output load resistor 921, of 3,000 ohms.

The output connection from the load resistor 921, which is currently used, is the combination lead 922, 923, and 924, which is continued as an input lead for the Pence Input Switching Matrix of FIG. 29. The diode 925 (of the 6BC7 type) will pass this group of four pulses because the anode has B+ voltage supplied thereto by the lead 926, which extends from the now-conducting M1 tube. The lead 926 is continued in FIG. 21, where the middle isolation diode of the multiple envelope 908 is conductive, over lead 927, which extends back to lead 920 (FIG. 21), the cathode output lead of the M1 tube of FIG. 25. Consequently, with the M1 tube conducting, the B+ supply is developed across the 47,000-ohm load resistor 928, shunted by the 0.001-microfarad capacitor 929, so that the lead 926 applies positive potential through the 22,000-ohm load resistor 930 (FIG. 29) to the anode 931 of the Pence Input Switching Matrix diode 925.

The group of four pulses leaves the Pence Input Matrix via the cathode output lead 941 for the diode 925. The output lead 941 is connected to the wiper 942 of a decimal wafer switch generally indicated at 943 in FIG. 29. Since the problem under consideration is one involving only whole numbers, the decimal wafer switch is set in its whole number position, in which the wiper 942 extends to the "1" terminal, which is connected to a lead 944, which serves as the input pulse lead for a triode amplifier section contained in the envelope 945 of FIG. 30. The left-hand triode section of this envelope serves as a pence accumulator input amplifier, its purpose being to increase the amplitude of the pulses being entered into the accumulator. The tube 945 preferably is of the 12AT7 type. The left-hand amplifier section has its anode 946 connected through a common 100,000-ohm load resistor 947 to the +360-volt B+ supply terminal 948. The cathode 949 of the pence accumulator input amplifier is connected over common lead 950 to the +96-volt terminal 951, the latter being by-passed to ground for transients by a 0.1-microfarad capacitor 952.

Returning now to the input pulsing lead 944 for the left-hand amplifier section of tube 945, it will be seen that the group of four pulses appears as voltage changes across the 100,000-ohm grid resistor 953, which is connected to the +85-volt terminal 954. At the control electrode 955 of the pence input amplifier, the multiplicand pulses have a magnitude of about 50 volts. The amplified pulses appear inverted on the output lead 956 for the pence input amplifier tube section. The output lead extends to the accumulator circuitry of FIG. 34, where the lead 956 serves as the input pulsing line for the units order of the pence accumulator.

The units order of the pence accumulator circuitry is shown in detail in FIG. 34, and the transfer or carry stage for this recycling binary type counter is included in FIG. 35, where the remaining pence order banks #2 through #7 are depicted in block form, being mere duplicates of the detailed circuitry of FIGS. 34 and 35, now to be explained. The recycling binary counter of FIG. 34 is conventional in nature, at least so far as the general principles of operation are concerned. A sufficient understanding of the counting or accumulating operation may be had from a reading of United States Patent No.

2,591,008, entitled Electronic Accumulator, filed January 7, 1950, and issued to Carl F. Rench on April 1, 1952.

During the following description, it should be borne in mind that not only the order banks of the pence accumulator but also each order bank of the shillings and pounds accumulators comprises a recycling binary type counter, as shown in FIG. 34. The counter includes four trigger pair stages, identified at 961, 962, 963, and 964, with a fifth trigger pair stage 965, serving in a transfer or carry stage. The binary counter counts in normal fashion until the count of 8 is attained, at which time the second and third trigger pairs, 962 and 963, are forcibly reset by a D.C. voltage developed in the fourth trigger pair 964. Recycling at this point causes the count 8 to become, in effect, a count of 14. Then, a count of 9 corresponds to 15, and a count of 10 is 16, which is the same as 0 so far as the condition of the trigger pairs is concerned. This will be more apparent from the pattern of conduction given in the following chart.

CONDUCTION CHART

| Position | Pairs | | | |
|---|---|---|---|---|
| | $2^0$ | $2^1$ | $2^2$ | $2^3$ |
| 0 | O | O | O | O |
| 1 | X | O | O | O |
| 2 | O | X | O | O |
| 3 | X | X | O | O |
| 4 | O | O | X | O |
| 5 | X | O | X | O |
| 6 | O | X | X | O |
| 7 | X | X | X | O |
| 8 | O | O | O | X |
| Recycle | O | X | X | X |
| 9 | X | X | X | X |
| 10 | O | O | O | O |

NOTE.—O=Off condition, left triode non-conducting; X=On condition, left triode conducting.

It will be noted that the O state for the counter is illustrated by conduction in the right-hand tube sections of each of the trigger pairs 961 through 964. The X state is then attained when conduction is shifted to the left-hand tube section. However, it might be noted that the normal condition (no carry being stored) for the transfer trigger pair 965 (FIG. 35) is conduction in the left-hand side.

The tride sections comprised in each trigger stage are preferably of the 12AT7 type. Considering the first stage, included in envelope 961, the cathodes 966 and 967 (FIG. 34) are connected to the common cathode lead 968 which is extended to the —40-volt terminal 969 (FIG. 35). The anodes 970 and 971 are connected through their respective 47,000-ohm load resistors 972 and 973 to the common B+ supply lead 974, which is connected to the +210-volt terminal 975 of FIG. 35.

From the anode 970 of the left-hand triode section of the first trigger pair, a coupling path is provided over a 200,000-ohm resistor 976, shunted by a commutating condenser 977, of 100 micro-microfarads, and via lead 978 and a 100-ohm parasitic suppressor resistor 979 to the control electrode 980 of the right-hand section, the D.C. biasing resistor 981, of 330,000 ohms, being connected to the —190-volt terminal 982. The same type of coupling is provided between the anode 971 of the right-hand tube section of trigger pair 961 and the control electrode 983 for the left-hand triode section of this trigger pair, the —190-volt terminal 984 being used as the voltage supply for this coupling network.

The input pulsing lead 956 for the counter of FIG. 34 is connected between a pair of capacitors 985 and 986, each of 25 micro-microfarads, so that a coupling path to either control electrode 980 or 983 exists for the negative pulses on input lead 956. The first negative pulse on input lead 956 passes through coupling condenser 986 to influence control electrode 980 and shift conduction from the right-hand trigger section to the left-hand trigger section of trigger pair 961. This is indicated in the conduction chart by the XOOO notation opposite the 1 position. In other words, the only disturbance occasioned by the first negative pulse was the shifting of conduction from the right-hand tube section to the left-hand tube section of the first trigger pair 961. This will be understood by realizing that, each time a negative pulse is applied to a trigger stage, the state of conduction is changed, but the application of a positive pulse to a trigger pair results in no change.

The second negative pulse of the pulse group on input line 956 is effective over capacitor 985 at control electrode 983 to cause conduction to be shifted back to the right-hand section of trigger pair 961. When the right-hand section comes on, the potential at anode junction point 1001 is suddenly depressed, causing a negative pulse to follow leads 1002 and 1003 through diodes 1004 (of the 1N65 type) and over lead 1005, which is the input lead for the second trigger pair 962. The negative pulse from trigger pair 961 is introduced into trigger pair 962 over a 47,000-ohm resistor 1006 and the 25-micro-microfarad coupling capacitors 1007 and 1008. Since conduction is already established in the right-hand tube section of trigger pair 962, the negative pulse from lead 1005 is effective over capacitor 1008 at control grid 1009 to turn this section off, thereby causing the left-hand section of trigger pair 962 to assume the conducting condition. The conduction pattern is not altered further because the output of trigger pair 962 is a positive going pulse which is not capable of switching the next trigger pair. The diode 1004 prevents the positive going pulse from charging the input circuit of trigger pair 962; i.e., capacitors 1007 and 1008. Hence the input circuit for stage 2 is always receptive to a negative going pulse from stage 1. This insures a maximum speed or frequency of operation for the counter. This feature is not disclosed in the identified prior art.

It might also be mentioned that the negative going output from trigger pair 961, which is passed by the diode 1004, also follows conductor 1003 to the fourth trigger pair 964. A 270,000-ohm load resistor 1011 is connected in lead 1003 in series with a 25-micro-microfarad coupling capacitor 1012 for coupling the output of the first trigger pair 961 to the control electrode 1013 of the left-hand triode section of the fourth trigger pair 964. The normal condition, of course, for trigger pair 964 is with conduction in the right-hand tube section thereof, so that the application of a negative pulse to the left-hand control grid 1013 is ineffective at this time to alter this condition.

The application of the third negative pulse to the counter of FIG. 34 over input lead 956 serves to switch conduction from the right-hand side to the left-hand side of the first trigger pair 961, and, since the output of the first trigger pair is a positive going pulse, the remaining trigger pairs are undisturbed. Consequently, the pattern for these tubes is obtained from the conduction chart as XXOO, corresponding to Position 3 therein.

From the conduction chart it can further be seen that the pattern following the application of the fourth negative pulse to the units pence order of FIG. 34 is OOXO. This was occasioned by conduction being shifted from the left-hand section of the first trigger pair 961 to the right-hand section thereof, which provided an output negative pulse over lead 1002 and diode 1004 to the input lead 1005 for the second trigger pair 962. This negative pulse shifted conduction from the left-hand side of trigger pair 962 to its right-hand side, producing a further negative pulse on the lead 1014, which is connected to input lead 1015 for the third trigger pair 963. This trigger pair has so far been undisturbed, so conduction remains in its right-hand tube section. However, the application of this negative pulse shifts conduction to the left-hand section thereof, and the corresponding positive going output from the third trigger pair 963 is ineffective to switch the fourth trigger pair 964. This completes the entry of the four pulses of the units multiplicand digit in the units order of the pence accumulator.

To recapitulate, the M1 tube has been controlling the operation of multiplying the multiplicand 324 by the units pence multiplier factor of four. So far, it has been shown how the pulse groups representative of the multiplicand have been developed and, in particular, how the group of four pulses indicative of the lowest order digit of the multiplicand has been entered into the units order of the pence accumulator once. From the multiplier factor, it will be noted that this process will be repeated four times, so that a total of sixteen counts will be applied to the units pence accumulator of FIG. 34. Although, simultaneously, counts indicative of the multiplicand hundreds and tens digits "3" and "2" are being applied to the hundreds and tens orders of the pence accumulator, it will be clearer if the ensuing description follows the complete entry into the pence units denomination in order to discuss the recycling feature of this counter and its ability to transfer.

Therefore, it will be assumed at this time that the second group of four pulses is applied over input lead 956 to the units order of the pence accumulator of FIG. 34. From the conduction chart it will be seen that the fifth input pulse sets up a conduction pattern of XOXO. Conduction is merely shifted from the right-hand tube section of the first trigger pair 961 to the left-hand tube section thereof to establish this pattern. The output of the first trigger pair 961 is a positive going pulse, so no further changes are effected in the remaining trigger pairs at this time.

The sixth input pulse sets up a pattern of OXXO, as shown in the conduction chart. The shifting of conduction from the left-hand side to the right-hand side of trigger pair 961 (FIG. 34) produces a negative-going output pulse which shifts conduction from the right-hand section to the left-hand section of trigger pair 962. The output of trigger pair 962 is consequently a positive-going pulse which is ineffective to produce further changes. Hence, the conduction pattern remains unchanged, so far as trigger pairs 963 and 964 are concerned.

It might be mentioned that the negative pulse from the first trigger pair 961 is also applied over lead 1003 and diode 1004 to the control electrode 1013 of the left-hand side of the fourth trigger pair 964. However, conduction in this trigger pair has remained in the right-hand tube section thereof, so that the negative input pulse to the left-hand section is ineffective to shift this trigger pair.

The third pulse of the second group of four pulses (which is really the seventh pulse) establishes the conduction pattern of XXXO. Only the first trigger pair 961 is affected by the seventh input pulse. Conduction is shifted from the right-hand section thereof to the left-hand section, so that that output pulse is positive-going and accordingly does not influence the remainder of the counter.

The last pulse of the second group of four pulses is the eighth count to be applied to the accumulator of FIG. 34; i.e., the units order pence denomination. Conduction is shifted in each of the four trigger pairs 961 through 964 as a result of the entry of the eighth count. The pattern is changed from XXXO to its opposite, OOOX. The negative input pulse establishes conduction in the right-hand side of the first trigger pair 961. The resulting negative-going pulse is applied to the second trigger pair 962 to shift conduction to its right-hand side. Again, the negative-going pulse, this time from trigger pair 962, causes conduction to be shifted to the right-hand section of the third trigger pair 963. Still again, the negative-going output pulse from the third trigger pair causes conduction to be shifted to the left-hand tube section of the fourth trigger pair 964 because the transfer path is from the anode junction point 1017 of the trigger pair 963 over lead 1018 to the control electrode 1019 for the right-hand tube section of the fourth trigger pair 964.

It might be pointed out that the switching of conduction in the fourth trigger pair 964 has followed after three time-delay intervals occasioned between the first and second, second and third, and third and fourth trigger pairs. Consequently, the negative pulse from the first trigger pair 961 via diode 1004 and the lead 1003 to the left-hand section of the fourth trigger pair 964 has been applied to the fourth trigger pair before conduction is shifted from the right-hand section to the left-hand section thereof. Therefore, the negative pulse from the first trigger pair is ineffective at the fourth trigger pair at this time.

However, when conduction is shifted to the left-hand section of the fourth trigger pair 964 due to the negative pulse from the third trigger pair 963, the anode junction point 1020 for the right-hand section of trigger pair 964 is elevated in potential, so that a predetermined positive bias is applied to the D.C. feed-back lead 1021 (FIG. 35). This bias elevates the potential of control electrode 1022 of the left-hand triode section of the third trigger pair 963 sufficiently to cause this section to assume the conducting state to the exclusion of the right-hand section. The D.C. feed-back is also applied over lead 1021 to the control electrode 1023 of the left-hand tube section of the second trigger pair 962 to establish conduction in this section to the exclusion of the right-hand section thereof.

The conduction chart shows that the conduction pattern is OXXX for the count of 8. In other words, the binary counter has been recycled automatically before the next input impulse, so that the count of eight is really changed to the binary count of fourteen, and then the count of nine will correspond to the binary count of fifteen, so the binary counter will be returned to zero upon the decimal count of ten.

The count of eight, stored in the units pence denomination of the pence accumulator, signifies that the lowest order digit "4" of the multiplicand 324 has been entered twice out of the four times that the units pence multiplier digit requires. The third group of four pulses applied to the units pence order of the pence accumulator will cause the counter to run through zero and show a count of two, and will cause a carry or transfer to be entered into the tens denominational order of the pence accumulator. This operation will now be explained, beginning with the first pulse of the third group of four pulses, which is the ninth count to be introduced into the counter of FIG. 34.

The conduction chart indicates that the pattern following the entry of the ninth count will be XXXX, as developed from the recycled pattern of OXXX for the digit "8." The application of the negative pulse, corresponding to the ninth count, causes conduction to be shifted from the right-hand section to the left-hand section of the first trigger pair 961. The resulting output is a positive-going pulse which has no effect on the rest of the counter circuit, and hence conduction remains in the left-hand sections of the second, third, and fourth trigger pairs 962, 963, and 964.

The tenth count to be entered into the accumulator of FIG. 34 is the second pulse of the third group of four pulses, representing the lowest order digit of the multiplicand. This pulse shifts conduction from the left-hand section to the right-hand section of the first trigger pair 961. The resulting negative pulse is applied over output lead 1002 and 1003 and via diode 1004 to the control electrode 1013 of the left-hand triode section of the fourth trigger pair 964 to shift conduction to the right-hand section of this trigger pair. This step is necessary to eliminate the positive D.C. bias being supplied over D.C. feed-back lead 1021 to the left-hand tube sections of the second and third trigger pairs 962 and 963.

The negative output pulse from the first trigger pair 961 is also applied over output leads 1002 and 1003 and via diode 1004 and input lead 1005 to the second trigger pair 962 to shift conduction from the left-hand section thereof to the right-hand section thereof. This action is permitted because the D.C. bias from the feed-back lead 1021 has been removed. When conduction is shifted in the second trigger pair 962, the output negative pulse is applied over leads 1014 and 1015 to the third trigger pair 963 to shift conduction from the left-hand section to the right-hand section thereof. This operation produces a negative output pulse, at junction point 1017, which is applied over output lead 1018 to the control electrode 1019 of the right-hand tube section of the fourth trigger pair 964. However, the right-hand tube section of trigger pair 964 must remain on, as required by the count of ten or zero. For this reason, a large storage capacitor 1025, of 250 micro-microfarads, is provided in the coupling path from the anode junction point 1020 of the right-hand triode section of the fourth trigger pair 964 to the control electrode 1013 of the left-hand tube section of this trigger pair. The RC time constant for the discharge of this condenser is sufficiently large to retain most of the charge across condenser 1025 until after the negative pulse from the third trigger pair 963 is applied to the fourth trigger pair 964. When the right-hand tube section of the fourth trigger pair 964 became conducting, the decrease in potential at anode junction point 1020 caused the stored charge of capacitor 1025 to be effective in reducing the potential at control electrode 1013, so that the left-hand triode section is clamped off and remains that way during the time that the negative pulse is applied to the right-hand tube section of the fourth trigger pair 964, thereby permitting conduction to remain in the right-hand tube section.

The transfer trigger pair 965 of FIG. 35 will now be described. When the counter is shifted from a "9" setting to a "0" setting, the re-establishment of conduction in the right-hand triode section of the fourth trigger pair 964 (FIG. 34) produces the first (only) negative-going output signal from this trigger pair. This negative-going signal is developed at the anode junction point 1020 and applied over the feed-back lead 1021 (FIG. 35) and by way of a 100,000-ohm resistor 1026 and a 25-micro-microfarad capacitor 1027 to the control electrode 1028 of the left-hand tube section of the transfer trigger pair 965. The application of this negative pulse shifts conduction to the right-hand tube section of the trigger pair 965, indicating that the trigger pair is "cocked" or in a condition holding a transfer or carry which has not yet been entered into the counter of the next higher denominational order.

It will be recalled that the "half-after" or 180° pulses are developed between the 0° pulses. The 0° pulses were used to form the pulse groups, and, consequently, the counts entering the counter and the negative-going pulses supplied by one trigger pair to the next trigger pair will occur at 0° times. Therefore, it will be appreciated that the transfer trigger pair 965 is "cocked" at a 0° time.

The transfer output from the trigger pair 965 is a positive-going pulse initiated when conduction is switched form the right-hand section thereof to the left-hand section. This occurs as a result of the first "half-after" or 180° pulse to appear subsequently to the shifting of conduction from the left-hand triode to the right-hand triode of the transfer trigger pair 965. The source of 180° pulses (tube 520 of FIG. 13) is continuously supplying 180° pulses such that any transfer trigger pair in the entire circuit can be released following "cocking" on a 0° pulse time.

A path for the 180° releasing pulses is provided over output lead 543 (FIG. 13) from the 180° pulse-supplying tube 520. The lead 543, which also supplies 180° pulses to the K ring of FIG. 18, is extended from FIG. 18 to FIG. 35, where the lead 543 is the input connection for a triode tube section 1031, preferably of the 12AT7 type. The triode 1031 serves as a phase inverter, in that the positive 180° pulses introduced to the control electrode 1032 by way of a 50-micro-microfarad coupling capacitor 1033 appear as negative pulses at the anode junction point 1034.

The phase inverter type operation is permitted because the triode section 1031 is normally cut off but is operated by the 180° pulses. The cathode 1035 is connected directly to the +105-volt source 1036, whereas the control electrode 1032 is connected over a 220,000-ohm grid resistor 1037 to the +85-volt source 1038. The anode B+ supply is the +360-volt source 1039, connected to the tube over a 22,000-ohm load resistor 1040.

The output pulses from the triode 1031 occur in time with the 180° pulses, so that their application to the transfer trigger pair 965 will release a carry (if one is stored) in the interval immediately following the cocking of the trigger pair at a 0° time. The junction point 1034 is connected over lead 1041 and by way of a 25-micro-microfarad coupling capacitor 1042 to the control electrode 1029 of the right-hand triode section of the transfer trigger pair 965. A 100-ohm parasitic suppressor resistor 1043 is included in this grid input circuit, as has been customary throughout the counter circuitry. The 180° pulse lead 1041 is also connected over a branch lead 1049 to the control electrodes of the right-hand triode sections of the transfer trigger pairs of Pence banks #2 through #7, shown only in block form.

Hence, at 180° pulse time, a negative pulse is applied to the control electrode 1029 of the right-hand triode section of the transfer trigger pair 965, as well as to the transfer trigger pairs of banks #2 through #7. Ordinarily, these pulses are ineffective because the normal state of conduction in the transfer trigger pairs, such as trigger pair 965, is with the left-hand triode section thereof conducting. However, when the transfer trigger pair 965 is "cocked" (storing a carry), the first 180° pulse to be applied to control grid 1029 of the right-hand tube section will cause conduction to be shifted back to the left-hand triode section.

The potential of anode junction point 1044 of the right-hand triode section of transfer trigger pair 965 will be appropriately elevated when conduction is switched out of this tube section. The positive-going pulse, indicative of a carry, is applied over output lead 1045 and by way of a 250-micro-microfarad input coupling capacitor 1046 to the control electrode 1047 of a pence input carry amplifier tube section 1048, provided to amplify carry signals from pence order bank #1 to pence order bank #2. The other banks have similar carry circuits, connected to the next higher denomination by way of amplifiers.

The amplifier tube section 1048 is normally cut off but is caused to conduct by the positive input carry pulse. The cathode 1051 is connected to the common +96-volt line 950, whereas the control electrode 1047 is connected over the 47,000-ohm grid resistor 1052 to the common +85-volt line 1053. Since the grid potential is 11 volts negative with respect to the cathode potential in the absence of conduction in this tube, the positive input carry pulse applied to control grid 1047 appears as a negative ouput pulse at the junction point 1054. The output lead 1055 introduces the negative carry pulse to the pence #2 denominational order 1056 of FIG. 35. The pence #2 denominational order bank 1056 is a counter of the same construction as the counter of FIGS. 34 and 35, heretofore explained in detail. Consequently, it may be appreciated that the negative pulse introduced to pence #2 bank 1056 on lead 1055 acts as a single count. This is true of original entries as well as carry entries from the previous denominational order.

It will be recalled that the carry signal out of the lowest order pence bank of FIG. 34 was developed due to the second pulse of the third group of pulses indicative of the lowest order digit, 4, of the multiplicand 324. The third pulse of the third group of four pulses then causes the counter of FIG. 34 to establish the XOOO pattern of position 1 of the conduction chart.

The four pulse of the third group of four pulses sets up position 2 of the conduction chart by establishing the pattern OXOO, which indicates that twelve pulses have passed through the lowest order denominational counter pence accumulator.

In the fourth group of four pulses, the first pulse establishes the XXOO pattern of position 3 of the conduction chart, the second pulse of this group establishes the pattern of position 4, the third pulse establishes the pattern of position 5, and, lastly, the fourth pulse sets the counter on position 6 with the pattern of OXXO.

At this time, it will be seen that sixteen pulses have been applied to the lowest denominational order of the pence accumulator to produce a carry or transfer signal out of this order and to leave this order on a setting of 6. The transfer or carry was entered into the next higher order bank of the pence accumulator. It must also be recalled that, during this operation, original entries of the digit "2" are being applied to the pence #2 order bank. This is one reason why the transfers are entered on 180° pulse times, thereby precluding interference with original entries developed on 0° pulse times.

The original entries being applied to pence #2 order bank 1056 of FIG. 35 are the groups of two pulses indicative of the tens digit 2 in the multiplicand 324. Since the controlling multiplier digit is still the units pence digit of 4, eight counts will be introduced into pence #2 bank 1056 as original entries. The transfer entry from the counter of FIG. 34, representing pence #1 bank, will increase the count stored in pence #2 bank 1056 to 9.

The group of two pulses indicative of the digit 2 in the multiplicand 324 is obtained from the B2 output from the B ring as it appears on line 1071 of FIG. 20. Since the "2" key 902 of the tens order multiplicand keyboard is depressed, a path is established from lead 1071 over lead 1072 and through the tens order keyboard to output lead 1073. The output lead 1073 extends to the block 1074 of FIG. 21. The block 1074 includes the circuitry depicted within the dotted outline 1075, shown directly above. Hence, a triode, corresponding to the triode 904, detailed within the dotted block 1075, is employed in block 1074 as a gate to pass the group of two pulses to the output lead 1076 for this block.

This output lead 1076 is the input lead 1076 of FIG. 29 for the pence input matrix diode 1077. The diode 1077 is receptive to pulses at this time due to the B+ supplied by the M1 tube on the common lead 1078. The group of two pulses is thus passed onto the output cathode lead 1079, which extends to the wiper 1080 of a decimal wafer switch 1081. The output lead 1082 from the switch 1081 is the input lead for the pence tens order input amplifier tube section 1083 of FIG. 30. Here, the Original entry pulses are inverted and follow the common input lead 1055 into the pence #2 order bank 1056 (FIG. 35).

The four groups of two pulses each which are entered over the input amplifier tube 1083 by way of input lead 1055 establish the count of eight in pence #2 order 1056, which is changed to a count of 9 by the carry. The carry is also applied to the input lead 1055 (FIG. 30), but by the carry input amplifier tube section 1048 rather than the original entry input amplifier tube section 1083.

In the sample problem of FIG. 1, under the pence symbol *d*, the multiplicand of 03.24 is multiplied by the pence multiplier digit "4" to provide a preliminary product of 12.96. To reiterate, in the problem under consideration at the moment, the decimal point has been omitted, so that the problem is the multiplication of 324 by 4 to produce 1296. It has been shown how the count of 6 has been entered into the units pence denominational order of FIG. 34. Also, the 9 has been stored in the tens pence #2 denominational order 1056 of FIG. 35. In the same manner, the digit 2 of the preliminary product 1296 is stored in the hundreds order pence #3 bank 1091 of FIG. 35 by four original entries of groups of three pulses, and the digit 1 is set into the thousands order pence #4 bank 1092 by virtue of a carry from pence #3 bank 1091.

In the multiplicand 324, the multiplication of the digit 3 by the pence factor of 4 is enabled by the formation of groups of three pulses four times. These pulses are derived from the B3 lead 1093 of FIG. 20 and selected over lead 1094 due to the "3" setting in the hundreds order of the multiplicand keyboard of FIG. 20. The output lead from this order of the multiplicand keyboard extends to the block 1096 (FIG. 21), corresponding to the block 1074, previously described. The output lead 1097 from the block 1096 is continued in FIG. 29 as the input lead 1097 for the pence input matrix diode 1098. Since the M1 tube is conducting, the four groups of three pulses pass over the output cathode lead 1099 and through the decimal transfer switch 1100 to follow lead 1101 to the input amplifier triode section 1102 (FIG. 30) for the pence #3 denominational order 1091 of FIG. 35, which is entered over lead 1103.

The carry or transfer path 1104 out of the pence #3 hundreds order 1091 of the accumulator is by way of the amplifier tube section 1105 (FIG. 30) and the output lead 1106 from this section, which becomes the input path to the thousands order pence #4 bank 1092 of FIG. 35.

It has now been shown how a preliminary product of 1296 has been developed and stored in the four lowest order banks of the pence accumulator due to a multiplication of 324 by a pence digit of 4. If the pence factor had been 10 or 11, the M2 tube would have been used to control the switching paths to the pence accumulator for the pulse groups. For example in the pence input matrix of FIG. 29, the M2 tube supplies B+ to the line 1111 to open four paths to the #2 through #5 order banks of the pence accumulator (FIG. 25).

The preliminary products, as produced by the shillings and pounds multiplier factors, are developed in the same manner and through the use of almost identical but separate circuitry. The shillings accumulator is shown in FIGS. 41 and 42. Only the #1 bank is shown in detail. The other counters making up the denominational orders of the shillings accumulator are the same as the one shown and operate in the same manner as the units pence counter, heretofore described in detail. The conduction pattern is, of course, the same as that set forth in the conduction chart used for the pence accumulator.

The pounds accumulator is shown in FIG. 8. None of the denominational orders is shown in detail because the circuit of each order is identical to that of the units shillings order of FIGS. 41 and 42.

In the problem of FIG. 1, as altered to exclude the decimal point, it may be observed that the preliminary product resulting from the multiplication of the multiplicand 324 by the shillings multiplier factor of 6 is 1944. Also, from FIG. 1 it may be determined that, when the multiplicand of 324 is multiplied by the pounds multiplier factor of 21, the preliminary product is 6804.

It is now the purpose, briefly, to explain the controls used in obtaining the above-noted preliminary products. The pence preliminary product was developed under control of the M1 tube, which established suitable paths through the matrices in order that the digits making up the preliminary product were entered in the proper denominational orders of the pence accumulator. The sample problem of FIG. 1 contains no tens pence multiplier factor, so the control tube M2 is skipped, and the M chain next operates on the M3 tube to establish suitable switching paths for the units shillings multiplication.

Groups of three, two and four pulses are selected from the appropriate B ring leads to represent the multiplicand. These groups of pulses are entered into the correct order banks of the shillings accumulator six times in accordance with the units shillings multiplier digit. The group of four pulses is selected from the B4 line of FIG. 20 by the Units keyboard over leads 909 and 912 due to the depression of the "4" key 901. The output lead 912 from the Units keyboard applies the four pulses to the gated triode 904 of FIG. 21, where they are passed on via output lead 924 to the common matrix input lead 924 of FIGS. 29 and 33.

The shillings input matrix of FIGS. 33 and 36 is now controlling because the M3 tube is supplying B+ to common anode lead 1112 thereof. The lead 1112 is connected over lead 1113, which is continued in FIG. 25, by way of lead 1114 to the cathode junction point 1115 of the M3 tube.

Since the group of four pulses is available at lead 924 in FIG. 33, and since the diode 1116 of the shillings input matrix is supplied with B+ potential, the pulses are passed to the cathode output lead 1117. The cathode output lead 1117 is continued in FIG. 40 as the incoming lead for the decimal wafer switch 1118. There is no decimal setting in switch 1118, so the wiper 1119 is on the contact "1" to continue the pulse path over lead 1120 and to the left along lead 1121 to the units shillings input amplifier tube section 1122. The output lead 1123 from this tube section is the input lead for the first trigger pair 1124 of the units order shillings accumulator of FIGS. 41 and 42.

The units shillings counter operates in the fashion heretofore explained, so that the four pulses register a count of four by establishing a conduction pattern of OOXO in the trigger pairs 1124 through 1127.

The next time the A ring automatically cycles, a second group of four pulses will be applied over the circuit just described to the units shillings counter. This operation is continued until six groups of four pulses have been introduced to the units order of the shillings accumulator in accordance with the shillings multiplier digit of 6. The units order of the shillings accumulator is selected to receive this interim product because the product is the result of the units multiplicand digit by the units multiplier digit.

The transfer trigger pair 1128 (FIG. 42) for the units shillings order of the accumulator, which receives 24 counts (4×6), is twice "cocked" and is then released each time by 180° pulses to send two carries over output lead 1129 to the carry amplifier tube section 1130 (FIG. 39). The output from tube section 1130 is over lead 1131 to the shillings #2 (tens) denominational order 1132.

In the multiplicand 324, the group of two pulses is also formed six times and selected by the Tens order keyboard of FIG. 20. The B2 lead 1071 supplies the two pulses over lead 1072 and through the Tens order keyboard due to the depression of the "2" key 902, so that the pair of output pulses appears on lead 1073, which extends to block 1074 of FIG. 21. The output lead 1076 of block 1074 for the gated output pulse is continued in FIG. 29, where it passes through the pence input matrix to the shillings input matrix of FIG. 33.

Here the diode 1140 is supplied with anode potential (due to conduction in the M3 tube) to apply the groups of two pulses to output lead 1141. The lead 1141 is continued in FIG. 40 as the input lead for decimal wafer switch 1142. The wiper 1143 and the leads 1144 and 1145 extend the path to the amplifier tube section 1146 of FIG. 39. The tube section 1146 serves as the input pulse amplifier for the shillings #2 (tens) denominational order 1132 of FIG. 42, the output path 1131 from this tube section serving to introduce the original entries to this order of the shillings accumulator.

The carries out of the #2 shillings order 1132 pass over lead 1147 to the carry amplifier tube 1148 of FIG. 40. The amplified carry signals pass over lead 1149 to the #3 shillings (hundreds) order bank 1150. Hence, the tens order bank 1132 of the shillings accumulator is used to receive the product of the tens order digit of the multiplicand by the units order digit of the multiplier factor.

The six groups of three pulses indicative of the hundreds order digit of the multiplicand are selected from the B3 line 1093 (FIG. 20) and applied through the Hundreds order of the keyboard by leads 1094 and 1095, the latter of which extends to the block 1096 of FIG. 21. The gated output from the block 1096 passes over lead 1097, which is continued in FIG. 29, where it is connected through the pence input matrix to the diode 1151 of the shillings input matrix. The output lead 1152 from the diode 1151 receives the groups of three pulses.

The diode 1151 is energized at this time due to the tube M3 supplying B+ on common anode lead 1112, so the pulses pass to the cathode output lead 1152, which is continued in FIG. 40 as the input lead for the decimal wafer switch 1153. The wiper 1154 and the leads 1155, 1156, and 1157 establish a path to the input amplifier tube section 1158 (FIG. 40), the amplified pulses representing original entry counts being appplied over output lead 1149 and into the shillings #3 (Hundreds) order 1150 of FIG. 42.

Here the count of 9 is stored and a single carry is developed on output lead 1159. The output lead 1159 extends to the carry amplifier tube section 1160 of FIG. 40, where the carry pulse is amplified and applied to lead 1161 for introduction into the shillings #4 (Thousands) order bank 1162. At this time, the preliminary product of 1944 has been stored in the first four denominational order banks of the shillings accumulator.

Referring now to that portion of the M chain illustrated in FIG. 25, it will be shown how the M4 tube is skipped and the M5 tube is fired to prepare for multiplication by the pounds units digit, the M4 tube being skipped because of the absence of any tens order shillings multiplier digit. The pounds mutiplier factor is 21, which is set into the keyboad of FIG. 24 through the depression of the Units Pounds "1" key 1163 and the Tens Pounds "2" key 1164.

The M3 tube (FIG. 25), which was controlling in the above multiplication operation, is used to prime the next M tube to be fired. A priming path for the M5 tube will be established due to a lack of setting in the Tens shillings keyboard of FIG. 23. This priming path is from junction point 1115 (FIG. 25) in the cathode circuit of the M3 tube over lead 1114 and through the Units shillings keyboard by way of contacts 1165, now closed by switch arm 1166 to extend lead 1114 to lead 1167. The output lead 1167 from the Units shillings keyboard is extended to the Tens shillings keyboard, where the "1" key 1168 is unset, so that the switch arm 1169 closes the contacts 1170 to provide a path over lead 1171 to the Units pounds keyboard of FIG. 24. Here the "1" key 1163 is set, so that the switch arm 1172 closes contacts 1173 to provide a path over lead 1174 through the Units pounds keyboard. The lead 1174 extends to the control electrode 1175 of the M5 tube of FIG. 21. Hence it may be seen that the M3 tube primes the M5 tube in the absence of any setting in the Tens shillings keyboard of FIG. 23 and the presence of a setting in the Units pounds keyboard of FIG. 24.

The M5 tube is fired by a K ring pulse (K6 pulse due to the shillings multiplier digit of 6) to initiate multiplication by the lowest order digit of the pounds multiplier factor. This firing pulse appears on the K6 lead 1176 of FIG. 22. In FIG 23, a connecting lead 1176 applies the K6 pulse to the Units shillings keyboard, where the switch arm 1177 of the "6" key 867 closes the contacts 1178 to extend the path downwardly over lead 1179 and thence upwardly over lead 1180, through the keyboard again, to the contacts 1181 of the "6" key 867. These contacts are also closed due to the depression of the "6" key because the switch arm 1182 is in its right-hand position (not shown). Hence the firing path is now over leads 1183 and 1184 and branch lead 1185 to the Tens shillings keyboard of FIG. 23. Here the contacts 1186 are closed by the switch arm 1187, since the "1" key 1168 is unset and extends the firing path over lead 1188 to the shield grid 1189 of the M5 tube (FIG. 25).

When conduction is established in the M5 tube, multiplication by the pounds factor is started. The pounds multiplication operation will be carried out in detail, as it is the first interim multiplication encountered which involves a two-digit multiplier factor requiring a denominational shift. In the multiplication of 324 by 21, the first operation of 1 times 324 is carried out over switching paths established by the M5 tube, and the next operation of 2 times 324 is carried out over switching paths set up by the M6 tube.

For the units order pounds multiplication, it is only necessary to select groups of three, two, and four pulses once for introduction into the appropriate order banks of the pounds accumulator. As before, the group of four pulses is obtained from the B4 lead of FIG. 20 and passed through the Units order of the decimal keyboard and over lead 912 to the gated triode section 904 of FIG. 21. The triode section 904 is receptive to these pulses because the potential of its control grid 914 is elevated over lead 916, which extends to the common cathode 918 of the multiple diode 906 of FIG. 21. The left-hand diode section in the multiple diode 906 is conducting because its anode is connected over leads 1201 and 1202 (FIG. 26) to the cathode junction point 1203 of the M5 tube (FIG. 25).

The output pulses from the gated cathode-follower-connected triode 904 (FIG. 21) appear across common load resistor 921, where the output lead 922 extends to a further output lead 1204, which is continued as the input lead 1204 to the pounds input switching matrix of FIG. 45. The switching path for the group of four pulses being applied to the pounds accumulator will be continued through diode 1205 (FIG. 45) of the pounds input switching matrix because the common anode lead 1206 for this tube is connected back over lead 1207 to the cathode junction point 1203 of the M5 tube of FIG. 25.

The diodes of the pounds input switching matrix of FIG. 45 may be of the 6BC7 type, each used with a 22,000-ohm plate load resistor and a 2,500-micromicrofarad input capacitor, as represented by the resistor 1210 and the capacitor 1211, shown in connection with the diode 1205.

The output path from the pounds input switching matrix of FIG. 45 for the group of four pulses is the cathode lead 1212 from diode 1205, which extends to the decimal wafer switch 1213 of FIG. 46. Here the wiper 1214 is connected to a lead 1215, which applies the pulses to an amplifier tube section 1216, provided for the original entry input pulses to the lowest order of the pounds accumulator. The pulses are amplified and inverted by the tube section 1216 and follow output lead 1217 to the pounds #1 (units) denominational order 1218 (FIG. 48).

For the instant problem, the group of four pulses applied to the units order of the pounds accumulator of FIG. 48 constitutes the total count stored in this order, because the lowest order digit of the pounds multiplier factor is "1," and subsequent multiplication by the tens order digit 2 of the pounds multiplier factor (21) will provide an interim product shifted one denominational order higher. Hence this product will not influence the counts stored in the lowest denominational order of the pounds accumulator.

The group of two pulses indicative of the middle digit (2) of the multiplicand 324 is derived from the B2 lead 1071 (FIG. 20) via the Tens order of the decimal keyboard, which sends the pair of pulses over output lead 1073 to the block 1074 of FIG. 21. The output lead 1221 from block 1074 (FIG. 21) is continued as the input lead for the receptive pounds input switching matrix diode 1222. The cathode lead 1223 from the diode 1222 extends to the decimal wafer switch 1224 of FIG. 46. The wiper 1225 of this switch provides a path to lead 1226, which is the input lead for a further pounds input amplifier tube section 1227. The tube section 1227 amplifies and inverts the pair of pulses and applies them over output lead 1228 to the pounds #2 (tens) denominational order bank 1229 of FIG. 48.

It might be mentioned that this count of two stored in the tens order of the pounds accumulator will be augmented when the multiplicand is multiplied by the tens order digit (2) of the pounds multiplier factor. Accordingly, the tens order pounds #2 bank 1229 receives entries according to the units, or lowest, digit of the multiplicand whenever the tens order digit of the pounds multiplier factor is being used to control multiplication.

The single group of three pulses indicative of the product of the pounds multiplier units order factor (1) times the hundreds order digit (3) of the multiplicand 324 is selected by the Hundreds order keyboard of FIG. 20 from the B3 lead 1093 and applied over output lead 1095 to the block 1096 of FIG. 21. Here a gated triode section (not shown), corresponding to the tube section 904, as illustrated above the block 1096, allows the group of three pulses to appear on output lead 1231. The output lead 1231 is continued in FIG. 45 as the input lead for the diode 1232 being supplied with B+ potential from common anode lead 1206. The output cathode lead 1233 is connected to the wiper 1234 (FIG. 46) for the decimal wafer switch 1235. Leads 1236 and 1237 permit the group of three pulses to pass to a pounds input amplifier tube section 1238 of FIG. 46. Here the pulses are amplified and inverted and passed over output lead 1239 to the pounds #3 (Hundreds) order bank 1240 of the pounds accumulator of FIG. 48.

Referring to the sample problem of FIG. 1, and neglecting the decimal point, it will be noted that the pounds multiplication up to this point has placed the number 324 in the three lowest order banks of the pounds accumulator. It will be seen from FIG. 1 that the number 648 will next be introduced into the pounds accumulator but displaced one denominational position to the left of the first entry in order to take into account the denominational shift from the units order to the tens order in the multiplier factor of 21. It may be observed that multiplication of the units digit 4 of the multiplicand (324) by the tens order 2 of the multiplier (21) produces two groups of four pulses, which are entered into the #2 or tens order bank 1229 (FIG. 48) of the pounds accumulator. This switching path will now be set forth.

The group of four pulses is selected from the B4 lead of FIG. 20 by the Units order of the decimal keyboard and applied over output lead 912 to the gated triode section 904 of FIG. 21. The cathode-follower output appears on lead 1204 (FIG. 21), which is continued in FIG. 45 to the pounds input switching matrix. However, at this time, the diode 1205 is no longer conducting, because the M chain has been shifted from conduction in the M5 tube to conduction in the M6 tube, in the manner of earlier M chain tube shifts, previously described.

The common B+ line 1245 (FIG. 45) for the diode 1244 is connected over lead 1246 to the cathode junction point 1247 of the M6 tube of FIG. 25, so it is the diode 1244 which will control the entry of this group of four pulses into the pounds accumulator.

A denominational shift is effected in this manner, so that the output cathode lead 1247 from the pounds input switching matrix diode 1244 is extended to the lead 1223, which has already been described as being connected to the input lead (1228) for the #2 (tens order) bank 1229 of the pounds accumulator of FIG. 48. Since the pounds multiplier digit under consideration is 2, the group of four pulses will be twice introduced into the tens order bank #2, shown at 1229 in the pounds accumulator (FIG. 48).

However, the count of two was already stored in the pounds #2 bank as a result of the entry occasioned by the units order pounds multiplier factor. Consequently, during the entry of the second group, the counter is run through zero to provide a carry signal, which follows the carry path 1249 to the carry amplifier tube section 1250 of FIG. 46. The carry signal is amplified and inverted and applied to lead 1239, which is the entry lead for the hundreds order bank #3, shown at 1240, for the pounds accumulator of FIG. 48.

As will be seen from the sample problem of FIG. 1, the pounds hundreds order bank 1240 (#3) is already storing a count of 3 when it is receiving an original entry of 4 plus the carry, which yields an ultimate count of 8 in this bank.

The switching path utilized to store the result of the multiplication of the middle digit (2) of the multiplicand 324 by the tens denominational digit (2) of the multiplier factor of 21 will now be shown. The group of two pulses is selected from the B2 line 1071 of FIG. 20 by the Tens order keyboard and applied over output lead 1073 to the block 1074 of FIG. 21. The two pulses are gated through block 1074 to follow output lead 1221, which is continued in FIG. 45, where the diode 1251 is now in condition to pass the pulses to its output cathode lead 1233, because the M6 tube is supplying B+ potential to the common anode lead 1245. The output lead 1233 from the diode 1251 delivers the pulses by way of decimal wafer switch 1235 (FIG. 46) and leads 1236 and 1237 to the input amplifier tube section 1238. As usual, the pulses are amplified and inverted in this tube section and follow output lead 1239 to the pounds hundreds order bank (#3) 1240 of FIG. 48.

Two groups of two pulses each are introduced to the #3 bank over the above-outlined path to provide a count of 4, which augments the count of 3 plus the carry to store the count of 8, as set forth above, in this denominational order.

The other parallel operation to be described, which, of course, is proceeding at the same time as the operation just described, is that of entering two groups of three pulses indicative of the hundreds order digit (3) of the multiplicand 324 in the appropriate order bank of the pounds accumulator. In FIG. 20, the groups of three pulses are selected from the B3 line 1093 by the Hundreds order keyboard and passed over output lead 1095 to the block 1096 of FIG. 21. There they are appropriately gated over output lead 1231, which extends to the diode 1252 of the pounds input switching matrix of FIG. 45.

The cathode output lead 1253 for diode 1252 extends to the decimal wafer switch 1254 of FIG. 46, where the wiper 1255 is connected over leads 1256 and 1257 to the input amplifier tube section 1258. The three pulses of each of the two groups are amplified and inverted by tube section 1258 and applied over output lead 1259 for entry into the pounds thousands order bank (#4) 1260 of FIG. 48. No previous counts have been applied to this order bank, so it merely stores the count of six to complete the pounds accumulator content of 6804.

The maximum pounds multiplier factor which could be employed in the exemplary apparatus of the present invention is 9,999. The multiplier factor (21) of the sample problem occupied the units and tens denominational orders only. The switching paths established for interim multiplications by digits in these orders were set up under control of the M5 and M6 tubes. It will be pointed out that, had digits been present in the hundreds and thousands order places of the multiplier factor, the M7 and M8 tubes would have been used to establish switching paths for the selected pulse groups to the appropriate order banks of the pounds accumulator. This selection is also under control of the pounds input switching matrix of FIG. 45, wherein the diode B+ leads 1261 and 1262 extend back to the cathode circuits of the M7 and M8 tubes of FIG. 26.

The pounds input switching matrix diodes 1263 and 1264 pass pulse groups selected by the Units order keyboard of FIG. 20, representing the units order of the multiplicand, to the appropriate banks of the pounds accumulator of FIG. 48 when the hundreds and thousands order digits of the pounds multiplier factor are employed. Since the multiplier factor being used, when the M7 tube is supplying B+ potential to common anode lead 1270 (FIG. 45), is the hundreds order digit, the diode 1263 will provide a path to the pounds hundreds order (#3) 1240 of FIG. 48. Similarly, when the M8 tube is controlling, the thousands order digit of the multiplier factor is being used for the interim multiplication, and, accordingly, the diode 1264 of the pounds input switching matrix of FIG. 45 establishes a path to the pounds thousands order (#4) 1260 of the pounds accumulator in FIG. 48.

The multiplicand heretofore used contained only three denominational places, represented by the number 324. The exemplary capacity of the machine will accommodate a four-place multiplicand, such as 1,324. The thousands order digit is assumed merely to point out the path which is provided for the accommodation of pulses indicative of this digit. Such paths, of course, exist for each of the pence, shillings, and pounds accumulators. The path to the pounds accumulator will now be shown.

In FIG. 20, it is the Thousands order keyboard which will select the single pulse indicative of the thousands order denominational digit of the multiplicand. This pulse is taken from the B1 line 1271 and passed to the thousands order keyboard output line 1272 due to the depression of the "1" key 1273. The output lead 1272 extends to the block 1274 of FIG. 21, where the first output lead 1275 from this block extends to the pence and shillings input matrices, but the second output lead 1276 is continued in FIG. 45 and is coupled to the diodes 1277 through 1280, which diodes may be selectively energized to pass this pulse to a selected order bank of the pounds accumulator according to the order of the pounds multiplier digit which is in control.

Assuming that the M8 tube is conducting in a multiplication by a thousands pound digit of the multiplifier, B+ will be supplied to the common anode lead 1281. It will be the diode 1280 which passes the pulse, indicative of the thousands order digit of the multiplicand. It should also be clear that, if it is the M8 tube which is controlling, then the pounds multiplier factor includes four whole-number digits; i.e., 9,999 pounds, for example. This situation is assumed to reveal the highest order bank of the pounds accumulator which will ever receive an original entry while dealing with a whole-number problem.

The output lead 1282 from the diode 1280 (FIG. 45) extends to the decimal wafer switch 1283 of FIG. 47, where the wiper 1284 establishes a connection over leads 1285 and 1286 to the input amplifier tube section 1287. The amplified and inverted pulse follows the output lead 1288 of tube 1287 to the millions pounds order (#7) 1289 (FIG. 48).

Accordingly, in the product, 13,238,676 pounds, obtained from multiplying 1,324 by 9,999 pounds, the lowest order digit (6) is stored in the pounds #1 bank. The digit (7) is stored in the pounds #2 bank, and so forth, to the next-to-highest order digit (3), which is placed in the pounds #7 bank (millions order), with the highest denominational order digit (1) being the result of a carry to the pounds (ten millions) order (#8) 1290.

In FIG. 48, the pounds denominational order bank (#8) 1290 is provided to receive carries out of the #7 bank 1289. This carry path is over output lead 1291 from bank #7 and by way of the carry amplifier tube section 1292 (FIG. 47) to its output lead 1293, which extends to the pounds #8 bank 1290. The maximum product which may be developed in a multiplication within the assumed capacity of the machine of the instant invention is 99,980,001, obtained from a multiplicand of 9,999 as multiplied by 9,999 pounds. In this situation, the pounds (ten millions) order (#8) 1290 receives nine carries but still no original entries. Hence, in summary, it may be stated that the proper number of order banks for the pounds accumulator is not more than the product of the highest denominational order appearing in the multiplier and the multiplicand factors; i.e., two, thousandth order, factors would require a million order accumulator plus one more, overflow, order, which is the ten million order described herein.

FRACTIONAL CONVERSION

The whole-number problem under consideration does not involve any fractional conversion, because there are no decimal fractions stored in the shillings and pounds accumulators. The purpose of this section is to show how the circuitry which otherwise would be used to effect fractional conversion is by-passed in whole-number problems, without interference with the sequential control arrangement of operations. In the basic multiplication operations, where the M1 through the M8 tubes were utilized to switch interim products into the appropriate order banks of the three accumulators, it will be recalled that any M tube could be skipped. This was so because prior M tubes were arranged to prime any higher order M tubes, which in turn were fired by K ring pulses under the control of the sterling keyboard setting.

However, this is not the case in connection with the M9 through M12 tubes (FIG. 26), which are provided for establishing switching paths for the fractional conversion operation, because these tubes are fired by K ring pulses over fixed firing lines. For example, the M9 and M10 tubes assume control during the conversion of the shillings fraction to pence. The conversion factor is 12, because there are twelve pence per shilling. Hence the conversion factor of 12 becomes the multiplier factor, and the decimal fraction stored in the shillings accumulator becomes the multiplicand. The M9 tube is primed from the last M chain tube employed. In the sample problem of FIG. 1, the M6 tube would supply priming potential to the M9 tube, because the pounds multiplier factor contained only two digits.

The M9 tube always provides for the entry of pulse groups in accordance with the shillings decimal fraction into the pence accumulator twice, whereas the M10 tube provides for the entry once. Consequently, two A ring cycles occur during conduction of the M9 tube, and these cycles are operable through the J ring and the K ring to develop a K2 pulse, which fires the M10 tube, priming for the M10 tube having been supplied by the M9 tube. The M10 tube is then controlling for one A ring cycle or until a K1 pulse is developed to fire the M11 tube. The M11 tube is primed by the M10 tube, and the M12 tube is primed from the M11 tube.

The M11 and M12 tubes control the conversion of the pounds decimal fraction to pence. There are 240 pence per pound, and so a conversion factor of 240 is used for this operation. The units order 0 of this conversion factor can be taken care of by a denominational shift, so that, in effect, the conversion factor becomes 24. Hence, the M11 tube is responsible for the entry of the pounds decimal fraction four times, thereby requiring four A ring cycles to develop a K4 pulse, which fires the M12 tube. The M12 tube is then opertaive for two A ring cycles until a K2 pulse is developed to fire the M13 tube (FIG. 27), which is primed from the M12 tube.

The M13 tube controls the round-off operation, wherein five pulses are introduced into the highest decimal fractional order bank of the pence accumulator. However, in the present problem, there are no decimal fractions in any of the accumulators, so round-off is meaningless because the decimal fractional pence are not read out.

The control tube M13A (FIG. 27) is used merely to provide a delay of one A ring cycle. This delay is for the sole purpose of accommodating a carry on a carry. The M13A tube is primed from the M13 tube but is fired by the A0–Tally pulse occurring at the end of the single A ring cycle delay, as afforded by the M13 tube.

The M13A tube primes the M14 tube (FIG. 27), which is also fired by the A0–Tally pulse which occurs at the end of the single A ring cycle related to the M13A tube. The M14 tube initiates the Extraction process, which will be described after it has been shown how the fractional conversion circuitry of the M9 through M12 tubes is rendered ineffective for the instant whole-number problem.

During fractional conversion, the denominational order banks of the shillings accumulator and the pounds accumulator which contain decimal fractions are "pulsed out" by groups of ten pulses, in order to obtain the count thereof for application to the pence accumulator. For whole-number problems, it is only necessary to block the paths for these groups of ten pulses to the shillings and pounds accumulators to render this mechanism temporarily inoperative.

In FIG. 39, a decimal control switch 1295 is provided to establish paths to the selected order banks of the shillings accumulator for the groups of ten pulses employed in fractional conversion. For whole-number problems, the switch 1295 is merely left in its open position, as illustrated, to disable the fractional conversion operation. A similar switch, 1296, is shown in FIG. 45 and serves the same function in connection with the denominational order banks of the pounds accumulator of FIG. 48.

EXTRACTION OF INTEGRAL SHILLINGS FROM PENCE

The accumulators now contain the results of the interim products. Ordinarily, due to the multiplication, the contents of the pence accumulator will be in excess of 11 pence, and the stored shillings will exceed 19. Therefore, it is necessary to extract shillings from the number stored in the pence accumulator and pounds from the content of the shillings accumulator. In order to extract integral shillings from the stored pence under the novel arrangement employed herein, the contents of certain of the pence accumulator order banks are analyzed to determine by logical circuitry whether division by 12 can be effected. Only the "0" and "1" readouts are required for the logical circuitry, but, since these are obtained in the manner of the "0" through "9" readouts provided for printing and indicating purposes, the following discussion will relate to the readouts in general.

For readout purposes, use is made of decoding networks comprising the 2.2-megohm resistors 1301, shown in the upper portion of the binary counter circuit of FIGS. 34 and 35. The ten readout lines 1302 through 1311 indicate the digits 0 through 9. These lines are provided for developing potentials, one of which is unique to represent the content of the binary counter. For any one of the ten possible conditions, the single readout lead indicative of the count stored will stand at +25 volts with respect to the cathode common lead 968, while the other nine leads will be at +60 volts or higher. However, the common cathode lead 968 is −45 volts with respect to ground, due to the terminal 969. Therefore, the readout lead which represents the count of the accumulator order at any time is at a potential of −20 volts relative to ground, while the other leads are at +15 volts or higher.

Since this potential distribution can be obtained on separate output leads for separate counts stored in the units pence order of FIG. 34, it is possible to control an indicator and/or printer from the readout leads over the cable 1312. Also, the inputs for the decision circuit, generally illustrated in FIG. 32, are obtained from selected ones of these readout leads for each pence order bank, as will be explained next. Then, in turn, the decision circuit can control the extraction process to insure that an overdraft situation is never encountered.

The readout leads from the pence accumulator order banks actually establish biasing voltages for the pence readout matrix tubes to render these tubes receptive or non-receptive to external pulses. The pulses applied to the gated pence readout matrix tubes are single 180° pulses—i.e., testing or clock pulses—which are passed, in combination, to a Rossi circuit of the decision network in accordance with the biasing supplied by the accumulator order banks via the readout leads. Ordinarily, three order banks are examined in combination.

The Rossi circuit is connected to a trigger pair which remains in one condition if a "GO" signal (meaning that division is possible) is obtained. Then in turn the trigger pair, if in the above-recited one condition, opens a further set of gates to allow pulses in accordance with the complementary number 988 to be combined additively with the contents of the selected pence accumulator order banks, thereby effecting a subtraction of 12; i.e., the extraction of one shilling. However, if division is not possible, a "NO GO" signal is obtained from the Rossi circuit. This signal sets the trigger pair to its other condition, which closes the gates for the complementary number pulses. Also, as a result of a "NO GO" signal, the M chain is stepped one tube to establish different matrix paths for examining the next combination of three pence order banks.

As will be recalled, when the schematic of FIG. 4B was considered, the readout leads for the pence accumulator banks included "0" and "1" readouts for banks #1 through #5 and only the "0" readout for bank #6. These readout leads are separate from the "0" through "9" printing and indicating leads, merely to avoid overloading. The uppermost readout leads 1313 and 1314 in FIG. 35 are extra "0" and "1" readout leads for the units order of the pence accumulator. These are the leads which extend to the pence readout matrix of FIGS. 37 and 38, where connections will be established to the decision circuit of FIG. 32 for controlling the extraction process. The pence #2 through #6 order banks shown in block form in FIG. 35 also have readout leads which extend to the pence readout matrix of FIG. 38. In the analyzing process to follow, these leads will be taken up in their order of use.

With the readout lines available, the ensuing discussion will first concern two block diagrams which represent equivalent logical or decision circuits. As will be recalled in FIG. 4A, a block type logical diagram was set forth for explaining when the quantity stored in three order banks of the pence accumulator could be divided by 12. The logical arrangement of FIG. 4A employed three input channels for simultaneous testing of three order banks of the pence accumulator. The highest order bank (A) examined required only the "0" readout, because, if the pence order bank A was storing a 1 or higher digit, this meant that a three-digit number was being examined for division by 12, and, of course, any number from 100 to 999 is divisible by 12; however, if the pence bank A contained a 0, the banks B and C could have been storing 10 or 11, in which event division was not possible. Hence, it was necessary to examine both the "0" and the "1" readout leads for pence banks B and C.

These conditions are set forth directly above the symbolic logical arrangement of FIG. 4A. The Truth Table representing these conditions is presented in FIG. 51 along with the logical expression based on the Truth Table. The function (F) represents the relation of the readout values for three order banks of the pence accumulator which will permit division. Considering either the conditions of FIG. 4A or the Truth Table of FIG. 51, it will be observed that division is possible if $A\neq 0$ (FIG. 4A) expressed by $\overline{A}_0$ in FIG. 51, OR $B\neq 0$ AND$\neq 1$ (FIG. 4A) express by $\overline{B}_0$ AND $\overline{B}_1$ in FIG. 51 OR $B\neq 0$ AND $C\neq 0$ AND$\neq 1$ (FIG. 4A), represented by $\overline{B}_0$ AND $\overline{C}_0$ and $\overline{C}_1$ in FIG. 51. By Boolean notation, this expression reduces to the equation:

$$F=\overline{A}_0+\overline{B}_0\overline{B}_1+\overline{B}_0\overline{C}_0\overline{C}_1$$

In substance, this equation states that, if the content of pence order bank A is NOT 0 (representing a stored quantity of at least 100), division is possible, OR if the content of pence order bank B is NOT 0 or NOT 1 (representing a stored amount of at least 20), division is possible, OR if the content of bank B is NOT 0 AND the content of bank C is NOT 0 AND NOT 1 (representing a stored quantity of at least 12 in banks B and C), division is still possible.

In order to show that the logical circuitry can be designed to incorporate either the conditions which will permit division or another set of conditions which will not permit division, the equation of FIG. 51 set forth above will be operated upon by the rule of sums and multiplications to obtain the NOT function ($\overline{F}$), which by definition then indicates that division is not possible. This equation is given in FIG. 51 as $$\overline{F}=A_0(B_0+B_1)(B_0+C_0+C_1)$$

Expansion of the terms yields $$\overline{F}=A_0B_0+A_0B_0C_0+A_0B_0C_1+A_0B_1C_0+A_0B_1C_1$$

which can be reduced by taking out an $A_0B_0$ from the first three terms. This produces $$\overline{F}=A_0B_0(1+C_0+C_1)+A_0B_1C_0+A_0B_1C_1$$

but the quantity $(1+C_0+C_1)$ is equal to 1 (since bank C cannot contain a count of 1 and 0 at the same time), so that $\overline{F}$ now becomes equal to $A_0B_0+A_0B_1C_0+A_0B_1C_1$. By extracting $A_0$, the equation for $\overline{F}$ is reduced to $$A_0(B_0+B_1C_0+B_1C_1)$$

It will now be shown that this latter equation can be derived for a logical circuit based on the conditions which preclude division. These conditions are represented by the Truth Table of FIG. 52, wherein division is *not possible* if the quantity stored in pence banks A AND B is 0 (representing a content of 9 at most), OR the quantity stored in pence bank A is 0 AND the quantity stored in pence bank B is 1 AND the quantity stored in pence bank C is 0 (representing 10), OR the quantity stored in bank A is 0 AND the quantity in bank B is 1 and in bank C is 1, representing 11. These conditions yield the expression of FIG. 52, wherein $\overline{F}=A_0$ AND $B_0$ OR $A_0$ AND $B_1$ AND $C_0$ OR $A_0$ AND $B_1$ AND $C_1$. Reduced to Boolean notation, $\overline{F}=A_0B_0+A_0B_1(C_0+C_1)$. By extracting $A_0$, the function ($\overline{F}$) becomes equal to $$A_0(B_0+B_1C_0+B_1C_1)$$

which is identical to the equation derived for the conditions of FIG. 51.

It therefore becomes apparent that the design of the logical circuitry can be approached by use of the conditions which *permit division* or the conditions which *do not permit division.* The actual circuitry presented in FIGS. 37, 38, and 32 is based on the conditions which *do not permit division,* for it was found to be slightly more compatible with the rest of the system than the circuitry based on conditions which *permit division.*

In FIG. 53 is shown a block diagram for carrying out the "not-divisible" conditions set forth in the lower left-hand portion of this figure, in accordance with the equation of FIG. 52. The A0 readout lead 1317 extends through a NOT circuit 1324, which has an output lead 1411 to the AND circuit 1333. The AND circuit is capable of providing a "not-divisible" (or NO GO) signal whenever all of its inputs are present. The NOT circuit 1324 of the A0 read out lead 1317 also receives a positive-going clock pulse over common lead 1372. Whenever the content of the A bank is 0, a negative-going D.C. bias is supplied to the circuit 1324, which is in reality a pence readout matrix triode of FIG. 37. This triode is either saturated or cut off according to the D.C. bias supplied by the readout lead 1317. Hence, the NOT circuit 1324 is receptive to the clock pulse when bank A is storing a "0" count, thereby permitting a negative-going pulse to appear on readout line 1411. The presence of the pulse on the lead 1411 indicates that condition (1) is true; i.e., $A=0$. However, this is but one of three inputs to the AND circuit 1333.

Similarly, in condition (2), if the "0" readout lead 1374 from the pence bank B indicates a content of 0 in the pence bank, a negative pulse is derived from the NOT circuit 1379 and applied over lead 1414 to the OR circuit 1401. However, if the content of the pence bank B is 1, the readout 1380 provides a negative-going potential to the NOT circuit 1385 to produce a negative pulse on output lead 1415, which also extends to the OR circuit 1401. Hence, according to condition (2), if pence bank B is storing either a 0 count or a 1 count, a negative pulse appears on the output lead 1418 from the OR circuit 1401 for application to the AND circuit 1333.

The first part of condition (3) is that pence bank B must be storing a 0 count. Hence, the lead 1421 extends from the lead 1414, which is the output lead for the NOT circuit 1379 of the B0 readout lead 1374, to the OR circuit 1402. The OR circuit 1402 will also receive a pulse if the pence bank C is storing a 0 count or a 1 count. The 0 readout 1388 applies a negative-going D.C. bias to the NOT circuit 1386 to produce a negative-going pulse on lead 1419 as an input to the OR circuit 1402, whenever the count in pence bank C is 0. Similarly, a 1 count in bank C provides a negative-going bias over the "1" readout lead 1389 to the NOT circuit 1387 for developing a negative-going pulse on lead 1420 for application to the OR circuit 1402. Obviously, pulses cannot be obtained from both of the $C_0$ and $C_1$ readout leads at the same time, because the count of pence bank C cannot be both 0 and 1. However, the OR circuit 1402 requires only a single input to obtain an output negative pulse on lead 1422 for the AND circuit 1333.

The AND circuit 1333 is a Rossi type circuit, wherein three triode tube sections are normally conducting, and only the simultaneous application of three negative-going pulses to the grid circuits of these tubes will increase the common anode potential to produce a positive output signal indicative of a "not-divisible" condition .

Next, the discussion will be returned to the circuit of FIGS. 35, 37, and 38 and FIG. 32, wherein the components which were depicted in block form in FIG. 53 will be identified by the same numbers as those which were used in the description of the block diagram of FIG. 53.

The higher order banks of the pence accumulator are shown in FIG. 35. Inspection of the contents of order banks #6, #5, and #4 is first made in order to extract integral shillings from the highest orders of the pence accumulator. Since the maximum possible number of pence is 109,989 (9,999 by 11 pence), bank #7 is not used in this problem. The "0" readout lead 1317 for the #6 (hundred thousand) order bank 1318 (FIG. 35) is connected to decimal wafer switch 1319. Since the problem under consideration is one involving only whole numbers, the wiper 1320 of this decimal wafter switch is in its "1" position, to extend the readout lead 1317 over leads 1321 and 1322 (FIG. 37) to the control electrode 1323 of a triode 1324 included in the pence readout matrix. The matrix triodes are preferably of the 12AT7 type. The cathode 1325 is grounded, and the anode 1326 is connected over a 220,000-ohm resistor 1327 to a common B+ supply lead 1328, which extends to the cathode junction point 1329 of the M14 tube of FIG. 27.

The M14 tube is primed from the M13A tube and is fired from the A0 Tally tube of FIG. 19 over lead 696. Consequently, at the termination of the A ring delay cycle afforded by tube M13A, the M14 tube is fired to initiate the extraction process. With B+ potential supplied to the pence readout matrix triode 1324 of FIG. 37, the condition of this tube will automatically be determined by the biasing potential supplied to it over readout lead 1317 and connecting leads 1321 and 1322 (including the 470,000-ohm grid resistor 1330) from the pence #6 order bank 1318 (FIG. 35).

If the pence #6 bank 1318 is storing a 0 count, the readout lead 1317, which supplies the biasing potential for the pence readout matrix tube 1324, will be negative. If the pence #6 bank 1318 is storing any count (other than 0), the readout lead 1317 will apply a positive bias to the control electrode 1323 of the pence readout matrix triode 1324. If the triode 1324 is biased at a zero or positive potential level, it will "block" any positive pulses applied to its input grid lead 1322, because it will already be in the conducting state. However, if the bias supplied to the tube 1324 is negative by 15 volts (which is the readout lead voltage when the content of order bank #6 is 0), it will be cut off, so that a positive pulse applied to its input lead 1322 will develop a negative output pulse at its anode junction point 1331.

The source of this positive testing pulse is the 180° power amplifier pentode 520 of FIG. 13. This tube is continuously supplying 180° pulses over ouput lead 543 and by way of input lead 615 to the control electrode 634 of the cathode follower triode 618 of FIG. 14, as has already been explained. The biasing arrangement for the triode 618 is such that this tube is gated on over lead 624 from the A Delay tube (FIG. 13) whenever the A Delay tube is conducting. Consequently, each A ring cycle, a single 180° pulse is passed through the cathode follower 618 (FIG. 14) to appear on its output lead 619'.

The lead 619' is continued in FIG. 32 as the input lead for an amplifier stage comprising the duo-triode tube 1341 of the 12BH7 type. The B+ supply for both sections of this tube is derived from the +250-volt terminal 1342 (shown at the top of FIG. 32) over common supply lead 1343 and leads 1344, 1345, and 1346. Each of the anode circuits includes a 10,000-ohm load resistor, as shown at 1347 and 1348. The right-hand triode section is normally conducting, because its control electrode 1349 is connected over a 220,000-ohm grid resistor 1350 to the B+ supply lead 1346, whereas its cathode 1351 is grounded. However, the left-hand triode section of the envelope 1341 is normally in a non-conducting condition, due to the −30-volt terminal 1352, which is connected over the 100,000-ohm grid resistor 1353 to the control electrode 1354. The negative 30-volt. supply applied at terminal 1352 is by-passed to ground for A.C. components by the 0.01-microfarad condenser 1355.

The positive 180° pulse applied to input lead 619' is passed through the 0.01-microfarad coupling condenser 1356 to the control electrode 1354, where it has a sufficiently positive amplitude to cause conduction in the left-hand triode section of tube 1341. An inverted or negative pulse appears at the anode junction point 1357 for this left-hand triode section. This pulse is applied over connecting lead 1358 and by way of a 0.01-microfarad coupling condenser 1359 to the control electrode 1349 for the right-hand triode section. The inverted pulse has sufficient amplitude to drive this triode section at least to cutoff, thereby producing a positive pulse at the anode junction point 1360. This positive pulse is applied over lead 1361 to a cathode follower stage comprising the 6J6 duo-triode 1362.

The right-hand and left-hand tube sections of the cathode follower 1362 are connected in parallel in such a way that the common 6,800-ohm cathode resistor 1363 serves both sections of the tube, the B+ supply being derived from the +250-volt terminal 1342 by way of leads 1343, 1344, and 1345. The control electrodes 1364 and 1365 are connected in a common circuit including the 1,000-ohm grid resistors 1366 and 1367. The input lead 1361 for the positive pulse from the amplifier tube 1341 is connected by way of a 0.01-microfarad condenser 1368 to the common grid circuit for the cathode follower 1362, a 100,000-ohm grid-leak resistor 1369 being connected from the common grid input circuit to ground.

Hence, when the positive pulse from amplifier tube 1341 is applied to the cathode follower tube 1362, a positive pulse is developed across the load resistor 1363. This pulse follows output lead 1370 to a pence readout matrix pulse supply lead 1371, which extends to the lower portion of FIG. 37, where it is connected to a common pulse supply lead 1372 for all of the tubes of the pence readout matrix of FIGS. 37 and 38. It may therefore be summarized that, each time a 180° pulse occurs during the A Delay interval, a positive pulse is applied to the common pulsing lead 1372 for the pence readout matrix tubes.

Considering now again the pence readout matrix triode 1342 (upper left-hand corner of FIG. 37), it will be noted that this triode will produce an output positive-going pulse if the #6 bank 1318 (FIG. 35) of the pence accumulator is storing a 0 count. However, if this order bank is storing any other count, it will be supplying a zero or positive bias to the triode 1324 (FIG. 37) so that the tube will be conducting and the 180° pulse will have no effect on its output.

The pence readout matrix is arranged to test three order banks of the pence accumulator simultaneously in the manner just described. The pence #5 order bank 1373 (FIG. 35) has two readout leads, which it is necessary to test to determine whether or not this order bank contains a 0 or 1 count. The "0" readout lead 1374 extends through decimal wafer switch 1375 by way of the wiper 1376 and thence via leads 1377 and 1378 to the pence readout matrix triode 1379. Similarly, the "1" readout lead 1380 for the pence #5 order bank 1373 is extended through the decimal wafer switch 1381 by wiper 1382 and then along leads 1383 and 1384 to the pence readout matrix triode 1385 (FIG. 37).

In the same manner, the "0" and "1" readouts 1388 and 1389 for the pence #4 order bank 1092 (FIG. 35) are extended to the pence readout matrix triodes 1386 and 1387, respectively (FIG. 37).

The outputs (if any) from the five pence readout matrix triodes of FIG. 37, which are energized by the common B+ supply lead 1328 when the M14 tube is conducting, are applied to the diodes contained in the multiple envelopes 1401 and 1402 of FIG. 32. The output circuit for the pence bank #6 "0" readout triode 1324 is by way of a 150-micro-microfarad condenser 1403 and lead 1404 to the cathode 1405 (FIG. 32) of the left-hand diode contained in multiple envelope 1401. The cathode 1405 is normally biased at about +18 volts by way of a 100,000-ohm resistor 1406 over lead 1407, which is connected to the +18-volt terminal 1408, in turn by-passed to ground by a 0.01-microfarad condenser 1409. The anode 1410 of this same diode is held at about +25 volts over lead 1411 due to the voltage divider action between the grounded 100,000-ohm resistor 1412 and the 1-megohm resistor 1413, connected to the common +250-volt supply lead 1343.

If an output pulse is obtained from the triode 1324 (FIG. 37), it has a magnitude of approximately −28 volts. The application of this negative pulse to the left-hand diode of envelope 1401 (FIG. 32) permits about a 10-volt negative pulse to pass on to output lead 1411, clipping being provided here to eliminate any interference from extraneous signals.

The output from the pence order bank #5 "0" readout triode 1379 of FIG. 37 is applied over lead 1414 to the middle diode of the multiple envelope 1401 of FIG. 32. Similarly, the output from the pence order bank #5 "1" readout triode 1385 (FIG. 37) is applied over lead 1415 to the right-hand diode of the multiple envelope 1401 of FIG. 32. The output from these two diode tube sections is "anded" by the parallel anode leads 1416 and 1417, which are brought together as the common output lead 1418.

The multiple diode envelope 1402 of FIG. 32 receives the output leads 1419 and 1420 from the pence readout matrix #4–"0" and #4–"1" triodes 1386 and 1387 (FIG. 37). The multiple diode 1402 (FIG. 32) also receives a connection 1421 from the cathode circuit of the middle diode of multiple envelope 1401 to the cathode circuit of the left-hand diode of the multiple envelope 1402. The three diodes of the envelope 1402 which have their outputs connected in parallel over the common output lead 1422 represent the OR circuit 1402 of FIG. 53.

The Rossi circuit of FIG. 32, which corresponds to the AND circuit 1333 of FIG. 53, comprises both triode sections of the 12AT7 envelope 1431 and the left-hand triode section of the 12AT7 envelope 1432. The output pulse obtained from testing the content of pence bank A (#6 at the moment) is applied from the diode envelope 1401 over lead 1411 to the control electrode 1433 of the left-hand triode section of envelope 1432. The analyzed output of pence bank B (#5–"0" or #5–"1") is applied over lead 1418 to the control electrode 1434 of the right-hand triode section of envelope 1431. The output which represents the testing of pence banks B and C ($B_0$ or $C_0$ or $C_1$) is applied over lead 1422 to the control electrode 1435 of the left-hand triode section of envelope 1431.

Normally, these three (Rossi) triode sections are conducting because their cathodes are tied to the common ground lead 1436, and their anodes are connected over lead 1437 and by way of common anode resistor 1438, of 100,000 ohms, to the common 250-volt lead 1343. The control electrodes of each of these triode sections are normally biased at about +25 volts, as was explained in connection with the anode voltage of the diodes of envelope 1401; i.e., the 1-megohm resistor 1413 and the 100,000-ohm resistor 1412 establish the +25-volt level for the control electrode 1433 of the left-hand triode section of envelope 1432. This same biasing arrangement is used for the other two triode sections of the Rossi circuit.

When each of the triode sections of the Rossi circuit is normally conducting, the potential level of the common junction point 1441 for the anode leads 1437 is low. This condition indicates that the quantity being examined is "divisible" by 12; i.e., no output pulse. However, when all three triode sections of the Rossi circuit simultaneously receive a negative pulse, the common anode junction point 1441 is elevated, as all the tubes are cut off to produce a positive output pulse, indicating that the quantity under examination is "not divisible" and the next combination of three channels to be tested should be set up.

Assuming first that the quantity under examination is divisible by 12, it will now be shown how the remaining circuitry automatically establishes a subtraction by introducing the complementary number 988 to the appropriate order banks of the pence accumulator. Since the Rossi circuit, comprising the triode sections of envelope 1431 and the left-hand triode section of envelope 1432 does not receive three negative pulses, the common anode junction point 1441 will remain at its low potential level. In other words, no pulse is developed at this point. Therefore, no pulse is applied to the common output lead 1334, which is connected by way of a 100-micro-microfarad coupling condenser 1442 to the control electrode 1443 of the left-hand triode section of a 12AT7 envelope 1444.

This triode section is connected as a phase inverter, which is normally in a cutoff condition due to the −30-volt source applied at terminal 1445 and effective over the 100,000-ohm grid biasing resistor 1446. The B+ supply for the phase inverter triode section of envelope 1444 is the +360-volt terminal 1447, which is connected over leads 1448, 1449, and 1450 to the 100,000-ohm anode load resistor 1451 for this triode section. The output lead 1452 for the phase inverter triode of envelope 1444 receives a pulse only when the Rossi circuit produces an output pulse. Consequently, when division is possible, the output lead 1452 does not receive a pulse, and, accordingly, no pulse is introduced over input lead 1453 by way of the 100-micro-microfarad condenser 1454 to the control electrode 1455 of a cathode-follower-connected triode section 1456, also preferably of the 12AT7 type.

The anode 1457 for the triode section 1456 is connected over lead 1458 and common lead 1343 to the +250-volt B+ supply applied at terminal 1342. The cathode 1459 is connected over a 47,000-ohm load resistor 1460 to ground. The control electrode 1455 is also connected over a 100,000-ohm resistor 1461 to the +250-volt supply line 1343 to insure that this tube is normally conducting.

The output lead 1462 from the cathode follower stage 1456 is connected over a 100-micro-microfarad coupling capacitor 1463 and by way of a 100,000-ohm grid resistor 1464 to the control electrode 1465 of the left-hand triode section of a trigger pair 1466. This left-hand section of the trigger pair is normally conducting and will remain so unless a negative pulse is applied to its left-hand control grid 1465.

The circuit for the trigger pair 1466 includes a pair of 27,000-ohm load resistors 1467 and 1468, and a pair of 250-micro-microfarad commutating condensers 1469 and 1470, shunting the 390,000-ohm transition resistors 1471 and 1472, respectively. The cathodes are connected over common lead 1473 to the negative 105-volt terminal 1474, and the common control electrode circuit receives the —210-volt (Ecc) supply from terminal 1481 over lead 1482.

This trigger pair operates in conventional manner, so that the anode junction point 1475 for the right-hand triode section thereof has a high potential level when conduction is in the left-hand triode section and a low potential level when conduction is in the right-hand triode section. The output lead 1476 extends from the junction point 1475 by way of a 47,000-ohm resistor 1477 to the control electrode 1478 of a complementary number gate 1479.

The complementary number gate 1479 is preferably a half section of a 12AT7 type tube, having its anode 1501 connected to the +105-volt terminal 1502 and its cathode 1503 connected through a 47,000-ohm load resistor 1504 to ground. The cathode is connected over a 22,000-ohm resistor 1500 to a clipper arrangement including the series resistors 1505, of 4,700 ohms, and 1506, of 22,000 ohms, connected over lead 1507 to the +105-volt terminal 1502, and including the rectifier 1508, of the 1N65 type. The 22,000-ohm resistor 1506 is by-passed for A.C. by a 0.25-microfarad capacitor 1509. This clipping arrangement regulates the output voltage supplied to the grids of the division tally tube 1561.

It will be observed that the output of the complementary number gate tube 1479 is a D.C. output when present. For the situation where division is permitted, there is an output from this gate, because no pulse was applied to the trigger pair 1466, and, consequently, conduction remains in the left-hand side thereof, so that the right-hand anode junction point 1475 is at its high potential level, and the cathode-follower gate 1479 remains in its conducting condition.

The D.C. potential supplied to the complementary number gate output lead 1510 (FIG. 32) is used as a D.C. biasing supply for the complementary number "9" and "8" gates, shown in the form of a pair of triode sections contained in the 12AT7 envelope 1511 of FIG. 21. This D.C. biasing path is by way of a common 22,000-ohm resistor 1512 (FIG. 21) and the individual 100,000-ohm grid resistors 1513 and 1514 to the control electrodes 1515 and 1516 of the "8" and "9" complementary number gates.

A clipping arrangement is also provided at this point to insure that the D.C. biasing potential applied to the control electrodes 1515 and 1516 is limited to about +87 volts. The B+ supply for the triode sections of envelope 1511 is used to establish the limiting level. The common B+ supply lead 932 extends to the +360-volt terminal 933, shown in the lower left-hand corner of FIG. 21. A 47,000-ohm resistor 1517 is connected in series with a 15,000-ohm resistor 1518 between the +360-volt supply line 932 and ground, a 0.25-microfarad capacitor 1519 serving to by-pass A.C. to ground. The junction point 1520 between the resistors 1517 and 1518 is connected through a pair of rectifiers 1521, of the 1N65 type, to the common control electrode biasing lead 1510. The values of the resistors 1517 and 1518 in relation to the B+ supply serve to limit the control electrode potential at approximately the +87-volt level.

The triode gates of envelope 1511 are connected in cathode-follower fashion, each having a 9,000-ohm load resistor 1522 and 1523 connected to the common +105-volt lead 1524, which extends to the positive terminal 1525. These triode sections are normally non-conducting and are receptive to pulses only when the D.C. biasing is supplied from the logical circuitry of FIG. 32. It will be recalled that this condition persists only so long as division is possible.

The input pulse supply for the left-hand complementary number "8" triode gate of envelope 1511 is the B ring B8 tube of FIG. 16. The cathode output lead 1526 for the B8 tube is connected to a further output lead 1527, which extends as the input lead for the B8 triode gate of envelope 1511 in FIG. 21. Whenever the B ring B8 tube is caused to assume the conducting condition, due to the A ring A8 tube, a group of eight 0° pulses is passed over output lead 1527 and by way of the 250-micro-microfarad coupling capacitor 1528 (FIG. 21) to the control electrode 1515 of the left-hand triode gate section of envelope 1511.

Similarly, the B9 tube of FIG. 16 supplies a group of nine 0° pulses over output leads 1529 and 1530 to the control electrode 1516 of the right-hand triode gate of envelope 1511 of FIG. 21. The nines complementary number for the division factor of 12 is 988; hence, a path is provided to the pence complements matrix of FIGS. 29 and 33 for the group of nine pulses, and a further path is divided into parallel paths, which are provided through the pence complements matrix for the group of eight pulses. In this manner, the number 988 can be formed by the pulse groups.

The "9" complementary gate of envelope 1511 (FIG. 21) has an output lead 1531, which is continued in FIG. 29 as the common pulse input line for four 6BC7 type diodes 1532 through 1535 of the pence complements matrix. At the present time, only the lower diode 1535 is receptive to the group of nine pulses on pulse lead 1531, because its common B+ supply lead 1536 is connected to lead 1537, which extends back to the energized cathode junction point 1329 of the M14 tube of FIG. 27. The group of nine pulses which pass the pence complements matrix diode 1535 (FIG. 33) is introduced into the pence #6 order bank 1318 of FIG. 35. This path is over the cathode output lead 1541 of the energized pence complements matrix 1536 (FIG. 33) and then by way of the common horizontal lead 1542 (FIG. 29) to the control electrode 1543 of a pence input amplifier triode section 155. The output lead 1545 from this tube section extends directly to the pence #6 order bank 1318 of FIG. 35.

In a similar manner, separate groups of eight pulses each will be introduced into the pence #5 order bank 1373 and the pence #4 order bank 1092 of FIG. 35. The pence complementary number "8" gate of envelope 1511 (FIG. 21) has an output lead 1546, which applies the single group of eight pulses selected by this gate to the pence complements matrix diodes of FIGS. 29 and 33. The common input lead 1546 is divided into the parallel leads 1547 and 1548, which enable separate diodes each to pass a group of eight pulses. The pence complements matrix diode 1549 of FIG. 33 receives the group of eight pulses from input lead 1547. The group of eight pulses is then passed over the cathode output lead 1550, which is continued as the common horizontal lead 1551 of FIG. 29. This latter lead supplies the pence accumulator input amplifier tube section 1552 of FIG. 30. The output lead 1106 from this amplifier tube section extends directly to the pence #4 order bank 1092 of FIG. 35.

The other input lead 1548 (FIG. 29) for a group of eight pulses extends to the pence complements matrix diode 1551 of FIG. 33. The cathode output lead 1552 for this diode is continued by the horizontal lead 1553 of FIG. 29 to the pence input amplifier tube section 1554 of FIG. 30. The output lead 1555 from this tube section applies the inverted, or now negative, pulses to the pence #5 order bank 1373 of FIG. 35.

The operation which follows a "division-permitted" signal from the Rossi circuit of FIG. 32 has just been described. Since the pence #4, #5, and #6 order banks 1092, 1373, and 1316 of FIG. 35 were under examination to yield the "division-permitted" signal, it is these banks which receive the complementary number 988. In this manner, the quantity 12 is substracted from the contents stored in these banks. If the potential on the readout leads from these three order banks does not change, the foregoing operation is automatically repeated to subtract 12 again. The M14 tube, of course, remains controlling, so that the matrix paths and the matrix diodes employed remain the ones just described.

Each time a substraction is effected, a division tally signal is developed and entered into the appropriate order bank of the shillings accumulator. In this manner, the quantity stored in the pence accumulator is converted to integral shillings so far as possible.

The division tally tube which develops this signal is shown in FIG. 32 as the 6J6 envelope 1561. The two triode sections of this envelope are connected in parallel, cathode-follower fashion, with the B+ supply being the +360-volt source 1447 applied over lead 1448. The single cathode output lead 1562 is connected through a 10,000-ohm load resistor 1563 and over lead 1564 to the +95-volt terminal 1565.

This cathode-follower-connected tube 1561 is normally in the non-conducting state, due to a D.C. biasing path for the tube 1561 from the complementary number gate triode 1479 (FIG. 32). It has previously been explained that the clipper arrangement including diode 1508 and series resistors 1505 and 1506 is provided to limit the output voltage from the complementary number gate 1479. This clipper arrangement limits the voltage to approximately the +87-volt level at junction point 1566. The cathode of tube 1479 is connected over 22,000-ohm resistor 1500 to point 1566, and a lead 1567 extends from junction point 1566 over a 100,000-ohm resistor 1568 to the common control electrode lead 1569 for the control electrodes of the division tally tube envelope 1561. A pair of 100-ohm parasitic suppressor resistors 1570 and 1571 is included in the common control electrode circuit for the division tally tube.

Hence, positive D.C. biasing is provided for the division tally tube 1561 whenever the trigger pair 1466 remains in its normal condition, with its left-hand triode section conducting. This is the case so long as division is permitted.

The division tally tube 1561 (FIG. 32) receives an input pulse once each A ring cycle. The input pulsing lead 1572 extends over a 250-micro-microfarad coupling capacitor 1573 to the cathode circuit of the B1 tube of FIG. 15. When the A1 tube assumes the conducting condition, a 0° pulse is applied from the B1 tube to the division tally tube 1561 of FIG. 32 over the input pulsing lead 1572. If, at this time, the positive D.C. biasing potential from the complementary number gate 1479 is also present, a positive output pulse will appear on lead 1574.

The output lead 1574 is continued in FIG. 36, where it serves as the input pulsing lead for the shillings tally matrix. The diode 1575 is energized at this time because its anode lead 1536 is connected over the 22,000-ohm load resistor 1577 to the cathode circuit of the M14 tube of FIG. 27. Accordingly, the positive pulse on input lead 1574 is applied through the 2,500-micro-microfarad coupling capacitor 1578 to the diode 1575, where the output lead 1579 is continued in FIG. 40 by lead 1580, which extends to the shillings input amplifier tube section 1581. The inverted, or negative, output pulse from this tube section is applied over lead 1161 to the shillings #4 order bank 1162 of FIG. 42. The shillings #4 order bank 1162 is the thousands denominational order of the shillings accumulator, for this problem. Hence, each time a division of the quantity stored in pence order banks #6, #5, and #4 is possible, an entry is provided into the thousands order bank of the shillings accumulator.

The reason that the tally is entered into the thousands order bank of the shillings accumulator is that, when the highest three order banks of the pence accumulator are being examined, the quantity of 12,000 is subtracted each time division is permitted. This will, perhaps, be more lucid if an example is presented. Assume, for the moment, that the pence accumulator contains the maximum amount which would ever be placed thereby a problem within the scope of the capacity assumed herein. This quantity is 109,989 pence, obtained by multiplying the decimal quantity 9999 by the pence factor of 11. If this quantity is divided by 12, it will be observed that it represents 9,165 shillings with a remainder of 9 pence. Consequently, when the contents of the highest three order banks (namely, 109) is being examined, it must be borne in mind that this represents 109,000, so each subtraction is in reality one of 12,000 pence, which is equal to 1,000 shillings.

Similarly, when the next combination of three banks of the pence accumulator is examined, the quantity 099 under examination actually represents 09,900, or 9,900. Hence, 1,200 is subtracted from this quantity during each division operation, and the tally pulses go to the hundreds order of the shillings accumulator because 1,200 pence is equal to 100 shillings. For the next denominational shift in the examining process, the tally pulses will enter the tens order of the shillings accumulator, and, for the last denominational shift, the units order of the shillings accumulator will receive any tallies developed.

When the selected order banks of the pence accumulator are receiving the complementary number, extraneous carries are developed by the highest order of the selected banks. Since the order banks are arranged in endless chain fashion, to facilitate fractional decimal problems (to be discussed later), carry paths extend from each order bank to its next higher order bank and from bank #7 to bank #1. Each time the complementary number 988 is added to 109, the quantity assumed in the first selected highest three order banks (#6, #5, and #4), an erroneous carry would be entered in to the #7 order bank. It is conceivable that spurious signals could extend a carry from the #7 bank into the as yet untested #1 order bank. Also, false carries would be entered into higher order banks when the selected combinations of three lower order banks were examined if the complementary number was required a sufficient number of times.

To preclude such false carry entries, the transfer path from the #7 order bank to the #1 order bank is always blocked for whole-number problems. Further, the transfer path out of the highest order bank under examination is also interrupted.

The transfer or carry path out of pence order bank

#7, shown at 1624 in FIG. 35, is over lead 1625 and by way of the right-hand triode amplifier section of envelope 945 (FIG. 30) to the common output lead 956, which serves as the input lead for the pence #1 order bank of FIG. 34. In order to block this transfer path, the control electrode 1626 of the carry amplifier section of tube 945 is changed to ground potential over a 47,000-ohm resistor 1627 via lead 1628 and wiper 1629 of decimal wafer switch 1630. Otherwise, the normal potential distribution at control electrode 1626 is determined by the path including the 47,000-ohm resistor 1627 and the 470,000-ohm resistor 1631, connected to the +85-volt terminal 954, by-passed to ground by the 0.002-microfarad capacitor 1632; all relative to the +96-volt level at cathode 1633. Hence, grounding of the control electrode 1626 circuitry precludes the passage of carries from pence order bank #7 (FIG. 35) to pence order bank #1 of FIG. 34.

In order to conserve components, the exact complementary number 988 is used herein in lieu of 9999988, a number having 9's in all orders up to the capacity of the accumulator. Hence it now becomes necessary to interrupt the carry or transfer path out of the highest order bank under examination; i.e., the bank which receives the 9 digit of the complementary number 988.

The transfer path out of the highest pence order bank under examination is blocked by one of the four triode gates, shown as the triode sections in the 12AT7 envelopes 1671 and 1672 of FIG. 31, under control of the M14 through M17 tubes, respectively. The left-hand triode of envelope 1671 has its control electrode 1673 connected between the equal-valued 270,000-ohm resistors 1674 and 1675, which form a voltage divider. The upper end of the voltage divider is connected over lead 1677 to the —75 volt terminal 1676, and the lower end of the divider extends over lead 1678 to the cathode junction point 1329 of the M14 tube of FIG. 27. The cathode 1679 (FIG. 31) of the left-hand gate of envelope 1671 is grounded, but the anode 1680 is connected over lead 1681 and by way of branch lead 1682 to the junction joint 1683 in the control grid 1684 circuitry of the carry amplifier tube section 1685.

The carry amplifier 1685 has an input lead 1686, for receiving carry signals from the pence #6 order bank 1318 (FIG. 35), and an output lead 1687 (FIG. 31), for passing the amplified and inverted carry signals to the pence #7 order bank 1624 (FIG. 35).

Figure 27:
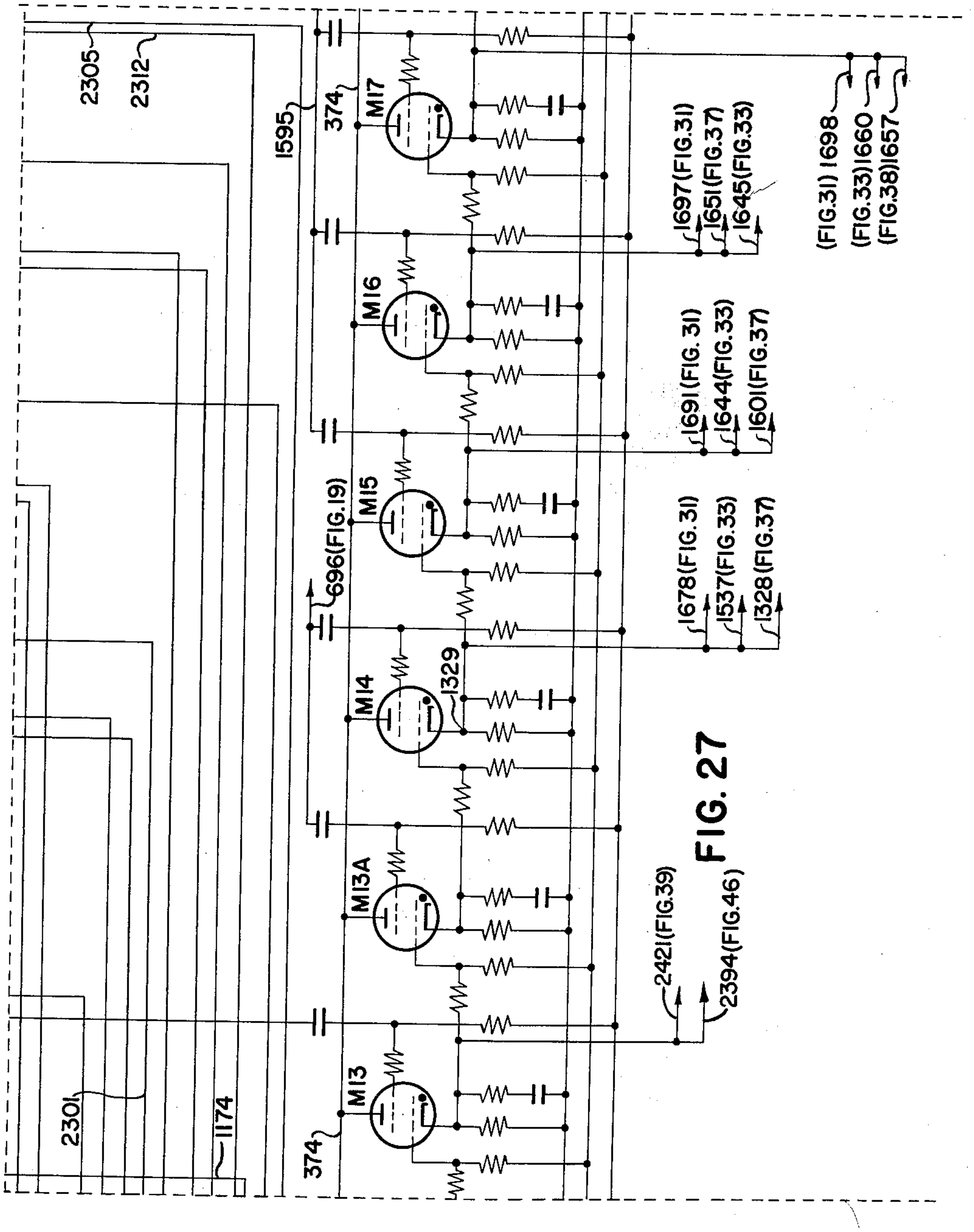

When the M14 tube of FIG. 27 is on, for controlling the testing of pence banks #6, #5, and #4 (FIG. 35), the left-hand gate section of envelope 1671 (FIG. 31) is caused to conduct due to the positive bias supplied over lead 1678.

The 470,000-ohm resistor 1688 in the control grid circuit of the carry amplifier 1685 serves as the load for the gate 1671, the +85-volt terminal 954 (FIG. 30) supplying B+ over lead 1053 for the gate 1671 (FIG. 31). Hence, when the gate conducts, under control of the M14 tube, the potential of control electrode 1684 of carry amplifier 1685 is dragged down sufficiently to block the carry tube section, thereby interrupting the carry path from pence bank #6 to bank #7 (FIG. 35).

In the same manner, the right-hand triode section of envelope 1671 serves as a carry blocking gate when pence banks #5, #4, and #3 are being tested. The M15 tube supplies D.C. biasing over lead 1691 to establish conduction, and the anode lead 1692 is extended over the branch lead 1693 to decrease the bias applied to carry amplifier section 1694. This tube section normally receives carry signals from pence bank #5 over lead 1695 and passes them, inverted and amplified, via lead 1545 to pence bank #6. Hence, when the right-hand triode section of tube 1671 is conducting, the transfer path from pence bank #5 to bank #6 is blocked by the cutoff amplifier section 1694.

Similarly, the left-hand section of tube 1672 blocks the carry amplifier 1696 (FIG. 30) over leads 1689 and 1690 for carries from pence bank #4 to #5 when the M16 tube is supplying positive biasing potential over lead 1697. At this time, the contents of pence banks #4, #3, and #2 are being examined. Next, when the stored quantity in pence banks #3, #2, and #1 is being tested, the M17 tube gates on the right-hand section of tube 1672 (FIG. 31) over lead 1698 to block the pence banks #3 to #4 carry amplifier section 1105 (FIG. 30) over leads 1699 and 1700.

Returning to the logical operations, after the appropriate number of subtractions have been effected, the quantity stored in the three banks under examination will have been reduced to a value which no longer permits the subtraction of 12. At this time, a "not-divisible" signal will be developed by the Rossi circuit of FIG. 32. The reason for this signal is the fact that the Rossi circuit, including the two triode sections of envelope 1431 and the left-hand triode section of envelope 1432, will simultaneously receive three negative input signals, which cut off these triode sections, thereby elevating the potential at their common anode junction point 1441.

The Rossi circuit of FIG. 32 will receive three negative input signals if the conditions set forth in FIG. 53 are satisfied; i.e., the quantity indicated by the $A_0$ readout is 0, AND the $B_0$ readout represents 0 OR the quantity indicated by the $B_1$ readout is 1, AND the quantity on the $B_0$ readout is 0 OR the $C_0$ readout equals 0 OR the $C_1$ readout equals 1. These conditions, of course, merely state that the highest order bank contains a 0 count and the next two order banks contain a count of less than 12.

In the example assumed, wherein the pence accumulator contained its maximum value, 109,989, the highest three order banks will enable nine subtractions, which reduces its count to 001. At this time, the pence accumulator order bank #6, shown at 1318 in FIG. 35, would be supplying a positive bias over output lead 1317 to the pence readout matrix diode 1324. The diode 1324 would pass a negative pulse over lead 1404 and by way of the left-hand diode of multiple envelope 1401 (FIG. 32) to the Rossi triode section, shown as the left-hand triode of envelope 1432.

At the same time, the pence #5 order bank 1373 (FIG. 35) would be supplying a positive bias over its "0" readout lead 1374 to the pence readout matrix triode 1379. Hence, a negative signal would be passed through the middle diode of envelope 1401 (FIG. 32) and on to the right-hand Rossi triode section of envelope 1431.

Also, the readout lead 1389 (FIG. 35) of the pence #4 order bank 1092 and the "0" readout lead 1374 of the pence #5 bank 1373 would be supplying a positive bias for the pence readout matrix triodes 1387 and 1379. Conseuently, a negative pulse would appear on the output lead 1422 of multiple envelope 1402 (FIG. 32) for application to the left-hand Rossi triode section of envelope 1431.

When the Rossi circuit of FIG. 32 has its three triode sections cut off, a positive-going voltage appears at the common anode junction point 1441. This potential change is transmitted over lead 1334 and by way of the coupling capacitor 1442 to the control electrode 1443 of the phase inverter triode section included in envelope 1444. It will be recalled that this tube section is normally cut off due to the negative bias applied at terminal 1445. However, the positive-going potential change has sufficient amplitude to relieve the cut-off condition in this tube, resulting in a negative-going potential change on output lead 1452. This potential change has a twofold purpose, one being to disable the complementary number gate and the other being to step the M ring tubes to the next setting.

The first function is achieved over the further lead 1453 (connected to output lead 1452), which extends to the control electrode 1455 of the cathode-follower-connected triode section 1456. This tube normally is biased to its conducting condition over the D.C. path including the resistor 1461. However, the negative-going potential introduced to this tube section passes to the cathode output lead 1462 also as a negative-going potential change which is effective over coupling capacitor 1463 and grid resistor 1464 to depress the potential of control electrode 1465 of the left-hand triode section of trigger pair 1466.

When the trigger pair is flipped, with conduction being established in its right-hand triode section, the potential at its anode junction point 1475 is suddenly decreased, which, by way of lead 1476, cuts off the complementary number gate 1479. This being a D.C. potential, the gate remains cut off until the trigger pair is switched back. Since the complementary number gate 1479 of FIG. 32 controls the "8" and "9" complementary number gates of FIG. 21 over the common control electrode lead 1510, it is impossible for the pulses in accordance with the digits of the complementary number 988 to pass to the pence accumulator.

The function of stepping the M chain is under the immediate control of the right-hand triode section of envelope 1432 (FIG. 32). The negative-going potential change on output lead 1452 from the left-hand triode section of envelope 1444 is applied through a 500-micro-microfarad coupling capacitor 1582 and by way of a clipper arrangement to the control electrode 1583 of the right-hand triode section of envelope 1432.

The clipper arrangement is such that the right-hand triode section of envelope 1432 is normally in the conducting condition. A 220,000-ohm resistor 1585 is connected from the +250-volt common supply lead 1343 to the control electrode 1583. A D.C. biasing path is continued from the control electrode 1583 through the 1N65 rectifier 1586 and by way of a 100,000-ohm resistor 1587 to the +36-volt terminal 1588, which is by-passed to ground by a 0.01-microfarad capacitor 1589. Grid current prevents an excessive D.C. potential level at the control electrode 1583. The cathode 1590 of this triode section is connected to the common ground lead 1436, and the anode 1591 is connected through a pair of parallel 39,000-ohm resistors 1592 and 1593 to the anode supply lead 1594, which extends over leads 1449 and 1448 to the +360-volt B+ supply terminal 1447. The output lead 1595 extends to FIGS. 28 and 27, where it serves as the firing line for the M chain tubes M15 through M22.

When the negative-going potential change occasioned by the "not-divisible" signal was applied to the control electrode 1583 of the right-hand triode section of envelope 1432 of FIG. 32, this triode section was momentarily cut off to produce a positive pulse on output lead 1595, which caused the M15 tube of FIG. 27 to be fired. It will be noted that the M15 tube was primed from the cathode circuit of the M14 tube in the manner previously explained in connection with earlier M chain tubes.

The M15 tube establishes paths through the matrices for testing the pence order banks #5, #4, and #3. These order banks are shown in FIG. 35, wherein the "0" readout output lead 1374 from the pence #5 bank 1373 is now connected over the decimal wafer switch 1375 by way of the wiper 1376 and the output lead 1377 to the common input lead 1378 for the pence readout matrix triodes. When the M15 tube is conducting, anode potential is applied to the common lead 1601 of FIG. 37 from the cathode circuit of the M15 tube of FIG. 27. Consequently, it is now the diode 1602 which serves as the NOT gate for the highest order readout lead. In the same manner, the pence readout matrix triodes 1603 and 1604 receive the "0" readout lead 1388 and the "1" readout lead 1389 from the pence #4 order bank 1092 of FIG. 35. Also, the pence readout matrix triodes 1605 and 1606 receive, respectively, the "0" readout lead 1607 and the "1" readout lead 1608 from the pence #3 order bank 1091 of FIG. 35.

The common input pulsing line 1372 for the pence readout matrix of FIGS. 37 and 38 receives a positive 180° testing pulse from the cathode follower tube 1362 (FIG. 32) over the lead 1371 during the A Delay time of the next A ring cycle. It will be pointed out that, during the A Delay time of the preceding A ring cycle, the upper row of pence readout matrix triodes 1324, etc. (FIGS. 37 and 38), passed a sufficient number of testing or 180° pulses to the Rossi circuit to switch the M chain and close the complementary number gate, so that the complementary number 988 digit pulses were blocked from entering the pence accumulator. This was the A ring cycle, wherein division was no longer possible.

The 180° testing pulse applied to the second row of pence readout matrix triodes 1602, etc. (FIGS. 37 and 38), is now testing to see whether the quantity stored in the pence banks #5, #4, and #3 is divisible.

Prior to the appearance of the testing pulse for the second row of pence readout matrix triodes 1602, etc., and during the "not-division" A ring cycle, the condition of the trigger pair 1466 of FIG. 32 was returned to normal, with conduction being re-established in its left-hand triode section. This trigger pair is reset at the conclusion of every A ring cycle by the A0–Tally pulse. The right-hand control electrode 1611 is connected over leads 1612 and 1613 (the latter including a 100-micro-microfarad coupling capacitor 1614) to the anode junction point 1615 of the right-hand triode amplifier section of envelope 1444.

This tube section is normally non-conducting, having its control electrode 1616 connected over a 100,000-ohm biasing resistor 1617 to the −30-volt terminal 1445. The cathode 1618 is grounded, and the anode 1619 is connected over a 27,000-ohm load resistor 1620 and by way of leads 1621 and 1344 to the common +250-volt lead 1343. The A.C. input lead 1622, including a 100-micro-microfarad capacitor 1623 for the right-hand section of envelope 1444, is connected to the cathode circuit output lead 696 of the A0–Tally tube of FIG. 19. Hence, each time a positive A0–Tally pulse is applied to the right-hand amplifier tube section of envelope 1444 (FIG. 32), a negative pulse is passed over output lead 1613 to the control grid 1611 of the right-hand triode section of trigger pair 1466. This action re-establishes conduction in the left-hand triode section of this trigger pair in the event that a "not-divisible" signal had caused conduction to be shifted ot the right-hand side thereof.

Now, if division of the quantity stored in pence banks #5, #4, and #3 is possible, there will be no potential change in the output of the Rossi circuit of FIG. 32, and, accordingly, the trigger pair 1466 will remain in its reset condition, permitting the complementary number gate 1479 to supply positive bias to the "9" and "8" complementary number gates of envelope 1511 (FIG. 21), so that the pulse groups will be applied over output leads 1531 and 1546 to the corresponding input lines for the pence complements matrix diodes of FIGS. 29 and 33. The diodes 1534, 1641, and 1642 will be energized over common anode supply lead 1640, which is connected to lead 1644, the cathode output lead from the M15 tube of FIG. 27.

The three diodes 1534, 1641, and 1642 of the pence complements matrix provide paths to the pence order banks #5, #4, and #3 of FIG. 35 for the entry of the complementary number 988. These paths may be traced through selected ones of the pence input amplifiers of FIG. 30. The complementary number is introduced at these order banks over the paths established by the above-mentioned pence complements matrix diodes once each A ring cycle until a "not-divisible" signal is obtained.

The manner of derivation of this signal, in accordance with the output potentials from the pence accumulator order banks of FIG. 35 by way of the pence readout matrix triodes of FIGS. 37 and 38 and the Rossi circuit and associated control circuitry of FIG. 32, is precisely the same as that described in connection with the "not-divisible" signal when the contents of the pence accumulator order banks #6, #5, and #4 were examined previously. The "not-divisible" signal also effects the shifting of the M chain conduction to the M16 tube of FIG. 27. Further, the "9" and "8" complementary number gates of envelope 1511 of FIG. 21 were closed to preclude the application of the complementary number to the pence accumulator order banks #5, #4, and #3 during the switching time.

When the M16 tube is fired, in the manner of the M15 tube, the pence complements matrix of FIGS. 29 and 33 establishes three paths by way of the diodes 1533, 1643, and 1644 to the pence order banks #4, #3, and #2 of FIG. 35 because these diodes are energized over the common anode B+ lead 1645, which extends back to the cathode circuit of the M16 tube of FIG. 27. At this time, the pence readout matrix diodes 1646 through 1650 of FIGS. 37 and 38 are energized over common anode lead 1651, which also extends back to the cathode circuit of the M16 tube of FIG. 27. These triodes, respectively connect readout leads #4–0, #3–0, #3–1, #2–0, and #2–1 from the pence order banks of FIG. 35 to the decision circuit of FIG. 32 for testing purposes. After the number of subtractions or divisions permitted by the logical circuitry, the M chain is switched to the M17 tube in order that the contents of pence order banks #3, #2, and #1 of FIGS. 34 and 35 may be analyzed.

Now the pence readout matrix triodes 1652 through 1656 are energized over common B+ supply lead 1657, which extends to the cathode circuit of the M17 tube of FIG. 27. These triodes connect the readout leads #3–0, #2–0, #2–1, #1–1, and #1–0 of the pence order banks of FIG. 35 to the logical circuitry of FIG. 32 for testing purposes. If subtraction is permitted, the diodes 1532, 1658, and 1659 of the pence complements matrix of FIG. 29, now energized over common anode supply lead 1660, which is connected to the cathode circuit of the M17 tube of FIG. 27, pass the complementary number pulses (988) to the pence order banks #3, #2 and #1 (shown in detail in FIG. 34).

Figure 28:
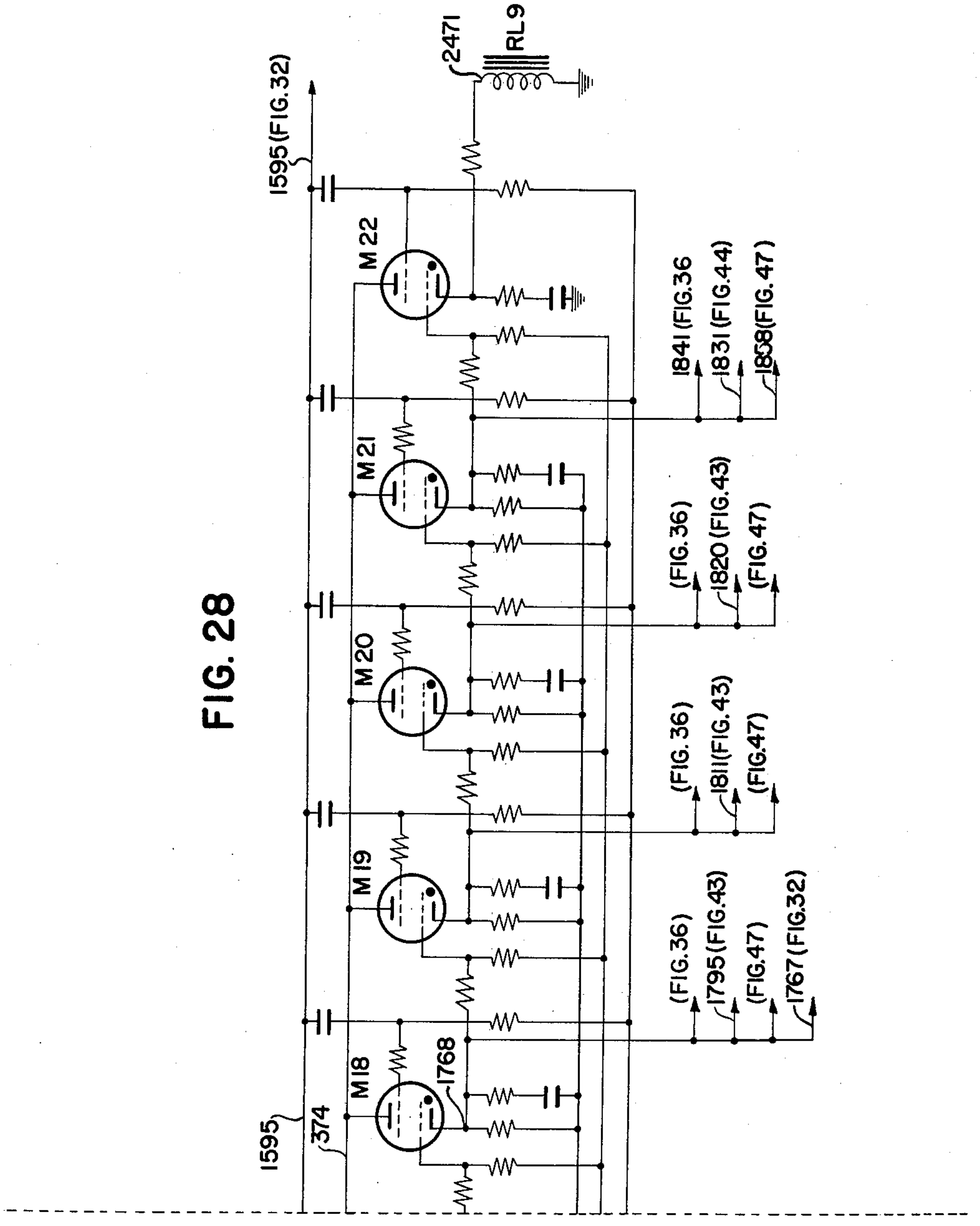

The M18 tube of FIG. 28 is fired at the conclusion of the extraction of integral shillings from the content of the pence accumulator. This operation will establish suitable paths to the shillings accumulator for analyzing its contents to permit the extraction of integral pence, if required. However, before this subject matter is discussed, the sample problem of FIG. 1 will be carried through the extraction-of-shillings step, omitting the decimal point and considering the sample figures to represent whole numbers.

The solution of a whole-number problem involves no fractional conversion, and so it is the Preliminary Product, as shown in FIG. 1, which is used in the extraction process. Accordingly, the value in the pence accumulator will be 0001296, which is evenly divisible by 12 to provide 108 shillings. The quantity 108 contains hundreds, tens, and units digit places, which denominational orders must be taken into account when the tallies are applied to the pence accumulator.

When the M14 tube is in control, extraction is attempted from order banks #6, #5, and #4. These banks are set to 001, a value too small to permit division. Accordingly, a "NO GO" or "not-divisible" signal will be generated to fire the M15 tube.

The M15 tube controls the examination of pence banks #5, #4, and #3, now containing the count 012. The stored amount 012 is divisible by 12, one time, resulting in a "one" tally into the hundreds order bank of the shillings accumulator and the subtraction of 1200 (through complementary addition) from the contents of the pence accumulator. The reason the tally went into the hundreds order bank of the shillings accumulator is that there are 100 shillings in 1200 pence. After the subtraction of 1200 pence, the pence accumulator contains only 00096 pence, which appears as 000 in the banks #5, #4, and #3, under examination. Hence a "NO GO" signal is developed to shift control to the M16 tube.

Tube M16 will conduct the examination of the contents of pence accumulator banks #4, #3, and #2. At this time, the content of these banks is 009, a quantity not divisible by 12. The resulting "No GO" signal shifts conduction from the M16 tube to the M17 tube.

The examination of pence banks #3, #2, and #1 is made under control of the M17 tube. The quantity stored in these banks is 096, which is divisible by 12 eight times. Therefore, eight tallies are applied to the units order bank of the shillings accumulator, thus completing the pence-to-shillings conversion. The quantity of 1296 pence has been converted into shillings, which were added into the shillings accumulator, leaving a 0 remainder in the pence accumulator. After the above eight subtractions, under control of the M17 tube, a "NO GO" signal is developed, which shifts conduction to the M18 tube to set up the extraction of pounds from the content of the shillings accumulator.

However, before any further discussion will be given relating to the extraction of pounds, the shillings extraction process will be further explained with reference to suitable timing charts, which reveal the components' timed intervals of operation.

In order to illustrate the complete operations involved in the extraction of integral shillings, it was necessary to select a quantity of considerably less magnitude than the 1296 pence contained in the pence accumulator in the whole-number problem. For this reason, the timing charts were drawn to illustrate the operation of extracting shillings from the pence accumulator when the latter contains a quantity of 28 pence. This is, of course, the quantity which is stored in the pence accumulator during the decimal fractional problem as set forth in FIG. 1.

The selected extraction is sufficiently simple to permit the graphic representations of all operations involved, because the extraction is limited to two shillings, with a remainder of four pence. Since this illustrated problem is so simple, the broad general description of the extraction circuitry was taken up prior to the presentation of the sample decimal fractional problem now to follow.

In FIGS. 7, 7A, and 7B, a timing chart is presented to depict the timed correlation of the important pulses and pulse groups and controls employed in the extraction process. Both extractions of the two integral shillings are enabled under the control of the M17 tube. For this reason, the timing chart is mainly concerned with the conducting interval of the control tube M17 of the M chain.

On Lines 1 and 2 of the timing chart of FIGS. 7, 7A, and 7B are shown the 0° pulses 101 and the 180° pulses 102. On Line 3 are shown the conducting intervals 1721 for the A Start tube of the A ring. The A Delay tube conducting intervals are shown on Line 4 at 1722. The A0–Tally pulses 1723 are shown opposite Line 5, appearing at the conclusion of each A ring cycle. On Line 12 is represented, at 1724, the normal condition of the decision circuit trigger pair 1466 of FIG. 32, which condition indicates that division is possible, and the other, or "not-divisible" condition is shown on Line 12 at 1725.

At the beginning of the time interval depicted by the chart of FIGS. 7 through 7B, the M16 tube is conducting, as illustrated on Line 13 at 1726. The M16 tube is rendered non-conducting, as shown at 1727 opposite Line 13, and the M17 tube is transferred from the non-conducting condition, as illustrated at 1728 on Line 14, to the conducting condition, depicted at 1729.

Bearing in mind the operation of the timing chart already described, the detailed circuitry will now be taken up. Since the pence accumulator order banks #3 through #7 of FIG. 35 contains 0's, the testing of these banks under control of the M14, M15, and M16 tubes generated "not-divisible" signals. For example, the extraction process is initiated upon the firing of the M14 tube of FIG. 27. The upper row of pence readout matrix triodes (FIGS. 37 and 38), as shown at 1324, etc., are energized over common anode lead 1328, which derives positive potential from the cathode circuit of the M14 tube of FIG. 27. Of the #6–0, #5–0, #5–1, #4–0, and #4–1 readout leads, the #6–0, #5–0, and #4–0 leads apply negative-going potential changes to the pence readout matrix triode 1323, the triode 1379, and the triode 1386, so that the 180° testing pulse applied to these tubes produces three simultaneous negative pulses to the Rossi circuit of FIG. 32. It will be recalled that this occasions the "not-divisible" signal, so the M chain is shifted to the M15 tube, and the complementary number pulses are not permitted to enter the pence accumulator.

The same operation occurs during conduction of the M15 tube because of the "0" content of pence accumulator order banks #5, #4, and #3. Hence, the "not-divisible" signal steps the M chain to the M16 tube. The operation under control of the M16 tube is identical to that occasioned by the M14 and M15 tubes. However, the timing chart of FIG. 7 is applicable to operation under control of the M16 tube, so the following discussion will set forth the timed correlation effected for a typical "not-divisible" signal developed at this time.

The A0–Tally pulse of Line 5 of FIG. 7, shown at 1723, terminates the A ring cycle associated with the M15 tube, so that the A Start conducting interval, shown at 1721 on Line 3, marks the beginning of the A ring cycle associated with the M16 tube. On Line 4, the A Delay conducting interval is shown at 1722, beginning one 0° pulse time interval after conduction is established in the A Start tube. It is during the A Delay interval that the testing pulse 1730 of Line 10 is gated to the pence readout matrix triodes of FIGS. 37 and 38 for analyzing the potential on the readout leads from the pence accumulator order banks. At the present time, it is the pence order banks #4, #3, and #2 which are being examined and which contain the quantity 002. Obviously, this quantity is not divisible by 12, so the Rossi circuit does receive three negative input pulses, necessary to its "not-divisible" condition.

The decision circuit output pulse—i.e., from the Rossi circuit—as shown at 1731 on Line 11 of FIG. 7. It will be recalled that the purpose of this pulse is twofold; namely, to shift the M chain and to prevent the entry of the complementary number.

In FIG. 7, it will be noted that conduction is shifted from the M16 tube, as shown at Line 13, to the M17 tube, the operation of which is illustrated on Line 14. The conducting condition for the M16 tube is shown at 1726, and it is changed to the non-conducting level 1727 at the time of occurrence of the decision circuit output pulse 1731 of Line 11. At this time, the M17 tube is fired from its non-conducting state 1728 to its conducting state, illustrated at 1729.

On Line 6 of FIG. 7, the conducting interval of the A9 tube is illustrated at 1732. This conducting interval covers the time necessary to develop nine 0° pulses, shown at 1733 in the B9 group of Line 7. Similarly, the A8 conducting interval is shown on Line 8 at 1734, and the group of B8 pulses is identified at 1735 on Line 9. Although these pulses are available to form the complementary number 988, they are not introduced into the pence accumulator because of the "not-divisible" signal 1731 of Line 11.

It will be recalled that the trigger pair 1466 of FIG. 32, when in its normal condition, permits the complementary number to be entered into the pence accumulator, but when in its other condition precludes the entry of the complementary number. The state of the decision circuit trigger pair is shown at Line 12 of FIG. 7, wherein the normal, or "division-possible" level is illustrated at 1724 and the "not-divisible" level at 1725. Hence, it was the decision circuit output pulse 1731 of Line 11 which caused the trigger pair, as shown on Line 12, to be switched from its normal condition. Therefore, the complementary number is not used during the first A ring cycle of FIG. 7.

At the conclusion of this first A ring cycle of the timing charts, the A0–Tally pulse is utilized to reset the trigger pair 1466 of FIG. 32. This is illustrated on Line 12 of FIG. 7A, where the decision circuit trigger pair is switched from its other than normal level 1725 to its normal condition 1724. At the same time, the second A0–Tally pulse 1723, shown in FIG. 7A, is developed to initiate the second A ring cycle, presented in the timing charts. During this cycle, the M17 tube is clearly controlling, as shown by the M17 tube reference levels of Line 14, and it is this tube which establishes the testing paths from the pence order banks #3, #2, and #1, by way of the pence readout matrix of FIGS. 37 and 38, to the decision circuit of FIG. 32. Since the content of these order banks is 028, the number 12 can be divided into this quantity twice, thereby yielding two shillings and a remainder of 4 pence.

Lines 16, 17, and 18 in FIGS. 7A and 7B illustrate the operation necessary to extract two shillings from the stored pence. These operations will now be considered in conjunction with the control exercised by the M17 tube of Line 14. In the second A ring cycle presented in the timing charts, the A Delay conducting interval is shown at 1722 on Line 4, permitting the application of the testing pulse 1730 of Line 10 to the pence order bank readout analyzing circuitry. Since the testing pulse does not result in the application of three negative-going pulses to the Rossi or decision circuit, the decision circuit does not provide an output pulse on Line 11. Hence, the decision circuit trigger pair of Line 12 remains in its "division possible," or normal, state, as indicated at 1724 on Line 12, to permit the complementary number (988), represented by the group of nine pulses 1732′ of Line 16 and the group of eight pulses 1735′ of Line 17 to be entered into the order banks of the pence accumulator, as selected by the M17 tube.

Each time the complementary number is introduced into the pence accumulator, a shillings tally pulse, as indicated at 1736 on Line 18, is introduced into the proper order bank of the shillings accumulator. This is under the control of the shillings tally tube 1561 of FIG. 32, which receives a B1 pulse of its input lead 1572, the B1 pulse occurring in time with the last pulse of the complementary "9" and "8" groups of Lines 16 and 17.

The output shillings tally pulse 1736, shown on Line 18 of the timing charts, follows the output lead 1574 of the division tally tube 1561 of FIG. 32 to the shillings tally matrix of FIG. 36. There the uppermost diode 1741 passes the pulse over output lead 1742, which is continued in FIG. 40, where lead 1121 provides a path to the units shillings input amplifier tube section 1122 of FIG. 39. The output lead 1123 from this amplifier tube section introduces the shillings tally pulse to the units order of the shillings accumulator, shown in FIG. 41.

During conduction of the M17 tube of Line 14, a second extraction or division is permitted, because, when the testing pulse 1730 occurs, during the A Delay conducting interval of FIG. 7B, no decision circuit output pulse is present on Line 11, and the decision circuit trigger pair of Line 12 remains in its normal operating condition, as indicated by the level 1724, to permit the second group of B9 and B8 pulses 1732′ and 1735′, as shown on Lines 16 and 17 of FIG. 7B, to be entered into the pence accumulator. A second shillings division tally pulse 1736 of Line 18 of FIG. 7B is introduced into the units order bank of the shillings accumulator over the path hereinbefore described. At this time, the content of the pence accumulator has been reduced to 004, as shown in the sample problem of FIG. 1. Hence, during the fourth A ring cycle of the timing charts of FIGS. 7 through 7B, the testing pulse 1730 of Line 10 fails to provide three pulses simultaneously to the Rossi or decision circuit, so that the decision circuit produces an output pulse 1731 on Line 11. This output pulse switches the decision circuit trigger pair of Line 12 to its other than normal condition 1725 to preclude the entry of the complementary number and also switches conduction in the control chain from the M17 tube to the M18 tube. Conduction in the M18 tube is indicated at 1745 on Line 15 in FIG. 7B. The M18 tube then initiates the process for extracting integral pounds from the surplus shillings stored in the shillings accumulator.

EXTRACTION OF INTEGRAL POUNDS FROM SHILLINGS

The extraction of pounds is effected by dividing the quantity in the shillings accumulator by 20, the number of shillings per pound. In reality, the divisors are 20,000, 2,000, 200, and 20, in accordance with the order banks being examined, as was explained in connection with the extraction of shillings from the content of the pence accumulator. Since the divisor may be considered as an even 20, only three readout connections are necessary for a decision, as only two conditions (one of these containing an alternative) need be met to obtain a "not-divisible" signal. The shillings accumulator includes six order banks, of which it is necessary to examine all but the lowest order bank, since there is a zero in the units order of the divisor. The first examination is made on the "0" readout from the #6 bank and the "0" and "1" readouts for the #5 bank. Assume for the moment that the #6 bank is the A channel and the #5 bank is the B channel, as used in FIG. 53. It may then be observed that, if the A readout is equal to "0" AND the B readout is equal to "0" OR is equal to "1," the quantity stored is not divisible. Hence, the conditions for "division not possible" may be expressed as:

(1) $A=0$ indicated by $A_0$
AND (2) $B=0$ OR $B=1$ indicated by $B_0+B_1$

From these conditions the Boolean expression of the general equation may be written as follows:

$$\overline{F}=A_0(B_0+B_1)$$

The decision circuit hereinbefore presented may be used to carry out the logic necessary for the extraction of pounds. Since only two conditions requiring an OR and an AND circuit are necessary for testing purposes, one of the input paths to the Rossi circuit of FIG. 32 is not needed. However, for the "not divisible" signal, it will be recalled that three negative impulses were necessary at the Rossi circuit to provide an output pulse. One of these negative pulses is now substituted for by a negative D.C. level established under control of a thyratron 1751, of the GL5663 variety (FIG. 32).

The cathode 1752 of the thyratron 1751 is connected over a 1,000-ohm resistor 1753 and by way of the normally closed *9b2* contacts 1754 to the —105-volt terminal 1755, the resistor 1753 and the terminal 1755 being bypassed to ground by a 0.25-microfarad decoupling condenser 1756. The anode 1757 of the thyratron 1751 is connected to the junction point 1758 between a pair of equal-valued 47,000-ohm resistors 1759 and 1760, the latter being grounded. The B+ supply lead for the thyratron 1751 includes the 47,000-ohm resistor 1759 and a 1-megohm resistor 1761 connected in the lead 1422, which extends to the common +250-volt lead 1343. The control grid 1763 is connected over a 150,000-ohm grid resistor 1764 to a voltage divider network including the 120,000-ohm resistor 1765, connected to the —210-volt terminal 1481, and the 180,000-ohm resistor 1766, connected over lead 1767 to the cathode junction point 1768 of the M18 tube of FIG. 28.

The thyratron 1751 is normally in its non-conducting condition, but, when the M18 tube is fired to initiate the process for the extraction of integral pounds, the positive potential at the cathode circuit of the M18 tube is effective over control grid lead 1767 (FIG. 32) to cause the thyratron to be fired, which in turn decreases the potential at control grid 1435 of the left-hand triode section of envelope 1431 in the Rossi circuit, thereby insuring that this section of the Rossi circuit remains cut off. As a matter of fact, this condition persists during conduction of the M18 through M21 tubes, because the thyratron 1751 cannot be reset until the *9b2* contacts 1754 are opened under control of the M22 tube.

Accordingly, the OR circuit, comprising the three diode sections of envelope 1402 (FIG. 32), is now unable to influence the left-hand triode section of envelope 1431, and consequently this OR circuit will not be used in carrying out the logic necessary for the extraction of pounds from the shillings accumulator. However, the diode sections of the left-hand multiple envelope 1401 of FIG. 32 will be used with the left-hand diode thereof forming an independent path for condition $A_0$ to the Rossi circuit, and the middle and right-hand diodes thereof composing an OR circuit for the conditions $B_0+B_1$. The path for the highest order bank being examined is brought into the left-hand diode of multiple envelope 1401 over lead 1781, which is one of the output leads from the shillings readout matrix of FIGS. 43 and 44. The "0" control lead 1782 (from FIG. 43) is connected to the cathode circuit of the middle diode of envelope 1401 (FIG. 32) from the shillings readout matrix of FIGS. 43 and 44. Lastly, the "1" readout control lead 1783, from the shillings readout matrix of FIGS. 43 and 44, extends to the cathode circuit of the right-hand diode of envelope 1401.

While the M18 tube is conducting, the upper three triode sections 1784, 1785, and 1786 of the shillings readout matrix of FIG. 43 are receptive to testing pulses applied to the common testing pulse input lead 1787 of the shillings readout matrix (FIG. 43) from the cathode follower amplifier 1362 of FIG. 32. These testing pulses are derived from the same source as the testing pulses used when the pence accumulator was examined and therefore comprise 180° pulses obtained during the A Delay conducting interval of A ring cycle.

Each of the shillings readout matrix triodes is a one-half section of a 12AT7 tube, having circuit parameters which will now be given with respect to the upper left-hand triode 1784 of FIG. 43. The cathode 1791 is connected to common ground lead 1792. The anode 1793 is connected over a 220,000-ohm load resistor 1794 to the common B+ supply lead 1795, which extends back to the cathode junction point 1768 of the M18 tube of FIG. 28 for the application of about +92 volts when the M18 tube is conducting. The output coupling condenser 1796 for the triode 1784 of FIG. 43 has a value of about 150 micro-microfarads. The control electrode 1797 is connected over a 470,000-ohm grid resistor 1897 to an input lead 1799, which receives the 180° testing pulses from common lead 1787 over a 25-micro-microfarad coupling capacitor 1800. The input lead 1799 extends through the decimal wafer switch 1801 of FIG. 42 by way of wiper 1802 and thence over lead 1803 to the #6 order bank 1804 of the shillings accumulator of FIG. 42. The lead 1803 is the "0" readout lead from the shillings order bank #6, which is the only readout lead from this order bank. Hence, the shillings readout matrix triode 1784 of FIG. 43 is part of the analyzing circuitry used in testing for a "0" count in the shillings #6 order bank 1804 of FIG. 42.

In the same manner, the shillings readout matrix triode 1785 receives the "0" readout lead 1805 from the shillings #5 order bank 1806, and the shillings readout matrix triode 1786 (FIG. 44) receives the shillings #5 order "1" readout lead 1807. Hence, the upper three triodes 1784 through 1786 of the shillings readout matrix of FIG. 43 are utilized to analyze the contents of the highest two order banks of the shillings accumulator.

In the sample problem of FIG. 1, it will be observed that the shillings accumulator contains only the count of 000021, its original entry of 19 having been augmented by two shillings through the extraction process from the pence accumulator. Since the content of the shillings order banks #5 and #6 of FIG. 42 is zero, the shillings readout matrix triodes 1784 and 1785 of FIG. 43 will be supplied with a negative biasing potential, so that the positive testing pulses on their input leads will pass over output leads 1781 and 1782, as negative pulses, to the left-hand and middle diodes of envelope 1401 of FIG. 32.

Thus, the two triode sections of envelope 1431 in the Rossi circuit of FIG. 32 will receive negative pulses, and the other triode section of the Rossi circuit (which is the left-hand triode of envelope 1432), being already biased negatively, enables the Rossi circuit to provide a positive pulse on output lead 1334. This pulse establishes conduction, at least momentarily, in the normally-cut-off left-hand triode section of envelope 1444 (FIG. 32).

The resulting negative output pulse from the left-hand triode section of envelope 1444 follows lead 1452 to the right-hand triode section of envelope 1432, which tube section is responsible for shifting conduction in the M ring. Also, this pulse follows further a parallel lead 1453 to the cathode-follower triode section 1456, which is in the group of control tubes which are selectively and sequentially operable for controlling the complementary number addition.

The cathode-follower 1456, accordingly, supplies a negative pulse, which follows output lead 1462 to the trigger pair 1466. This negative pulse shifts conduction in the trigger pair to the right-hand triode section thereof, decreasing the potential at junction point 1475 to block the complementary number gate 1479.

Since the complement of 20 with respect to 1,000 is 980, the same controls which were used to select the complementary number 988 for application to the pence accumulator may now be used to select a group of nine and a group of eight pulses to form the complementary number 980.

However, since division is not possible at this time (because of the zero count stored in shillings order banks #6 and #5), the complementary gate 1479 of FIG. 32 must now block the complementary number path. The output lead 1510 from the tube 1501 applies its ground potential to both the B8 and the B9 triode sections of the "8" and "9" gates contained in envelope 1511 of FIG. 21. Hence, the complementary number 980 is not introduced to the shillings accumulator.

It will be recalled that the positive pulse out of the normally-cut-off tube 1444 of FIG. 32, which established the complementary number gate control, also followed the output path 1452 to the right-hand triode section of envelope 1432, where it caused this tube section to conduct. The resulting positive-going pulse is applied to output lead 1595, which is the common firing line for the M15 through M22 tubes of FIGS. 27 and 28. Since the M18 tube was conducting, the M19 tube was primed, and, accordingly, this pulse fires the M19 tube, causing the M18 tube to be extinguished.

For the sample problem of FIG. 1, the above process is repeated under control of the M19 and M20 tubes, because division is not possible until the M21 tube conducts to shift the examination to the contents of shillings order banks #3 and #2.

However, while the M19 tube is controlling, B+ is supplied over lead 1811 from the cathode circuit thereof to the shillings readout matrix triodes 1812 through 1814 of FIGS. 43 and 44. The shillings readout matrix triode 1812 is controlled by the "0" readout lead 1805 from shillings #5 order bank of FIG. 42. The triode 1813 (FIG. 43) is controlled by the "0" readout of shillings #4 bank (1162) over lead 1815, and the triode 1814 of FIG. 44 is controlled by the shillings "1" readout from #4 bank over lead 1816. The triodes 1812 and 1813 pass negative pulses over leads 1781 and 1782 to the Rossi circuit to provide a "not-divisible" signal, which establishes the same type of operation as that described above in connection with the M18 tube.

Hence, the M chain is automatically shifted to the M20 tube, which supplies B+ from its cathode circuit over lead 1820 to the triodes 1821 through 1823 of FIGS. 43 and 44. The shillings readout matrix triode 1821 (FIG. 43) now tests the "0" readout of shillings order #4 bank over lead 1815, and the triodes 1822 and 1823 (FIG. 44) test the contents of shillings order #3 bank, shown at 1150 in FIG. 42, over the "0" readout lead 1825 and the "1" readout lead 1826. Again, a "not-divisible" signal is developed due to the "0" readouts, which cause shillings readout matrix triodes 1821 and 1822 (FIGS. 43 and 44) to send negative signals to the Rossi circuit. This causes the Rossi circuit to provide the "not-divisible" signal to repeat the foregoing operations and cause the M chain to be shifted, so that tube M21 becomes conducting.

The M21 tube provides B+ potential over its cathode output lead 1831 to the shillings readout matrix triodes 1832 through 1834 of FIG. 44. The shillings readout matrix triode 1832 receives the "0" readout lead 1825 from shillings order bank #3 of FIG. 42, whereas the triodes 1833 and 1834 of FIG. 44 receive the "0" and "1" readout leads 1836 and 1837 from the shillings order #2 bank 1132 of FIG. 42.

It will be recalled that, in order to obtain a "not-divisible" signal from the Rossi circuit, the content of the highest order bank must be "0" and the content of the next-to-highest order bank under examination must be "0" or 1. Since 21 shillings are stored in the shillings accumulator, the shillings order bank #1 contains a "1," the shillings order bank #2 contains a "2," and the shillings order bank #3 contains a "0." Hence, although the first condition necessary for a "not-divisible" signal is fulfilled by the "0" readout from shillings order #3 bank, the second condition is not met, because shillings order #2 bank does not contain "0" or "1." Division is therefore possible.

In the shillings readout matrix of FIG. 44, it is only the triode 1832 on the bottom row of triodes 1832 through 1834 which receives a negative bias from the accumulator. Hence, by following the output leads 1782 and 1783 from shillings readout matrix triodes 1833 and 1834 to the multiple diode 1401 of FIG. 32, it will be seen that neither the center diode nor the right-hand diode receives a negative pulse. Hence, the Rossi circuit receives less than the required number of negative pulses to provide a "not-divisible" output signal. The absence of such a signal is actually the "division possible" signal.

In the Rossi circuit of FIG. 32, the common anode junction point 1441 will remain in its low potential state because its center triode section (which is the right-hand section of envelope 1431) remains in a conducting state, so that no positive-going pulse is supplied over output lead 1334 to the normally-cut-off left-hand triode section of envelope 1444. Consequently, no negative pulse is applied over output lead 1452 and by way of the further lead 1453 to the cathode-follower triode section 1456. Hence, no negative pulse appears on its output lead 1462 to influence the trigger pair 1466, so the latter remains in its normal condition, with conduction being retained in the left-hand side thereof. Consequently, the right-hand anode junction point 1475 remains at its elevated potential level to permit conduction in the complementary number gate triode section 1479. Therefore, the potential on output lead 1510, from the complementary number gate 1479, is high, which biases the B8 and B9 gates of envelope 1511 of FIG. 21 open.

The complementary number 980 will thus be formed, the group of nine pulses on input lead 1530 being applied over output lead 1531, which is continued in FIG. 29 and further extends to the shillings complement matrix of FIG. 36.

At this time, the M21 tube is conducting to supply B+ to the common anode lead 1841 (from its cathode circuit), so that the 6BC7 diode 1842 is receptive to the group of nine pulses applied over lead 1531. The cathode output lead 1843 from the diode 1842 is continued in FIG. 40, where the pulses follow the downwardly-directed lead 1157 to the shillings input amplifier triode section 1158. Since the pulses forming the group of nine pulses are positive, they pass through the amplifier 1158, where they are inverted and appear as negative pulses on output lead 1149, which extends to the shillings order #3 bank 1150 of FIG. 42.

In a similar manner, the group of eight pulses will enter the shillings order #2 bank 1132 of FIG. 42, with nothing being entered into the shillings #1 order bank, shown in detail in FIG. 41, so that the complementary number 980 is applied to the shillings accumulator.

The path for the group of eight pulses will now be shown. These pulses appear on input lead 1527 to the complementary number "8" gate 1511 of FIG. 21 from the B8 tube of FIG. 16. The group of eight pulses passes the now-gated open B8 gate, which is the left-hand triode section of envelope 1511 (FIG. 21), to continue over output lead 1546, which is the common input pulsing lead in FIG. 29.

It will be recalled that an alternate path was provided for the group of eight pulses which were introduced to the pence accumulator in order that the complementary number 988 could be formed. It is the alternate path 1548 which branches off of the common input lead 1546 which now applies the group of eight pulses to the shillings complement matrix of FIGS. 33 and 36. However, since the M21 tube is conducting, B+ is supplied only to common anode lead 1841 to permit the diode 1846 (FIG. 33) to pass these pulses over cathode output lead 1847, which is continued in FIG. 40 as the input lead to the shillings input amplifier triode section 1146 of FIG. 39. Each of the pulses of the group of eight is here amplified and inverted and appears on the lead 1131, which extends to the shillings #2 order bank 1132 of FIG. 42.

The application of the complementary number 980 to the lowest three order banks of the shillings accumulator, containing the quantity 021, permits a subtraction or extraction of one pound, leaving a remainder of one shilling. Since one pound is extracted, a tally pulse must be entered into the appropriate order bank of the pounds accumulator.

The division tally pulse is developed from a B1 pulse in the division tally tube 1561 of FIG. 32. Of course, during each A ring cycle, a B1 pulse is applied to division tally tube 1561, but tally pulses are effective to enter the shillings and pounds accumulators only when the shillings tally matrix or pounds tally matrix permits the entry.

It will be recalled that the selected tubes of these matrices are rendered receptive by B+ supplied from the chain tubes which are controlling during the extraction process. Hence, a second output lead 1851 for the division tally tube 1561 of FIG. 32 is extended to FIG. 47, where a selected one of the diodes 1852 through 1855 of the pounds tally matrix, when supplied with B+ from one of the M18 through M21 tubes, may be used during the extraction process. The diodes are preferably of the 6BC7 type, each having a 22,000-ohm anode resistor and a 2,500-micro-microfarad input coupling capacitor, as illustrated by the resistor 1856 and the capacitor 1857 in circuit with the diode 1855.

Since the M21 tube is controlling at the present stage in the operation, it will be the diode 1855 which is supplied with B+ potential over lead 1858 from the cathode circuit of the M21 tube of FIG. 28. The cathode lead 1859 for the pounds tally matrix diode 1855 (FIG. 47) receives the tally pulse and passes it to the downwardly-directed lead 1860 of FIG. 46, which is the input lead for the pounds input amplifier triode section 1216, also shown in FIG. 46. The positive tally pulse is amplified and inverted in triode section 1216 and passed to output lead 1217, which supplies a single count to the units bank 1218 of the pounds accumulator of FIG. 48.

Due to the addition of the complementary number 980 to the contents of shillings bank #1, #2, and #3 of FIGS. 41 and 42, the shillings accumulator now contains 000001, which quantity obviously is not divisible by 20. The readout leads from the #3 and #2 order banks from the shillings accumulator (FIG. 42) apply negative bias to the shillings readout matrix triodes 1832 through 1834 of FIG. 44 to pass the testing pulse from common input lead 1787 (by way of the diodes in multiple envelope 1401 of FIG. 32) to the Rossi circuit, now effectively including only the two triode sections of the envelope 1431 (FIG. 32).

The resulting positive output signal at common junction point 1441 signifies that division is not possible and, accordingly, produces a negative output pulse from the normally-cut-off amplifier 1444 to the M chain shift control tube, shown as the right-hand section of envelope 1432, thereby providing a positive pulse over the M chain firing line 1595 to fire the M22 tube of FIG. 28, this tube being primed from the M21 tube.

Firing of the M22 tube, the last tube in the M control chain, energizes the relay coil RL9 connected in its cathode circuit to initiate the indicating or printing operation. In FIGS. 49 and 50, there is shown suitable apparatus for indicating the answer to the sample problem of FIG. 1. A detailed description of this apparatus will be presented under the heading "Printing and Indicating" at the termination of the problem involving the fractional decimal notations. However, for the moment, it may be observed that it is only necessary to provide two readout leads from the pence accumulator to the printer or indicator mechanism, because there can never be more than eleven pence in any answer. Similarly, the shillings accumulator requires only two indicating readouts, because the maximum shillings indication is confined to 19. However, the pounds accumulator includes eight readout lines, it being possible to develop a product having a digit in each order bank of the pounds accumulator.

FRACTIONAL PROBLEM

If the problem of FIG. 1 is now to be carried through to illustrate the operation of the adjustable decimal point apparatus provided in the multiplying apparatus of the instant invention, the machine is, of course, first "cleared," as was explained in connection with the whole-number problem. Assuming, then, that the presetting interval has passed and that the machine is ready to receive the sample problem of FIG. 1, the decimal point switch 318, shown in block form in FIG. 9, will be moved two places from its extreme right-hand position, since the multiplicand, 03.24, includes two fractional decimal places.

The decimal switch 318 is connected through servos and automatic stepping switches to control all of the decimal wafer switches located throughout the circuit diagram. Although these decimal wafer switches could well be set from a single shaft, by the mechanical motion of turning the shaft, as a practical matter the decimal wafer switchees are located on different chassis in the machine, and therefore the servo system of FIG. 12 has been employed. No claim of novelty is made to the stepping switch and the servo setup, for these units, per se, are available from G. H. Leland, Incorporated, of Dayton, Ohio.

In FIG. 12, the master decimal point control switch 318 is the switch 318 of FIG. 9. In the position illustrated, the multiplicand would be a whole number. However, the arrow 1881 is provided to show the position which the pointer 1882 would occupy for a multiplicand including two fractional decimal places, such as the multiplicand 03.24 of the sample problem.

The decimal point switching apparatus of FIG. 12 will now be described as if the pointer 1882 is to be moved, from the position shown, to the position of the arrow 1881. Power is supplied to the circuit over the A.C. main lines 355 and 356, which provide 110-volt A.C. to the rectifier bridges 1883 and 1884. The common positive line 1885 extends to a contact 1886 on the decimal point switch disc 318. In the position shown, the positive path is extended through the disc to all of the contact buttons "2" through "5," the "1" contact button bring unenergized because it lies in the slot in the disc.

The first stepping switch includes the two-contact arm disc 1888, which has its contact arm 1889 connected to the dead, or unenergized, lead 1890. The "hot leads" 1891 through 1894 connect to the contact buttons of the stepping switch disc 1888.

In the illustrated position, the stepping switch will not move because its solenoid 1895 is de-energized at the moment. However, when the master decimal point switch 318 is moved to the position of the arrow 1881, the "3" contact now lies in the slot, so that lead 1892 is dead, and the remaining leads from the master switch to the slave stepping switch disc 1888 are "hot." Since the contact arm 1889 of the disc 1888 was in the position shown, the lead 1890 applies the positive potential over a 10-ohm resistor 1896 and a 0.1-microfarad condenser 1897 to the solenoid 1895, which has its lower extremity connected to the common negative line 1898.

Energization of the solenoid 1895 causes its contact arm 1899 to be opened, which automatically steps the stepping switch disc 1888 in the clockwise direction. However, when the contact arm 1889 connects to the button of lead 1891, it encounters a "hot" lead, so that the solenoid causes the stepping switch disc 1888 to be stepped again to connect the contact arm 1889 to lead 1892. Lead 1892 is a dead lead, because the slot of disc 318 precludes the application of the positive potential to this line. The resistor 1896 and the capacitor 1897 serve as a spark-suppressor circuit when the contact arm 1899 is opened.

A shaft 1900, shown in dotted outline in FIG. 12, is fixed to the disc 1888 for rotation therewith. This shaft supports a plurality of the decimal wafer switches utilized in the circuit diagram. Hence, each of these decimal wafer switches is mechanically moved to its #3 position, corresponding to the "3" setting of the master decimal point switch 318.

The shaft 1900 also carries a control disc 1901, which is fixed thereon for rotation therewith. The control disc 1901 has a contact arm 1902, which is consequently moved off of the "1" position contact 1903 and to the "3" position contact 1904. The control disc 1901 is supplied with positive potential from the common plus lead 1885 over conductor 1905. Thus, the lead 1906 from the "3" contact button 1904 becomes "hot" to apply the positive potential over the "3" contact button 1907 to a slave disc 1908.

The output lead 1909 from the slave disc is connected to a solenoid 1910, employed in the manner of the solenoid 1895. So long as the disc 1908 is "hot," the solenoid is energized to automatically step the slave disc 1908 until the positive potential is removed from this disc. This, of course, occurs after two steps, when the slot of the disc 1908 interrupts the positive potential path from the "3" contact 1907. The solenoid 1910 is then de-energized, and the shaft 1911 has been rotated two positions in the clockwise direction. This shaft also carries a plurality of decimal wafer switches, which are mechanically set to their #3 positions.

The reason that the control disc 1901 has ten wired contacts, whereas the remaining control and slave discs have only five connected contacts, is because of the slave disc 1888, which has two projections or tabs (corresponding to the tab 1889), so that no lost motion is developed at this point. Thus, the initiating part of the servo-mechanism, including the slave disc 1888 and the control disc 1901, may establish contacts at each position, whereas the slave disc 1908 and the next control disc 1914, fixed thereto by the shaft 1911, etc., may be required to step through five connected positions in order to locate the next "hot" or "dead" lead, as the case may be. However, this time lapse is not material, since it is very short, and also since the decimal point switch 318 may be set prior to making the entry into the keyboards.

In this manner, the remaining stepping switches set the decimal wafer switches in accordance with the master decimal point control switch 318. The control disc 1914 energizes the solenoid 1916, which steps the slave disc 1917 to its predetermined position. The shaft 1918 thereof sets the decimal wafer switches carried thereby to establish the connections required for a two-fractional-decimal place problem. The control disc 1919 is set by the shaft 1918 to operate the slave disc 1920 through the stepping solenoid 1921. The shaft 1922 then sets the next control disc 1923 to operate the stepping solenoid 1924, thereby setting the slave disc 1925 and associated decimal wafer carrying shaft 1926.

Since the load capacity of the rectifier bridges 1883 and 1884 is limited, the bridge 352 of FIG. 11 is used to supply positive potential to the last control disc 1923. The B+ lead 1927 extends from the positive terminal 359 of the bridge 352 of FIG. 11 to the input contact 1928 of the control disc 1923. The negative connection 1929 extends from the negative terminal point 363 of the bridge 352 of FIG. 11 to the lower end of the stepping solenoid 1924 (FIG. 12).

In this manner, the decimal wafer switches, carried by the shafts 1900, 1911, 1918, 1922, and 1926 of FIG. 12, establish the required switching paths throughout the remainder of the multiplying circuitry to handle the denominational orders of the decimal fraction, whether the decimal fraction includes one or up to four places. Hence, fractional notations of the orders of tenths, hundredths, thousandths, or ten thousandths may be handled automatically due to the decimal point setting. The first decimal point wafer switches which will be encountered in the ensuing discussion are those associated with the accumulators—for rearranging the order banks thereof to receive the fractional decimals.

DECIMAL FRACTIONAL ACCUMULATOR SWITCHING

In FIG. 54 is shown, in block form, the arrangement of the pence accumulator for whole-number problems and the rearranged pence accumulator as utilized for two-place decimal fractions. The order banks #1 through #7 are arranged in increasing order from right to left when the decimal point is located to the right of the #1 bank. This, of course, is the normal accumulator order arrangement which is used for whole-number problems. It may be noted that transfer paths are provided from each bank to the next higher order bank and from the #7 bank to the #1 bank. The readout matrices 1941 and 1942 are provided for the #1 and #2 banks only. Since any pence notation can be expressed in only two orders—i.e., "0" through "11" pence—only the two readout matrices shown are necessary to control the printing and indicating means.

In FIGS. 34 and 35 is shown the readout matrix for the units order bank of the pence accumulator, including thirty-six resistors and a greater number of leads, which must be wired together to enable the content of this order bank to be read out. For the purpose of saving such components and attendant wiring time, the apparatus employed in the present invention has been designed to accommodate fractional or whole-number problems with a minimum of readout matrices.

In order to preserve the #1 and #2 pence order banks as the units and tens orders, respectively, the decimal fractional numbers are stored in the higher order banks, with the tenths fractional order being the #7 pence order, the hundredths fractional order being the #6 pence order bank, etc. In the sample problem of FIG. 1 under consideration, there are two decimal places. Hence, the #7 and #6 pence order banks are utilized to store the tenths and hundredths orders of the fraction.

In FIG. 54, the order banks of the pence accumulator have been rearranged, by the decimal wafer switches, to indicate that the #7 and #6 order banks are utilized to store the decimal fraction to the right of the decimal point. It will be seen that the readout matrices 1941 and 1942 remain connected to the #1 and #2 order banks, so that the pence content can always be read out.

It might also be noted that the transfer paths remain unchanged, such paths being illustrated from the lower order to the next higher order banks and including the path from the #7 order bank to the #1 order bank. Hence, any carry out of the tenths order #7 fractional bank will be added into the units order bank #1.

In connection with the rearranged pence accumulator of FIG. 54, it might be noted that a disable-transfer line 1943 is connected to the transfer path between bank #5 and bank #6, so that carries will not be added into the lowest order bank of the fractional number from the highest order bank of the whole number. This situation might arise when the complementary number 988 is being added to the highest three order banks of the pence accumulator (which now would be banks #5, #4, and #3) during the extraction process.

When the whole-number problem was presented, there was no need for half-penny round-off, but, when the decimal type problem of FIG. 1 is being performed, it becomes necessary to include the round-off operation. Hence, the lead 1944 is provided to the #7 order bank for introducing the count of five to the highest order fractional bank.

The order banks of the shillings accumulator are treated in much the same manner as that outlined in connection with the pence accumulator. In FIG. 55, it will be seen that the shillings accumulator includes only six order banks, and, for the two-decimal-place problems, the #6 and #5 order banks are located to the right of the decimal point. The readout matrices 1945 and 1946 are brought out of the #1 and #2 order banks, which banks always contain the units and tens shillings digits. Here again, it is necessary to disable transfers between the highest order whole-number bank, shown as #4 order, and the lowest order decimal fraction bank, shown as the #5 order. The disable transfer lead 1947 is shown for this purpose.

The pounds accumulator is treated in the same manner, except that it will be noted, from viewing FIG. 56, that each order bank is provided with a readout matrix. This is necessary when it is considered that the exemplary capacity of the machine will accommodate a problem such as 9,999 times 9,999 pounds to yield the result of 99,980,001 pounds. This product is represented by a digit in each of the eight order banks of the pounds accumulator. It may also be noted that, when the multiplicand includes a single fractional decimal plate, the product may include only seven whole numbers and one decimal fraction digit. However, when the multiplicand includes two decimal places, the product may have six whole numbers and two decimal fraction digits. Thus, it is possible to utilize each of the eight pounds banks in whole-number problems or in problems employing decimal fractions.

In any event, the same number of higher order pounds banks is shown to the right of the decimal point in FIG. 56 as there are decimal fraction places in the multiplicand. In the sample problem of FIG. 1, where the multiplicand is 03.24, the pounds order banks #8 and #7 are used to receive the decimal fraction. However, as this fraction is converted to pence prior to readout, then the readout matrices from pounds order banks #8 and #7 may be ignored.

The decimal wafer switches which establish the accumulator switching in accordance with the layouts of FIGS. 54, 55, and 56 will be pointed out and described in the following discussion, wherein the sample problem of FIG. 1, using the decimal point, will be carried out in the apparatus of the subject invention. Assume that the M chain of FIG. 25 is preset with conduction established in the M1 tube and that the J ring is preset to the J0 tube of FIG. 17 due to the firing of the M1 tube, and, further, that the A ring of FIGS. 13 and 14 is beginning to cycle, all being accomplished in the manner explained heretofore.

The A and B rings cooperate to develop pulse groups in accordance with the digits 03.24 of the multiplicand. The A ring exercises the control over the B ring which selects the number of 0° pulses required to produce each of the digits. The J ring steps once for each A ring cycle until it attains a setting corresponding to the multiplier digit, in the first instance 4 pence, to develop and enter the multiplicand into the proper order of the pence accumulator, the appropriate number of times. While the M1 tube is controlling, the multiplicand 03.24 will be developed four times and introduced into the appropriate order banks of the pence accumulator. These order banks are now #2, #1, #7, and #6 from higher to lower order, with the decimal point being located between the #1 and the #7 order banks.

Although the digits 03.24 are introduced into the pence order banks simultaneously over parallel circuits, their respective paths will be shown individually and in sequence.

The group of four pulses, indicative of the lowest order digit of the multiplicand 03.24, appears on the B4 lead 1951 (FIG. 20) after being selected by the B4 tube of FIG. 15. The decimal keyboard of FIG. 20 (including the units through thousands orders for whole-number problems) at this time includes two whole-number orders and two fractional orders.

In the keyboard illustration of FIG. 9, it will be seen that the decimal point lamp 321 is lighted when the decimal point control switch 318 is moved two places from its extreme right-hand position. Hence, the highest order row of keys is 309, with the next highest order being 308 and the rows 307 and 306 being reserved for the fractional decimal setting.

Returning to FIG. 20, the thousands order bank is the highest order whole-number bank, with the tens and units keyboards accommodating the decimal fraction settings. Thus, in the multiplicand 03.24, the lowest order fractional digit (namely, 4) will be selected from the B4 line 1951 by the units order decimal keyboard. The "4" key 901 is depressed, and it will be seen that, so far, this is the condition which prevailed in the whole-number problem. Accordingly, the group of four pulses appears on output conductor 912, which extends to the cathode-follower-connected tube section 904 of FIG. 21. The same output leads 922, 923, and 924, the latter of which extends to the pence input matrix of FIG. 29, are employed to apply the group of four pulses to the matrix diode 1925. This tube has B+ supplied thereto from the M1 cathode circuitry by way of anode supply lead 926. The pulses, accordingly, follow the cathode output lead 941 to the decimal wafer switch 943. Due to the decimal point setting, the wiper 942 is now on its "3" position to apply the group of four pulses onto lead 1542, which extends to the pence input amplifier triode section 1544 of FIG. 31. The output lead 1545 from this triode section applies the inverted and amplified pulses to the #6 pence order bank 1318 of FIG. 35.

The other digits of the multiplicand follow similar, but parallel, paths to the appropriate order banks of the pence accumulator; now, rearranged by the decimal wafer switches. In the multiplicand 03.24, the group of two pulses representing the highest order of the fractional portion is applied to pence bank #7, shown at 1624 in FIG. 35.

The tens order decimal keyboard of FIG. 20 selects the group of two pulses from the B2 line 1071 over lead 1072 due to the depression of the "2" key 902. Hence, for each A ring cycle, a group of two pulses follows the keyboard output lead 1073 to the circuitry shown in the block 1074 of FIG. 21. The output path 1076 applies the group of two pulses to the pence input matrix of FIG. 29, where the diode 1077 is now energized to pass the pulses over cathode lead 1079 to the decimal wafer switch 1081. The wiper 1080 is in position "3" to continue the output path over leads 1953 and 1954 and thence via the downwardly directed lead 1955 (FIG. 31) to the pence amplifier input triode section 1956. The output lead 1687 from this pence input amplifier tube section introduces the group of two pulses to the pence #7 order bank 1624 of FIG. 35.

In the multiplicand 03.24, the group of pulses representing the digit 3 is introduced into the pence #1 order bank of FIG. 34. This path is from the B3 lead 1093 of FIG. 20 over the lead 1094, which extends through the Hundreds order of the decimal Keyboard, which is now used to enter the units digit, and thence via output lead 1095 to the block 1096 of FIG. 21. The output lead 1097 from the block 1096 extends to the pence input matrix of FIG. 29, where the diode 1098 passes the group of three pulses to the common cathode output lead 1099, which extends to the decimal wafer switch 1100. Here, the wiper 1958 is now connected to lead 1959, which is continued by way of lead 944 to the pence input amplifier triode section 946 of FIG. 30. The output group of three pulses from this pence input amplifier triode section is applied over output lead 956 to the units order bank (FIG. 34) of the pence accumulator.

Since the multiplicand 03.24 does not include a tens order whole number digit, the fourth parallel path to the pence accumulator is not used; however, if the multiplicand included such a digit, a number of pulses in accordance with this digit would have been selected from the B1 through B9 lines of FIG. 20 by the Thousands order Keyboard, which now would be used for the tens order of the number, and applied over output line 1272 to the block 1274 of FIG. 21. The output lead 1275 from this block extends as the input lead 1275 to the pence input matrix of FIG. 33. The pence input matrix diode 1961 is supplied with B+, at this time, to pass the group of pulses, which would be indicative of the tens order digit of the multiplicand, over lead 1962 and by way of decimal wafer switch 1963 and leads 1964 and 1082 to the pence input amplifier triode section 1083 of FIG. 30. This triode section, of course, is in the input circuit, over lead 1055, to the pence #2 order bank 1056 of FIG. 35. Hence, had the multiplicand included a tens order digit, pulses in accordance therewith would have been introduced into the #2 order bank 1056 of the pence accumulator.

Since the pence multiplier factor is 04, the A ring will cycle four times to enter the quantity 3.24 four times into the pence accumulator, to form therein the intermediate product 12.96. At the end of the first A ring cycle, the A0–Tally pulse steps the J ring from the J0 Start tube to the J Delay tube. The next 0° pulse, which occurs only one 0° pulse time later, causes the J1 tube to be fired. At the conclusion of the second A ring cycle, the A0–Tally pulse fires the J2 tube; then, at the conclusion of the third A ring cycle, the J3 tube is fired; and finally the J4 tube is fired by the A0–Tally pulse derived during the fourth A ring cycle. Since the J ring has been stepped to the multiplier digit, a K4 pulse is applied to the M chain to shift conduction to the M3 tube.

It has previously been explained how the control sequence is shifted from the M1 tube to the M3 tube in the absence of a tens order digit in the pence multiplier factor. However, it will be pointed out that, had there been such a multiplier factor, four parallel paths would have been established through the pence input matrix of FIGS. 29 and 33 to the #3, #2, #1, and #7 order banks of the pence accumulator of FIG. 35.

In the pence input matrix of FIGS. 29 and 33, the common anode supply lead 1111 is connected over lead 1970, which extends to the isolation multiple diode envelope 907 of FIG. 21, where the leads 1971 and 1972 connect the circuit to the cathode junction point 1973 of the M2 tube (FIG. 25). Consequently, the four diodes 1975 through 1978 are receptive to pulses applied to the input leads 924, 1076, 1097, and 1275.

The path through diode 1975 is for the hundredths order of the multiplicand fraction and, therefore, extends to tenths pence order bank #7.

The diode 1976 now passes the tenths order of the multiplicand fraction to the units pence accumulator order bank #1, and the diode 1977 passes the units order whole number portion of the multiplicand to tens pence accumulator bank #2.

The diode 1978 is not used in the instant problem but is provided in the event that the multiplicand includes a tens order digit. When such is the case, a path to the pence order bank #3 is required.

In summary, it will be appreciated that, in the adjustable decimal point apparatus, if the pence banks #2 #1 · #7 #6 are allocated to receive the product of the multiplicand by the lowest order of the pence multiplier digit, then the pence banks #3 #2 #1 · #7 would receive the product of the multiplicand by the highest order pence multiplier digit. It may be seen that this constitutes merely a one-order denominational shift to the left.

The shillings accumulator switching is handled in the same manner, with the order banks of the shillings accumulator being rearranged by the decimal wafer switches, which establish paths from the shillings input matrix to the order banks of the shillings accumulator. Hence, when the multiplicand 03.24 is multiplied by 06 shillings, the product is now routed into shillings banks #2 #1 · #6 #5 in lieu of banks #4, #3, #2, and #1.

When the multiplicand 03.24 is added into the shillings accumulator six times, the lowest order digit 4 is selected from the B4 line 1951 of FIG. 20 over vertical lead 909 due to the depressed "4" key 901 of the Units order decimal Keyboard. It will be pointed out that the Units order decimal Keyboard is now the hundredths fractional order keyboard due to the setting of decimal point switch 318 (FIG. 9).

The keyboard output group of four pulses follows lead 912 to the cathode-follower-connected triode 904 of FIG. 21. Here, the output lead 924 extends to the shillings input matrix of FIGS. 33 and 36.

In this matrix, the top row of diodes is energized over common B+ supply lead 1112 (FIGS. 33 and 36) by way of the lead 1113, which extends to the M3 tube cathode circuitry of FIG. 25. The lowest order path (for the digit 4 under consideration) is by way of diode 1116 (FIG. 33), which has a cathode output lead 1117, continued in FIG. 40 as the input lead for the decimal wiper switch 1118.

In the whole number position shown, the decimal wiper switch 1118 establishes an input path to the lowest order bank of the shillings accumulator. However, in the instant problem, where the wiper 1119 is on position "3," a path is established over leads 1981 and 1982 to the shillings input amplifier triode section 1983 of FIG. 40.

The output lead 1984 from this amplifier triode section supplies the shillings #5 order bank 1806 of FIG. 42.

In the same manner, the path for the pulses in accordance with the digit 2 of the multiplicand 03.24 is by way of the shillings input matrix diode 1140 (FIG. 33) and thence by the rearrangement decimal wafer switch 1142 (FIG. 40) to the shillings bank 1804 (FIG. 42), which is the #6 order bank; rather than the #2 order bank, as earlier selected by the decimal wafer switch 1142 when in the whole number, or "1," position.

Likewise, the path for the three pulses in accordance with the units digit "3" of the multiplicand 03.24 is by way of the shillings input matrix diode 1151 (FIG. 36) and over lead 1152 and the decimal wafer switch 1153 of FIG. 40. The decimal wafer switch now establishes a connection to the shillings order bank #1, shown in detail in FIG. 41, in lieu of the shillings order bank #3, shown at 1140 in FIG. 42.

The fourth parallel path to the shillings accumulator is by way of the shillings input matrix diode 1990 (FIG. 36) and via output lead 1991, which extends to the decimal wafer switch 1992 of FIG. 40. In the instant problem, the decimal wafer switch 1992 establishes a path to the shillings #2 order bank 1132 of FIG. 42 in lieu of a path to the shillings #4 order bank 1162, as would normally be established in the absence of any decimal point setting. Hence, for the two-decimal-place problem, the decimal wafer switches have now established input paths to the rearranged shillings accumulator as follows: #2 #1·#6 #5.

The foregoing paths are employed for the six additions of the multiplicand into the shillings accumulator as determined by the shillings multiplier digit of 06. At the conclusion of each of the A ring cycles, the J ring is stepped until it attains a J6 setting, to produce a K6 pulse, which shifts conduction in the M chain to the M5 tube, skipping the M4 tube.

The M4 control tube is not used because of the absence of any tens order digit in the shillings multiplier factor of 06. However, it will be pointed out that, in the shillings input matrix of FIGS. 33 and 36, the diodes 1994 through 1997 provide four parallel paths to the shillings accumulator order banks #3 #2 #1·#6, respectively, when the M4 tube is conducting to supply B+ potential over lead 2000 to the anodes of these four diodes. The paths from these diodes to the decimal wafer switches of FIG. 40 are all identified with the exception of the path 2001, associated with the diode 1997, which extends to the decimal wafer switch 2002 of FIG. 40.

The denominational shift which would be required for a tens order shillings multiplier factor is automatically taken care of by the decimal wafer switches of FIG. 40. These switches establish suitable paths, under control of the M4 tube, to shillings order banks #3 #2 #1·#6; however, since in the sample problem of FIG. 1 there is a zero in the tens order denominational place of the shillings multiplier factor, the automatic shifting of the M ring to the M5 tube initiates multiplication by the pounds multiplier factor.

In the multiplication of 03.24 by 21 pounds, the multiplicand is fed, in the form of pulse groups, through the pounds input switching matrix of FIG. 45 to the pounds accumulator order banks #2 #1·#8 #7 by way of the decimal switching wafers of FIGS. 46 and 47. These paths are utilized by the multiplicand pulse groups only once, in accordance with the units order of the multiplier factor of 21. The denominational shift required for multiplication by the tens order digit 2 is set up by the shift of conduction from the M5 to the M6 control tubes, which switches the effective paths through the pounds input switching matrix of FIG. 45. At this time, the multiplicand is twice entered into pounds order banks #3 #2 #1·#8.

The paths used in the foregoing operation will be briefly pointed out. Referring to FIG. 45, it will be seen that the diodes 1205, 1222, 1232, and 1277 of the pounds input switching matrix are each supplied with B+ over common leads 1206 and 1207. The M5 tube is conducting to establish four parallel paths from the decimal keyboard of FIG. 20 to the pounds accumulator denominational orders of FIG. 48. In the manner hereinbefore explained in connection with the pence and the shillings accumulators, the diodes 1205, 1222, 1232, and 1277 establish switching paths to the decimal wafer switches 1213, 1224, 1235, and 1254, respectively. These decimal wafer switches provide input switching paths for the multiplicand digit-representing pulses to the rearranged pounds order banks #2 #1·#8 #7.

Since the lowest order digit of the pounds multiplier factor 21 is unity, the multiplicand is only added into the pounds accumulator one time over these paths, the A ring cycling once to step the J ring to its J1 setting, which produces a K1 pulse for firing the M6 control tube.

In the pounds input switching matrix of FIG. 45, it will be seen that the M6 control tube supplies B+ potential to the matrix diodes 1244, 1251, 1252, and 1278. These diodes establish paths over the decimal wafer switches 1224, 1235, 1254, and 2005 to pounds accumulator order banks #8, #1, #2, and #3 rearranged as #3 #2 #1·#8.

Since the multiplier factor is 21 pounds and the tens order digit 2 is currently being employed, the multiplicand 03.24 will be twice entered into the above-mentioned order banks of the pounds accumulator. Two A ring cycles are required to produce two A0–Tally pulses, which step the J ring to the J2 setting to produce a K2 pulse, which fires the M9 tube in the M control chain. The reason that the M7 and M8 control tubes are skipped is the fact that the pounds multiplier factor 21 does not contain any hundreds or thousands order digits. However, if these digits were present, suitable parallel paths would be established to the pounds accumulator in the manner explained hereinafter.

In the pounds input switching matrix of FIG. 45, the diodes 1263, 2006, 2007, and 1279 are supplied with B+ when the M7 tube is conducting in order to enter what normally would be the hundreds order, in the absence of any decimal point. The selected diodes of the pounds input switching matrix provide parallel paths through the decimal wafer switches 1235, 1254, 2005, and 2008 to the pounds #1, #2, #3, and #4 order banks of FIG. 48. As a matter of fact, regardless of the decimal point location, within the capacity of the instant machine, the product resulting, during the interval in which the M7 tube is controlling, will always be stored in pounds banks #4, #3, #2, #1. In the two-place decimal problem, the pounds banks #8 and #7 are allotted to the decimal fraction. Since the multiplicand is limited to a four-digit number, within the assumed capacity (see the keyboard of FIG. 8 or FIG. 9), only four pounds order banks need be reserved for decimal fractional digits. Hence, the pounds accumulator will never be rearranged as to the four lower order banks; namely, #4, #3, #2, and #1.

In like manner, the pounds input switching matrix diodes 1264, 2010, 2011, and 1282 of FIG. 45 are used to select, over decimal wafer switches 1255, 2005, 2008, and 1283 of FIGS. 46 and 47, the appropriate pounds order banks for receiving the product of the multiplicand by the thousands order pounds multiplier factor. These pounds order banks are #5, #4, #3, and #2, in that order, to take care of the denominational shift in the multiplier factor.

Returning to the sample problem of FIG. 1, it will now be seen that the pence accumulator contains the quantity 12.96 pence, the shillings accumulator contains 19.44 shillings, and the pounds accumulator contains its original entry of 68.04 pounds. These products are listed as Preliminary Products in FIG. 1.

The next operation to be encountered is that of converting the fractional decimal portions of the products stored in the shillings and pounds accumulators into pence for addition to the pence preliminary product already in the pence accumulator. It will be noted that, of the shillings preliminary product 19.44, the fractional portion (.44) will be multiplied by 12, the number of pence in a shilling, to convert the fractional shillings to 5.28 pence. During the conversion, entries are made into the proper orders of the pence accumulator and added to the preliminary product. Also, the fractional pounds portion (.04), stored in the pounds accumulator, is multiplied by the conversion factor of 240 pence per pound to convert the fractional pounds to 9.60 pence. As before, during conversion, entries are made into the proper order of the pence accumulator and added to the amount previously entered, to form the new total of 27.84 pence.

In the previous whole-number problem, there were no fractional pounds or shillings to be converted to pence. Also, it will be recalled, the order banks of the various accumulators were not rearranged to take care of the decimal fractions which it was necessary to store. In contrast, in the ensuing description, the decimal wafer switches, set up by the master decimal point control switch, will be used to establish paths from the rearranged accumulator order banks storing the fractional decimals for conversion purposes. Since this operation of the circuitry has not been described previously, it will not be described in detail with reference to the numerical example of FIG. 1.

FRACTIONAL SHILLING CONVERSION

The firing of the M9 tube starts the next step of the multiplication process, which is the conversion of the fractional shillings to integral pence. In this step, the fractional portion (.44) of the shillings accumulator content is multiplied by 12 in a manner which adds the product thereof into the appropriate banks of the pence accumulator.

The decimal shillings fraction of .44 is stored in the shillings accumulator order banks #6 and #5, as indicated in the schematic of FIG. 57. In the conversion process, groups of pulses representing the stored shillings decimal fraction must be formed. If ten pulses are fed to the #6 shillings bank, in which a "4" is stored, then the #6 order counter will count through "0" and back to "4." However, if a gate is opened as the count reaches "0," then the last four of the ten pulses may be gated out in the form of a group of four pluses, which represents the still-stored digit "4." If, simultaneously, ten pulses are fed to bank #5 of the shillings accumulator, then a group of four pulses, corresponding to its count, is developed without disturbing the storage. These groups of four pulses which are developed to represent the contents of the shillings accumulator #5 and #6 order banks are applied to the pence order banks #6 and #7, respectively, as illustrated in the chart or flow diagram of FIG. 57.

The chart of FIG. 57 is used to simplify the explanation of the conversion of the fractional shillings decimal portion to pence. It is noted that the shillings accumulator contains six order banks, so arranged that the decimal portion is contained in banks #6 and #5, with the new fixed decimal point for the current problem being indicated by the dot between shillings banks #1 and #6. The pence accumulator contains seven order banks, with banks #7 and #6 being used to receive the decimal fraction portion of the pence, and the decimal point appearing between banks #1 and #7.

The content of the shillings accumulator is shown as 19.44 and that of the pence accumulator as 12.96 when the conversion process is begun. The object, of course, is to convert .44 shilling to pence. Hence, the .44 shilling is multiplied by 12 to yield 5.28 pence, which amount is entered into the pence accumulator. However, as will appear more fully hereinafter, the 5.28 pence are not developed in the pence accumulator at the same time but rather result from the individual portions of the product in the conversion multiplication, as set forth in FIG. 57.

The foregoing is represented by the numerical factors of 44 appearing in the conversion multiplication process of FIG. 57. For example, it is first necessary to multiply .44 shilling by the digit 2 of the conversion multiplier factor 12. This is accomplished by developing 44 twice and entering it successively into the appropriate pence order banks, shown as banks #7 and #6. Subsequently, the quantity 44 is developed once, due to the units digit of the conversion multiplier factor 12, but the quantity 44 is displaced one order to the left in entry, as illustrated in the chart of FIG. 57. Hence, the last 44 is entered in pence order banks #1 and #7.

Paths A and B are provided in the chart of FIG. 57 to show that connections are set up between selected banks of the shillings accumulator and the appropriate order banks of the pence accumulator to effect the fractional shillings conversion. Path A extends from shillings bank #5 to pence bank #6, so that the right-hand digit 4 of the quantity 44 appearing on Line 1*a* is produced from shillings bank #5 and entered into pence bank #6. Simultaneously, the left-hand digit 4 of this quantity 44 on Line 1*a* is represented by a group of four pulses developed at the shillings bank #6 and added into pence bank #7 by way of path B. The same step in the process is also illustrated by the horizontal line arrow, which extends from the product 44 of Line 1*a* to the right-hand portion of the chart to show that the quantity 44 is entered into the digit order places represented by pence banks #7 and #6. Also, as suggested by the M9 label appearing on this arrow, the current operation is under the control of the M9 tube of the M control chain.

Next, the portion of the product (44) of Line 2*b* is entered into the pence accumulator banks #7 and #6 in the manner explained above in connection with paths A and B. As a matter of fact, the same paths A and B are used for the second groups of four pulses developed during the second A ring cycle. These paths, of course, extend through the appropriate matrices from the shillings accumulator banks #6 and #5 to the pence accumulator banks #7 and #6. This operation is also effected under control of the M9 tube.

Subsequently, when the portion of the product 44 of Line 3*c* is to be entered into the pence accumulator, a denominational order shift is required. This is obtained under control of the M10 tube, which establishes the appropriate switching paths for the pulses indicative of the fractional shillings digits. The K ring stepped the M chain from the M9 tube to the M10 tube when the K2 tube was fired, because of the fixed wiring controls to terminate the multiplication by the units digit 2 of this conversion factor. This occurred automatically after two A ring cycles, which enabled the operation of Lines 1*a* and 2*b*.

Now the M10 tube establishes suitable connections or paths from the shillings bank #5 to the pence bank #7 and from the shillings bank #6 to the pence bank #1, as indicated by the letters C and D. In this manner, the portion of the product shown on Line 3*c* is introduced into the appropriate pence order banks, so that the total content of the pence accumulator becomes 18.24, the fractional shillings adding 5.28 pence to the stored total of 12.96 pence. The foregoing operation will now be described in detail with respect to the circuit arrangements for enabling the fractional shillings conversion.

The groups of ten pulses employed for "pulsing out" purposes are derived from the B10 tube of FIG. 16 when the A10 tube of FIG. 13 is gated on, so that the Class C amplifier (B10 tube) is brought up almost to cut-off. This condition permits ten positive pulses of the 0° type to pass to output lead 771, labeled B10 in FIG. 16, during each A ring cycle. The B10 output lead 771 is connected to an amplifier 2021 (FIG. 39), which is preferably one half section of a 12BH7 type tube. The individual pulses of the group of ten pulses from the B10 tube are, of course, inverted, or negative, pulses due to the Class C amplifier connection.

The amplifier 2021 of FIG. 39 is normally conducting because its control electrode 2022 is tied back through a 100,000-ohm resistor 2023 to the +250-volt B+ supply applied at terminal 2024. The anode 2025 is connected over a 10,000-ohm load resistor 2026 to the positive terminal 2024, and the cathode 2027 is grounded.

Each of the negative pulses appearing on input lead 771 is applied through a 1,000-micro-microfarad input capacitor 2028 to the control electrode 2022. The output pulses from the amplifier 2021 are reoriented, so that they appear in amplified form as positive pulses.

The output lead 2031 from the amplifier 2021 (FIG. 39) extends to a duo-triode complement generator tube 2032, of the 12BH7 variety. Each of the triode sections of the complement generator tube 2032 is connected as a cathode-follower circuit for performing the same functions, except that the left-hand triode section serves as a gate for the groups of ten pulses utilized for fractional shillings conversion, whereas the right-hand triode section is employed in the pounds fraction conversion.

During fractional shillings conversion, the left-hand triode section of the complement generator 2032 receives each group of ten pulses from the lead 2031 by way of a 100-micro-microfarad input capacitor 2033 and passes the pulses onto output lead 2034 when the M9 tube or the M10 tube is controlling. The control tubes afford positive biasing over control electrode lead 2035, including the 240,000-ohm resistor 2036. The biasing lead 2035 extends to the cathode 2036 (FIG. 21) of the left-hand isolation diode of multiple envelope 2037 and also to the cathode 2038 of the right-hand isolation diode of multiple envelope 2039. The anode 2040 of the right-hand diode of envelope 2039 is connected over leads 2041 and 2042 to the cathode circuit of the M9 tube (FIG. 26), whereas the anode 2043 (FIG. 21) of the left-hand diode of envelope 2037 is connected over leads 2044 and 2045 to the cathode circuit of the M10 tube (FIG. 26). Hence, whenever the M9 tube or the M10 tube is in its conducting condition, a positive potential of approximately 85 volts is connected to the D.C. biasing lead 2035 of the left-hand triode of the complement generator tube 2032 (FIG. 39).

Each group of ten pulses which appears on output lead 2034 of the complement generator tube 2032 (FIG. 39), as permitted by the positive biasing, is fed to two different places during conduction in either the M9 tube or the M10 tube. One of the places is, of course, the appropriate order banks of the shillings accumulator for "pulsing out" the contents thereof, and the other place is a further controlled section, which is activated when its corresponding shillings order counter is run through "0" to divert the remaining number of this group of ten pulses (which corresponds to the count stored in the shillings accumulator order) to the appropriate order bank of the pence accumulator. In other words, the parallel paths for the same initial group of ten pulses permits the simultaneous application of ten counts to the selected shillings decimal fractional order bank to be "pulsed out" with ten pulses to a gate in a path to the pence order bank which is to receive pulses equal in number to the digit in the shillings decimal fractional order bank. When the shillings decimal fractional order bank is passed through zero, its delay transfer trigger pair provides a control potential to open the gate and allow the remaining pulses in the group of ten at the gate to pass to the pence accumulator.

The controlled section receives the groups of ten pulses being sent from output lead 2034 of complement generator tube 2032 over the further output lead 2051, which is continued in FIG. 21 as the common input lead to four cathode-follower-connected gate tubes 2052 through 2055. The first-mentioned cathode-follower gate includes the right-hand triode section of the tube 2052 (preferably 12AU7), whereas the remaining cathode follower stages 2053 through 2055 are represented in block form, since they are duplicate circuits of that shown in detail. The cathode-follower tube sections of these tubes will be gated open at the time when their corresponding shillings denominational orders are caused to pass through zero during the "pulsing-out" interval. Hence, further description of this gating section will be delayed until the controls offered by the shillings accumulator denominational orders can be shown.

The shillings "pulsing-out" path or the parallel path to that above for the groups of ten pulses is over output lead 2034 and via common lead 2051 to the input leads 2056 through 2059 for the diodes 2060 through 2063 of FIG. 39. The groups of ten pulses will be gated through one or more of the 6BC7 diodes 2060 through 2063 to one or more order banks of the shillings accumulator of FIG. 42. The setting of the decimal wafer switch 1295 determines how many paths are established to order banks of the shillings accumulator for the groups of ten pulses; i.e., equal to the fixed number of fractional decimal places. The lower semi-circular disc 2064 of the switch 1295 is a conductive plate which establishes connection from the "1" terminal to the remaining terminals. The plate 2064 is adapted for clockwise rotation in a step-by-step manner under control of the master decimal point switch 318, shown in FIG. 9.

The decimal wafer switch in the position shown in FIG. 39 is in the condition for whole-number problems, since there is no fractional conversion operation to be handled. In the present problem, however, where there are two decimal places, the decimal wafer switch 1295 will have its plate 2064 rotated two places in the clockwise direction to connection terminal "1" to terminals "2" and "3."

The biasing conductor 2035, which is connected to the "1" terminal of decimal wafer switch 1295, is at a potential of approximately +85 volts when the M9 tube or the M10 tube is conducting, as has already been shown. Hence, the B+ potential is simultaneously applied to the diodes 2060 and 2061 over their 22,000-ohm anode resistors 2065 and 2066. Therefore, two paths are opened for groups of ten pulses when the decimal point includes two fractional decimal digits, so that conversion of the decimal fraction .44 may be carried out with respect to both digits thereof simultaneously.

The group of ten pulses applied over input lead 2056 and by way of the 2,500-micro-microfarad input capacitor 2067 pass through the diode 2060 and follow its cathode output path 2068 to the decimal wafer switch 1118, which is shown at the top left of FIG. 40. In the current problem, the wiper 1119 will be on contact "3" to extend the path for the group of ten pulses over lead 1981 and via lead 1982 to the shillings input amplifier triode section 1983 of FIG. 40. The output path from this triode section is lead 1984, which extends to the shillings #5 order bank 1806 of FIG. 42. Hence, in this manner, a group of ten pulses is applied to the shillings accumulator order #5 bank.

Similarly, a group of ten pulses is simultaneously applied to shillings #6 order bank, shown at 1804 in FIG. 42, due to the conducting condition in diode 2061 (FIG. 39). The path from diode 2061 is over its output cathode lead 2070 to decimal wafer switch 1142 of FIG. 40. Here the wiper 1143 extends the path to lead 2071, which in turn is connected to leads 2072 and 2073, the latter extending to the shillings input amplifier triode section 2074. The output from this triode section is anode lead 2075, which extends to the shillings #6 order bank 1804 of FIG. 42.

It will be recalled that shillings order banks #6 and #5 are storing the fractional shillings amount of .44 shilling. When the groups of ten pulses are entered into each of these denominational orders of the shillings accumulator, the counters thereof reach "0" after six pulses. At this time, each order triggers its delay transfer trigger pair, which will supply the gating control potential change used to control the other path, where the appropriate number of the ten pulses, equal to the shillings accumulator count, is selected and applied to the pence accumulator.

In the shillings denominational orders #5 and #6, the delay transfer trigger pairs are included within the blocks 1806 and 1804 of FIG. 42. However, in the detailed showing of shillings order #1, a typical delay transfer trigger pair is shown at 1128 in FIG. 42. As the stored count passes through "0," conduction is shifted from the left-hand triode section to the right-hand triode section of the delay transfer trigger pair 1128. The control output leads are connected to the anode junction point of the right-hand triode sections of the delay transfer trigger pairs, as represented at 2081 in trigger pair 1128. However, in transfer trigger pair 1128 for shillings order bank #1, no such control lead is shown, because the shillings order bank #1 will never contain a decimal fraction. However, the output control leads are shown for order banks #5 and #6 of FIG. 42 at 2082 and 2083. Hence, when conduction is shifted to the right-hand section of the delay transfer trigger pair of shillings order bank #5, shown at 1806 (FIG. 42), a potential decrease is applied to control lead 2082. This lead extends to decimal wafer switch 2084, where the wiper 2085 is connected to the contact "3" to extend the circuit over output lead 2086.

The output control lead 2086 is continued in FIG. 21 as the input biasing lead for the left-hand triode section of the D.C. amplifier tube 2052. The left-hand triode section has its anode 2088 connected through a 47,000-ohm load resistor 2089 to the B+ supply lead 932, which extends to the +360-volt terminal 933, shown in the lower left-hand portion of FIG. 21. The cathode 2090 of this triode section is connected over cathode lead 2091 to the common lead 1524, which also extends to the lower left-hand portion of FIG. 21 to a +105-volt terminal 1525. Thus, it may be seen that this triode section is normally conducting, and in such condition its anode junction point 2100 is at a decreased potential level. A lead 2101 connects this junction point 2100 over a 270,000-ohm dropping resistor 2102 to the control electrode 2103 of the right-hand cathode-follower-connected triode section of tube 2052. The control electrode 2103 is in reality connected in a voltage divider which includes the further 200,000-ohm resistor 2106 in lead 2107, which extends to the −105-volt terminal 2108.

In this manner, the potential level of anode junction point 2100 of the left-hand triode section of tube 2052 controls the potential level of control grid 2103 of the right-hand triode section thereof to establish the conducting or non-conducting condition. Hence, normally the cathode-follower tube section is gated off. However, when the left-hand triode section of tube 2052 receives the decreasing potential over lead 2086 and by way of the 470,000-ohm resistor 2104 on its control electrode 2105, it is cut off. The potential of anode junction point 2100 is, accordingly, elevated to gate open the right-hand cathode-follower section thereof.

When the right-hand section of tube 2052 (FIG. 21), which is the gated cathode-follower circuit, is gated on, the remaining pulses being applied to input lead 2051 pass through the 250-micro-microfarad input capacitor 2111 to the control electrode 2103. In the present problem, this action occurs at the appropriate time to permit the last four pulses of the group of ten to appear across the output cathode load resistor 921.

This group of four pulses follows a path along output conductors 922, 923, and 924 to the pence input matrix of FIG. 29. Here it is the diode 925 which will pass the group of four pulses, because the common B+ line 1078 is supplied with approximately +85 volts to conduction in the M9 tube. The anode lead 926 extends to the multiple diode envelope 908 of FIG. 21, where the two left-hand isolation diode sections have their cathodes 2121 and 2122 interconnected. The left-hand anode lead 2123 is connected to the further lead 2042, which extends to the cathode circuit of the M9 tube of FIG. 26. Of course, the other diode in this multiple envelope is connected to the cathode circuit of the M1 tube, so that the B+ supply is present in the pence input matrix (FIG. 29) on common supply lead 1078 whenever either the M1 tube or the M9 tube is conducting.

Returning to the pence input matrix of FIG. 29, a path for the group of four pulses is established through the diode 925 and over its cathode output lead 941 to the decimal wafer switch 943. Here the wiper 942 is on the contact "3" to extend the path via lead 1542 to the pence input amplifier triode section 1544 of FIG. 31. The pulses of the group of four are inverted and amplified in this triode section and appear on output lead 1545, which extends to the pence #6 order bank, shown at 1318 in FIG. 35.

Referring back to the block diagram of FIG. 57, it will be noted that the operation just described is that carried out over path A. Hence, it will be observed that the matrices and gates employed have obviously been omitted from the block diagram of FIG. 57. Also, it will be noted that the group of four pulses which were developed under control of the shillings order bank #5 were introduced to the pence order bank #6 over paths established through the switching matrices by the decimal wafer master switch.

Of course, simultaneously four pulses were developed under control of the shillings order bank #6 and introduced into the pence order bank #7. Path B of FIG. 57 represented this operation, which was also permitted under control of the M9 tube. The paths and circuitry for effecting this entry will now be described.

Returning to the complement generator tube 2032 of FIG. 39, it will be recalled that the group of ten pulses on output lead 2034 was also able to pass through the diode 2061, due to the B+ supplied from the decimal wafer switch 1295. This group of ten pulses was applied over the diode output lead 2070 and by way of decimal wafer switch 1142 of FIG. 40 and conductors 2071, 2072, and 2073 to the shillings input amplifier triode section 2074 of FIG. 40. The inverted and amplified pulses passed over output lead 2075 to the #6 order bank 1804 of the shillings accumulator of FIG. 42.

After six pulses had passed into the counter of the shillings #6 order bank, it was caused to pass through "0," which provided the decreasing potential control on output lead 2083. The path for this decreasing potential control is along the further conductor 2124 and by way of lead 2125 and wiper 2126 of decimal wafer switch 2127. The output lead 2128 of the decimal wafer switch 2127 is extended as the input lead for the left-hand section of the duo-triode 2053 (shown in FIG. 21 in block form) corresponding to the detailed tube 2052, shown directly above. Of course, the group of ten pulses is available on input lead 2051 for the right-hand triode section of the tube 2053, so that, when the control (the decreasing potential) is applied over left-hand input lead 2128 from shillings order bank #6, the last four pulses of the group are passed over output lead 1076 to the diode 1077 of the pence input matrix (FIG. 29). This diode will continue the path, so that eventually pence accumulator #7 order bank will receive the four pulses.

As will be recalled, this operation is simultaneous with that of introducing four counts from the shillings #5 order bank to the pence #6 order bank, since the diode 925 and the diode 1077 are each connected to the common B+ supply lead 1078, which is energized during conduction of the M1 tube. It will also be seen that the diodes 1098 and 1961 are energized at this time and would provide two further parallel paths from shillings order banks, if they were being used to store fractions at the moment, to the appropriate order banks of the pence accumulator.

However, in the present problem, shillings order banks #4 and #3 (FIG. 42) are not being "pulsed out," and, accordingly, their delay transfer trigger pairs do not supply any control potential to the gated tubes 2054 and 2055 (shown in block form in FIG. 21). Hence, no input pulses are supplied to the diodes 1098 and 1961 of FIGS. 29 and 33. Also, it will be pointed out that the maximum exemplary decimal fraction storage in the shillings accumulator can be contained within four order banks, and, hence, the four parallel paths will suffice for any shillings fractional conversion operation.

Returning to the fractional conversion path from the shillings #6 order bank to the pence #7 order bank, it will be noted that the pence input matrix diode 1077 (FIG. 29) has a cathode output lead 1079, which extends to the decimal wafer switch 1081. This switch is, of course, on its "3" contact, so that the path is continued over leads 1953, 1954, and 1955 (FIG. 31) to the pence input amplifier triode section 1956. The amplified and inverted pulses in the group of four are applied over output lead 1687 to the pence #7 order bank 1624 of FIG. 35 to complete the entry over path B of FIG. 57.

Referring to the schematic of FIG. 57, the operation of Line 1*a* has just been completed. Paths A and B are again used to repeat this operation, as set forth on Line 2*b* under control of the M9 tube, to enter the quantity 44 into the same pence #7 and #6 order banks again. The paths A and B are twice used because of the units digit "2" in the conversion multiplier factor of 12.

Next, the M chain control will be shifted from the M9 tube to the M10 tube in order to effect multiplication by the tens order digit 1 of the conversion multiplier factor 12. The denominational shift required is automatically established by the circuitry. Since this conversion factor is always 12, the shifting of control from the M9 tube to the M10 tube is accomplished over a fixed connection, because two A ring cycles are always required to carry out the operation under control of the M9 tube, at which time control is shifted to the M10 tube for one A ring cycle and then by a fixed connection to the M11 tube.

Perhaps the foregoing controls are better seen from the timing charts of FIGS. 6, 6A, and 6B. The M9 tube is conducting, as illustrated by the elevated line 2131 on Line 14 in FIG. 6. This conducting condition continues, as evidenced by the elevated line 2131 in FIG. 6A, for approximately two A ring cycles, the A Start tube conducting intervals 2132 of Line 3 being indicated to show the two A ring cycle intervals.

During the two A ring cycles, the B10 tube on Line 18 develops two groups of ten pulses each. These 0° pulses are represented at 2133 and 2133′ along with a third group of ten pulses 2133″, developed during the succeeding A ring cycle for use under control of the M10 tube. The first group of B10 pulses 2133 is used to develop the requisite pulses of Line 1*a* of FIG. 57 for entry along paths A and B, while the second group of B10 pulses 2133′ is used to make the second entry corresponding to Line 2*b* along the same paths A and B. The third group of B10 pulses 2133″ is used to make the entry of Line 3*c* over paths C and D.

Returning to the chart of FIGS. 6 through 6B, the application of two groups of B10 pulses 2133 and 2133′ to the conversion process under control of the M9 tube is assured due to the allotment of the two A ring cycles. The M10 tube cannot become conducting until the K2 pulse 2134*b* of line 13 is developed. This is true because the only firing line (fixed connection) for the M10 tube is the conductor 2135 (FIG. 17), which extends from the K2 tube to FIG. 25, where a further connection 2136 (FIG. 26) applies the K2 firing pulse over the 100-micro-micro-farad input capacitor 2137 and by way of the 47,000-ohm grid resistor 2138 to firing electrode 2139 of the M10 tube. The M10 tube is, of course, primed on its control electrode 2140 from the cathode circuitry of the M9 tube.

Referring again to the timing charts of FIGS. 6 through 6B, it will be observed that the groups of four pulses responsible for the conversion entries along paths A and B of FIG. 57 are shown at 2151 and 2151′ on Line 21, FIGS. 6 and 6A. These are, of course, the last four pulses gated out of the B10 group of pulses 2133 and 2133′ appearing on Line 18.

The gating control affording the selection of these pulses is provided by the delay transfer trigger pairs of the shillings banks #5 and #6. The conducting interval for the right-hand triode section of the delay transfer trigger pair is shown at 2152 and 2152′ on Line 20 of FIGS. 6 and 6A, it being remembered that a decreased potential gating voltage was established when the shillings banks #5 and #6 were run through "0." The negative gating voltage (not illustrated) occupies the time interval corresponding to conduction in the right-hand triode section shown at 2152 and 2152′ on Line 20.

The resetting of the delay transfer trigger pairs to terminate the gating potential control will now be described. In FIG. 6A, it will be noted that the gating control interval 2152 ends at the time of appearance of the "readout restore pulse" 691 of Line 19. The 180° pulse 691 may also be called a "transfer release gated pulse" for present purposes. This pulse, it will be recalled, is a 180° pulse selected during the A Delay interval 692, represented on Line 4. Since the delay transfer trigger pairs are not reset until the appearance of the pulse 691, the gating control 2152 persists from its inception to the middle of the A Delay interval of the succeeding A ring cycle.

Normally, in the multiplying apparatus of the instant invention, the 180° pulses are applied continuously to the transfer trigger pairs of all of the accumulator orders to release any transfers set up by the immediately preceding 0° impulses normally serving as input counts. In this way, it is assured that transfers on transfers, etc., will never interfere with the operation of the counters. However, in the fractional conversion operation under discussion, it would be improper to release transfers from the transfer trigger pair, since these transfers are not carries but merely controls for the fractional conversion process only. These B10 groups of pulses are merely employed to extract from the shillings accumulator the content of the fractional order banks in order to effect the conversion to integral pence. Consequently, error would be introduced at this time if carries were permitted.

In order to avoid the foregoing, a transfer gating arrangement is provided wherein the transfer release pulses, such as those shown at 691 on Line 19 in the timing chart of FIGS. 6 through 6B, are applied to the transfer trigger pairs of the shillings accumulator banks #5 and #6 only once during each A ring cycle in lieu of the 180° pulses 102 of Line 2, which normally release transfers. As has been previously pointed out, the time of application of the transfer release pulses 691 is subsequent to the appearance of the last pulse in the group of ten pulses employed for "pulsing out" purposes.

This action then effects a resetting of the transfer trigger pairs. The reason for resetting is twofold, one being to permit the proper gating control throughout the entire fractional shillings conversion process. The other reason is to enable the trigger pairs to be in condition to accommodate transfers in the event that they are encountered during the subsequent extraction of integral shillings from the pence accumulator content.

GATED TRANSFER RELEASE CONTROL

Under normal conditions, all transfer trigger pairs in the counters have pulses applied thereto to release any transfers in the interval following the 0° pulse time in which they were set. These releasing pulses are, of course, the 180° pulses. The exception is during conversion, when the M9 through M12 tubes are controlling the machine operation. However, the discussion will first deal with the normal condition for releasing transfers or carries.

Since the clocks were designed with the 180° pulse times occurring intermediate the 0° pulse times, the carries can be released only when counts are not being entered into the accumulators. The circuitry for effecting such transfer release is shown in FIG. 44. The "gated" transfer release circuit includes the left-hand section of the duo-triode tube 2161, preferably of the 12AU6 variety, whereas the normal transfer release circuitry includes the right-hand section of tube 2161 and the left-hand section 2162 of a 12AT7 tube. In this latter tube section, the anode 2163 is connected through a 100,000-ohm resistor 2164 to the +250-volt terminal 2165, whereas the cathode 2166 is grounded through a 6,800-ohm load resistor 2167, which is by-passed by a 4-microfarad capacitor 2168. A further 15,000-ohm resistor 2169 is connected from the cathode 2166 to the +105-volt terminal 2170.

This cathode circuit arrangement enables approximately a +34-volt potential level to be supplied to the cathode 2166 when the tube section 2162 is in its non-conducting condition. The control electrode 2171 is connected through a 220,000-ohm grid resistor 2172 to the common input lead 2173. The input lead 2173 is connected to the cathodes 2174 and 2175 of the left-hand two diodes in multiple envelope 2039 of FIG. 21. These cathodes are tied together and grounded through a parallel combination of a 0.001-microfarad capacitor 2176 and a 47,000-ohm resistor 2177. The anode 2178 of the left-hand diode section is connected over lead 2179 to the cathodes 2180 and 2181 of the right-hand two diodes of multiple envelope 2037. These cathodes are connected to ground by the parallel arrangement of a 47,000-ohm resistor 2182 and a 0.001-microfarad capacitor 2183.

The purpose of these four diode sections is to establish isolated connections to the cathode circuits of the M9 through M12 tubes, so that approximately the +85-volt level will be applied to conductor 2173. Hence, positive D.C. biasing will be introduced to the left-hand section of tube 2161 and to the left-hand section of tube 2162 of the transfer released gated and normal transfer release circuits of FIG. 44 during the conversion operations.

Returning to FIG. 21, it will be seen that the anode 2191 of the middle diode of envelope 2037 is connected over leads 2192 and 2193 to the cathode circuit of the M11 tube of FIG. 26. Similarly, the right-hand diode section of envelope 2037 (FIG. 21) has its anode 2194 connected over leads 2195 and 2196 to the cathode circuit of the M12 tube of FIG. 26. The middle diode of envelope 2039 (FIG. 21) has its anode 2199 connected over lead 2200 to the cathode 2038 of the right-hand diode of envelope 2039 and also to the cathode 2036 of the left-hand diode of envelope 2037. As has been previously pointed out, the anode 2040 of the right-hand diode of envelope 2039 is connected over leads 2041 and 2042 to the cathode circuit of the M9 tube of FIG. 26, whereas the anode 2043 of the left-hand diode section of multiple envelope 2037 has a connection over leads 2044 and 2045 to the cathode circuit of the M10 tube of FIG. 26.

Since the diode sections mentioned above are referenced to ground and are not in condition to conduct except when the M9 through M12 tubes supply positive anode potential thereto, the normal potential level of the grid lead 2173 (FIG. 44) is zero, or ground. It will then be seen that the cathode potential of +34 volts, due to the voltage divider resistors 2167 and 2169, connected to the +105-volt terminal 2170, is sufficiently positive relative to the grid potential to maintain tube section 2162 in its off," or non-conducting, condition.

Accordingly, the anode junction point 2211 is at its higher potential level. A biasing lead 2212 extends from this anode junction point to a voltage divider network which sets the D.C. bias for the control electrode 2213 of the right-hand triode section of envelope 2161. This voltage divider network includes series-connected resistors 2214 and 2215, of 330,000 ohms and 510,000 ohms, respectively, connected between the anode junction point 2211 and the −105-volt terminal 2216. The voltage divider is such that the potential level at control electrode 2213 is approximately +85 volts when the tube section 2162 is not conducting.

The cathode 2221 of the right-hand triode section of tube 2161 is connected over lead 2222 to the +105-volt terminal 2170, so that the control electrode 2213 is only slightly negative relative to the cathode 2221. The pulsing input lead 2223 for the right-hand triode section of envelope 2161 is used to introduce 180° pulses to the control electrode 2213 over a 50-micro-microfarad input capacitor 2224. The 180° pulses on conductor 2223 are derived over lead 543 (FIG. 18), which extends back to the cathode-follower-connected 180° pulse source power amplifier tube 520 of FIG. 13.

Since the 180° pulses are applied to input conductor 2223 for the right-hand triode section of envelope 2161 (FIG. 44), and since they are positive pulses, they will be passed to the anode circuit, where the 22,000-ohm anode resistor 2228 will periodically develop greater portions of the +360 volts of the B+ supply applied at terminal 2229. In other words, the common anode junction point 2230 is decreased in potential each time a 180° pulse passes through the right-hand tube section of envelope 2161.

The 180° negative pulses from anode junction point 2230 are applied over lead 2231 to the shillings units order counter via a 25-micro-microfarad coupling capacitor 2232 (FIG. 42) and also to a common lead 2233, which applies the 180° normal transfer releasing pulses to each of the shillings orders #2 through #6. In the detailed transfer trigger pair (FIG. 41) of the units order shillings bank, it may be seen that the negative pulses will transfer conduction from the right-hand tube section of trigger pair 1128 back to the left-hand section, which is normally conducting when a transfer or carry is not stored.

It will be recalled that these negative-going 180° transfer release pulses were applied to the orders of the shillings accumulator only when the control electrode 2213 of the right-hand triode section of envelope 2161 (FIG. 44) was at +85 volts. This D.C. bias was established due to the lack of conduction in triode section 2162, which is the normal condition for this tube established at all times except during conversion, when the M9 through M12 tubes are supplying positive bias for this tube section. Hence, if any of the counters in the shillings accumulator is caused to store a transfer during the 0° pulse time, the succeeding negative pulse applied at the 180° time immediately releases this transfer or carry into the next higher order bank by resetting the transfer trigger pair to its normal or transfer receptive condition.

The foregoing expanation sets forth the normal transfer release for the shillings banks. It is now the purpose to explain the so-called "gated transfer release" for the shillings order banks, which is necessary during the conversion process. It will be recalled that during this conversion process the transfer release trigger pairs are no longer used to provide carries but are used to provide control signals or potential levels which persist from the time the counter was caused to pass through zero until a predetermined period after it attains its original setting.

The conversion of the fractional shillings accumulator content into pence is under the control of the M9 and M10 tubes. As has been explained, at this time the input conductor 2173 (FIG. 44) for the triode section 2162 is connected over one of the diode sections of envelopes 2037 or 2039 (FIG. 21) to the cathode junction points of one of the M9 through M12 tubes. If any of these M ring tubes is conducting, the potential level of conductor 2173 is established at approximately +85 volts. Accordingly, the tube section 2162 is no longer cut off, and the potential of its anode junction point 2211 is decreased. The potential distribution among resistors 2164, 2214, and 2215 is altered, so that the level of control electrode 2213 is decreased to establish a highly cut-off condition for the right-hand section of tube 2161. Even the presence of the positive 180° pulses applied over lead 2223 does not affect the cut-off condition of this tube section. Therefore no pulses of any kind are delivered to the shillings order banks from the normal transfer release circuitry during conversion.

Returning to the timing charts of FIGS. 6 and 6A, it may be seen that, on the sixth pulse of the B10 group 2133 (Line 18), the shillings banks #5 and #6 are caused to pass through zero, and at this time a control signal is stored in the transfer trigger pairs of these order banks. The presence of this control signal is indicated by the condition of the transfer trigger pair of Line 20, shown at 2152, wherein conduction is shifted to the left-hand triode section thereof. It is, of course, this control which enables the remaining four pulses to be gated through to the pence accumulator banks #6 and #7.

During this time, there is no output from the right-hand triode section of tube 2161 (FIG. 44). When the A Delay pulse 692 of Line 4 (FIG. 6A) is present, it enables the resetting of the transfer trigger pairs for shillings banks #5 and #6 by permitting the transfer release gated pulse 691 of Line 19 (FIGS. 6A and 6B) to cause the left-hand section of tube 2161 to generate a pulse which shifts conduction in the transfer trigger pairs back to the normal or left-hand triode sections thereof.

With the foregoing in mind, the "gated transfer release" circuitry of FIG. 44 will now be considered in detail. The left-hand triode section of envelope 2161 has its control electrode 2241 connected over a 500-micro-micro-farad input capacitor 2242 to the input lead 619. The input lead 619 derives a single 180° pulse during each A ring cycle from the cathode-follower-connected tube section 618 of FIG. 14. It will be recalled that this tube is gated receptive to 180° pulses only when the A Delay tube of FIG. 13 is conducting. The A Delay conduction extends only over a 0° pulse time interval, so that a single 180° pulse is selected by the cathode-follower tube section 618. This single 180° pulse is applied, during each A ring cycle, to the left-hand triode section of envelope 2161 of FIG. 44.

A D.C. biasing arrangement for the control electrode 2241 is supplied over a 220,000-ohm grid resistor 2243, connected in lead 2244, which extends to the input lead 2173 for the triode section 2162 of FIG. 44. It will be recalled that the lead 2173 normally has a zero-volt potential level except during conversion, when the cathode circuits of the M9 through M12 tubes supply the +85-volt potential level to this lead. Therefore, during the conversion process, the left-hand triode section of envelope 2161 will be primed to pass the single 180° pulses applied over its input lead 619. This pulse is identified at 691 on Line 19 of the timing charts of FIGS. 6 through 6B.

The application of these positively-oriented 180° pulses to the left-hand section of tube 2161 produces a negative pulse on output lead 2231, which extends to the delay transfer trigger pairs of each of the shillings accumulator order banks. These negative pulses, of course, reset any previously-set delay transfer trigger pairs to conduction in the normal or left-hand triode section thereof. Hence, the transfer trigger pair control of Line 20 in the timing charts of FIGS. 6A and 6B is relieved at this time.

As was mentioned, the control potential 2152 (Line 20, FIGS. 6 through 6B) for the conversion process was derived from the anode junction point of the right-hand trigger pair sections of the shillings accumulator. The common anode junction point 2081 of trigger pair 1128 (FIG. 42) was mentioned as being representative of the take-off point for this control potential. When conduction is shifted out of the right-hand triode sections back to the normally-conducting left-hand triode sections, the potential of the points, such as point 2081, is decreased to permit the controls exercised by the gates, such as those contained in envelopes 2052 through 2055 of FIG. 21, to be effective in passing the remaining pulses of the groups of ten pulses to the appropriate order banks of the pence accumulator.

Under normal conditions, when conduction is shifted from the right-hand triode section to the left-hand triode section of the delay transfer trigger pairs, a carry would be entered into the next higher order shillings bank. This transfer or carry must, of course, be blocked during conversion in order not to disturb the content of the shillings accumulator. Since shillings banks #5 and #6 are currently under discussion, their transfer paths will be considered for purposes of explaining the blocking arrangement. The transfer path from shillings bank #5 to shillings bank #6 must be interrupted, and the transfer path from shillings bank #6 to shillings bank #1 must also be interrupted, in order to preclude erroneous carries. Reference to FIG. 55 may be had to review the arrangement of the shillings order banks when the two-decimal-place problem of FIG. 1 is being carried out. The transfer paths to be interrupted are clearly shown in this figure.

In the circuit of FIG. 42, the normal transfer path out of the shillings #5 order bank 1806 is over a 27,000-ohm wave-shaping resistor 2251 (connected to the anode junction point, such as 2081 in the delay transfer trigger pair 1128 of FIG. 41) and by way of lead 2252 to the left-hand triode section 2253 (FIG. 40) of a 12AT7 type duo-triode connected as a shillings input amplifier triode section. Here the carry or transfer pulse is inverted and applied over output lead 2075 as an input count into shillings order bank #6, shown at 1804 in FIG. 42. Similarly, the transfer path out of shillings order bank #6, shown at 1804 in FIG. 42, is over the 27,000-ohm resistor 2254 by way of lead 2255 to the amplifier triode section 2256 of FIG. 39. The output lead 1123 from this triode section extends as the input lead for the shillings units order bank detailed in FIG. 41.

It may be seen that the pattern for carries or transfers out of one order bank to the next higher order bank is always established through a shillings input amplifier triode section. Therefore, if at the proper time the correct ones of these amplifiers are blocked, the transfer paths for the corresponding shillings order banks are interrupted.

This operation is achieved through the use of the multiple diode envelope 2261 (of the 6T8 type) including four diode sections (FIG. 39). The common cathode lead 2262 is connected to the anode 2263 of the left-hand triode section of a 12AT7 type tube 2264 (also FIG. 39). The cathode 2265 of this triode section is grounded, and the control electrode 2266 receives biasing potential over a 100,000-ohm grid resistor 2267 connected to two separate biasing leads 2268 and 2269. Isolation diodes 2270 and 2271, of the 1N65 type, are included in the respective leads which establish the D.C. control potential for this tube section.

The left-hand lead 2268 is connected to the lead 2035, which supplies the +85-volt potential level from the M9 or M10 tubes when they are controlling the conversion process. The parallel input lead 2269 is connected back directly to the cathode circuit of the M11 tube of FIG. 26. Although the M9 and M10 tubes mainly control the conversion of any shillings fraction, the M11 tube control insures that, when the trigger pairs are finally reset, no transfer or carry is entered at this time. Consequently, when any of the M chain tubes M9 through M11 is conducting, a positive biasing potential is applied to control electrode 2266 of tube 2264 (FIG. 39), so that this left-hand tube section will be conducting.

When the left-hand triode section of tube 2264 is conducting, the common cathode lead 2262 for the multiple diode envelope 2261 is drawn down to lower the potential level of the anodes of each of the diode sections and, consequently, the circuitry connected to these anodes. This circuitry includes four of the shillings input amplifier control electrode circuits. The lowering of the control electrode potentials serves to block any carries which are introduced to these shillings input amplifier tube sections. For example, the left-hand diode section of multiple envelope 2261 is connected over leads 2274 and 2275 to the junction point 2276 in the control electrode circuitry for the shillings input amplifier triode section 2256, which normally permits carries from the shillings #6 order bank 1804 (FIG. 42) to pass to the units order bank of the shillings accumulator, shown in detail in FIG. 41.

In the control electrode circuitry for the shillings input amplifier triode section 2256 (FIG. 39), a pair of series-connected resistors 2277 and 2278, of 47,000 ohms and 470,000 ohms, respectively, is located between the control electrode 2279 and the +85-volt lead 2280. Since the cathode 2281 is connected over the lead 2282 to the +96-volt terminal 2283, the normal grid-to-cathode potential is about −11 volts. However, when the junction point 2276 in the control circuit for triode section 2257 is substantially grounded through the left-hand diode section of multiple diode 2261, this potential difference approaches −96 volts, which is sufficient to block this tube section to carry or transfer pulses.

In the same manner, the second-from-the-left diode section of multiple envelope 2261, over leads 2285 and 2286, blocks the shillings amplifier triode section 1160 (FIG. 40) for carries from the shillings #3 order bank 1150 (FIG. 42) to the shillings #4 order bank 1162.

The third-from-the-left diode section of multiple envelope 2261 is effective over leads 2287 and 2288 to ground the control electrode circuitry of the shillings input amplifier triode section 2289 (FIG. 40), thus blocking carries from the shillings #4 order bank 1162 (FIG. 42) to the shillings #5 order bank 1806 at this time.

In the same manner, the right-hand diode section of envelope 2261 is connected over leads 2291 and 2292 to the control electrode circuit of shillings input amplifier triode section 2253 (FIG. 40) to block carries from the shillings #5 order bank 1806 (FIG. 42) to the shillings #6 order bank 1804.

During conversion under certain circumstances, it is necessary to block each of these transfer paths in order to preclude carries when the shillings banks are "pulsed out" or used as a pulse generator for the fractional digits contained therein. The reason that four transfer paths might be involved is that the multiplying apparatus will accommodate numbers having up to and including four fractional decimal digits. In other words, the banks of the shillings accumulator would be arranged as follows for the case of no decimal fractional digits to the case of four decimal fractional digits:

654321.
54321.6
4321.65
321.654
21.6543

Looking at the above arrangement of the banks of the shillings accumulator, it will be noted that in the case of the uppermost line there are no banks to accommodate fractional digits to the right of the decimal point. In the second line, bank #6 accommodates the single fractional digit, so it is necessary to interrupt the transfer path from bank #6 to bank #1 during conversion, because bank #1 is being "pulsed out." In the third line, it is necessary to interrupt the transfer path from bank #5 to bank #6 and from bank #6 to bank #1. In the fourth line, the transfer paths to be interrupted are from bank #4 to bank #5 and from bank #5 to bank #6 and from bank #6 to bank #1. In the case of the fifth line, which accommodates four decimal fractional digits, the transfer paths which must be interrupted are from bank #3 to bank #4, from bank #4 to bank #5, from bank #5 to bank #6, and from bank #6 to bank #1.

Although the instant problem involves a two-place decimal fraction, it will be noted that the multiple diode envelope 2261 of FIG. 39 interrupts all of the transfer paths mentioned in connection with any of the arrangements supra. In conclusion, during conversion, when the M9, M10, or M11 tubes apply a positive potential to the control electrode 2262 of the left-hand triode section of envelope 2264 (FIG. 39), the diode sections of multiple envelope 2261 insure that all transfer paths between the shillings banks which might be utilized during the conversion process are interrupted.

To the left of the multiple envelope diode 2261 (FIG. 39) is shown a decimal wafer switch 2297, having four out of five of its contact positions or leads connected in parallel with the diode sections of the multiple envelope 2261. The purpose of this switch is to disable and enable transfer paths in the shillings accumulator according to the location of the decimal point. For example, the wiper 3398 is shown in its left-hand, or "1," position to connect approximately ground potential over a 47,000-ohm resistor 2300 and by way of lead 2275 to the common junction point 2276 in the shillings input amplifier triode section 2256. This shillings amplifier tube section normally permits carries out of the shillings #6 order bank 1804 (FIG. 42) to pass to the units order bank of the shillings accumulator, shown in detail in FIG. 41. For whole-number problems, such transfers would cause erroneous entries, and, accordingly, this path is blocked when there is no decimal point setting.

When the multiplication involves a problem having a single decimal fractional digit to the right of the decimal point, the switch 2297 has its wiper 2298 set on position "2" to effect one connection and one disconnection. Since the ground potential level is removed from contact "1," the transfer path from shillings bank #6 to shillings bank #1 is re-established, so that carries from the fractional order bank #6 may be transferred into the units bank #1, when developed. This is true except during conversion, when the multiple envelope diode 2261 blocks this transfer path.

Also, with the decimal wafer switch 2297 having its wiper 2298 in position "2," the approximate ground potential level is extended over lead 2292 to the control electrode circuitry of the shillings input amplifier triode section 2253. This connection insures that carries will not pass from the shillings #5 order bank to the shillings #6 order bank at this time.

In the instant problem, involving a two-place decimal fraction, the wiper 2298 of switch 2297 is on position "3" to interrupt the transfer path from shillings bank #4 to shillings bank #5. Movement of the wiper 2298 from position "2" to position "3" enables the transfer path from shillings bank #5 to shillings bank #6.

If the decimal wafer switch 2297 had its wiper 2298 in position "4," the transfer path from shillings bank #3 to shillings bank #4 would be blocked, but the previously interrupted path from shillings bank #4 to shillings bank #5 would be enabled.

Lastly, movement of the wiper 2298 from position "4" to position "5" enables the transfer path from shillings bank #3 to shillings bank #4 and disables the path from shillings bank #2 to shillings bank #3. Of course, movement of the wiper 2298 off of the "5" position then enables the transfer path from shillings bank #2 to shillings bank #3.

It may now be appreciated that the function of the decimal wafer switch 2297 does not interfere with that of the diode sections of multiple envelope diode 2261 and vice versa.

The switching circuits, components, and connections for establishing the illustrative paths A and B of the "Fractional Shillings Converted To Pence" chart of FIG. 57 have been shown and explained in connection with the entry of the two portions (44) of the fractional conversion product shown on Lines 1_a_ and 2_b_. However, the manner of automatically effecting these entries using the 0° and 180° pulses of FIGS. 6 through 6B, under control of the A, J, and K rings, has not been completely explained.

It is now the purpose to refer to these timing charts and show the sequential operation which enables the fractional conversion. On Lines 1 and 2 of the timing charts of FIGS. 6 through 6B, there are represented the 0° impulses at 101 and the 180° impulses at 102.

The entire operation begins with the Tally Pulse 2321 of Line 5, which is developed by the A0–Tally tube of FIG. 19. The A ring has just completed a cycle when the A0–Tally pulse 2321 is developed, which operation resets the ring, so that the next 0° pulse, 101_a_, initiates a further A ring cycle.

However, before the next A ring cycle begins, the K2 pulse 2134_a_ of Line 13 causes conduction to be shifted from the M8 tube to the M9 tube, the conducting interval for the latter being indicated at 2131 on Line 14.

The reason that it is a K2 pulse which steps the M chain from the M8 tube to the M9 tube can best be seen from a consideration of the sample problem of FIG. 1. It has previously been explained that the M1 through M8 tubes are provided to control the basic multiplication steps in the apparatus. From FIG. 1, it may be observed that the highest order multiplier factor is 21 pounds. The highest digit in this multiplier factor is 2, and, of course, the K ring had to step to its K2 setting in order to effect multiplication by this tens order digit. Hence, upon the appearance of the K2 pulse, the basic multiplication is concluded, and this pulse is applied to the M9 tube to establish conduction therein.

In order to trace the firing path for the M9 tube, it may be helpful to note that only two digits of a possible four pounds multiplier digits appear in the problem of FIG. 1. Hence, the M5 and M6 tubes are controlling in the basic pounds multiplication, and the M7 and M8 tubes are skipped. It is therefore necessary to prime the M9 tube from the M6 tube before the K2 firing pulse can be effective.

The priming path extends from the cathode junction point 1247 of the M6 tube (FIG. 25) by way of conductor 2301 to the Tens order Pounds Keyboard of FIG. 24. The "2" key 1164 is depressed in this keyboard to extend the path over output lead 2302 through the Hundreds order of the Pounds Keyboard, because there is no setting in this order bank. The output lead 2304 from the Hundreds order Keyboard bank is extended through the Thousands order of the Pounds Keyboard (because there is no setting in the Thousands order) to the output lead 2305. This output lead 2305 is connected to the control electrode 2306 of the M9 tube. Thus, whenever the M6 tube is conducting, the M9 tube is primed if there is no key depressed in the Hundreds or Thousands order banks of the Pounds Keyboard of FIG. 24.

The K2 pulse from the K2 tube of FIG. 17 is applied over output lead 2135, which is continued across FIGS. 22 and 23, to the input lead 2307 for the Tens order of the Pounds Keyboard of FIG. 24. Since the "2" key 1164 is depressed, a path is formed through the blocked-in Tens order key bank to output lead 2308. Although the Tens order Keyboard is shown in block form, the paths therethrough may be traced in accordance with the detailed showing of the Units Pounds Keyboard to the left thereof. The output firing lead 2308 from the Tens order Pounds Keyboard is extended to the branch lead 2309, which passes through the unset Hundreds order Keyboard and emerges as output lead 2310. The output lead 2310 follows branch lead 2311 through the unset Thousands order Pounds Keyboard to connect a path to output lead 2312, which lead becomes the firing lead for the M9 tube of FIG. 26.

The firing of the M9 tube of Line 14 of FIG. 6 at the 180° time, indicated by the K2 pulse 2134_a_ of Line 13, really initiates the fractional conversion process.

In the portion of the A ring cycle appearing to the extreme left of FIG. 6, the Tally Pulse 2321 of Line 5 was responsible for firing the J2 tube, which gated open the K2 tube to apply the K2 pulse 2134_a_ (i.e., the next 180° pulse 102_a_) to the M ring, thereby shifting the conduction from the M6 tube to the M9 tube. Whenever conduction is shifted in the M chain, the J ring is reset, with conduction being initially established in the J0 tube. In the first full A ring cycle of FIG. 6, conduction in the J0 tube is indicated on Line 8 at 2313.

Next, in the sequence, the second 0° pulse 101_a_ of Line 1 (FIG. 6) fires the A Start tube, as illustrated in Line 3. The A Start tube conducts for the entire A ring cycle, the conducting interval being indicated at 2132 on Line 3. This tube is then extinguished on the next Tally Pulse 2321_a_ (Line 5), at the conclusion of the first illustrated A ring cycle.

The A ring controls the B ring and, in conjunction with the M chain, controls the J ring, which in turn controls the K ring. The K ring determines the number of times that the interim products (44) of Lines 1_a_ through 3_c_ in the chart of FIG. 57 are entered into the pence accumulator. The decimal fractional conversion factor for converting fractional shillings to integral pence is 12. Hence, the K1 and K2 tubes can be used to set off a single A ring cycle and a pair of A ring cycles, respectively, during which time the fractional conversion can be effected. The portions (44) of the product illustrated on Lines 1_a_ and 2_b_ are entered into the pence accumulator under control of the M9 tube of FIG. 26. The K2 tube allots a time interval of two A ring cycles for effecting this operation.

First, however, it will be recalled that groups of ten pulses are developed to "pulse-out" the contents of shillings banks #5 and #6. Of these groups of pulses, the proper number must be applied, in the conversion process, to the pence accumulator banks #7 and #6. As was indicated on Line 14 of FIG. 6, the M9 tube conducts over the interval 2131. During this time interval, the appropriate switching paths for all of the pulses utilized in the conversion process under control of the units denominational order digit 2 of the conversion factor 12 must be established.

Next, of significance in the timing sequence as the first illustrated A ring cycle proceeds, is the occurrence of the A Delay pulse 692 of Line 4, FIG. 6. This A Delay pulse is initiated by the 0° pulse 101_b_ of Line 1, which follows the 0° pulse 101_a_. As has been mentioned, the "transfer release gated" pulse 691 of Line 19 is developed during the A Delay pulse 692 as a result of the control afforded by the A Delay tube over the gated cathode follower 618 of FIG. 14. This first "transfer release gated" pulse 691 is applied to all of the trigger pairs of the shillings accumulator of FIG. 41 and FIG. 42 to insure that these trigger pairs are reset to their normal condition. The normal condition is, of course, with conduction in the left-hand triode sections thereof. Hence, when the counters of the shillings accumulator orders which contain the decimal fraction to be "pulsed out" are pulsed through "0," the trigger pairs associated therewith will have conduction shifted to the right-hand tube sections thereof to enable the gating control shown at 2152 on Line 20.

However, before the gating control is established, the sequential operation of the A ring enables conduction to be established in the A10 tube, as shown at 2323, Line 17 of FIG. 6. Conduction is established in the A10 tube by the fourth 0° pulse, and, as a result thereof, the A Delay tube is extinguished. It might be recalled that the A Delay tube is the only tube in the A ring which does not conduct from the time of its initiation until the conclusion of the A ring cycle because of the extinguishing circuit including the diode 654 (FIG. 13) in the feedback circuit from the A10 tube.

The A10 tube conducts until the next Tally Pulse **2321*a* of Line 5 to insure that the B10 tube passes the group of ten pulses 2133 of Line 18**, which group is used to "pulse-out" the fractional order banks of the shillings accumulator.

In the present problem, two groups of ten pulses, derived from the group 2133 over parallel paths, are applied simultaneously to the shillings banks #6 and #5; one time during each of the two A ring cycles allotted to the units order digit 2 of the conversion factor 12. The sixth pulse of the B10 group 2133 causes the delay transfer trigger pairs of the shillings #6 and #5 order banks to be cocked, thus affording the control 2152 of Line 20.

The four count content of the shillings banks #6 and #5, as represented by the pulses 2151 of Line 21, are applied to the #7 and #6 order banks of the pence accumulator while the control 2152 of Line 20 is effective. These pulses are used to restore the shillings #6 and #5 order banks to their previous contents, since they were caused to pass through zero on the sixth pulse of the B10 group 2133.

It has previously been explained how the control 2152 holds over until the A Delay time 692 of the succeeding A ring cycle when the "transfer release gated" pulse 691 of Line 19 is applied to all transfer trigger pairs to reset any of them which has been cocked and relieve the control, as illustrated at 2152.

The timing sequence so far described has taken care of the entry of Line 1*a* (FIG. 57) of the Fractional Shillings Converted to Pence Chart, so that the first portion 44 was "pulsed out" of the shillings accumulator and placed into the pence accumulator under the control of the M9 tube.

LINE 2*b* OF THE CHART OF FIG. 57

As the first complete A ring cycle, illustrated in FIGS. 6 and 6A, is concluded, the J Delay tube assumes the conducting condition for the J ring, as is illustrated by the pulse 2326. The reason the J Delay tube becomes conducting is that it is primed by the J10 tube of Line 8 and fired by the Tally Pulse **2321*a* of Line 5. While the J Delay tube is conducting, the J1 tube (the operation of which is indicated on Line 10) is primed, so that the first 0° pulse 101*c* to occur during the second A ring cycle fires the J1 tube, as is illustrated at 2327, and also establishes conduction in the A Start tube, as shown at 2132**.

During the second A ring cycle, illustrated in FIG. 6A, the B10 group of pulses 2133′ is applied to the shillings order banks #6 and #5, with, of course, only the four pulses 2151′ of Line 21, as selected by the control 2152′ of Line 10, being entered into the pence banks #7 and #6.

It will be noted from the timing chart of FIG. 6A that the M9 tube of Line 14 remains conducting, as illustrated at 2131, and, of course, the M10 tube of Line 15 remains in a non-conducting state, as indicated at 2328, during the second A ring cycle of conversion. For this reason, the operations which occur during the first A ring cycle will be repeated, so that the amount 44 of Line 2*b* of FIG. 57 will be entered into pence banks #7 and #6 over the same paths B and A.

The reason the M9 tube remains conducting and the M10 tube remains non-conducting during the second A ring cycle is that the firing line for the M10 tube is connected from the K2 tube of FIG. 17 as output lead 2135, which has the vertically downwardly extended lead 2136 of FIG. 26 connected thereto to establish the firing path for the M10 tube. Hence, until the K2 pulse **2134*b* of FIG. 6A appears, the M9 tube remains conducting, as is illustrated by the elevated level 2131 of Line 14. It is for this reason that the banks #6 and #5 of the shillings accumulator are "pulsed out" by the B10 groups of pulses 2133′ for the second time to develop the second group of four pulses 2151′** for application to the pence accumulator banks #7 and #6.

Since it is the J ring which controls the K ring, which in turn shifts conduction in the M chain, the J tube conducting intervals will be further considered. Conduction in the J Delay tube, as shown at 2326, had enabled the J1 tube to be fired. The J1 tube conducts for the interval 2327, which interval corresponds to the second A ring cycle time, just described.

It might be noticed at this time that, during conduction of the J1 tube, a group of twelve K1 pulses 2329 is produced, as is illustrated on Line 12. This is the normal operation, of course, because the J1 tube gates open the K1 tube to pass all of the 180° pulses which are developed during this time interval. However, these K1 pulses had no effect upon the conversion operation set up by the first two A ring cycles, because there existed no firing line from the K1 tube to the M10 tube, which is the only tube that is primed during conduction of the M9 tube.

It has now been shown how the conversion operation of Line 1*a* of the chart of FIG. 57 has been duplicated, as represented at Line 2*b* thereof, to enter the amount 44 into the appropriate order banks of the pence accumulator twice.

FRACTIONAL CONVERSION OF LINE 3*c* OF FIG. 57

The next step in the conversion process is that of entering the amount 44 of Line 3*c* of FIG. 57 into the appropriate order banks of the pence accumulator. The chart of FIG. 57 clearly shows that this entry involves a denominational shift. The M10 tube is utilized to set up new paths through the pence input matrix of FIGS. 29 and 33, so that the order banks of the pence accumulator now entered are #1 and #7 in lieu of #7 and #6.

The denominational shift is initiated by the M10 tube's assuming conduction, as illustrated at 2330 on Line 15 of FIG. 6B. The M10 tube assumes the conducting condition because the K2 pulse **2134*b*** follows the above-described fixed or direct firing line to the now-primed M10 tube.

The circuitry forming the illustrative paths C and D of FIG. 57 will next be discussed with the timing chart operation to follow. Of course, the paths C and D do not really exist as shown, but they do represent what happens in the conversion process. As was previously explained, the group of ten pulses which is used to "pulse-out" the shillings order banks is actually applied over parallel paths to the selected shillings order banks, as well as to gates which are opened when the shillings order banks are caused to pass through zero, thereby allowing the remaining numbers of the groups of ten pulses to pass to the appropriate order banks of the pence accumulator while the corresponding number of pulses returns the shillings order banks to their previous content prior to "pulsing out."

From the chart of FIG. 57 it may be observed that the contents of shillings bank #5 will be introduced into pence order #7 over path C, and the contents of shillings bank #6 goes to pence order #1 over path D. The group of ten pulses required to "pulse-out" shillings order banks #5 and #6 is derived from the B10 tube of FIG. 16. This output connection, shown at 771, extends from the anode circuit of the B10 tube to the amplifier triode section 2021 of FIG. 39. The group of ten pulses passes over output lead 2031 from tube 2021 to feed the control electrode 2331 of the complement generator tube 2032.

At the present time, the D.C. bias for this tube is supplied by the M10 tube over lead 2035, which lead is continued in FIG. 21 as the cathode lead for the left-hand diode of multiple envelope 2037. The anode lead 2044 for this isolating diode tube section is continued over lead 2045 to the M10 cathode circuit of FIG. 26. Consequently, when the M10 tube is conducting, its cathode potential of approximately +85 volts serves as a positive D.C. bias for the control electrode 2331 of the complement generator tube 2032 of FIG. 39, so that this cathode-follower develops the ten pulses across its 10,000-ohm load resistor 2334. This is the point where the group of ten pulses is applied to parallel paths, with one path being over output lead 2034 and by way of the further lead 2051 to the gate 2052 of FIG. 21.

The right-hand triode section of envelope 2052 is gated open whenever a negative-going voltage is applied to the left-hand control grid 2105 over its input lead 2086. This, it will be recalled, happens whenever the shillings bank being "pulsed-out" passes through zero. Accordingly, the other place that the group of ten pulses from the cathode follower tube 2032 of FIG. 39 is directed is the appropriate shillings order banks to be "pulsed-out." This path is by way of the output lead 2034 and two of the four diodes 2060 through 2063, as selected by the decimal wafer switch 1295, located to the left thereof.

The use of diodes 2060 and 2061 to provide paths over decimal wafer switches 1118 and 1142 of FIG. 40 to the shillings order banks #5 and #6, shown at 1806 and 1804 of FIG. 42, has already been explained. These paths remain unaltered, for it is the same shillings order banks—i.e., the decimal fractional banks—which are being "pulsed-out" in all phases of the conversion process of the instant problem.

Hence, at the appropriate time, when order banks #5 and #6 of the shillings accumulator are run through zero, the negative-going control potentials, developed on output leads 2082 and 2083, are applied to the gates 2052 and 2053 of FIG. 21 to allow the remaining number of pulses in the groups of ten pulses applied here to pass on to the pence accumulator.

It is this portion of the path to the pence accumulator which will be altered to account for the denominational shift due to the tens order digit "1" of the conversion factor "12."

The four output pulses from the gate 2052 of FIG. 21, representing the contents of shillings bank #5, are applied over output leads 922, 923, and 924 to the pence input matrix of FIG. 29. Here, the input lead 924 supplies the four pulses to the diode 1975, which is now energized because its anode B+ supply lead 1970 is connected to the right-hand isolation diode of multiple envelope 907 of FIG. 21, where the diode anode lead 2045 is connected to the cathode circuit of the M10 tube of FIG. 26. Hence, with the diode 1975 of FIG. 29 biased to a receptive condition, the four pulses pass oved cathode output lead 1079 to the decimal wafer switch 1081, where the wiper 1080 establishes a connection over leads 1953 and 1954 to the pence input amplifier triode section 1956 of FIG. 31. The output lead 1687 from this amplifier tube section extends to pence order bank #7, shown at 1624 in FIG. 35.

At the same time that the pence bank #7 is receiving the contents of the shillings fractional bank #5, the pence bank #1 is receiving the contents of shillings bank #6. This latter path is through the gate 2053, shown in block form in FIG. 21, by way of the output lead 1076, which is continued in FIG. 29 to the pence input matrix, where the diode 1976 is receptive to the four pulses passed through this gate, the diode 1976 having B+ supplied thereto over the common anode lead 1111 from the lead 1970, which extends back to the cathode circuit of the M10 tube.

Thus, the four pulses applied to pence input matrix lead 1076 pass through diode 1976 (FIG. 29) and follow the cathode output lead 1099 to the decimal wafer switch 1100. Here, the wiper 1958 establishes a connection to lead 1959, which in turn extends over lead 944 to the pence input amplifier triode section 946 of FIG. 30. The output lead 956 from this amplifier extends as the input lead for the units order of the pence accumulator, shown in FIG. 34.

The connections between shillings bank #5 and pence bank #7 of path C (FIG. 57) and from shillings bank #6 to pence bank #1 along path D have just been described. These two paths enabled both digits 4 of the amount 44 of Line 3c to be introduced into the pence accumulator under control of the M10 tube to complete the conversion of fractional shillings to pence.

In the chart of FIG. 57 it will thus be seen that 5.28 pence have been aded to the previous pence total of 12.96 to produce a new pence total of 18.24 as a result of the conversion of .44 of a shilling to pence.

Now the timing chart of FIG. 6B will be referred to in order to show the conclusion of the conversion process. It will be recalled that two A ring cycles were allotted to the portion of the conversion process accounting for the units order digit "2" of the conversion factor "12." A single A ring cycle, referred to as the third A ring cycle of the timing charts of FIGS. 6 through 6B, is allotted to the tens order digit "1" of the conversion factor "12."

As shown in the timing charts of FIGS. 6A and 6B, the J2 tube was primed for conduction during the conducting interval 2327 for the J1 tube of Line 10 when the Tally Pulse 2321*b* occurred, signifying the end of the second A ring cycle. Thus, the J2 tube is fired, as indicated at 2336 on Line 11. It was this action which developed the K2 pulse 2134*b* of Line 13 which caused the M10 tube to assume the conducting condition, as illustrated at 2330 on Line 15.

When conduction is shifted in the M chain from the M9 tube to the M10 tube, the J ring is reset in the manner explained hereinbefore to re-establish conduction in the J0 tube, as indicated at 2313′ on Line 8.

Firing of the M10 tube sets up the paths to the appropriate order banks of the pence accumulator described in connection with the amount 44 of the conversion product of Line 3*c* of the fractional shillings chart of FIG. 57. These paths, of course, enable the application of the four pulses 2151″, representative of the content of the fractional banks of the shillings accumulator, to be introduced into the appropriate order banks of the pence accumulator. The third A ring cycle of the conversion process is then concluded upon the occurrence of the Tally Pulse 2321*c* of Line 5. This Tally Pulse fires the J Delay tube to cause it to conduct at 2326′, as shown on Line 9. Then the next 0° pulse fires the J1 tube to cause it to conduct, as shown at 2327′ on Line 10.

It will be noted that this conducting interval for the J1 tube is substantially shorter than the conducting interval 2327 for the J1 tube in the second A ring cycle of FIG. 6A. The reason for this is the fact that the conversion factor is "12" and the K1 pulse 2329′ of Line 12 (FIG. 6B) follows its fixed or direct firing path to the M11 tube to establish conduction therein, as shown at 2339 on Line 16. The M10 tube is, of course, extinguished at this time, and the decrease in potential in the common anode circuit of the M chain is effective to reset the J ring immediately; hence the shortened J1 conducting interval 2327′.

Once the M11 tube is fired, the conversion of fractional shillings to pence is culminated, and the conversion process for the fractional pounds to pence is begun. However, it still remains to reset the delay trigger pairs in the shillings accumulator when the control interval 2152″ of Line 20 is concluded. The last "transfer release gated" pulse 691″, shown on Line 19, is responsible for this resetting. The fact that the M11 tube is now conducting, as illustrated on Line 16 at 2339, insures that no carries or transfers out of shillings banks #5 and #6 will be made when their delay trigger pairs are reset to the normal condition.

The resetting of the delay transfer trigger pairs and the blocking of carry paths out of selected shillings order banks will now be described with reference to the circuitry for carrying out these functions. In the gated transfer release circuitry of FIG. 44, the persistence of the positive biasing voltage applied to lead 2173 for the tube 2162 due to conduction in the M9 through M12 tubes continues the blocking arrangement for the right-hand triode section of tube 2161 throughout the conversion process. Therefore, the half-after or 180° pulses continuously applied to lead 2123 for the right-hand tube section of tube 2161 cannot pass to the transfer trigger pairs to release the control provided thereby during the conversion process by shifting conduction from the right-hand triode sections to the left-hand triode sections of these trigger pairs. Thus, the restoration of the transfer trigger pairs exhibiting the controls during the conversion of the shillings fraction to pence cannot be accomplished until the transfer release gated pulse 691" of line 19 of FIG. 6B is applied to input lead 619 (FIG. 44) of the left-hand triode section 2161. This particular transfer-releasing pulse occurs during the first A ring cycle while the M11 tube is controlling. Consequently, it is necessary at this time to insure that transfers or carries are not released out of the shillings fractional order banks when their transfer trigger pairs are reset.

It will be recalled that the multiple diode 2261 of FIG. 39 was provided to block the transfer paths out of each of the shillings order banks which could be used for storing a fraction (namely, banks #6, #5 #4, and #3). The left-hand section of triode 2264 reduces the potential at the multiple diode 2261 to block the above-mentioned paths whenever the M9, M10 or M11 tube is conducting. Hence, in the instant problem, at the time of occurrence of the transfer release gated pulse 691" of line 19 (FIG. 6B) during conduction of the M11 tube, the restoration of the transfer trigger pairs in shillings order banks #5 and #6 produces two erroneous "carry" signals, which are ineffective because their output paths are blocked. In other words, the transfer paths out of shillings order banks #5 and #6 are blocked by the multiple diode 2261 of FIG. 39 due to conduction in the M11 tube, which controls the left-hand section of triode 2263.

FRACTIONAL POUNDS CONVERSION

It has already been explained how the M11 tube is fired at the conclusion of fractional shillings conversion to initiate the fractional pounds conversion. As shown in the sample problem of FIG. 1, the pounds accumulator contains 68.04 pounds at the time the conversion process is begun. The object is now to convert .04 of a pound to pence, with this quantity being entered into the pence accumulator. Since there are 240 pence in a pound, the fractional portion of the stored pounds (.04) is multiplied by the conversion factor of 240 to yield 9.60 pence.

In this conversion multiplication, the digit 0 of the conversion factor 240 is omitted through the expedient of a denominational shift, so that the conversion multiplier factor includes only the digits "2" and "4." Accordingly, the quantity .04 is entered into the appropriate pence accumulator banks four times and then two times, with a further denominational shift being employed between these entries.

The M11 tube controls the first series of entries into the pence accumulator effected by "pulsing out" the content of pounds fractional banks #8 and #7. The M11 tube permits the introduction of this quantity four times into pence banks #1 and #7. Next, the M12 tube controls the switching paths for the double entry of .04 "pulsed out" of pounds banks #8 and #7 and added into pence banks #2 and #1. The lowest order bank of the pence accumulator is #6, but this bank is not entered, due to the "built-in" denominational shift necessary because of the zero digit in the conversion factor "240."

The pounds fractional conversion is effected in an identical manner to that described in connection with the shillings fractional conversion. Accordingly, a detailed explanation of the instant conversion operations will be dispensed with, and the process will merely be briefly outlined. Similarly, no timing chart is provided to illustrate this operation, because it is felt that the timing principles are obtainable from the charts of FIGS. 6 through 6B, used in connection with the previous description.

The M11 tube establishes paths through the pence input matrix of FIGS. 29 and 33 for the quantities "pulsed out" of the pounds fractional banks to the appropriate order banks of the pence accumulator. However, as in the case of the shillings conversion, the pulses representing the contents of the fractional order banks of the pounds accumulator do not come from the pounds fractional order banks but rather come from the gate controlled by the delay transfer trigger pairs of the pounds fractional order banks. Hence, it is necessary to supply simultaneously a group of ten pulses to each pounds fractional order bank to be "pulsed out" and to the corresponding gate, which will be opened when the pounds fractional order banks pass through zero.

It will be recalled that the group of ten pulses used for "pulsing out" purposes is present at the complement generator tube 2032 of FIG. 39, having been derived from the B10 tube of FIG. 16. In FIG. 39, it is the right-hand section of the complement generator tube 2032 which passes the group of ten pulses to the parallel paths which lead to the pounds fractional order banks to be "pulsed out" and also to the gates for the selection of the appropriate number to be introduced to the pence accumulator. This triode section is biased to the conductive condition whenever the M11 tube or the M12 tube is controlling. The biasing path is over lead 2341, which is continued in FIG. 21 by the middle and right-hand diode sections of envelope 2037 to the cathode circuits of the M11 and M12 tubes over paths previously traced.

The parallel paths for the groups of ten pulses out of the right-hand section of complement generator 2032 are shown connected to output lead 2342. The right-hand path 2343 directs the group of ten pulses to the four diodes 2344 through 2347 of FIG. 45, which provide input paths to each of the fractional order banks of the pounds accumulator. These banks, it will be recalled, are the highest four order banks #5 through #8. However, in the instant problem, the decimal wafer switches throughout the circuit of the subject multiplying apparatus are set in their Number 3 positions to accommodate a decimal fractional problem having two decimal places; hence, the group of ten pulses applied to input lead 2343 pass through two of these diodes (namely, 2344 and 2345) to follow paths to the pounds #7 and #8 order banks 1289 and 1290 of FIG. 48.

These two diodes are receptive to the pulses at the present time because the decimal wafer switch 1296 of FIG. 44 has its lower semi-circular disc 2348 rotated two positions in a clockwise direction to connect the lead 2349 to the anode leads 2350 and 2351 for the diodes 2344 and 2345. The input B+ supply lead 2349 is extended to the middle and right-hand diode sections of multiple diode envelope 2037 of FIG. 21, where these isolation diodes are connected over previously described paths to the cathode circuits of the M11 and M12 tubes. Thus, the +85-volt potential level of these M chain tubes is available as the anode supply for the diodes 2344 and 2345 of FIG. 45.

The paths from these diodes to the pounds #7 and #8 order banks of FIG. 48 may be traced if it is noted that the decimal wafer switches 1213 and 1224 (FIG. 46)

have their wipers 1214 and 1225 set on the Number 3 contacts for the two-decimal-place problem.

The ten pulses which pass the decimal wafer switch 1213 are applied to the pounds input amplifier triode section 1287 in FIG. 47, where they are amplified and inverted for introduction into the pence #7 order bank 1289 of FIG. 48. Similarly, the ten pulses which pass diode 2345 of FIG. 45 are extended over decimal wafer switch 1224 and by way of pounds input amplifier triode section 2353 (FIG. 47) to pounds #8 bank 1290 of FIG. 48.

In the sample problem of FIG. 1, the decimal fraction .04 is stored in the pounds #8 and #7 order banks, with the #8 bank holding the highest order of the decimal fraction (tenths) and the #7 bank accommodating the hundredths order of the fraction.

Since the pounds #8 bank is storing a zero, there will be no output from this bank in the conversion of the instant fraction. However, ten pulses will be applied to this order bank, and, after the addition of ten counts, the delay transfer trigger pair for this order will be "cocked." This setting of the delay transfer trigger pair occurs too late to open the corresponding gate for the application of any pulses to the pence accumulator. The delay transfer trigger pair is reset to its normal condition by the gated transfer release circuitry, as before explained. No "carry" signal is entered into the next order bank, because the transfer paths are blocked at this time.

The four decimal wafer switches 2361 through 2364, shown in FIG. 48 beneath the pounds accumulator, are provided to establish the appropriate connections from the pounds fractional order banks to their corresponding gates for enabling the application of control potential from the "pulsed out" fractional banks to the appropriate gate at the proper time to allow the fractional representing number of pulses to pass to the pence accumulator. Since the pounds #7 bank 1289 is storing the quantity "4," it will develop a gating potential control after six pulses have been introduced thereto to cause the bank to pass through zero. This control potential follows lead 2366 to the decimal wafer switch 2361, which extends the path over output lead 2367 to the gating tube 2368 of FIG. 21.

The remaining decimal wafer switches 2362 through 2364 of FIG. 48 are connected to the pounds gates 2369, 2370, and 2371 (FIG. 21), which are shown in block form because they are identical to the circuit of envelope 2368, shown in detail thereabove. The output connections from these gates extend to the pence matrix, where paths are provided therethrough to the appropriate order banks of the pence accumulator according to the M tube in control.

Considering the decimal wafer switches of FIG. 48, it will be appreciated that the decimal wafer switches establish connections to the pounds #8 bank in problems involving one to four decimal places and to the #7 bank in problems involving two to four decimal places and to the #6 bank in problems involving three to four decimal places and to the #5 bank in problems having four decimal places. The common lead 2365 (FIG. 42) for the decimal wafer switches has +250 volts applied thereto to block the gates 2368 to 2371 (FIG. 21) in the whole-number problem.

Depending on the number of decimal places in the problem, it is possible to employ from one to four of the gates 2368 through 2371 of FIG. 21 in a pounds fractional conversion operation. Each of these gates is adapted to receive ten pulses on common input lead 2372 derived from the complement generator tube 2032 (FIG. 39) over output lead 2372. The gates are, of course, opened at the proper time during the application of the group of ten pulses to the common input lead 2372 to pass the number of pulses in accordance with the stored pounds fractional digits on to the pence input matrix of FIGS. 29 and 33. The upper output leads 924, 1076, 1097, and 1275 for the gates of FIG. 21 establish the paths to the pence input matrix of FIGS. 29 and 33.

In the instant problem, the fraction (.04) stored in pounds banks #8 and #7 is being introduced into pence banks #1 and #7 four times under control of the M11 tube in accordance with the tens digit of the conversion factor 240. Hence, in FIGS. 29 and 33, the common anode lead 1111 is supplied with B+ potential from the cathode circuit of the M11 tube over lead 1970. Accordingly the right-hand section of gate 2368 (FIG. 21) passes four pulses to the lead 924, which applies these pulses to pence input matrix diode 1975, now rendered receptive due to the anode supply applied thereto. The cathode output lead 1079 continues the path through decimal wafer switch 1081 and via leads 1953, 1954, and 1955 to the pence input amplifier tube section 1956 of FIG. 31. The output path from this tube section is over lead 1687 to the pence #7 order bank 1624 of FIG. 35.

It has previously been explained how the above operation is repeated four times in accordance with the middle digit of the conversion factor 240 to enter 04 into pence accumulator order banks #7 and #1 four times. This requires four A ring cycles, which in turn step the J ring to the J4 tube to cause a K4 pulse to fire the M12 tube, the firing path being lead 871 (FIG. 25), which extends across FIG. 26 to connect with a downwardly-directed conductor 2375, which leads to the firing electrode of the M12 tube.

The M12 tube will control the conversion operation for two A ring cycles, during which time the quantity 04 will be "pulsed out" of pounds banks #8 and #7 and entered into pence banks #2 and #1 twice. This denominational shift is effected by the selection of different paths through the pence input matrix of FIGS. 29 and 33 by the application of B+ potential to the common B+ supply lead 2376 for the diodes 2377 through 2380.

The path from pounds bank #7 to pence bank #1 will now be traced. The control potential developed by the delay transfer trigger pair (not shown) of pounds #7 bank 1289 (FIG. 48) is applied over the previously-described path, including lead 2366, decimal wafer switch 2361, and lead 2367, to the gating tube section of envelope 2368 of FIG. 21. Four of the group of ten pulses, applied to input lead 2372 for this gating envelope, are selected and passed to output lead 924, which delivers the group of four pulses to pence input matrix diode 2377 of FIG. 29. The B+ anode supply is now present at this diode due to the lead 2381, which extends back to the right-hand diode section of envelope 908 of FIG. 21 to connect to the cathode circuit of the M12 tube of FIG. 26. Since the diode 2377 of FIG. 29 is now receptive to the four pulses, they are passed to the cathode output lead 1099, which extends to the decimal wafer switch 1100, located near the top of FIG. 29. The wiper 1958 completes a path to leads 1959 and 944 to the pence input amplifier triode section 946 of FIG. 30. Here the pulses are amplified and inverted and applied over the lead 956 to the units order of the pence accumulator, shown in detail in FIG. 34.

This outlined path is used twice to introduce the quantity 4 to pence accumulator order bank receiving a total count of 8. Hence, the pence accumulator has now received a total of 9.6 pence which have been added into pence banks #1 and #7, taking into account a single carry from pence bank #7 to pence bank #1. Similar circuits are set up for the control of the entry of amounts into the #2 order bank of the pence accumulator under control of the #8 order bank of the pence accumulator under control of the #8 order bank of the pounds accumulator, but no entries are made, since the value in bank #8 is zero.

During fractional pounds conversion, it is necessary to block selected carry paths in a manner similar to that set forth in connection with the shillings conversion process. The carry paths to be blocked in the pounds accumulator are those out of the order banks which might contain a decimal fraction. Only order banks #8, #7, #6, and #5 may be allotted to the decimal fraction, so, if the carry paths out of these banks are blocked during the conversion proces, there will be no erroneous carries resulting from the "pulsing out" of the fraction.

The multiple diode envelope 2382 (FIG. 46) of the 6T8 variety is used to disable the carry paths out of each of the fractional pounds order banks. The triode section 2383 (FIG. 46) of the 12AU7 type tube is adapted to draw current through any of the diode sections of multiple envelope 2382 to decrease the control grid potential of the selected pounds input amplifiers 2384 (FIG. 46), 2385, 2386, and 1292 of FIG. 47 in the carry paths out of the fractional order banks.

The foregoing is permitted because the cathode 2387 of triode 2383 is grounded, whereas its control electrode 2388 is connected in a voltage divider arrangement including the 100,000-ohm resistors 2389 and 2390. The lower end of this voltage divider is connected to the −75-volt terminal 2391, whereas the upper end receives the +85-volt cathode potential level of the M11 and M12 tubes over lead 2349 by way of the isolation rectifier 2392 of the 1N65 type and also the cathode potential of the M13 tube over isolation diode 2393 and by way of lead 2394. Consequently, when any of the M11 through M13 tubes is conducting, the bias applied to the triode 2383 of FIG. 46 will be sufficient to permit conduction in this tube, with the B+ supply therefor being the +85-volt source applied at terminal 2395 (FIG. 46) and effective over the common lead 2396 therefrom and one of the 470,000-ohm resistors 2401 (FIG. 46) and 2402 through 2404 (FIG. 47), which serve, respectively, as loads for the diode sections of multiple envelope 2382 (FIG. 46).

By tracing the anode leads of the diode sections of multiple envelope 2382, it can be seen how the transfer paths out of the fractional order banks are blocked at the input amplifier for the next higher order bank. The left-hand diode section of multiple envelope 2382 has an anode lead 2407, which extends to the grid circuit of the pounds input amplifier tube section 2385 (FIG. 47), which is in the transfer path out of bank #5 and to bank #6. In a similar manner, the second diode section from the left in multiple envelope 2382 (FIG. 46) blocks the amplifier section 2386 (FIG. 47) for carries from pounds bank #6 to pounds bank #7. Similarly, the second from the right-hand diode section of multiple envelope 2382 blocks the transfer path from pounds #7 to pounds #8 bank, and the right-hand diode section of multiple diode 2382 blocks the transfer path from pounds bank #8 to pounds bank #1. Thus it may be seen that no carries are permitted out of pounds banks #5 through #8 during the conversion process when these banks may be "pulsed out."

Basically, the M11 and M12 tubes are responsible for setting up the switching paths to enable pounds conversion. However, the use of the M13 tube to elevate the bias for the transfer-path-blocking triode 2383 of FIG. 46 insures that no transfers will be permitted out of the fractional banks until the A Delay time in the A ring cycle occurring while the M13 tube is controlling. Thus, the delay transfer trigger pairs are restored at the conclusion of the conversion process while the carry paths are still blocked. This type of operation has been explained in connection with the timing charts of FIGS. 6 through 6B in relation to the shillings accumulator, and, so, further description is believed to be unnecessary.

The M13 tube was automatically fired after two A ring cycles occurred during control by the M12 tube because of the fixed connection required by the fixed conversion factor 240. This fixed firing line is the K2 pulsing line 2135 of FIG. 25, which extends across FIG. 26 and to FIG. 27 to the downwardly-directed firing lead 2410 for the M13 tube of FIG. 27.

ROUND-OFF OF PENCE

Firing of the M13 tube initiates the round-off operation. As will be observed from the sample problem of FIG. 1, the quantity of pence accumulated is at this time 27.84. Round-off is effected by the introduction of a half penny to this total to provide a new total of 28.34 pence, which is thereafter utilized as 28 pence because the fraction is ignored. In order to add the half penny for round-off, it is necessary to supply a group of five pulses to the proper pence order bank. This pence order bank is always the #7 bank because, in any fractional problem, the #7 pence bank always contains the highest order decimal fraction.

For example, if the decimal point were set so as to include only a single decimal digit, this fractional decimal digit would appear in pence bank #7. In the instant problem, there are two decimal positions in the stored quantity 27.84, and, accordingly, the pence bank #7 contains the digit 8. Then, when the count of 5 is entered into this order, the resulting transfer or carry into the units pence order bank creates a new total of 28 pence. Otherwise, all fractional notations are disregarded because they are not read out at the conclusion of the problem.

The group of five pulses for the round-off operation is derived from the B6 tube of FIG. 15 over output lead 2412, which is continued in FIG. 39 as the input lead including the 250-micro-microfarad input capacitor 2413 for the right-hand cathode-follower-connected triode section of envelope 2264. This cathode-follower gate is biased to a condition which will permit conduction by each of the five pulses whenever the M13 tube is controlling. The D.C. biasing path for the control electrode 2415 is over a 290,000-ohm resistor 2416, connected in the lead 2417, which lead extends to the decimal wafer switch 2418 at the top right-hand corner of FIG. 39.

Whenever whole-number problems are handled, the decimal wafer switch has its wiper 2419 set to the "1" position, which grounds the control electrode 2415, thereby precluding conduction in the cathode-follower gate. However, whenever the problem involves one to four decimal places, the wiper 2419 is set to one of the #2 through #5 positions to establish a path over lead 2421 to the cathode circuit of the M13 tube of FIG. 27. In the instant problem, involving two decimal places, the wiper 2419 of decimal wafer switch 2418 (FIG. 39) is on the #3 position to apply the +85-volt cathode potential of the M13 tube to the cathode-follower gate in envelope 2264. Hence, the group of five pulses passes over output lead 2422 and through a diode 2423 (FIG. 31) (of the 1N65 type) and coupling capacitor 2424 to the lead 1955, which is the input lead for the pence #7 order bank 1624 of FIG. 35. The rectifier 2423 operates in conjunction with a 100,000-ohm resistor 2425, connected over lead 2426 to the common lead 950 (FIG. 30), which extends to +96-volt source 951 to isolate the two sources of input pulses which may be applied to output lead 2422 (FIG. 31).

In this manner, the pence total of 27.84 is changed to 28.34 in which the fraction is disregarded. It might be noted that, had the pence accumulator included only a count of, say, 27.44, the addition of one half-penny would merely have effected the fractional portion of the pence content and would not have caused any transfer entry into the units order digit of the whole-number pence.

Of course, the round-off process requires only a single A ring cycle, because a group of five pulses is available during each A ring cycle. At the conclusion of the A ring cycle, developed while the M13 tube is controlling, the A ring tally pulse is responsible for firing the M13A tube, thereby completing the round-off process and initiating a single A ring cycle delay to allow time for transfer releases before the next step in the multiplication process is begun. As may be seen in FIG. 27, both the M13A and M14 tubes are fired over lead 696, which receives the A0 tally pulse. Consequently, when the M13 tube is conducting in the round-off operation, the M13A tube is primed, so that the first A0 tally pulse to appear fires the M13A tube. At the conclusion of the one A ring cycle, while the M13A tube is conducting and priming tube M14, the A0 tally pulse fires the M14 tube to initiate the extraction process.

EXTRACTION IN DECIMAL FRACTIONAL PROBLEM

The extraction of integral shillings from the content of the pence accumulator is carried out generally in the same manner in the fractional problem as in the whole-number problem. However, since one or more of the order banks #7, #6, #5, and #4 may be used to represent a decimal fraction, it is necessary to apply a "false zero" control to the fractional decimal order banks to insure that the quantity contained therein is not examined for possibilities of division or extraction. Of course, it will be appreciated that the decimal fractional problem may contain less than four decimal positions, and, accordingly, it would not be proper to place "false zeros" in each of the four higher order banks for all problems. The "false zero" control is therefore made effective for only the order banks actually containing the decimal fractions. This will be explained further in connection with the description to follow.

The extraction-of-shillings process is initiated by the firing of the M14 tube, which takes place at the conclusion of the single A ring delay cycle allotted to the M13A tube. The M14 tube is also fired by an A0 tally pulse, over the common input firing lead 696 (FIG. 27). Firing of the M14 tube energizes the top row of triodes in the pence readout matrix of FIG. 37. As in the case of the whole-number problem previously discussed, the triode 1324 receives the "0" readout from pence order bank #6, whereas triodes 1379 and 1385 receive the "0" and "1" readouts from pence bank #5 and triodes 1386 and 1387 receive the "0" and "1" readouts from pence bank #4. These pence order banks are shown in block form in FIG. 35, where the decimal wafer switches 2441, 1390, 1375, 1381, and 1319 now provide, as required, the "false zero" control over the common lead 2442, which is connected to the −15-volt source 2443.

At the present time, the pence accumulator is arranged with its order banks in the following relation: #5, #4, #3, #2, #1, #7, and #6, the decimal point providing for two decimal fractional places in accordance with the sample problem of FIG. 1. This accumulator is storing 00028.34 pence, including the five pulses (half-penny) which were applied to the #7 order bank during round-off. It has previously been explained that it is unnecessary ever to examine the contents of pence bank #7.

In the instant problem, since the pence bank #6 is now allotted to the decimal fraction, it is necessary to apply a "false zero" to this order bank to prevent error in the extraction process, because the decision circuit must initially receive the readouts from the #6, #5, and #4 pence order banks.

By observation of the decimal fractional switches located beneath the pence accumulator banks of FIG. 35, it may be seen that the wiper 1320 of decimal wafer switch 1319, serving pence bank #6, will be on its #3 position, so that a connection is established over the 620,000-ohm resistor 2444 and by way of lead 2442 to the −15-volt "false zero" source 2443. In this manner, the pence #6 order bank appears to have a zero content for extraction purposes.

It may also be noted that the #5 bank "0" and "1" readout leads are connected to the wipers 1376 and 1382 of decimal wafer switches 1375 and 1381 when these switches have their wipers on the #3 positions to accommodate a two-place decimal fractional problem. This, of course, presents the true content of pence bank #5 to the decision circuit. However, if the decimal problem involves three decimal places, it may be noted that the #5 bank "0" and "1" readouts will be disconnected, and their decimal wafer switches will be connected to the "false zero" source 2443, as was the case with the #6 bank "0" lead when two decimal places were included in the fractional problem. In a similar manner, the "0" and "1" readouts for the #4 bank are disconnected when the decimal fraction includes four decimal places, and the decimal wafer switches 2441 and 1390 have their wipers on the #5 position to receive the "false zero" potential. It may therefore be summarized that, when a bank which includes readouts to be analyzed in the extraction process is allotted as a decimal fractional order bank, its readout leads automatically receive the "false zero" potential level.

In the instant problem under consideration, each of the 6–0, 5–1, 5–0, 4–1, and 4–0 readouts all indicate a content of zero, the #6 readout being a "false zero" and the other readouts being connected to banks which are actually storing zero.

Since the pence banks #5 and #4 actually contain zeros, their "0" readout leads will have the unique potential level—namely −15 volts—applied thereto, as will also the 6–0 readout due to the "false zero" source. It is this negative potential level, effective at the 6–0 pence readout triode 1324 (FIG. 37), the 5–0 triode 1379, and the 4–0 triode 1386, which renders these three tubes receptive to the gated clock or 180° pulse on common lead 1372, which supplies all of the input pulsing leads for the triodes connected to the readout leads. Accordingly, the left-hand section of diode 1401 and the diode "OR" sections of tubes 1401 and 1402 (FIG. 32) simultaneously apply three negative pulses to the Rossi decision circuit including the two triode sections of tube 1431 and the left-hand triode section of tube 1432 to establish a positive ouptput pulse on common lead 1344, which is indicative of the "not divisible" condition. This pulse is effective by way of the inverter triode section of tube 1444 and the right-hand triode gate of envelope 1432 over common lead 1595 to the step the M chain from the M14 tube to the M15 tube (FIGS. 32 and 27). This same "not divisible" signal triggers the trigger pair shown in envelope 1466 (FIG. 32) by way of the cathode follower gate 1456 to disable the complements and tally generator via gate 1479 and the division tally tube 1561, thereby preventing division through the addition of the complementary number 988.

The above process is repeated until division is possible. However, under control of the M15 tube, the pence order banks #5, #4, and #3 have their readout leads connected to the second row of triodes in the pence readout matrix of FIGS. 37 and 38 to test the 5–0, 4–0, and 4–1, and 3–0 and 3–1 readouts for the possibility of extraction or division. This second row of triodes 1602 to 1606 is, of course, energized from the M15 tube through the B+ supply on common lead 1601 at this time. As in the previous situation, the three zero readout leads from the #5, #4, and #3 banks cause the decision circuit to set up the conditions for division not possible, thereby stepping the M chain and blocking the complements and tally generator.

The third row of triodes 1646–1650 of the pence readout matrix of FIGS. 37 and 38 receive the 4–0, the 3–0 and 3–1, and the 2–0 and 2–1 readout leads for examination during conduction of the M16 tube. Of course, the "not divisible" signal is again rendered because of the simultaneous presence of three negative biasing potential levels at three of the pence readout matrix triodes; namely, the 4–0 and 3–0 readout leads. This "not divisible" signal is responsible for stepping control to the M17 tube for examination of the 3–0, 2–0 and 2–1, and the 1–0 and 1–1 readout leads.

A "divisible" signal will be obtained this time, because the pence banks #3, #2, and #1 contain the quantity 028, which is, of course, divisible by 12. It will be appreciated that, while the 3–0 lead is actually connected to the #3 bank, which contains a zero, the "0" and "1" readout leads for the pence banks #2 and #1 will not have the negative potential level because these banks do not contain a "0" or a "1" content at this time. Therefore, the trigger pair 1466 remains in its normal condition to allow the complementary number gate 1479 to bias on both sections of the "B8" and "B9" gates contained in envelope 1511 of FIG. 21. Hence, the group of nine pulses and the group of eight pulses applied to the sections of this tube 1511 are passed on to the pence complements matrix of FIGS. 29 and 33. Here, it will be recalled, the group of nine pulses appears on common input lead 1531, where the upper diode 1532 is receptive because of the B+ supply provided by the M17 tube over common lead 1660, so that the group of nine pulses is applied over output lead 2450 and by way of the horizontal lead 1101 (FIG. 29) to the pence input amplifier triode section 1102 of FIG. 30. This amplifier tube introduces the group of nine pulses over output lead 1103 to pence bank #3, shown at 1091 in FIG. 35.

Returning to the pence complements matrix, the group of eight pulses introduced over input lead 1546 is applied to diode 1659, which is now receptive due to the B+ supply on common lead 1660 provided by the M17 tube, so that the group of eight pulses is passed over cathode output lead 2451 to the horizontal lead 944, which introduces the group of pulses to pence input amplifier 946 of FIG. 30. Here the pulses are amplified and inverted and then applied to the units order of the pence accumulator, shown in detail in FIG. 34. Simultaneously, however, a further group of eight pulses, derived from the pence complements matrix input lead 1546 (FIG. 29) over the parallel lead 1548, is applied through now-receptive diode 1658 and output lead 2452 to the horizontal lead 1082 (FIG. 29), which extends to the pence input amplifier 1083 of FIG. 30. Here this group of pulses is amplified and inverted and applied over output lead 1055 to the pence #2 order bank 1056 of FIG. 35. Consequently, the complementary number 988 is added into pence banks #3, #2, and #1 to reduce the content from 028 to 016.

This operation, of course, develops a tally pulse which is applied to the appropriate order bank of the shillings accumulator. This tally pulse is developed at the division tally tube 1561 (FIG. 32), where the left-hand section is biased receptive to a B1 pulse applied over input lead 1572, while the complementary number gate 1501 is in its operative or "on" condition. The output division tally pulse from division tally tube 1561 follows lead 1574 to the shillings tally matrix of FIG. 36, where the lead 1574 is continued to the diode 1741 of FIG. 33, which is now receptive due to the B+ supply attributable to the M17 tube. The output lead 1742 from this diode is continued in FIG. 40 as the upper line of a group of horizontal leads extending across this figure and to the units shillings input amplifier triode section 1122 of FIG. 39. Here the tally pulse is amplified and inverted and applied over output lead 1123 to the units shillings order bank, shown in detail in FIG. 41. This, of course, is the proper order bank of the shillings accumulator to receive the tally pulse, because only a single shilling was extracted from the pence accumulator content, which was reduced from 028 to 016.

The foregoing process is repeated once again to extract a second shilling from the contents of the pence accumulator under control of the M17 tube, thus reducing the pence total to 04 pence and providing for the introduction of a second extracted shilling into the shillings accumulator to increase the total count therein to 21, as shown in FIG. 1.

Of course, when the content of the pence accumulator is reduced to 04, a "not divisible" signal is obtained from the decision circuit to shift control from the M17 tube to the M18 tube, which initiates the extraction of integral pounds from the shillings accumulator content. However, before a brief description of this process is given, it will be mentioned that, during the extraction of shillings from pence process just described, it is necessary to block or interrupt certain carry paths to prevent erroneous entries.

The circuitry for blocking the carry path out of the highest order bank under examination, so that carries will not be transferred out of this order bank when the complementary number is introduced to the pence accumulator, has already been discussed. However, it will be briefly pointed out again, even though the decimal fractional switching does not enter into or affect this circuitry. When the M14 tube is controlling, the contents of banks #6, #5, and #4 are being examined for the possibility of division. Accordingly, at this time the carry path from pence bank #6 to pence bank #7 is blocked. This is accomplished by the left-hand triode section of envelope 1671, shown in FIG. 31. The M14 tube applies positive biasing over lead 1678 to the control electrode of this triode section, so that it is rendered conductive and current is drawn over its anode lead 1681 and by way of the load resistor 1688 connected to the +85-volt source 954 (FIG. 30) via lead 1053. This anode load 1688 is in the grid circuit of the pence amplifier tube located in the carry path from pence bank #6 to pence bank #7. Therefore, whenever the left-hand tube section of envelope 1671 is conducting (during the conducting interval of the M14 tube), the voltage level at point 1683 in the grid circuit of pence amplifier 1685 is decreased to block this carry path.

In the same way, the right-hand section of envelope 1671 blocks the carry path between pence bank #5 and #6 at pence amplifier 1694 (FIG. 31) whenever the M15 tube is conducting to permit the examination of pence banks #5, #4, and #3.

The pence transfer path from bank #4 to #5 is blocked under control of the M16 tube when it is possible that the complementary number 988 may be introduced into pence banks #4, #3, and #2. The control tube section is the left-hand side of envelope 1672 (FIG. 31), which is connected over lead 1689 to the grid circuit of the pence amplifier triode section 1696 (FIG. 30) to interrupt the pence bank #4 to bank #5 transfer path. Likewise, the right-hand section of envelope 1672 (FIG. 31) interrupts the pence bank #3 to pence bank #4 transfer path at pence amplifier 1105 (FIG. 30) whenever the M17 tube is conducting and there is a possibility of entering the complementary number 988 into pence banks #3, #2, and #1.

It will also be recalled that the decimal wafer switch 1630 (FIG. 30) is provided to interrupt the transfer path out of the highest order pence bank to the lowest order pence bank allotted for the decimal fraction. In the instant two-place decimal problem, the fractional decimal banks are #7 and #6. It is therefore the purpose of the switch 1630 to block the transfer path from bank #5 to #6. This is accomplished by placing the wiper 1629 on position "2," which applies ground potential level to the grid circuit of the pence amplifier 1694 (FIG. 31) to interrupt the carry path from pence bank #5 to pence bank #6. This concludes the description of the process utilized for the extraction of integral shillings from the pence accumulator content during a fractional decimal problem.

The process for extracting integral pounds from the shillings accumulator content will now be briefly considered.

The shillings accumulator now contains 0021.28 shillings in banks #4, #3, #2, #1, #6, and #5 in that order from left to right, from which it is possible to extract one pound, leaving a remainder of one shilling. Since the logical or testing circuitry is arranged to examine the contents of the shillings order banks in descending order, it is necessary to establish the "false zero" condition in shillings banks #6 and #5.

The decimal wafer switches located along the bottom of FIG. 42 and including such switches as 2461 and 1801 are provided for establishing the "false zero" condition on the readout leads from the shillings order banks which may contain a decimal fraction; namely, banks #3 through #6. The —15-volt "false zero" source is shown at 2443′ and may, of course, be the same source used for establishing the "false zero" condition for the pence accumulator order banks. The common —15-volt lead 2442′ is connected to each of the decimal wafer switches by way of their common load resistors, such as 2444′ for switch 1801. It may be seen that, as in the case of the pence accumulator order banks, the shillings accumulator order banks are arranged to have the "false zero" condition established according to the decimal point setting. For example, the wiper 1082 of switch 1801 for bank #6, shown at 1804, will receive the "false zero" level when the problem includes one through four decimal fractional places. Likewise, the shillings #5 bank 1806 will have the "false zero" condition established in problems having two through four decimal fractional places.

It will be recalled that the readout leads from the shillings order banks are connected to the shillings readout matrix triodes of FIGS. 43 and 44. When the M18 tube is energized to initiate the extraction of integral pounds, the upper three triodes 1784, 1785, and 1786 will be supplied with B+ potential over the M18 cathode tube lead 1795. Also, the thyratron 1751 (FIG. 32) is fired over lead 1767 from the cathode circuit of the M18 tube to cause a negative potential to be applied to and maintained on the grid of the left-hand triode section of tube 1431 of the Rossi decision circuit. In accordance with the logical conditions set forth and explained previously, the decision circuit will now provide a "not divisible" signal upon the simultaneous application of two, rather than three, negative signals thereto.

In the instant two-fractional-decimal-place problem, it may be observed that the switches 1801 and 2461 for shillings order banks #6 and #5 (FIG. 42) will be moved two places in the clockwise direction to apply the "false zero" level to the 6–0 triode 1784 (FIG. 43) and the 5–0 triode 1785. Also, the further decimal wafer switch 2462 (FIG. 42) establishes the "false ezro" level for the 5–1 readout lead, so that the corresponding triode 1786 (FIG. 43) will receive the —15-volt level at its control grid in the same manner as the triodes 1784 and 1785. Therefore, the 180° or clock pulse on common input pulsing lead 1787 (FIG. 43) for the shillings readout matrix triodes will affect each of the triodes in the upper row to supply negative pulses through the left-hand section of diode 1401 and through the "OR" section of diode 1401 (FIG. 32) to the Rossi decision circuit now including the right-hand section of envelope 1431 and the left-hand section of envelope 1432. This, it will be recalled, produces the "not divisible" signal, which, by way of the inverter section of envelope 1444 and the amplifier section of envelope 1432, steps the M chain to the M19 tube, while the "not divisible" signal also affects the trigger pair 1466 to close the complementary number gate 1479, thereby blocking the complements generator and division tally sections.

The foregoing process is repeated under control of the M19 tube and the M20 tube, because the left-hand section of diode 1401 (FIG. 32) receives a negative pulse, whereas the double input "OR" section also receives at least one negative pulse. However, when the M21 tube assumes control, the content of shillings banks #3 and #2 are under examination, and while the 3–0 readout is negative due to the zero content in this bank, the 2–1 readout is positive due to the "2" content in the #2 bank, and the 2–0 readout is positive for the same reason. Consequently, the Rossi circuit develops a "divisible" signal, so that the trigger pair 1466 (FIG. 32) is switched, and the complement gate 1479 opens a path from the complementary number generator, which now supplies the quantity 980 to the shillings order banks #3, #2, and #1, to cause one pound to be extracted therefrom. Accordingly, a single tally pulse is entered into the units order of the pounds accumulator, and the shillings content is reduced to 001. Examination of the 3–0 and 2–0 and 2–1 readout leads now is responsible for the formation of a "not divisible" signal, because the 2–0 input to the "OR" circuit permits a negative pulse simultaneously with the 3–0 negative pulse to influence the Rossi circuit, which causes the M chain to be stepped to the M22 tube (FIG. 28) to energize the relay coil 2471 of relay RL9, which terminates the calculation and initiates the printing and indicating operation.

Before the printing or indicating circuitry is discussed, it will be pointed out that the same type of carry-inhibiting circuitry is provided to block erroneous carries developed in the shillings accumulator, as was discussed in connection with the pence accumulator. Of particular importance in the extraction process is the circuitry for blocking carries out of the highest order bank receiving the complementary number.

This circuitry is shown in the form of the two triode sections contained in envelope 2472 and the half-triode section of envelope 2473 of FIG. 39. The common —75-volt source 2474 is provided to normally maintain these triode sections in the cut-off condition. However, each of their control electrodes is also adapted to be supplied with positive potential from the cathode circuits of the M19 through M21 tubes whenever these tubes are controlling. The control electrode 2475 of envelope 2473 is connected over lead 2476 to the M19 lead 1811 of FIG. 43. Similarly, lead 2477 for the right-hand triode section of envelope 2472 is connected across FIG. 41 and to the M20 lead 1820 of FIG. 43. Likewise, the lead 2488 for the left-hand triode section of envelope 2472 (FIG. 39) is connected across FIGS. 41 and 43 to the M21 lead 1831 of FIG. 44. The anode lead 2501 for the triode section 2473 (FIG. 39) is connected to the horizontal lead 2292, which extends across FIG. 40 to the control electrode circuitry of the shillings amplifier tube section 2253, connected in the transfer path from shillings bank #5 to shillings bank #6. When the triode section 2473 (FIG. 39) assumes its conducting condition due to the positive bias supplied by the M19 tube, this triode draws current through the "load" resistor 2502 (FIG. 40) in the control electrode circuitry of the shillings amplifier 2253 due to the +85-volt source 2503, thereby to disable this transfer tube.

Likewise, the right-hand transfer blocking triode section of envelope 2472 (FIG. 39) is connected in the control electrode circuitry of the shillings amplifier 2289 (FIG. 40) to block the transfer path from shillings order bank #4 to shillings order bank #5, whenever the M20 tube is conducting. Similarly, the left-hand triode section of envelope 2472 (FIG. 39) blocks the shillings amplifier triode section 1160 (FIG. 40) for carries from shillings order bank #3 to #4 whenever the M21 tube is controlling. In this manner, the complementary number may be introduced into the shillings accumulator without causing carries to be entered into the next higher order bank.

Also, the decimal wafer switch 2297 of FIG. 39 is provided to interrupt the end-around-carry path from the highest whole-number order bank to the lowest fractional decimal order bank. In the instant problem, the wiper 2298 will be moved two positions in the clockwise direction to block the shillings amplifier tube section 2289 (FIG. 40), thereby interrupting the carry path from bank #4 to bank #5.

PRINTING AND INDICATING

The printing and indicating mechanism contained in the housing 303 (FIG. 8) is shown and described in United States Patent No. 2,682,995, which was filed in the names of Edward J. Carey and Desmond R. Hearsum and is entitled "Printer and Indicator Unit" and issued on July 6, 1954. The electrical control circuitry for the printer is illustrated in FIGS. 49 and 50 to show the manner in which the multiplying apparatus in housing 301 (FIG. 8) initiates the printing and indicating operation. It is believed that sufficient of the details are presented to enable the general principles to be understood. For further details of the mechanism employed, reference may be had to the above-identified patent, the mechanism of which forms no part, per se, of the present invention but merely serves as a suitable output means therefor.

The schematically illustrated indicating mechanism generally includes a plurality of indicator drums, each of which is individually settable to indicate various ones of the digits of an amount, and the printing mechanism includes a corresponding plurality of type wheels, which are set along with the indicator drums to enable the indicated amount to be printed.

Each indicator drum and related type wheel is driven to the desired digit-representing position under control of a sensing means, which senses a commutator to which the plurality of related potentials derived from any one accumulator order bank is applied, one of the potential levels being distinctive in accordance with the digit set in the order bank. The drive for the indicator drum and type wheel is interrupted when the distinctive digit-representing potential is sensed, so that this digit may be indicated and printed. Suitable interlocking controls are included to prevent an impression from being made from the type wheels while the type wheels are being set under control of the sensing means, and also to prevent a sensing operation from taking place while an impression is being made on the record material.

In FIGS. 49 and 50 are shown twelve separate channels for handling the printing and indication of twelve digits simultaneously. The upper two channels in FIG. 49 are noted as the pence #1 and pence #2 order bank channels. It will be recalled that it is only necessary to read out two digits from the pence accumulator, as the final answer can contain a maximum of eleven pence. Any higher quantity has, of course, been converted to shillings or pounds.

Similarly, the next two channels in FIG. 49 accommodate the digits stored in shillings #1 and #2 order banks to provide for printing and indication of these digits in the final answer.

The last eight channels illustrated in FIGS. 49 and 50 are provided to print and indicate the pounds digits appearing in pounds order banks #1 through #8, for it is possible, within the assumed exemplary capacity, to have an answer including eight pounds digits.

Each of the channels is connected over a cable including ten readout leads to the corresponding accumulator order bank. For example, the readout cable 1312, connected to the readout resistor matrix for the units pence order bank of FIGS. 34 and 35, is continued in FIG. 49 to supply the pence #1 channel. The cable 2511 from the pence tens denominational order bank #2, shown at 1056 in FIG. 35, extends to the pence #2 channel in FIG. 49. The cables 2512 and 2513 from the shillings units and tens order banks (FIG. 42) are connected to shillings #1 and shillings #2 channels of FIG. 49. In the same manner, the eight readout cables 2514 through 2521 from the pounds #1 through pounds #8 order banks of FIG. 48 are extended to the pounds #1 through #8 channels of FIGS. 49 and 50.

The pence #1 and pounds #8 channels are shown in detail, whereas the remaining channels are blocked in, being mere duplicates of the detailed channels. The pounds #8 channel includes the driving sources with their connections to a suitable control circuit of FIG. 50.

The pounds #8 cable 2521 includes the ten readout leads for the digits 0 through 9. It will be recalled that, in the subject multiplying apparatus, the distinctive potential level is −15 volts, whereas the remaining potential levels are all positive. Hence, the ten leads contained in cable 2521 have nine positive potential levels and one negative potential level, the latter being indicative of the digit stored in the pounds #8 order bank.

The ten readout leads are terminated in segments, such as 2524, which form a commutator, through which the individual potential levels of the readout leads are made available. A brush 2525 is the sensing means which traverses the segments seeking the distinctive potential level. The searching is continued in a step-by-step manner until the brush 2525 comes to rest on the segment having the distinctive potental level. The indicating drum 2526 and the type wheel 2527 of this channel, which rotate with the brush, are thus set to the stored digit according to the lead having the distinctive potential level.

The driving source for setting the indicator drum 2526 and the type wheel 2527 is the indicator motor 2528. A system of gearing, symbolically shown as the pinion 2529 and the gears 2530 and 2531, connects corresponding indicator drums 2526 and type wheels 2527 for simultaneous movement to various ones of their positions, so that a related indicating drum and type wheel will be set with the same digit in indicating and printing positions, respectively. The ratio of the gears in the gear train is such that the indicator drum 2526 and the type wheel 2527 make one tenth of a revolution for each revolution of the gear 2530.

In the above arrangement, there is included a single revolution clutch which can be coupled to the gear 2530 by a spring-urged coupling means (not shown). A clutch control lever 2532 is normally urged into a position to engage the coupling means to hold it in uncoupling relation, thereby uncoupling the clutch from its drive. A clutch control magnet 2533 is provided to rock the clutch control lever 2532 out of its engaging position to permit the gear 2530 to make one revolution and the indicator drum and type wheels to make one tenth of a revolution if the clutch magnet 2533 is energized.

This action allows the clutch to couple the drive to the output gear 2531 to move the brush 2525 to the next segment, with the indicator drum and type wheel, of course, being moved one digit position. Hence, when the brush 2525 engages a segment which does not have the distinctive potential applied thereto, it will be effective through a circuit, to be described more fully hereinafter, to cause the magnet 2533 to be energized to trip the clutch, which, if the motor 2528 is operating, will drive the brush to the next segment. As the brush engages each of the segments which does not have the distinctive potential applied thereto, the magnet 2533 will be energized repeatedly to trip the clutch, but, when it engages the segment having the distinctive potential, the magnet will not be energized, and the drive will be interrupted, leaving the indicator drum 2526 and the type wheel 2527 set to the corresponding amount and the brush 2525 standing on the corresponding segment.

The drive from the motor 2528 extends to all of the channels and may be coupled by a clutch for each channel to cause the indicator drums and type wheels for that channel to be set in a manner as described for the #8 pounds channel, according to the various digits stored in the respective accumulator banks.

An aliner (not shown) is carried by the type wheel supporting frames (also not shown) and can be rocked to engage the type wheels during a printing operation to aline the type. In the normal, unoperated, position of the aliner, it engages an interlock switch 2540 (FIG. 50, right-lower portion) and maintains the switch in its closed condition. This switch is in a D.C. circuit for controlling the setting of the indicator drums and type wheels through the clutch magnets, such as 2533, and will disable the circuit to prevent any change in the setting during a printing operation when the aliner is in its operated position, with the switch 2540 then open.

A tripping solenoid 2551 (lower-center of FIG. 50) is shown in the electrical A.C. control circuit to initiate a printing operation when energized. Energization of the solenoid 2551 causes the switch 2552 to be closed, thereby closing a circuit to the printer motor 2553 to cause an impression to be taken.

The apparatus necessary to the printing and indicating operation has now been briefly set forth. It is believed that sufficient structure has been described to permit the electrical control circuit to be understood in the following discussion. The printer and indicator apparatus is adapted to be readied for operation, for example, at the beginning of the day, when the A.C. circuit of FIG. 50 is first energized. As shown, the terminals 2554 are provided to receive the conventional 110-volt A.C. supply. When the alternating current is first applied to this circuit, a printing operation takes place as an incident to conditioning the control circuits. This conditioning insures that a further printing operation will not take place until after an indicator-drum-and-type-wheel-setting operation has been completed.

Upon initial application of current to the circuit, relay RL30 (FIG. 50) is energized over normally-closed contacts R20*b*2 and R40*b*2 and will close contacts R30*a*1 to energize solenoid 2551, which operates the motor switch 2552 for the printer motor 2553 to its closed position, thereby starting a printing operation.

Relay R30, when tripped, also closes contact R30*a*2; then, when the tripping solenoid 2551 has completely operated to close contact 2555, energizing circuit is completed for relay RL40 over normally-closed contact R20*b*2 and contacts R30*a*2 and 2555.

Relay RL40, upon being energized, opens normally-closed contact R40*b*2 to de-energize relay RL30, which in turn opens contacts R30*a*1 to de-energize the solenoid 2551. Contacts 2552 open at the end of a printing operation and remain open until the solenoid 2551 is energized again.

Relay RL40 also closes a holding circuit for itself over contacts R20*b*2 and R40*a*1 and will remain energized until relay R20 is energized in a readout or indicator-drum-and-type-wheel-setting operation. As long as relay RL40 is energized, relay RL30 will remain de-energized, and this will prevent the energization of solenoid 2551 to initiate a further printing operation.

With the printing and indicating apparatus in the above condition, it is ready to accept input signals to its twelve printing and indicating channels to perform its given function.

It will be recalled that, in the multiplying apparatus of the instant invention, the M22 tube was fired after the calculations had been made and would energize relay RL9. In FIG. 50, at the lower right, there is shown a relay contact 9*a*1, which is adapted to serve as the "Start" switch for the printing and indicating apparatus. Closure of the contacts 9*a*1 connects the +250-volt terminal 2561 to relay coil RL50. Relay RL50 closes contact R50*a*1 (FIG. 50, lower left), which completes the energizing circuit to relay RL20, which in turn closes contacts R20*a*1 to complete the circuit to the indicator-drum-and-type-wheel-driving motor 2528, causing this motor to operate and provide the drive for setting the indicator drums and type wheels.

Energization of relay RL20 also opens contacts R20*b*2, which causes relay RL40 to become de-energized. De-energization of relay RL40 allows contacts R40*b*2 in the circuit relay RL30 to reclose, but the circuit to this relay is opened at contacts R20*b*2 and relay RL30 will not be energized. Relay RL20 remains energized until the readout or setting operation has been completed and thereby prevents the energization of the solenoid 2551 to initiate a printing operation during the readout operation.

With the circuit completed to the indicator drive motor 2528, the rear trains in the several channels may be operated to set the indicator drums and type wheels. The brushes, such as 2525, which are on contacts which do not have the distinctive potential applied thereto, control their related setting control circuits to cause their indicator drums and related type wheels to be positioned.

Each setting control circuit includes a triode of the 12AT7 type, such as the tube 2562 for channel 12 (pounds #8 channel of FIG. 50). The cathode 2563 of this tube is grounded, and the anode is connected over lead 2564 and by way of the winding of magnet 2533, the aliner switch 2540, and the contacts 9*a*1 to the +250-volt supply terminal 2561. The control electrode 2565 is connected to the brush 2525 and has applied thereto the potential levels of the segments, such as 2524. Hence, as the brush 2525 is driven past the segments in succession, the potentials which have been applied to these contacts will be impressed on the grid. This triode will be conducting if its related brush senses a positive potential on the segments. The tube will be cut off when the brush engages the contact having the distinctive—i.e., negative—potential level applied thereto. Of course, each segment having the non-distinctive or positive potential enables the triode 2562 to conduct and energize the clutch magnet 2533. This trips the clutch control lever 2532 to permit the drive to be connected to the indicator drum and type wheel and to the sensing means to cause these to be driven in unison. The brush in the sensing means, together with the drum and the type wheel, will be driven through repeated cycling of the clutch until the brush 2525 engages the contact having the distinctive negative potential level, at which time the triode 2562 will be cut off, thereby de-energizing the clutch magnet 2533 and allowing the clutch trip lever 2532 to return to the clutch-uncoupling position to uncouple the drive of the indicator drum and type wheel with the proper digit in indicating and printing positions.

Each of the setting control circuits for the other units cooperates as described above to cause the related indicator drums and type wheels to be set according to the distinctive potential levels applied thereto.

Each clutch magnet, such as 2533, while energized, opens its normally closed contact, such as **2533*b*, the contacts 2533*b* for each channel being included in series in a circuit for signalling when the setting operation has been completed. This circuit is a loop circuit which in FIGS. 49 and 50 includes a portion of the loop from point 2571** (FIG. 49) through contacts 9*a*2 and then via all of the **2533*b*** type contacts and further contacts R111*a*1 (FIG. 50) to point 2572 in the latter figure.

This loop is continued in FIG. 11 of the multiplying apparatus, where the point 2571 is connected to conductor 2573, which extends to the positive terminal 359 of the bridge 352, and the point 2572 is connected to the conductor 2574, which extends through a 4,700-ohm resistor 2575 to relay coil RL10. The other side of this relay coil is connected to the negative common lead 362, and the coil is shunted by a 20-microfarad condenser 2576. Now it may be seen that this series or loop circuit must be closed or uninterrupted to complete a path for the energization of relay RL10, which relay is responsible for concluding the multiplying process, including the printing and indicating step.

Relay contacts R111*a*1 (FIG. 50) in this series circuit are normally open but are automatically closed after a short delay following the closing of the "Start" switch, which is relay contacts 9*a*1. When the contacts 9*a*1 are closed, the +250-volt supply applied at terminal 2561 (FIG. 50) is extended to a voltage divider including a one-megohm resistor 2577 and a 750,000-ohm resistor 2578 connected to the —75-volt terminal 2579. The junction point 2580 in this voltage divider circuit is connected over a 470,000-ohm grid resistor 2581 to the control electrode of a thyratron 2582, of the GL5663 variety. A 0.1-microfarad condenser 2583 is connected between the junction point 2580 of the voltage divider and ground to provide, with resistor 2578, an RC time delay network effective to delay the firing of this thyratron when it is energized.

The thyratron 2582 has its anode connected over a relay coil RL111 and a 20,000-ohm load resistor 2584 to the anode potential supply terminal 2561, the shield and the cathode being grounded. The control grid of the thyratron 2582 is normally negatively biased and, due to the capacitor 2583, will momentarily be delayed in firing when positive potential is applied to the grid circuit and anode potential is supplied to the plate circuit through the operation of the "Start" contacts 9*a*1.

When conduction takes place in the delay tube 2582, relay coil RL111 will be energized and will close contacts R111*a*1 (FIG. 50) in the loop or series circuit for relay RL10 (FIG. 11) of the multiplying apparatus. Since relay coil RL9, located in the M22 tube cathode circuit of FIG. 28, is energized, its contacts 9*a*2 in FIG. 49 will be closed in the loop or series circuit for relay RL10 of FIG. 11. Thereafter, when all of the control magnet windings, such as 2533, are de-energized at the completion of the setting of the drums and type wheels, their contacts, such as 2533*b*, will all be closed to complete the circuit for energization of relay RL10 of FIG. 11. The delay in closing contact R111*a*1 of FIG. 50 in this loop circuit was provided to insure that any control magnet windings, such as 2533, which are to be energized to cause a setting of their related drums and type wheels will be energized to open their contacts such as 2533*b* above. This control of the relay RL10, therefore, insures that the proper setting for printing and indicating will take place prior to the energization of RL10.

Relay RL10 (FIG. 11), when energized at the end of a readout or settling operation, drops relay RL9 (FIG. 28) through its contact 10*b*1 (FIG. 11), which is in the circuit to relay RL4, which maintains the B+ supply for the M chain via contact 4*a*1 of FIG. 18 at B+ supply terminal 367. Consequently, relay contacts 9*a*1 in FIG. 50 are opened to drop relay coil RL50 and also remove the anode potential from the tubes in the setting control circuit to prevent a further setting operation.

The release of relay coil RL50 opens contact R50*a*1 (FIG. 50) in the circuit to relay RL20 to de-energize this relay. RL20, when de-energized, recloses contacts R20*b*2, which action causes relay RL30 to be energized.

As explained earlier herein, the energization of relay RL30 causes the trip solenoid 2551 to be energized to initiate a printing operation via its operated contacts 2552 in the circuit for the printer motor 2553. The solenoid 2551 also causes contacts 2555 to close to energize the relay RL40, which in turn releases relay RL30 and maintains relay RL30 de-energized until relay RL20 is energized in another indicator-drum-setting operation.

The control circuits, accordingly, control the setting of the indicator drums and type wheels, as required by the distinctive —i.e., negative—potentials supplied thereto, and also inter-relate the setting operation and the printing operation, so that a setting operation cannot take place during a printing operation, and a printing operation cannot take place during a setting operation.

Also, when relay coil RL9 is energized, its contacts 9*b*1 (FIG. 19) are opened to permit the negative bias from the —105-volt terminal 565 to become effective in blocking the A ring cathode-follower 453, thereby disabling the A ring. Also, contacts 9*b*2 (FIG. 32) are closed to apply a large negative bias from the —105-volt source 1755 to the cathode 1752 of the thyratron 1751 to blow out this thyratron and restore the decision circuit to its normal or three-channel testing condition to permit examination of the pence accumulator content for extraction purposes in the next problem.

When the relay coil RL10 (FIG. 11) was energized at the end of a readout or setting operation, the following relays were dropped in the multiplying apparatus to terminate the problem set-up and return the circuitry to a normal, or new-problem-receptive, condition. These relay coils are RL4, RL7, RL8, and RL9. It has been explained how relay coil RL4 was dropped through contact 10*b*1 in FIG. 11 to relieve the B+ supply from the M chain tubes. Also, from FIG. 11, it may be seen that the positive potential lead to relay RL7 was interrupted when contacts 10*b*1 were opened, as was the case with relay RL8. When RL9 was de-energized through the dropping of the B+ supply for the M chain tubes, its contact 9*a*2 in FIG. 49 of the printer and indicator apparatus was opened, and the continuous loop or series circuit to relay RL10 of FIG. 11 was interrupted. Hence, RL10 effectively dropped itself out.

This latter relay has been made a slow-dropping relay due to the 4,700-ohm resistor 2575 in series with its coil and the 20-microfarad condenser 2576 across its coil. This delay in dropping out assures that all the other relays have dropped out previously. The machine is now in its condition, described initially during the pre-setting time, to receive a further problem for multiplication.

While the device shown and described herein is admirably adapted to fulfill the objects primarily stated, it is to be understood that it is not intended to confine the invention to the one form or embodiment disclosed herein, for it is susceptible of embodiment in various other forms within the scope of this invention.

What is claimed is:

1. In an apparatus for multiplying two factors, one of which is a decimal amount and the other of which is a sterling amount which may be made up of pounds, shillings, and pence notations, the combination of a first factor receiving means upon which may be set the decimal amount; a second factor receiving means upon which may be set the pounds, the shillings, and the pence notations of the sterling amount; a separate decimal product accumulator for each of the notations of the sterling amount; means controlled by the first and second factor receiving means for multiplying the factors and entering the products into the respective product accumulators for the pounds, shillings, and pence; means operable after the multiplication is completed for extracting shillings from the pence product accumulator until a remainder of less than a shilling remains in the pence product accumulator; means for entering the number of shillings thus extracted into the shillings product accumulator to be added to the product therein; means operable after the shillings extraction has been completed for extracting pounds from the shillings accumulator until a remainder of less than a pound remains in the shillings accumulator; and means for entering the number of pounds thus extracted into the pounds accumulator to be added to the product therein, said accumulators having therein the true product after the extracting operations.

2. In an apparatus for multiplying two factors, one of which is a decimal amount and the other of which is a sterling amount which may be made up of pounds, shillings, and pence notations, the combination of entry receiving means upon which may be set the decimal amount; entry receiving means upon which may be set the pounds, the shillings, and the pence notations of the sterling amount; a separate decimal product accumulator for each of the notations of the sterling amount; means controlled by the entry receiving means for the decimal amount and for the pence amount for multiplying the decimal amount and the pence amount and entering the product in the pence accumulator as a decimal amount; means controlled by the entry receiving means for the decimal amount and for the shillings amount for multiplying the decimal amount and the shillings amount and entering the product in the shillings accumulator as a decimal amount; means controlled by the entry receiving means for the decimal amount and for the pounds amount for multiplying the decimal amount and the pounds amount and entering the product in the pounds accumulator as a decimal amount; means operable upon the completion of the multiplying operations for repeatedly subtracting twelve pence from the pence accumulator to extract the shillings therefrom until a remainder less than twelve pence is obtained; means for entering the number of shillings thus extracted into the shillings product accumulator to be added to the product therein; means operable upon completion of the shillings extraction operation for repeatedly subtracting twenty shillings from the shillings accumulator to extract pounds therefrom until a remainder less than twenty shillings is obtained in the shillings accumulator; and means for entering the pounds thus extracted into the pounds accumulator to be added to any product therein.

3. In an apparatus for multiplying two factors, one of which is a decimal amount and the other of which is a sterling amount which may be made up of pounds, shillings, and pence notations, the combination of entry receiving means upon which may be set the decimal amount; entry receiving means upon which may be set the shillings and pence notations of the sterling amount; a separate decimal product accumulator for each of the notations of the sterling amount; means controlled by the entry receiving means for the decimal amount and for the pence amount for multiplying the decimal amount and the pence amount and entering the product in the pence accumulator as a decimal amount; means controlled by the entry receiving means for the decimal amount and for the shillings amount for multiplying the decimal amount and the shillings amount and entering this product in the shillings accumulator as a decimal amount; means operable upon completion of the multiplications for subtracting twelve pence from the pence accumulator to extract the shillings therefrom until a remainder less than twelve pence is obtained; means for entering the number of shillings thus extracted to the shillings product accumulator to be added to the product therein; means operable upon completion of the shillings extraction for subtracting twenty shillings from the shillings accumulator to extract pounds therefrom until a remainder less than twenty shillings is obtained in the shillings accumulator; and means for entering the pounds thus extracted into the pounds accumulator.

4. In an apparatus for multiplying two factors, one of which is a decimal amount and the other of which is a sterling amount which may be made up of pounds and shillings notations, the combination of entry receiving means upon which may be set the decimal amount; entry receiving means upon which may be set the pounds and shillings of the sterling amount; a separate decimal product accumulator for each of the notations of the sterling amount; means controlled by the entry receiving means for the decimal and shillings amounts for multiplying the decimal amount and the shillings amount and entering the product in the shillings accumulator as a decimal amount; means controlled by the entry receiving means for the decimal and pounds amounts for multiplying the decimal amount and the pounds amount and entering the product in the pounds accumulator as a decimal amount; means operable upon completion of the multiplications for repeatedly subtracting twenty shillings from the shillings accumulator to extract pounds therefrom until a remainder less than twenty shillings is obtained in the shillings accumulator; and means for entering the pounds thus extracted into the pounds accumulator to be added to the product therein.

5. In an apparatus for multiplying two factors, one of which factors is in the decimal notation and the other of which factors is made up of at least two notations having different radices, the units in the different notations having different relative values in the factor, means for entering said one factor into the apparatus; means for entering said other factor into the apparatus; a separate decimal product accumulator related to each notation of the second factor; means controlled by the two factor entering means for multiplying said factors and entering the products as decimal numbers into the respective accumulators related to the notations of the second factor; means operable upon completion of the operation of the multiplying means for extracting units of the next higher valued notation from the product in the accumulator of the lowest valued notation by subtracting from the accumulator of the lowest valued notation the number of units of the lowest valued notation which are equal to one unit of the next higher valued notation until less than said number of units remains in the accumulator of the lowest valued notation; and means for entering the number of units of the next higher valued notation thus extracted into said next higher notation accumulator to be added to the product therein; said accumulators then containing the final product of the multiplication of the factors.

6. In an apparatus for multiplying two factors, one of which factors is in the decimal notation and the other of which factors is made up of a plurality of notations having different radices, the units in the different notations having different relative values in the factor, means for entering said one factor into the apparatus; means for entering said other factor into the apparatus; a separate decimal product accumulator for each notation of the second factor; means controlled by the two factor-entering means for multiplying said factors and entering the products as decimal numbers into the respective accumulators related to the various notations of the second factor; means operable upon completion of the operation of the multiplying means for extracting units of the next higher valued notation from the accumulator of the lowest valued notation by subtracting from the accumulator of the lowest valued notation the number of units of the lowest valued notation which are equal to one unit of said next higher valued notation until less than said number of units remains in the accumulator of the lowest valued notation; means for entering the number of units of higher valued notations thus extracted into said next higher valued notation accumulator to be added to any product therein; means thereafter operable for extracting units of a next further higher value notation from said next higher value notation accumulator by subtracting from the accumulator of said next higher valued notation the number of units of said next higher notation which are equal to one unit of said next further higher valued notation until less than said number of units remains in the accumulator of said next higher valued notation; and means for entering the number of units of next further higher notation thus extracted into the next further higher value notation accumulator to be added to any product therein, said product accumulators containing the true product after the extracting operations.

7. In an apparatus for multiplying two factors, one of which factors is a decimal fractional amount and the other of which factors is a sterling amount and may include pounds, shillings, and pence notations, first factor-receiving means upon which said one factor may be set; second factor-receiving means upon which the other factor may be set; a plurality of decimal product accumulators, one for each of the pounds, shillings, and pence notations; means controlled by the first and second factor-receiving means for multiplying the factors and entering the products into the respective product accumulators; means controlled by the pounds and shillings product accumulators for converting any fractional parts of pounds and shillings products into equivalent pence amounts and entering these amounts into the pence accumulator to be added to the product therein; means for extracting shillings fom the pence accumulator until a remainder of less than a shilling is obtained in the pence accumulator; means for entering the number of shillings thus extacted into the shillings accumulator to be added to the product therein; means for thereafter extracting pounds from the shillings accumulator until a remainder of less than a pound is obtained in the shillings accumulator; and means for entering the number of pounds thus extracted into the pounds accumulator to be added to any product therein, said whole number amounts in the pounds and shillings accumulators and the amount in the pence accumulator after the extracting operations corresponding to the true product.

8. In an apparatus for multipling two factors, one of which factors is a decimal amount and includes a decimal fraction and the other of which factors is a sterling amount and may include pounds, shillings, and pence notations, first factor-receiving means upon which said one factor may be set; second factor-receiving means upon which said other factor may be set; a plurality of decimal accumulators, one for each of the pounds, shillings, and pence notations of said other factor for separately accumulating products for these notations; means controlled by the first and second factor-receiving means for multiplying the factors and entering the products into the respective accumulators; means controlled by the pounds and shillings product accumulators for converting any decimal fractional parts of pounds and shillings into equivalent pence amounts and entering these pence amounts into the pence accumulator to be added to any product therein; means for thereafter extracting shillings from the pence accumulator by substracting twelve pence from the pence accumulator until less than twelve pence remain in the pence accumulator; means for enterting the number of shillings thus extracted into the shillings accumulator to be added to any product therein; means for subsequently extracting pounds from the shillings accumulator by subtracting twelve pence from the shillings accumulator until less than twenty shillings remain in the shillings accumulator; and means for entering the number of pounds thus extracted into the pounds accumulator to be added to any product therein, the whole number amounts in the pounds and shillings accumulators and the amount in the pence accumulator after the extracting operations representing the true product.

9. In an apparatus for multiplying two factors, one of which factors is in the decimal notation and contains a decimal fractional part, and the other of which factors is made up of at least two notations having different radices, the units in the different notations having different relative values in the factor; means for entering said one factor into the apparatus; means for entering said other factor into the apparatus; a separate decimal product accumulator related to each notation of the second factor; means controlled by the two factor entering means for multiplying said factors and entering the products as decimal numbers into the respective accumulators related to the notations of the second factor; means operable at the conclusion of the multiplying operation and controlled by the accumulator for the higher valued notation to convert any fractional part of the product of said higher valued notation into the equivalent number of units of the lowest valued notation and to enter them into the lowest value notation accumulator to be added to the product therein; means set into operation at the completion of the operation of the converting means for extracting units of the next higher valued notation from the product in the accumulator of the lowest valued notation by repeatedly subtracting from the accumulator of the lowest value notation the number of units of the lowest valued notation which are equal to one unit of the next higher valued notation until less than said number of units remains in the accumulator of the lowest valued notation; and means for entering the number of units of the next higher valued notation thus extracted into said next higher notation accumulator to be added to the product therein.

10. In an apparatus for multiplying two factors, one of which factors is in the decimal notation and contains a decimal fractional part and the other of which factors is made up of a plurality of notations having different radices, the units in the different notations having different relative values in the factor; means for entering said one factor into the apparatus; means for entering said other factor into the apparatus; a separate decimal product accumulator for each notation of the second factor; means controlled by the two factor-entering means for multiplying said factors and entering the products as decimal numbers into the respective accumulators related to the various notations of the second factor; means operable upon completion of the operation of the multiplying means and controlled by the accumulators for the higher valued notations for converting fractional parts of products in said higher valued notations into equivalent numbers of units of the lowest valued notation and entering these units into the accumulator of the lowest valued notation to be added to the product therein; means set in operation by the completion of the operation of the converting means for extracting units of the next higher valued notation from the accumulator of the lowest valued notation by subtracting from the accumulator of the lowest valued notation the number of units of the lowest valued notation which are equal to one unit of said next higher valued notation until less than said number of units remains in the accumulator of the lowest valued notation; means for entering the number of units of higher valued notation thus extracted into said next higher valued notation accumulator to be added to any product therein; means thereafter operable for extracting units of a next further higher value notation from said next higher value notation accumulator by subtracting from the accumulator of said next higher valued notation the number of units of said next higher notation which are equal to one unit of said next further higher valued notation until less than said number of units remains in the accumulator of said next higher notation; and means for entering the number of units of next further higher notation thus extracted into the next further higher value notation accumulator to be added to any product therein, the whole number part of the products in the accumulators of the further higher and next higher valued notations and the product in the accumulator of the lowest valued notation making up the true product.

11. In an apparatus for multiplying two factors, one of which factors is a decimal amount and includes a decimal fractional part and the other of which factors is a sterling amount and may include pounds, shillings, and pence notations, first factor-receiving means upon which said first factor may be set; second factor-receiving means upon which said other factor may be set; a plurality of decimal accumulators, one for receiving the products involving each of the pounds, shillings, and pence notations; sequence control means for controlling the sequence of operations which are necessary to produce the final product; means controlled by the first and second factor-receiving means and by the sequence control means for multiplying the factors and entering the products into the respective product accumulators; means set into operation by the sequence control means at the end of the operation of the multiplying means and controlled by the pounds accumulator or multiplying any fractional part of pounds by two hundred and forty to convert the decimal part into an equivalent pence amount and entering the amount into the pence accumulator to be added to the product therein; means set into operation by the sequence control means at the end of the fractional pounds conversion and controlled by the shillings accumulator for multiplying any fractional part of shillings by twelve to convert the fraction into an equivalent pence amount and enterting the amount into the pence accumulator to be added to the product therein; means set into operation by the sequence control means at the end of the second converting operation for extracting shillings from the pence accumulator by subtracting twelve pence therefrom until less than twelve pence remains in the pence accumulator; means for entering the number of shillings thus extracted into the shillings accumulator to be added to the product therein; means set into operation by the sequence control means at the end of the shillings extraction operation for extracting pounds from the shillings accumulator by subtracting twenty shillings therefrom until less than twenty shillings remains in the shillings accumulator; and means for entering the number of pounds thus extracted into the pounds accumulator to be added to the product therein, said whole number amounts in the pounds and shillings accumulators and the amount in the pence accumulator after the extracting operation corresponding to the true product.

12. In an apparatus for multiplying two factors, one of which factors is a decimal amount and the other of which factors is a sterling amount which may be made up of pounds, shillings, and pence notations, the combination of factor entry means upon which may be set the decimal amount; factor entry means upon which may be set the pounds, the shillings, and the pence of the sterling amount; a separate decimal product accumulator for each of the notations of the sterling amount; sequence control means for controlling the sequence of operations which are necessary to produce the final product; multiplying means controlled by the entry-receiving means for the decimal amount and for the pence amount and by the sequence control means for first multiplying the decimal amount and the pence amount and entering the product in the pence accumulator as a decimal amount; multiplying means controlled by said entry-receiving means for the decimal amount and for the shillings amount and by the sequence control means for next multiplying the decimal amount and the shillings amount and entering the product in the shillings accumulator as a decimal amount; multiplying means controlled by said entry-receiving means for the decimal amount and for the pounds amount and by the sequence control means for thereafter multiplying the decimal amount and the pounds amount and entering the product in the pounds accumulator as a decimal amount; said sequence control means omitting multiplications involving any notations of the sterling amount when no amount is set up in that notation; means controlled by the sequence control means and operable after the multiplications have been completed for extracting shillings from the pence accumulator by subtracting the number of pence in a shilling from the product until the number of pence remaining in the pence accumulator is less than the number of pence in a shilling; means for entering the number of shillings thus extracted into the shillings accumulator to be added to the product therein; means controlled by the sequence control means and operable after the shillings extraction is completed for extracting pounds from the shillings accumulator by subtracting the number of shillings in a pound from the product until the number of shillings remaining is less than the number of shillings in a pound; and means for entering the number of pounds thus extracted into the pounds accumulator to be added to the product therein, said accumulators containing the true product after the extracting operations.

13. In an apparatus for multiplying two factors, one of which factors is in the decimal notation and the other of which factors is made up of at least two notations having different radices, the units in the different notations having different relative values in the factor, means for entering said one factor into the apparatus; means for entering said other factor into the apparatus; a separate decimal product accumulator related to each notation of the second factor; sequence control means for controlling the sequence of operations which are necessary to produce the final product; means controlled by the two factor entering means and by the sequence control means for multiplying said factors and entering the products as decimal numbers into the respective accumulators related to the notations of the second factor; means controlled by the sequence control means and rendered operable thereby at the conclusion of the multiplying operation for extracting units of the next higher valued notation from the product in the accumulator of the lowest valued notation by repeatedly subtracting from the accumulator of the lowest valued notation the number of units of the lowest valued notation which are equal to one unit of the next higher valued notation until less than said number of units remains in the accumulator of the lowest valued notation; and means for entering the number of units of the next higher valued notations thus extracted into said next higher notation accumulator to be added to the product therein; said accumulators then showing the final product of the multiplication of the factors.

14. In an apparatus for multiplying two factors, one of which factors is in the decimal notation and the other of which factors is made up of a plurality of notations having different radices, the units in the different notations having different relative values in the factor, means for entering said one factor into the apparatus; means for entering said other factor into the apparatus; a separate decimal product accumulator for each notation of the second factor; sequence control means for controlling the sequence of operation of the various means which are necessary to produce the final product; means controlled by the two factor-entering means and by the sequence control means for multiplying said factors and entering the products as decimal numbers into the respective accumulators related to the various notations of the second factor; means set in operation by the sequence control means upon completion of the operation of the multiplying means for extracting units of the next higher valued notation from the accumulator of the lowest valued notation by repeatedly subtracting from the accumulator of the lowest valued notation the number of units of the lowest valued notation which are equal to one unit of said next higher valued notation until less than said number of units remains in the accumulator of the lowest valued notation; means for entering the number of units of higher valued notation thus extracted into said next higher valued notation accumulator to be added to any product therein; means thereafter set in operation by the sequence control means and operable to extract units of a next further higher value notation from said next higher value notation accumulator by subtracting from the accumulator of said next higher valued notation the number of units of said next higher notation which are equal to one unit of said next further higher valued notation repeatedly until less than said number of units remains in the accumulator of said next higher valued notation; and means for entering the number of units of next further higher notation thus extracted into the next further higher value notation accumulator to be added to any product therein, said product accumulators containing the true product after the extracting operations.

15. Multiplying apparatus for obtaining the product of a decimal amount by a sterling amount, comprising, in combination, first input means for entering said decimal amount into the apparatus, respective second input means for each notation of said sterling amount for entering said sterling amount into the apparatus, means responsive to said first and second input means for developing digit-representing pulse groups representative of each of the digits in the decimal amount, a number of times corresponding to each of the digits in the sterling amount; decimal accumulator means having a plurality of denominational order banks for each notation of said sterling amount; means for introducing the pulse groups into the proper order banks of the accumulator means as determined by the denominational order of the digits in the sterling amount; means for converting the accumulated product into the least number of integral sterling quantities; and means for indicating said quantities.

16. Multiplying apparatus for obtaining the product of a decimal amount by a multiple-species sterling amount, comprising, in combination, first input means for entering said decimal amount into the apparatus, respective second input means for each species of said sterling amount for entering said sterling amount into the apparatus, means responsive to said first and second input means for developing digit-representing pulse groups representative of each of the digits in the decimal amount a number of times corresponding to each of the digits in the sterling amount; a separate accumulator means for each of said multiple species of the sterling amount, each accumulator means including a plurality of decimal denominational order banks; means for sequentially introducing the pulse groups by species into the proper order banks of the related accumulator means as determined by the denominational order of the digits in the sterling amount; means for converting the accumulated product into the least number of integral quantities in lower order species accumulator means; and means for indicating the converted result.

17. Multiplying apparatus for obtaining the product of a decimal amount by a multiple-species sterling amount, comprising, in combination, first input means for entering said decimal amount into the apparatus respective second input means for each species of said sterling amount for entering said sterling amount into the apparatus, means responsive to said first and second input means for developing digit-representing pulse groups representative of each of the digits in the decimal amount, a number of times corresponding to each of the digits in the sterling amount; decimal accumulator means for each of said species; programming means for sequentially controlling the development of the pulse groups by species of the sterling amount from the lowest order to the highest order; means under control of the programming means for introducing the pulse groups into the proper order banks of the related accumulator means to form the product as determined by the denominational order of the digits in the sterling amount; means for converting the product accumulated in the various accumulator means into the least number of integral sterling quantities in predetermined ones of the species; and means for indicating said quantities.

18. Multiplying apparatus for obtaining the product of a decimal amount including a decimal fraction by a multiple-species sterling amount, comprising, in combination, first input means for entering said decimal amount into the apparatus, respective second input means for each species of said sterling amount for entering said sterling amount into the apparatus, means responsive to said first and second input means, for developing digit-representing pulse groups representative of each of the digits in the decimal amount, a number of times corresponding to each of the digits in the sterling amount; accumulator means for each of the species of the sterling amount, each accumulator means including a plurality of order banks; means for introducing the pulse groups into the proper order banks of the accumulator means with the fractional order digits going to fractional order banks, all as determined by the denominational order of the digits in the sterling amount; means for converting the fractional portions of the amounts in the accumulator means for sterling species of all but the lowest order species into integral units of the lowest species; means for entering the so-derived integral units into the proper accumulator order banks of the lowest order species; means for extracting higher order integral species from the next lower order species accumulator means and adding the number extracted to the higher order species accumulator means; and means for indicating the resulting product formed in said species accumulator means.

19. Multiplying apparatus for obtaining the product of a decimal expression by a sterling expression including pounds, shillings, and pence, comprising, in combination, first input means for entering said decimal amount into the apparatus, respective second input means for each the pounds, shilling, and pence of said sterling amount for entering said sterling amount into the apparatus, means responsive to said first and second input means for developing digit-representing pulse groups representative of each of the digits in the decimal expression, a number of times corresponding to each of the digits in the sterling expression; separate pounds, shillings, and pence accumulator means; matrix means for establishing pulse paths from the means for developing digit-representing pulse groups to the separate pounds, shillings, and pence accumulators; means for selectively controlling the matrix means to open paths for the pence digit-representing pulses to the pence accumulator means, for the shillings digit-representing pulses to the shillings accumulator means, and for the pounds digit-representing pulses to the pounds accumulator means; means for converting the product in the several accumulator means into the greatest number of integral pounds and shillings with any pence remainder; and means for indicating the pounds, shillings, and pence in the several accumulator means.

20. Multiplying apparatus for multiplying a decimal expression by a multiple-species sterling expression, comprising, in combination, first entry means for entering the decimal expression as the multiplicand factor; further entry means for entering the sterling expression as the multiplier factor; means for representing the decimal expression in the form of digital pulse groups as selected by the first entry means; decimal accumulator means for each of the multiple species for receiving the digital pulse groups as sterling species in decimal denominational order banks thereof; stepping means controlled by the further entry means for controlling the entry of the pulse groups into the related accumulator means a number of times equal to each of the digits of the sterling expression; means for extracting higher order sterling species out of lower order sterling species accumulator means to reduce the lower order sterling species to the least integral product; means to enter the number of higher order species extracted from the lower order accumulator into the higher order species accumulator to be added to the product stored therein; and means for making said product available.

21. Multiplying apparatus for multiplying a decimal amount by a multiple-species sterling amount, comprising, in combination, first entry means for entering the decimal amount as the multiplicand factor; further entry means for entering the sterling amount as the multiplier factor; pulse-developing means for representing the multiplicand factor in the form of digital pulse groups as selected by the factor in the first entry means; decimal accumulator means for each species of the sterling amount to receive the digital pulse groups in decimal denominational order banks thereof; stepping means operative through the further entry means for controlling the entry of the pulse groups into the related accumulator means a number of times equal to each of the digits of the multiplier factor; matrix means for providing a plurality of paths from the pulse-developing means to the order banks of the several accumulator means; means for selecting the appropriate paths through the matrix according to the digits of the multiplier factor; means for extracting higher order multiplier species out of lower order multiplier species to reduce the product to the least integral expression; and means for indicating the digits of said expression in the accumulator means.

22. Multiplying apparatus for multiplying a decimal expression which may include decimal fraction by a sterling expression which may include pounds, shillings, and pence, comprising, in combination, first entry means for entering the decimal expression as the multiplicand factor; further entry means for entering the sterling expression as the multiplier factor; pulse supply means for representing the decimal expression in the form of digital pulse groups as selected by the first entry means; separate pounds, shillings, and pence accumulator means to receive the digital pulse groups as sterling species in decimal denominational order banks thereof; means for designating a selectible number of the order banks of each of the accumulator means to receive the decimal fraction; stepping means operative through the further entry means for controlling the entry of pulse groups into the related accumulator means a number of times equal to each of the digits of the sterling expression; means for converting any fractional decimal pounds and shillings in the fractional decimal order banks of the pounds and shillings accumulator means to pence and entering the amount in the pence accumulator; means for extracting integral shillings from any pence total over 11 and adding them into the shillings accumulator; means for extracting integral pounds from any shillings total over 19 and adding them into the pounds accumulator; and means for indicating the pounds, shillings, and pence in the accumulator means after the extracting operations.

23. Multiplying apparatus for multiplying a decimal number by a sterling expression which may include pounds, shillings, and pence, comprising, in combination, first entry means for entering the decimal number as the multiplicand factor; further entry means for entering the various species of the sterling expression as the multiplier factor; pulse supply means for representing the decimal number in the form of digital pulse groups as selected by the first entry means; separate pounds, shillings, and pence accumulator means to receive the digital pulse groups as sterling species in decimal denominational order banks of each of the separate accumulator means; sequence control means operative through the further entry means for controlling the entry of the pulse groups into the related accumulator means a number of times equal to each of the digits of the sterling expression; logical decision means controlled by further operation of the sequence control means and connectible to selectible order banks of the pence and the shillings accumulator means; means operative through the logical decision means for testing to determine if any shillings are extractible from the pence accumulator means content and if any pounds are extractible from the shillings accumulator content; means effective to perform the determined extractions through successive subtractions from the pence and shillings accumulator means; means for entering tallies in the shillings and pounds accumulator means in accordance with the extractions thereof from the pence and shillings accumulator means; and means for indicating the reduced content of the various accumulator means to make the product known.

24. Multiplying apparatus for multiplying a decimal number by a sterling number which may include pounds, shillings, and pence, comprising, in combination, first entry means for entering the decimal number as the multiplicand factor; further entry means for entering the sterling number as the multiplier factor; pulse supply means for representing the decimal number in the form of digital pulse groups as selected by the first entry means; separate pounds, shillings, and pence accumulator means to receive the digital pulse groups as sterling species in decimal denominational order banks of each of the separate accumulator means; stepping means operative through the further entry means for controlling the entry of the pulse groups into the related accumulator means a number of times equal to each of the digits of the sterling expression; switching means for establishing paths from the first entry means to the separate pounds, shillings, and pence accumulator means when the pounds, shillings, and pence multiplier digits are controlling; a logical decision circuit for determining a quantity is divisible by 12; means for connecting said decision circuit to the pence accumulator means to examine the quantity of pence stored therein; means under control of the decision circuit for extracting integral shillings from said quantity of pence when the quantity exceeds 12 and causing an entry of "1" in the proper order of the shillings accumulator means for each extraction; means for modifying the decision circuit to determine when a quantity is divisible by 20; means for connecting the decision circuit thus modified to the shillings accumulator means to examine the quantity of shillings therein; further means under control of the decision circuit for extracting integral pounds from the quantity of shillings when the quantity exceeds 20 and causing an entry of "1" in the proper order of the pounds accumulator means for each extraction; and means for indicating the quantities in the several accumulator means.

25. Multiplying apparatus for obtaining the product of a decimal expression by a sterling expresison which may include pounds, shillings, and pence, comprising, in combination, first entry means for entering the decimal expression as the multiplicand; further entry means for entering the sterling expression as the multiplier to determine the number of times the multiplicand will be successively added; continuously cycling means for developing pulse groups indicative of each of the digits 0 through 9 each cycle thereof; pulse paths from the cycling means to the first entry means; separate pounds, shillings, and pence accumulator means; matrix means for selectively establishing paths from the first entry means to the pounds, shillings, and pence accumulator means, over which paths the pulse groups from the cycling means, as selected by the first entry means, are passed to the accumulator means; a sequencing chain for controlling the matrix means to selectively open paths therethrough in accordance with the pence, shillings, and pounds denominational order digits for the pence digit-representing pulse groups to the pence accumulator means, the shillings digit-representing pulse groups to the shillings accumulator means, and the pounds digit-representing pulse groups to the pounds accumulator means; a stepping and counting ring for counting each cycle of the cycling means as a single count and thereby counting off cycles according to the particular sterling multiplier digit which is controlling, the number of times the multiplicand digit-representing pulse groups are developed for successive addition; output means in the stepping and counting ring for supplying a pulse via the further entry means to the sequencing chain when the stepping and counting ring has counted up to the multiplier digit, to thereby advance the sequencing chain; a circuit from the sequenching chain to the counting and stepping ring to reset the ring to zero each time the chain is advanced, to set up paths through the matrix for the next higher order multiplier digit; and means for converting the accumulated product in the pounds, shillings, and pence accumulator means so that the product is represented in proper sterling values, with the amount in the pence accumulator less than a shilling, and the amount in the shillings accumulator means less than a pound.

26. The multiplying apparatus of claim 25 including means for converting any fractional pounds and shillings to pence, comprising a gate associated with each accumulator order bank containing a fraction; means for introducing ten pulses from the cycling means to any fractional order bank of the pounds and shillings accumulator means and to the gates simultaneously; means under control of the order banks for opening the associated gates as the order banks pass through zero; means for applying the pulses which pass said gates through said matrix to the proper order bank of the pence accumulator; and fixed control means from the stepping and counting ring to the cycling means for repeating the application of the gated pulses to the pence accumulator a predetermined number of times necessary to effect a conversion.

27. The multiplying apparatus of claim 25 wherein the product-reducing means comprises a logical decision circuit for determining if integral shillings can be extracted from the pence accumulator content and integral pounds from the shillings accumulator content; input connections for the logical decision circuit adapted to be connected selectively to the pence accumulator means and to the shillings accumulator means under control of the sequencing chain; means included in the logical circuit for testing the content of the pence accumulator means to determine if integral shillings can be extracted therefrom and for thereafter testing the content of the shillings accumulator means to determine if integral pounds can be extracted therefrom; and means for extracting such integral quantities when possible.

28. In a sterling multiplying apparatus having separate pounds, shillings and pence accumulators, each having a plurality of decimal order banks with 0 and 1 read-out leads therefor; an extraction circuit for extracting integral shillings from stored pence, comprising, in combination, three input channels; a pence read-out matrix for selectively connecting the 0 and the 1 read-outs of the pence accumulator order banks to the input channels, said input channels including paths through the pence read-out matrix for the extraction circuit; sequencing means effective upon the pence matrix for enabling three of the pence order banks at a time to control the extraction circuit over the input channels; logical means in said channels for establishing a predetermined output signal if extraction is possible and a different signal if extraction is not possible; means for extracting integral shillings from the pence accumulator order banks in response to each output signal; means for advancing the sequencing means to shift the extraction circuit to the control of different pence order banks over the pence matrix in response to said different signal; and means for tallying into the shillings accumulator for each extraction.

29. The extraction circuit of claim 28 including means for disabling one of the three channels; a shillings read-out matrix for selectively connecting the 0 and the 1 read-outs of the shillings accumulator over paths including the two remaining channels to the logical means; means for extracting integral pounds from the shillings accumulator in response to the output signal; and means for tallying into the pounds accumulator for each extraction.

References Cited in the file of this patent

UNITED STATES PATENTS

| | | |
|---|---|---|
| 2,237,335 | Bryce | Apr. 8, 1941 |
| 2,346,249 | Bryce | Apr. 11, 1944 |
| 2,346,616 | Saxby | Apr. 11, 1944 |
| 2,674,727 | Spielberg | Apr. 6, 1954 |
| 2,719,959 | Hobbs | Oct. 4, 1955 |
| 2,745,599 | Woods-Hill et al. | May 15, 1956 |
| 2,776,380 | Andrews | Jan. 1, 1957 |
| 2,837,278 | Schreiner et al. | June 3, 1958 |
| 2,884,616 | Fillebrown et al. | Apr. 28, 1959 |
| 2,907,877 | Johnson | Oct. 6, 1959 |
| 2,942,193 | Tryon | June 21, 1960 |